United States Patent [19]

Tung et al.

[11] Patent Number: 5,490,247
[45] Date of Patent: Feb. 6, 1996

[54] VIDEO SUBSYSTEM FOR COMPUTER-BASED CONFERENCING SYSTEM

[75] Inventors: Peter Tung, Beaverton; Mike Gutmann, Portland, both of Oreg.

[73] Assignee: Intel Corporation, Santa Clara, Calif.

[21] Appl. No.: 157,478

[22] Filed: Nov. 24, 1993

[51] Int. Cl.[6] .................................................. G06F 15/00
[52] U.S. Cl. ................................... 395/162; 395/200.04
[58] Field of Search ..................................... 395/162–164, 395/114, 200, 200.04; 370/62; 379/202; 348/15, 384; 382/56, 232; 364/514 A, 514 C

[56] References Cited

U.S. PATENT DOCUMENTS 4,475,193  10/1984  Brown ...................................... 379/202
4,998,243  3/1991  Kao ........................................... 370/62

(List continued on next page.)

FOREIGN PATENT DOCUMENTS 0523629  7/1992  European Pat. Off. ........ H04M 11/00

OTHER PUBLICATIONS

Computer Conferencing: IBM Scientists Demo Prototype of Affordable Computer Conferencing System, Nov. 2, 1992 EDGE, on & about AT&T, v7, No. 223, p. 22.
Nakamura et al., "Personal Multimedia Teleconferencing Terminal." IEEE International Conference On Communications ICC 90–Session 211. vol. 1, 15 Apr. 1990, Atlanta (US).
Maeno et al., "Distributed Desktop Conferencing System (Mermaid) Based on Group Communication Architecture." IEICE Transactions, vol. E74, No. 9, Sep. 1991, Tokyo JP.
Tanigawa et al., "Personal Multimedia–Multipoint Teleconference System," IEEE INFOCOM 91–Conference on Computer Communications–Session 9D, vol. 3, 7 Apr. 1991, Bal Harbour (US).
Eleftheriadis et al., "Algorithms and Performance Evaluation of the Xphone Multimedia Communication System." ACM Multimedia 93–Proceedings First ACM International Conference on Multimedia, 1 Aug. 1993, Anaheim (US).
Zhang et al., "Video Communication on LANs—Multimedia CSCW Applications." CCECE/CCGEI '93.
Ramanathan et al., "Integrating Virtual Reality, Tele–Conferencing, and Entertainment into Multimedia Home Computers". IEEE Transactions on Consumer Electronics, vol. 38, No. 2, May 1992.
Chen et al., "A Multimedia Desktop Collaboration System." Globecom 92—EEE Global Telecommunications Conference, vol. 2, 6 Dec. 1992–9 Dec. 1992. Orlando (US).
Vin et al., "Multimedia Conferencing in the Etherphone Environment." Computer, vol. 24, No. 10, Oct. 1991. Long Beach (US).

Primary Examiner—Raymond J. Bayerl
Assistant Examiner—Kee M. Tung
Attorney, Agent, or Firm—Steve Mendelsohn; William H. Murray

[57] ABSTRACT

A video microcode resides on a video board of the computer conferencing system. A video capture driver, a video manager, and a video applications programming interface reside on a general-purpose host processor of the computer conferencing system. The video microcode receives local analog video signals, generates local compressed video signals corresponding to the local analog video signals, and passes the local compressed video signals to the video capture driver. The video capture driver controls the operations of the video microcode and passes the local compressed video signals to the video manager. The video manager passes the local compressed video signals to a communications subsystem of the computer conferencing system for transmission over a communications link to a remote computer conferencing system. The video manager receives remote compressed video signals from the communications subsystem and passes the compressed video signals to the video capture driver, the communications subsystem having received the remote compressed video signals over the communications link from the remote computer conferencing system. The video capture driver generates remote decompressed video signals corresponding to the remote compressed video signal for local playback.

6 Claims, 32 Drawing Sheets

U.S. PATENT DOCUMENTS

| | | | |
|---|---|---|---|
| 5,014,267 | 5/1991 | Tompkins et al. | 370/62 |
| 5,056,136 | 10/1991 | Smith | 380/10 |
| 5,072,442 | 12/1991 | Todd | 370/62 |
| 5,157,491 | 10/1992 | Kassatly | 348/15 |
| 5,315,633 | 5/1994 | Champa | 379/202 |
| 5,319,793 | 6/1994 | Hancock et al. | 395/800 |
| 5,333,133 | 7/1994 | Andrews et al. | 370/58.2 |
| 5,335,321 | 8/1994 | Harney et al. | 395/162 |
| 5,375,068 | 12/1994 | Palmer et al. | 364/514 C |
| 5,384,598 | 1/1995 | Rodriguez et al. | 348/384 |
| 5,384,772 | 1/1995 | Marshall | 370/60 |
| 5,392,223 | 2/1995 | Caci | 364/514 A |

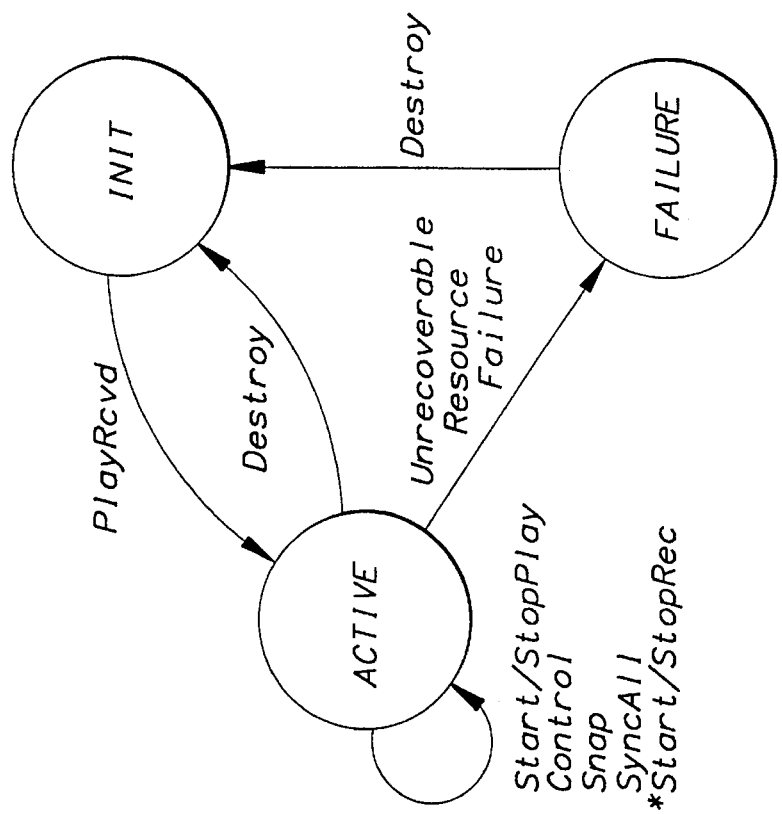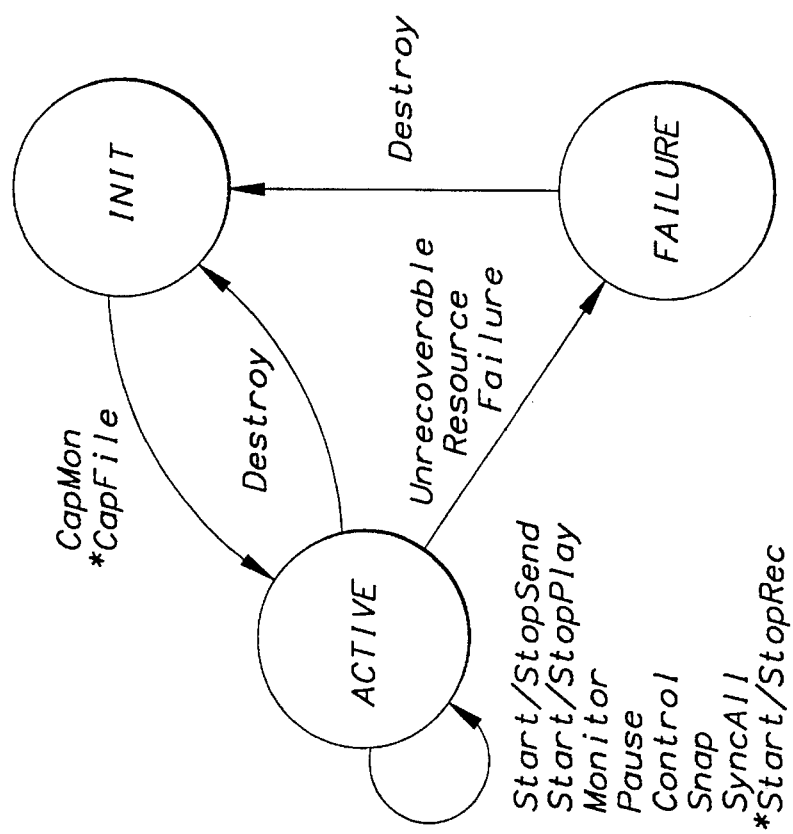
FIG. 9

FIG. 27.

| (BITS) | (FIELD) |
|---|---|
| 8 | Control |
| 16 | Length |
| 16 | CRC |
| 0- | Data |

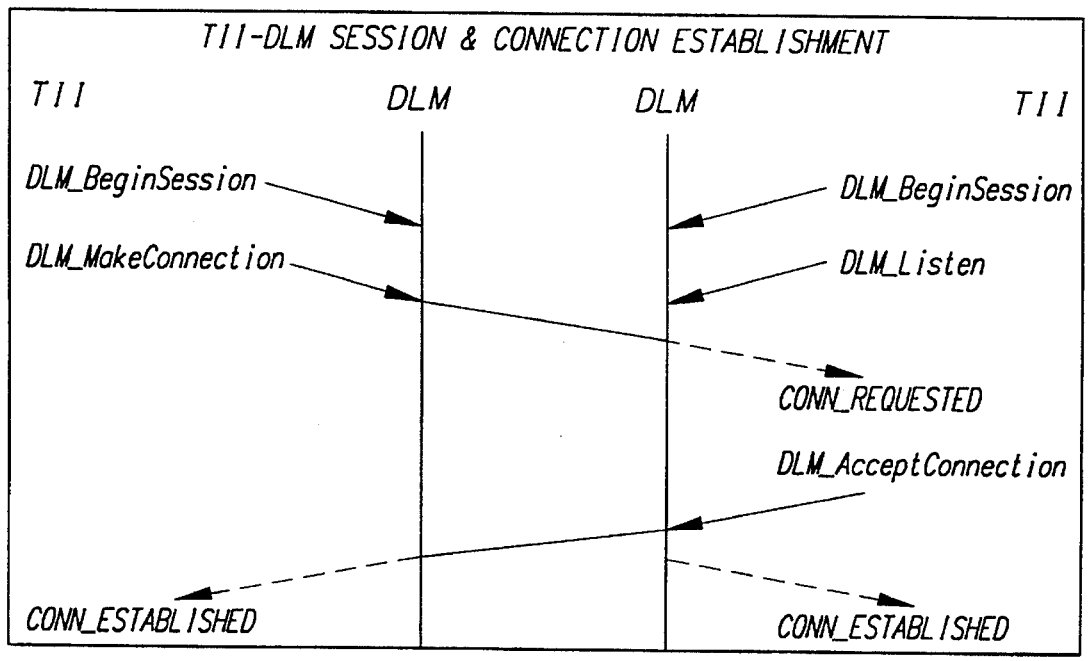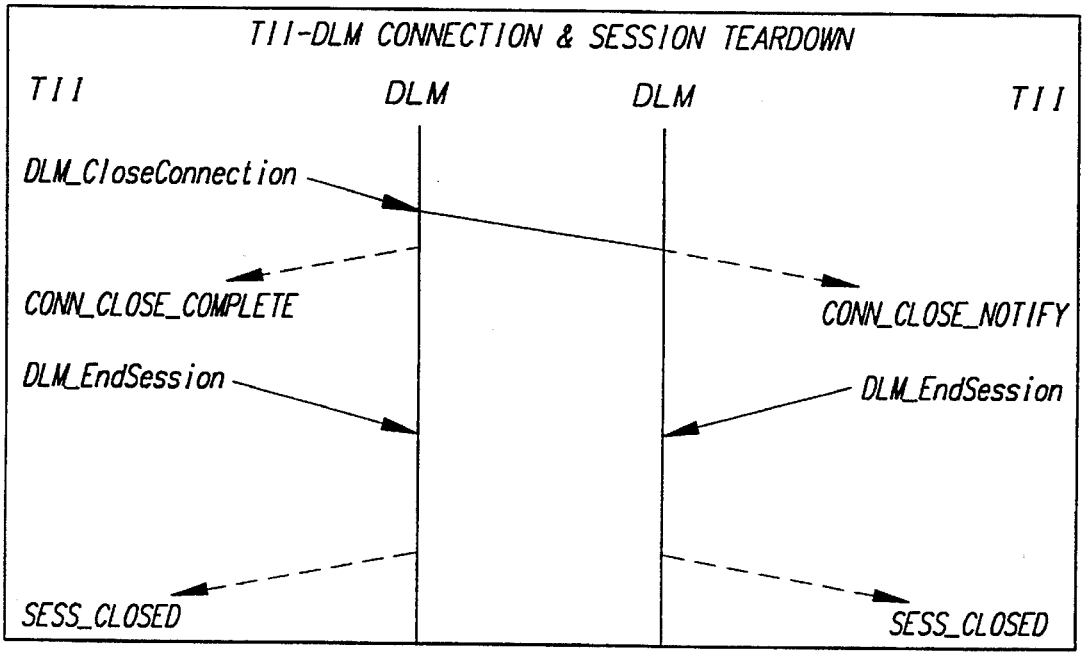
FIG. 29

VC BOARD BASIC ARCHITECTURE 5,490,247

VIDEO SUBSYSTEM FOR COMPUTER-BASED CONFERENCING SYSTEM

BACKGROUND OF THE INVENTION

1. Field of the Invention

The present invention relates to audio/video conferencing, and, in particular, to systems for real-time audio, video, and data conferencing in windowed environments on personal computer systems.

2. Description of the Related Art

It is desirable to provide real-time audio, video, and data conferencing between personal computer (PC) systems operating in windowed environments such as those provided by versions of Microsoft® Windows operating system. There are difficulties, however, with providing real-time conferencing in non-real-time windowed environments.

It is accordingly an object of this invention to overcome the disadvantages and drawbacks of the known art and to provide real-time audio, video, and data conferencing between PC systems operating in non-real-time windowed environments.

It is a particular object of the present invention to provide real-time audio, video, and data conferencing between PC systems operating under a Microsoft® Windows operating system.

Further objects and advantages of this invention will become apparent from the detailed description of a preferred embodiment which follows.

SUMMARY OF THE INVENTION

The present invention is a video subsystem for a computer conferencing system. A video microcode resides on a video board of the computer conferencing system. A video capture driver, a video manager, and a video applications programming interface reside on a general-purpose host processor of the computer conferencing system. The video microcode receives local analog video signals, generates local compressed video signals corresponding to the local analog video signals, and passes the local compressed video signals to the video capture driver. The video capture driver controls the operations of the video microcode and passes the local compressed video signals to the video manager. The video manager passes the local compressed video signals to a communications subsystem of the computer conferencing system for transmission over a communications link to a remote computer conferencing system. The video manager receives remote compressed video signals from the communications subsystem and passes the compressed video signals to the video capture driver, the communications subsystem having received the remote compressed video signals over the communications link from the remote computer conferencing system. The video capture driver generates remote decompressed video signals corresponding to the remote compressed video signal for local playback.

BRIEF DESCRIPTION OF THE DRAWINGS

Other objects, features, and advantages of the present invention will become more fully apparent from the following detailed description of the preferred embodiment, the appended claim and the accompanying drawings in which:

FIG. 9 is a representation of the conferencing stream FSM for each conferencing system participating in a conferencing session;

FIG. 27 is a representation of the reliable transport comm packet structure;

FIG. 29 are diagrams indicating typical connection setup and teardown sequences;

DESCRIPTION OF THE PREFERRED EMBODIMENT(S)

Point-To-Point Conferencing Network

Figure 1:
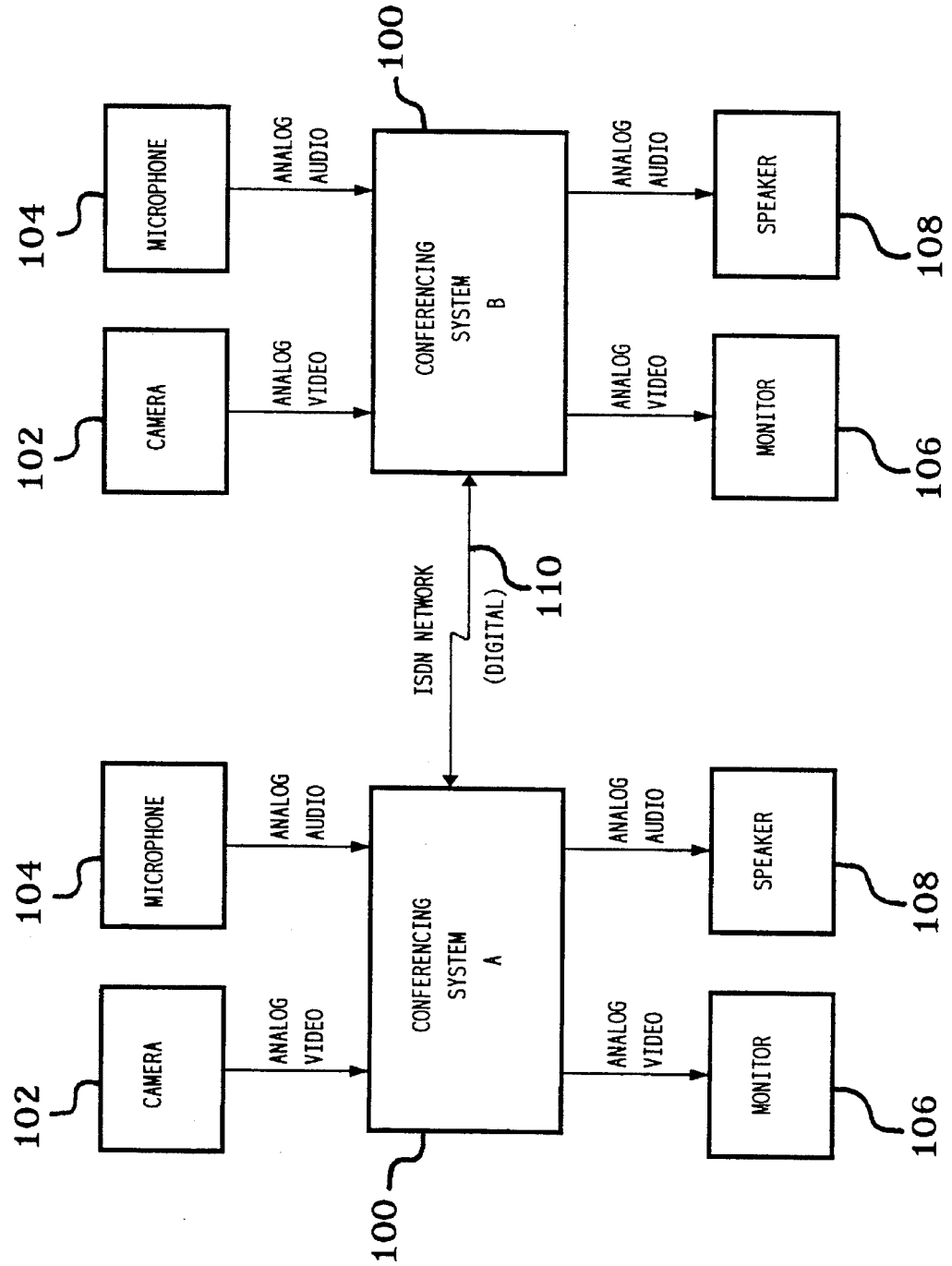
FIG. 1 is a block diagram representing real-time point-to-point audio, video, and data conferencing between two PC systems, according to a preferred embodiment of the present invention.

Referring now to FIG. 1, there is shown a block diagram representing real-time point-to-point audio, video, and data conferencing between two PC systems, according to a preferred embodiment of the present invention. Each PC system has a conferencing system 100, a camera 102, a microphone 104, a monitor 106, and a speaker 108. The conferencing systems communicate via an integrated services digital network (ISDN) 110. Each conferencing system 100 receives, digitizes, and compresses the analog video signals generated by camera 102 and the analog audio signals generated by microphone 104. The compressed digital video and audio signals are transmitted to the other conferencing system via ISDN 110, where they are decompressed and converted for play on monitor 106 and speaker 108, respectively. In addition, each conferencing system 100 may generate and transmit data signals to the other conferencing system 100 for play on monitor 106. In a preferred embodiment, the video and data signals are displayed in different windows on monitor 106. Each conferencing system 100 may also display the locally generated video signals in a separate window.

Camera 102 may be any suitable camera for generating NSTC or PAL analog video signals. Microphone 104 may be any suitable microphone for generating analog audio signals. Monitor 106 may be any suitable monitor for displaying video and graphics images and is preferably a VGA monitor. Speaker 108 may be any suitable device for playing analog audio signals and is preferably a headset.

Conferencing System Hardware Configuration

Figure 2:
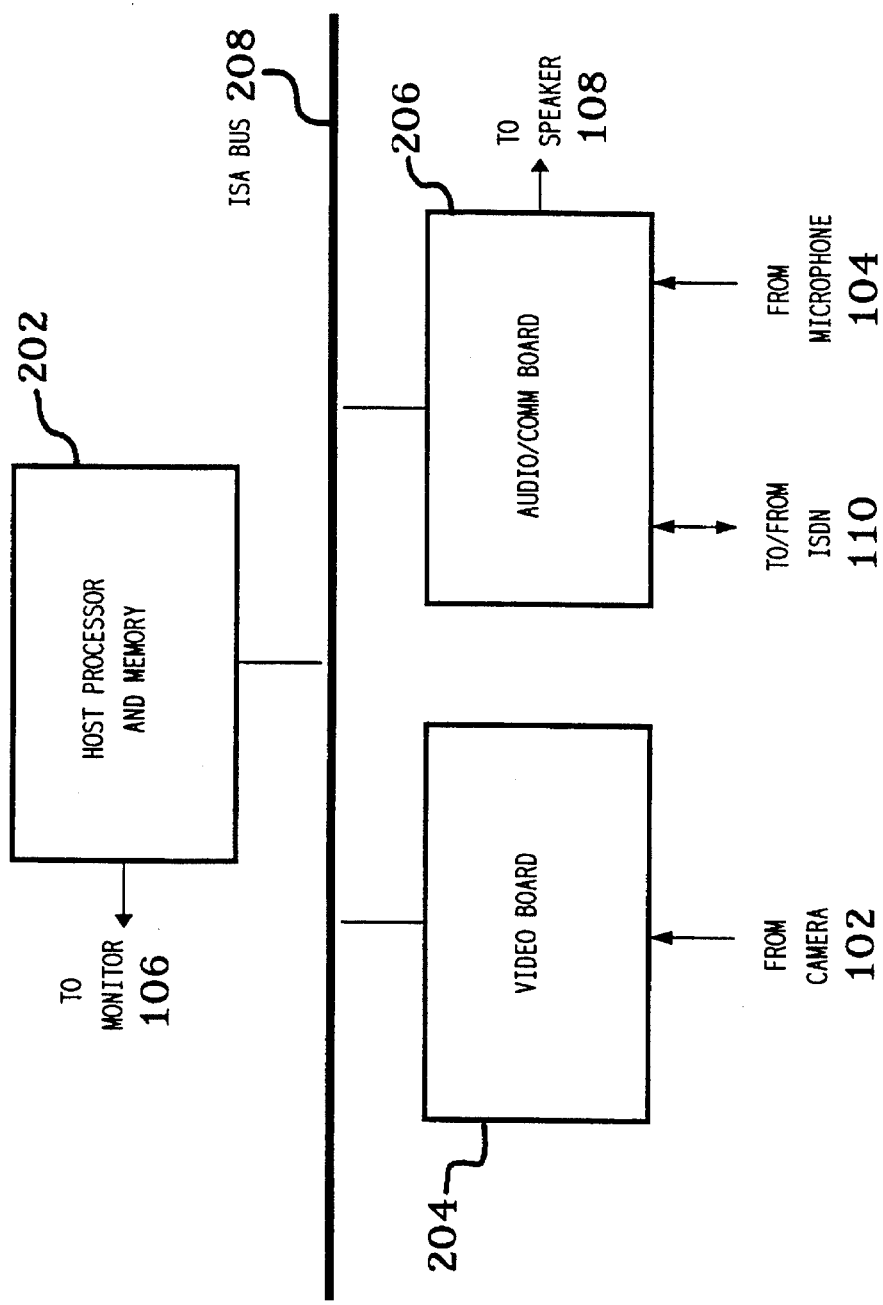
FIG. 2 is a block diagram of the hardware configuration of the conferencing system of each PC system in FIG. 1.

Referring now to FIG. 2, there is shown a block diagram of the hardware configuration of each conferencing system 100 of FIG. 1, according to a preferred embodiment of the present invention. Each conferencing system 100 comprises host processor 202, video board 204, audio/comm board 206, and industry standard architecture (ISA) bus 208.

Figure 3:
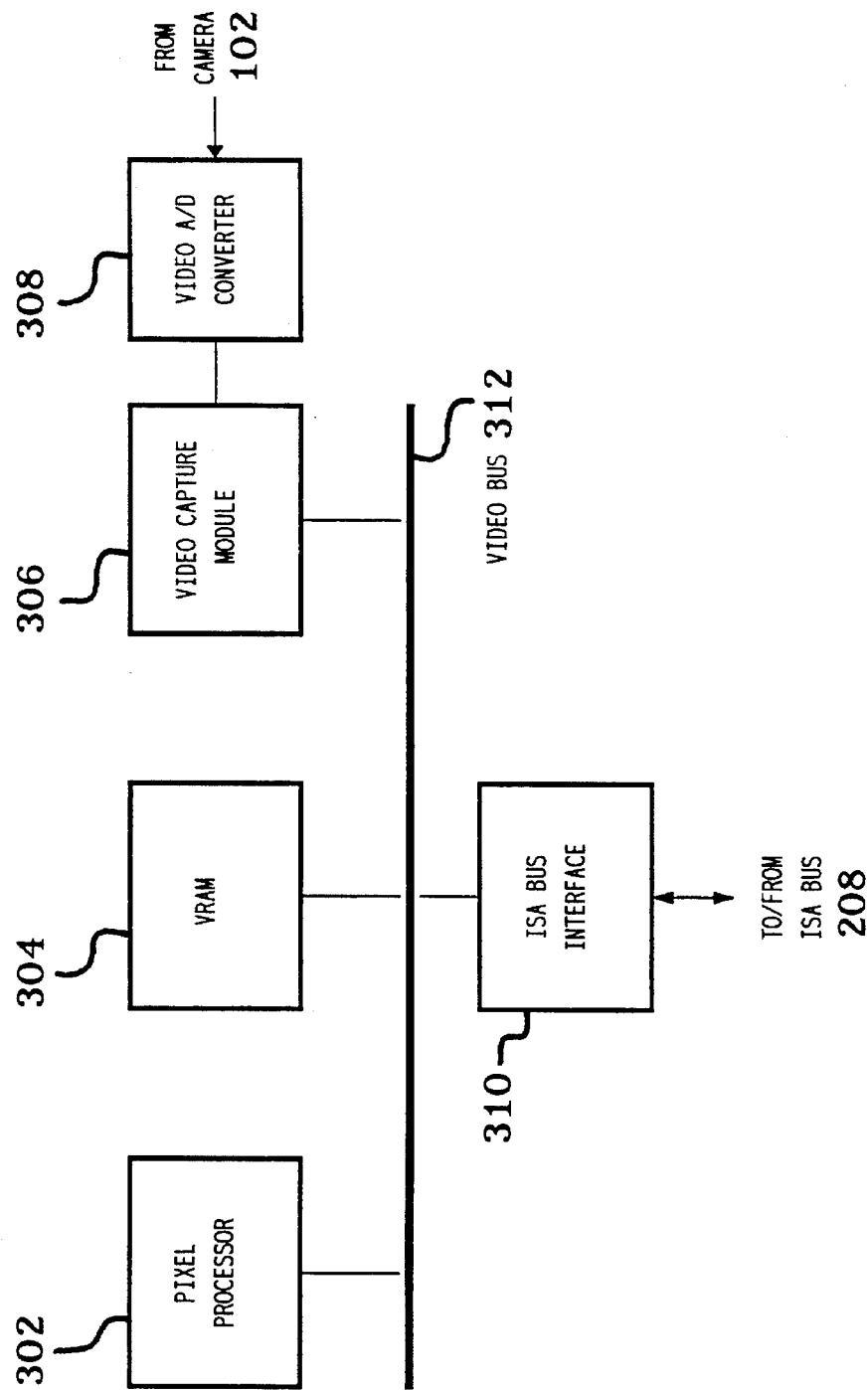
FIG. 3 is a block diagram of the hardware configuration of the video board of the conferencing system of FIG. 2.

Referring now to FIG. 3, there is shown a block diagram of the hardware configuration of video board 204 of FIG. 2, according to a preferred embodiment of the present invention. Video board 204 comprises ISA bus interface 310, video bus 312, pixel processor 302, video random access memory (VRAM) device 304, video capture module 306, and video analog-to-digital (A/D) converter 308.

Figure 4:
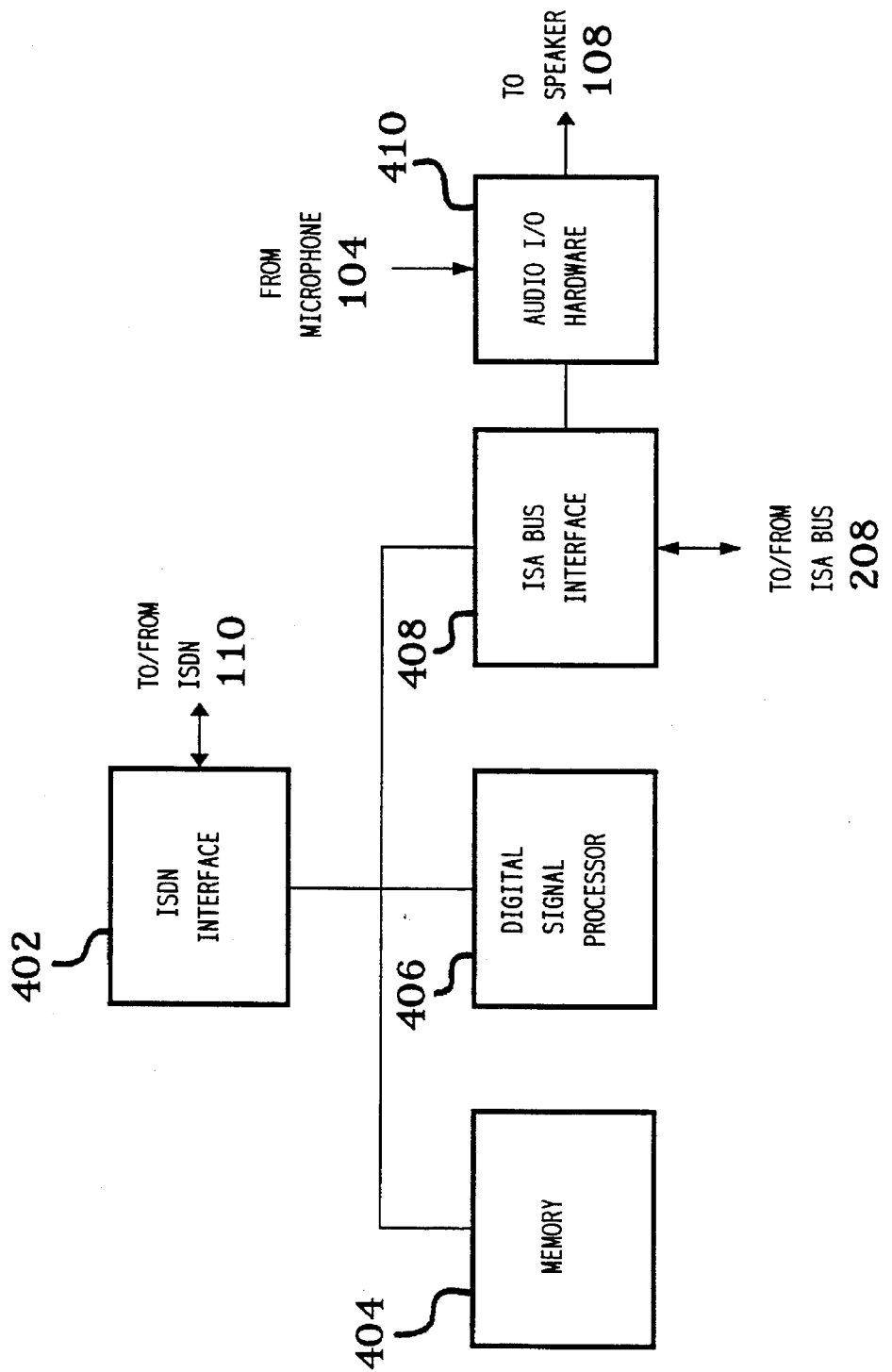
FIG. 4 is a block diagram of the hardware configuration of the audio/comm board of the conferencing system of FIG. 2.

Referring now to FIG. 4, there is shown a block diagram of the hardware configuration of audio/comm board 206 of FIG. 2, according to a preferred embodiment of the present invention. Audio/comm board 206 comprises ISDN interface 402, memory 404, digital signal processor (DSP) 406, ISA bus interface 408 and audio input/output (I/O) hardware 410.

Conferencing System Software Configuration

Figure 5:
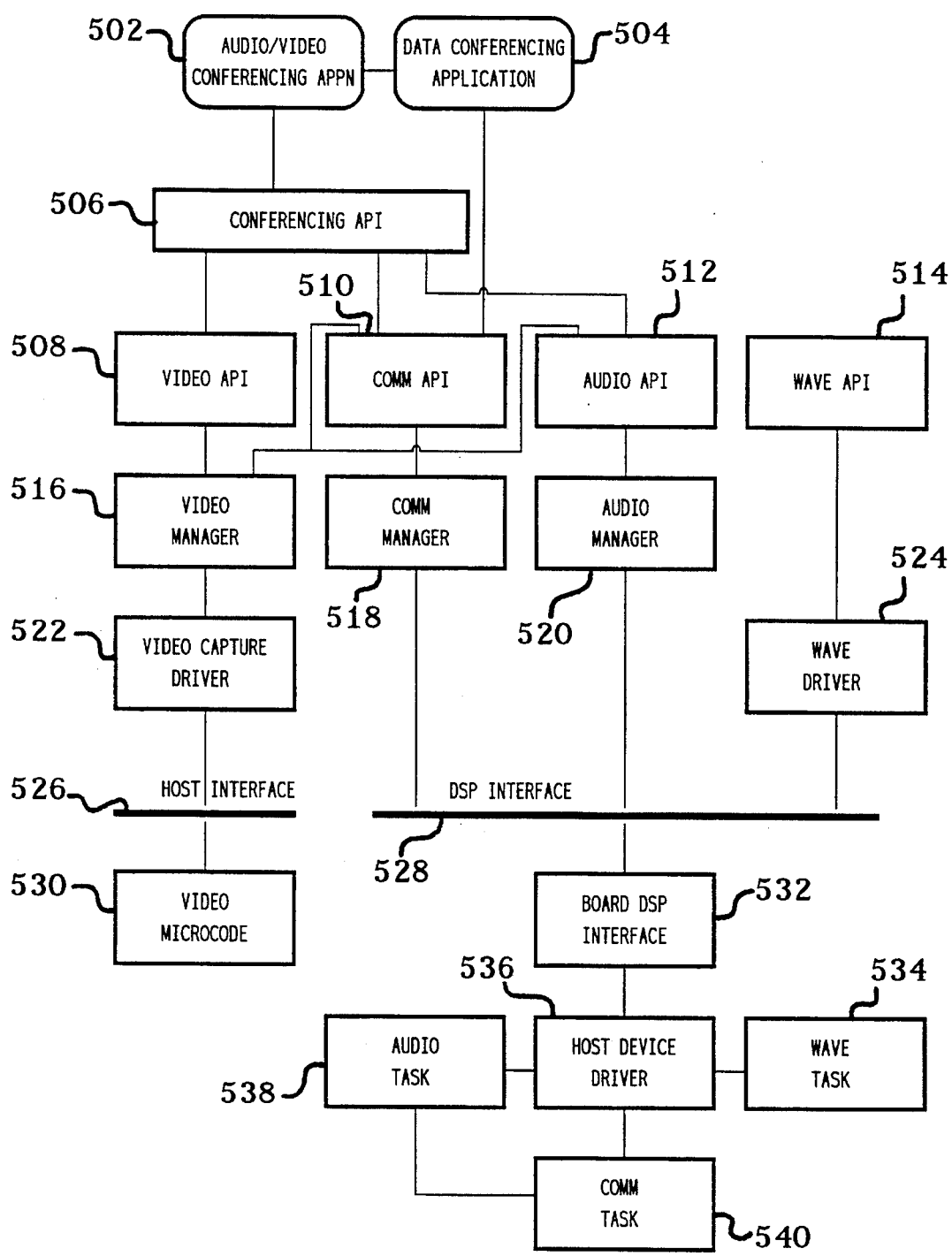
FIG. 5 is a block diagram of the software configuration of the conferencing system of each PC system of FIG. 1.

Referring now to FIG. 5, there is shown a block diagram of the software configuration each conferencing system 100 of FIG. 1, according to a preferred embodiment of the present invention. Video microcode 530 resides and runs on pixel processor 302 of video board 204 of FIG. 3. Comm task 540 and audio task 538 reside and run on DSP 406 of audio/comm board 206 of FIG. 4. All of the other software modules depicted in FIG. 5 reside and run on host processor 202 of FIG. 2.

Video, Audio, and Data Processing

Referring now to FIGS. 3, 4, and 5, audio/video conferencing application 502 running on host processor 202 provides the top-level local control of audio and video conferencing between a local conferencing system (i.e., local site or endpoint) and a remote conferencing system (i.e., remote site or endpoint). Audio/video conferencing application 502 controls local audio and video processing and establishes links with the remote site for transmitting and receiving audio and video over the ISDN. Similarly, data conferencing application 504, also running on host processor 202, provides the top-level local control of data conferencing between the local and remote sites. Conferencing applications 502 and 504 communicate with the audio, video, and comm subsystems using conferencing application programming interface (API) 506, video API 508, comm API 510, and audio API 512. The functions of conferencing applications 502 and 504 and the APIs they use are described in further detail later in this specification.

During conferencing, audio I/O hardware 410 of audio/comm board 206 digitizes analog audio signals received from microphone 104 and stores the resulting uncompressed digital audio to memory 404 via ISA bus interface 408. Audio task 538, running on DSP 406, controls the compression of the uncompressed audio and stores the resulting compressed audio back to memory 404. Comm task 540, also running on DSP 406, then formats the compressed audio format for ISDN transmission and transmits the compressed ISDN-formatted audio to ISDN interface 402 for transmission to the remote site over ISDN 110.

ISDN interface 402 also receives from ISDN 110 compressed ISDN-formatted audio generated by the remote site and stores the compressed ISDN-formatted audio to memory 404. Comm task 540 then reconstructs the compressed audio format and stores the compressed audio back to memory 404. Audio task 538 controls the decompression of the compressed audio and stores the resulting decompressed audio back to memory 404. ISA bus interface then transmits the decompressed audio to audio I/O hardware 410, which digital-to-analog (D/A) converts the decompressed audio and transmits the resulting analog audio signals to speaker 108 for play.

Thus, audio capture/compression and decompression/playback are preferably performed entirely within audio/comm board 206 without going through the host processor. As a result, audio is preferably continuously played during a conferencing session regardless of what other applications are running on host processor 202.

Concurrent with the audio processing, video A/D converter 308 of video board 204 digitizes analog video signals received from camera 102 and transmits the resulting digitized video to video capture module 306. Video capture module 306 decodes the digitized video into YUV color components and delivers uncompressed digital video bitmaps to VRAM 304 via video bus 312. Video microcode 530, running on pixel processor 302, compresses the uncompressed video bitmaps and stores the resulting compressed video back to VRAM 304. ISA bus interface 310 then transmits via ISA bus 208 the compressed video to host interface 526 running on host processor 202.

Host interface 526 passes the compressed video to video manager 516 via video capture driver 522. Video manager 516 calls audio manager 520 using audio API 512 for synchronization information. Video manager 516 then time-stamps the video for synchronization with the audio. Video manager 516 passes the time-stamped compressed video to communications (comm) manager 518 using comm application programing interface (API) 510. Comm manager 518 passes the compressed video through digital signal processing (DSP) interface 528 to ISA bus interface 408 of audio/comm board 206, which stores the compressed video to memory 404. Comm task 540 then formats the compressed video for ISDN transmission and transmits the ISDN-formatted compressed video to ISDN interface 402 for transmission to the remote site over ISDN 110.

ISDN interface 402 also receives from ISDN 110 ISDN-formatted compressed video generated by the remote site system and stores the ISDN-formatted compressed video to memory 404. Comm task 540 reconstructs the compressed video format and stores the resulting compressed video back to memory 404. ISA bus interface then transmits the compressed video to comm manager 518 via ISA bus 208 and DSP interface 528. Comm manager 518 passes the compressed video to video manager 516 using comm API 510. Video manager 516 decompresses the compressed video and transmits the decompressed video to the graphics device interface (GDI) (not shown) of Microsoft® Windows for eventual display in a video window on monitor 106.

For data conferencing, concurrent with audio and video conferencing, data conferencing application 504 generates and passes data to comm manager 518 using conferencing API 506 and comm API 510. Comm manager 518 passes the data through board DSP interface 532 to ISA bus interface 408, which stores the data to memory 404. Comm task 540 formats the data for ISDN transmission and stores the ISDN-formatted data back to memory 404. ISDN interface 402 then transmits the ISDN-formatted data to the remote site over ISDN 110.

ISDN interface 402 also receives from ISDN 110 ISDN-formatted data generated by the remote site and stores the ISDN-formatted data to memory 404. Comm task 540 reconstructs the data format and stores the resulting data back to memory 404. ISA bus interface 408 then transmits the data to comm manager 518, via ISA bus 208 and DSP interface 528. Comm manager 518 passes the data to data conferencing application 504 using comm API 510 and conferencing API 506. Data conferencing application 504 processes the data and transmits the processed data to Microsoft® Windows GDI (not shown) for display in a data window on monitor 106.

Preferred Hardware Configuration for Conferencing System

Referring again to FIG. 2, host processor 202 may be any suitable general-purpose processor and is preferably an Intel® processor such as an Intel® 486 microprocessor. Host processor 202 preferably has at least 8 megabytes of host memory. Bus 208 may be any suitable digital communications bus and is preferably an Industry Standard Architecture (ISA) PC bus.

Referring again to FIG. 3, video A/D converter 308 of video board 204 may be any standard hardware for digitizing and decoding analog video signals that are preferably NTSC or PAL standard video signals. Video capture module 306 may be any suitable device for capturing digital video color component bitmaps and is preferably an Intel® ActionMedia® II Capture Module. Video capture module 306 preferably captures video as subsampled 4:1:1 YUV bitmaps (i.e., YUV9 or YVU9). Memory 304 may be any suitable computer memory device for storing data during video processing such as a random access memory (RAM) device and is preferably a video RAM (VRAM) device with at least 1 megabyte of data storage capacity. Pixel processor 302 may be any suitable processor for compressing video data and is preferably an Intel® pixel processor such as an Intel® i750® Pixel Processor. Video bus 312 may be any suitable digital communications bus and is preferably an Intel® DVI® bus. ISA bus interface 310 may be any suitable interface between ISA bus 208 and video bus 312, and preferably comprises three Intel® ActionMedia® Gate Arrays and ISA configuration jumpers.

Figure 6:
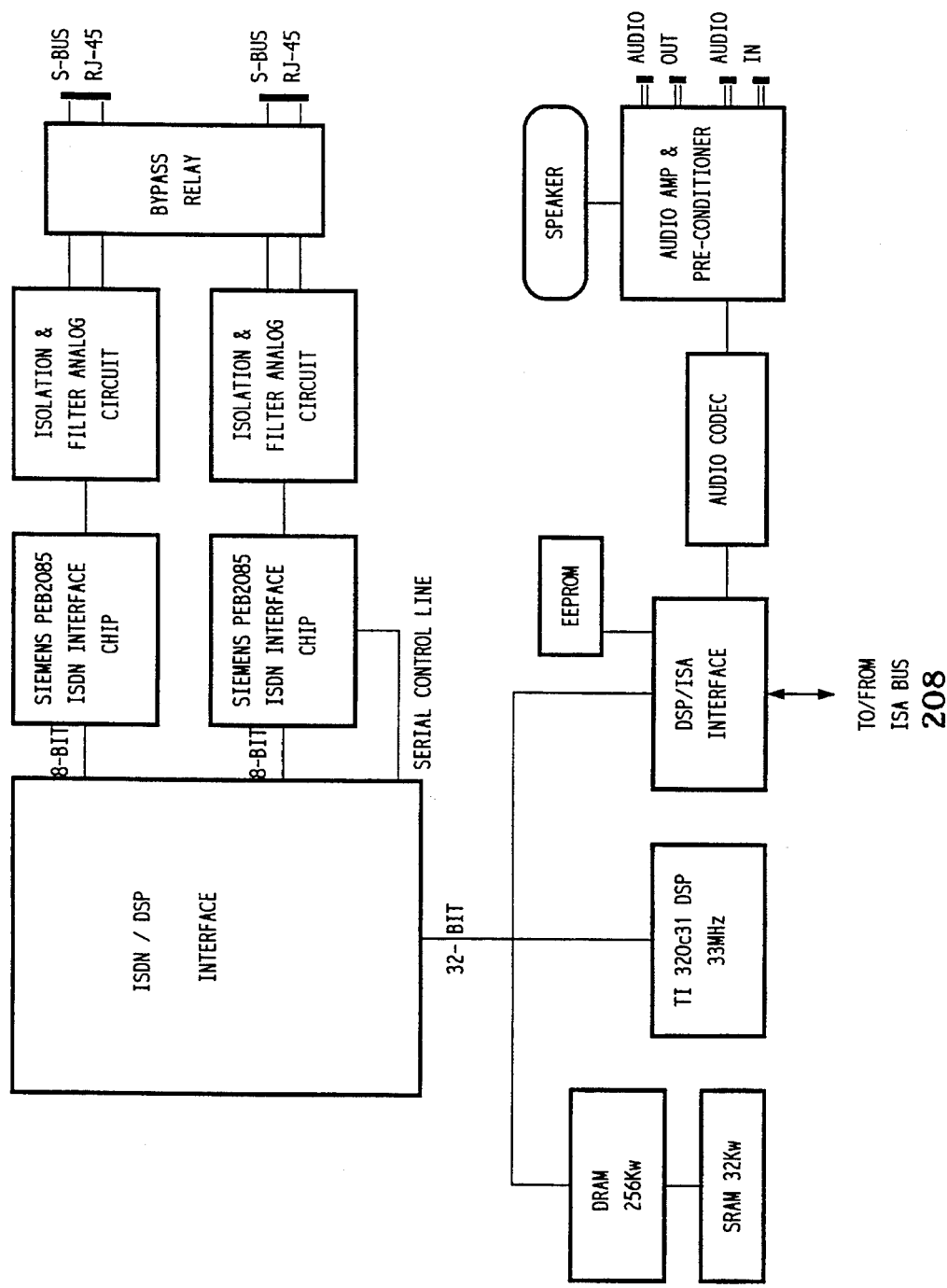
FIG. 6 is a block diagram of a preferred embodiment of the hardware configuration of the audio/comm board of FIG. 4.

Referring now to FIG. 6, there is shown a block diagram of a preferred embodiment of the hardware configuration of audio/comm board 206 of FIG. 4. This preferred embodiment comprises:

Two 4-wire S-bus RJ-45 ISDN interface connectors, one for output to ISDN 110 and one for input from ISDN 110. Part of ISDN interface 402 of FIG. 4.

Standard bypass relay allowing incoming calls to be redirected to a down-line ISDN phone (not shown) in case conferencing system power is off or conferencing software is not loaded. Part of ISDN interface 402.

Two standard analog isolation and filter circuits for interfacing with ISDN 110. Part of ISDN interface 402.

Two Siemens 8-bit D-channel PEB2085 ISDN interface chips. Part of ISDN interface 402.

Texas Instruments (TI) 32-bit 33 MHz 320c31 Digital Signal Processor. Equivalent to DSP 406.

Custom ISDN/DSP interface application specified integrated circuit (ASIC) to provide interface between 8-bit Siemens chip set and 32-bit TI DSP. Part of ISDN interface 402.

256 Kw Dynamic RAM (DRAM) memory device. Part of memory 404.

32 Kw Static RAM (SRAM) memory device. Part of memory 404.

Custom DSP/ISA interface ASIC to provide interface between 32-bit TI DSP and ISA bus 208. Part of ISA bus interface 408.

Serial EEPROM to provide software jumpers for DSP/ISA interface. Part of ISA bus interface 408.

Audio Codec 4215 by Analog Devices, Inc. for sampling audio in format such as ADPCM, DPCM, or PCM format. Part of audio I/O hardware 410.

Analog circuitry to drive audio I/O with internal speaker for playback and audio jacks for input of analog audio from microphone 104 and for output of analog audio to speaker 108. Part of audio I/O hardware 410.

Figure 30:
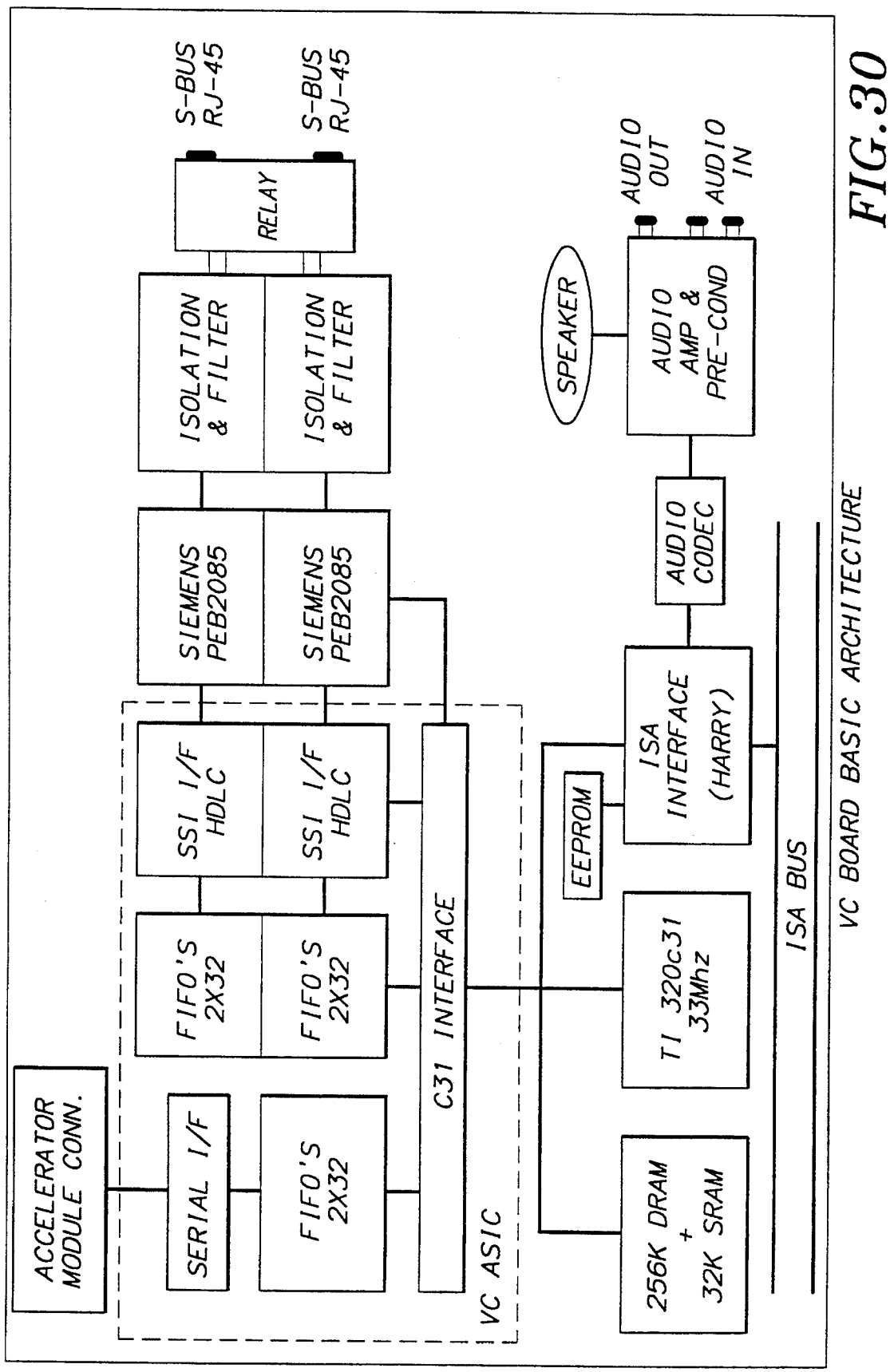
FIGS. 30 and 31 are diagrams of the architecture of the audio/comm board.
Figure 31:
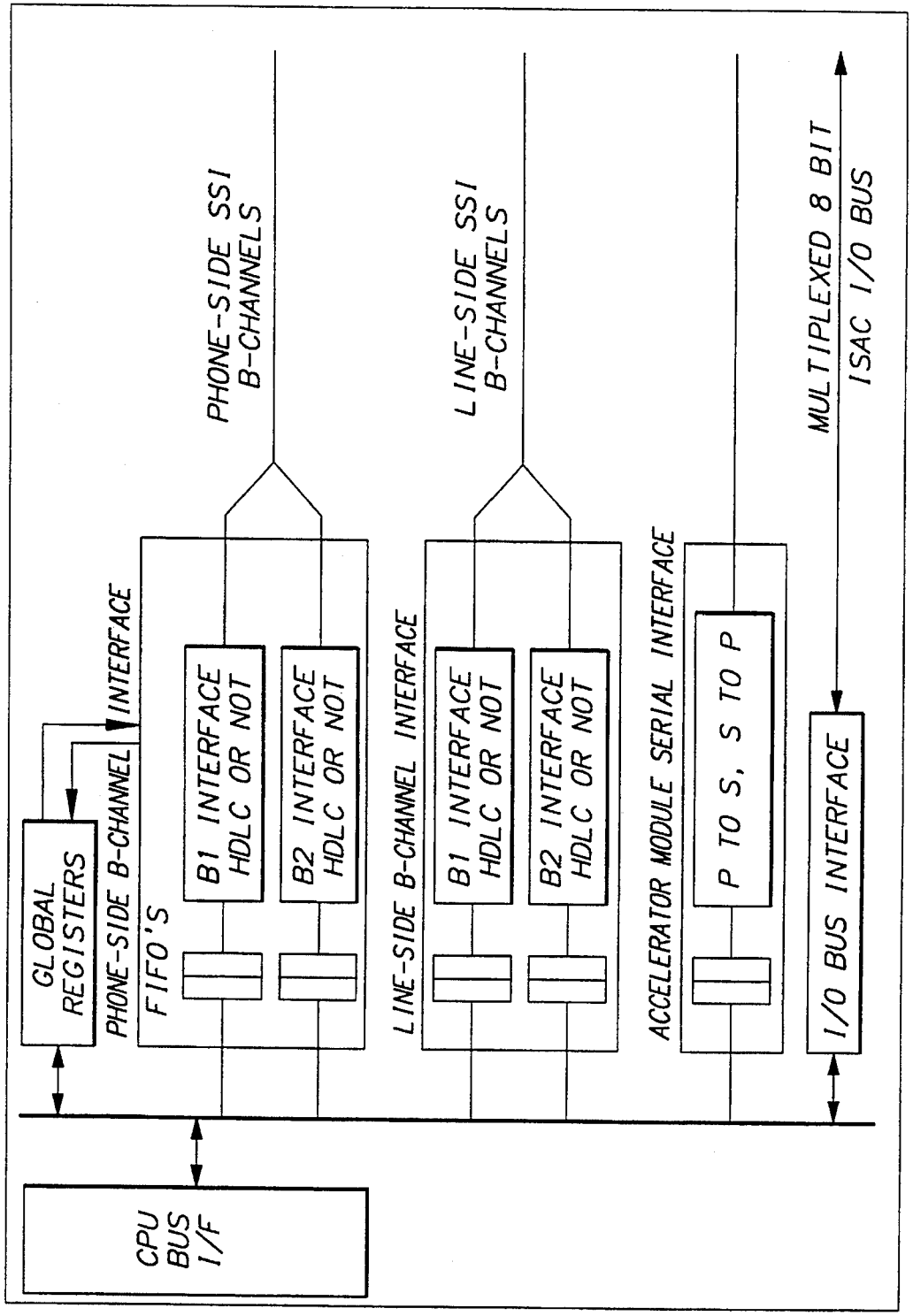

Referring now to FIGS. 30 and 31, there are shown diagrams of the architecture of the audio/comm board. The audio/comm board consists basically of a slave ISA interface, a TMS320C31 DSP core, an ISDN BRI S interface, and a high quality audio interface.

The C31 Interface is a 32-bit non-multiplexed data port to the VC ASIC. It is designed to operate with a 27–33 Mhz C31. The C31 address is decoded for the ASIC to live between 400 000H and 44F FFFH. All accesses to local ASIC registers (including the FIFO's) are 0 wait-state. Accesses to the I/O bus (locations 440 000H through 44F FFFH) have 3 wait states inserted. Some of the registers in the ASIC are 8 and 16 bits wide. In these cases, the data is aligned to the bottom (bit 0 and up) of the C31 data word. The remainder of the bits will be read as a "0". All non-existent or reserved register locations will read as a "0".

The B-channel interfaces provide a 32-bit data path to and from the B1 and B2 ISDN data channels. They are FIFO buffered to reduce interrupt overhead and latency requirements. The Line-side and Phone-side interfaces both support transparent data transfer —used for normal phone-call, 1 FAX, modem and H.221 formatted data. Both interfaces also support HDLC formatting of the B data per channel to support V.120 "data data" transfer.

The receive and transmit FIFO's are 2 words deep, a word being 32 bits wide (C31 native data width). Full, half and empty indications for all FIFO's are provided in the B-channel status registers. Note that the polarity of these indications vary between receive and transmit. This is to provide the correct interrupt signaling for interrupt synchronized data transfer.

The transparent mode sends data received in the B-channel transmit FIFO's to the SSI interface of the ISACs. The transmitted data is not formatted in any way other than maintaining byte alignment (i.e., bits 0, 8, 16, 24 of the FIFO data are always transmitted in bit 0 of the B-channel data). The written FIFO data is transmitted byte 0 first, byte 3 last—where byte 0 is bits 0 through 7, and bit 0 is sent first.

Transparent mode received data is also byte aligned to the incoming B-channel data stream and assembled as byte 0, byte 1, byte 2, byte 3. Receive data is written into the receive FIFO after all four types have arrived.

The ISAC I/O Interface provides an 8 bit multiplexed data bus used to access the Siemens PEB2085s (ISAC). The 8 bits of I/O address come from bits 0 through 7 of the C31 address. Reads and writes to this interface add 3 wait-states to the C31 access cycle. Buffered writes are not supported in this version of the ASIC.

Each ISAC is mapped directly into its own 64 byte address space (6 valid bits of address). Accesses to the ISAC are 8 bits wide and are located at bit positions 0 to 7 in the C31 32 bit word. Bits 8 through 23 are returned as "0"s on reads.

The PB2085's provide the D-channel access using this interface.

The Accelerator Module Interface is a high bandwidth serial communication path between the C31 and another processor which will be used to add MIPs to the board. Certain future requirements such as g.728 audio compression will require the extra processing power.

The data transfers are 32 bit words sent serially at about 1.5 Mbits/s. The VC ASIC buffers these transfers with FICOs which are 2 words deep to reduce interrupt overhead and response time requirements. The status register provide flags for FIFO full, half, empty and over/under-run (you should never get an under-run). Any of these can be used as interrupt sources as selected in the Serial Port Mask register.

The following paragraphs describe the ISA interface of the audio/comm board. The ISA interface is the gate array that provides an interface between the multi-function board and the ISA bus. Further, the ASIC will control background tasks between a DSP, SAC, and Analog Phone line interfaces. The technology chosen for the ASIC is the 1 micron CMOS-6 family from NEC.

Figure 32:
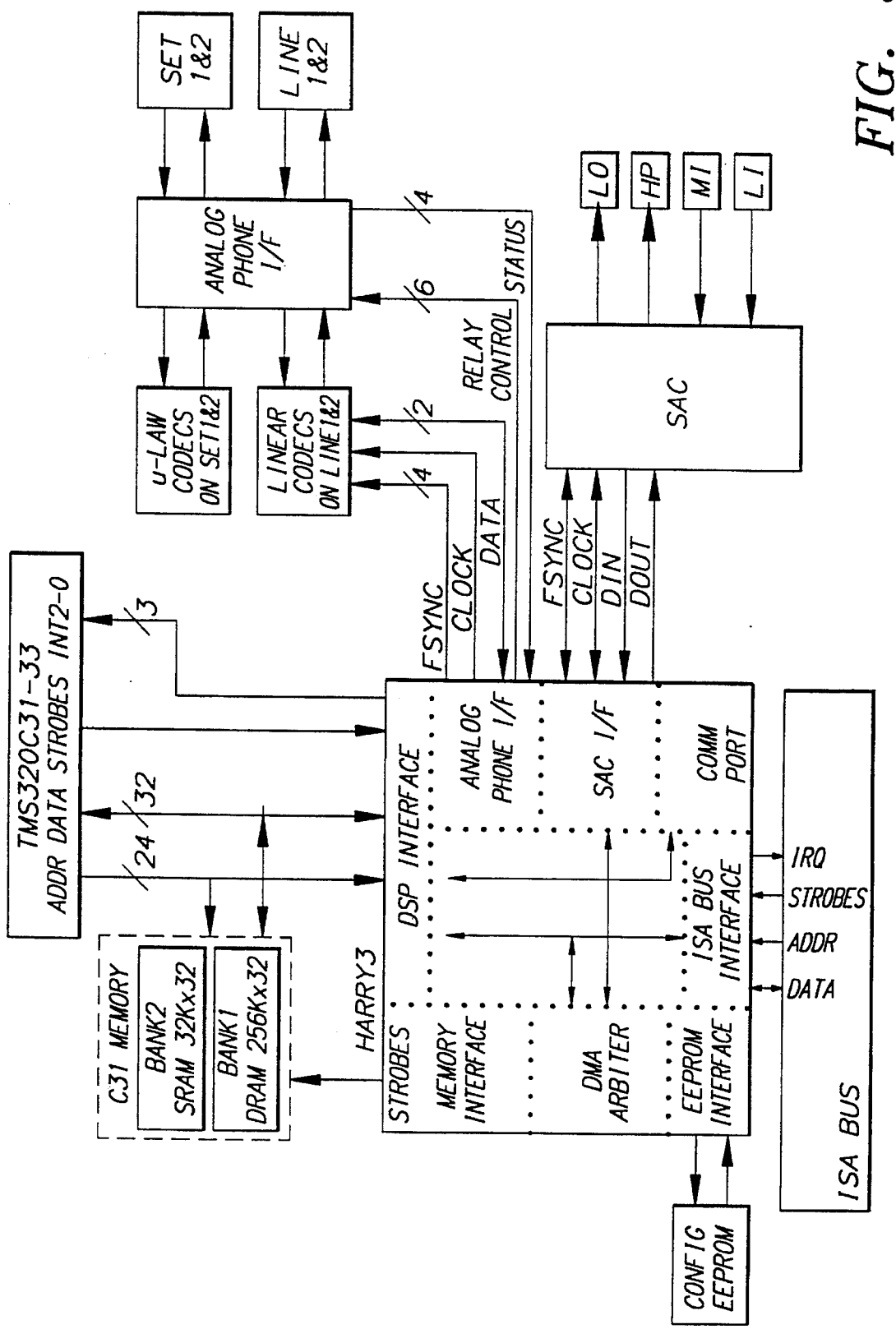
FIG. 32 is a diagram of the audio/comm board environment.

Referring now to FIG. 32, there is shown a diagram of the audio/comm board environment. The following is a description of the signal groups.

| ISA Bus Signals | |
|---|---|
| AEN | The address enable signal is used to de-gated the CPU and other devices from the bus during DMA cycles. When this signal is active (high) the DMA controller has control of the bus. The ASIC does not respond to bus cycles when AEN is active. |
| IOCS16# | The I/O 16-bit chip select is used by 16-bit I/O devices to indicate that it can accommodate a 16-bit transfer. This signal is decoded off of address only. |
| IOW# | This is an active low signal indicating the an I/O write cycle is being performed. |
| IOR# | This is an active low signal indicating the an I/O read cycle is being performed. |
| IRQ3, IRQ4, IRQ5, IRQ9, IRQ10, IRA11, IRQ15 | These signals are interrupt requests. An interrupt request is generated when an IRQ is raised from a low to a high. The IRQ must remain high until the interrupt service routine acknowledges the interrupt. |
| RESET | This signal is used to initialize system logic upon power on. |
| SBHE# | The system bus high enable signal indicates that data should be driven onto the upper byte of the 16-bit data bus. |
| SA(9:0) | These are the system address lines used to decode I/O address space used by the board. This scheme is compatible with the ISA bus. These addresses are valid during the entire command cycle. |
| SD(15:0) | These are the system data bus lines. |
| DSP Signals | |
| H1CLK | H1CLK is the DSP primary bus clock. All events in the primary bus are referenced to this clock. The frequency of this clock is half the frequency of the clock driving the DSP. See the TMS320C31 data manual chapter 13. |
| D(31:0) | These are the DSP 32-bit data bus. Data lines 16, 17, and 18 also interface to the EEPROM. Note that the DSP must be in reset and the data bus tri-stated before access to the EEPROM. This date bus also supplies the board ID when the read while the DSP is reset (see HAUTOID register). |
| C31_RST# | This is the DSP active low reset signal. |

-continued

| | |
|---|---|
| A23–A0 | These DSP address lines are used to decode the address space by the ASIC. |
| R/W# | This signal indicates whether the current DSP external access is a read (high) or a write (low) |
| STRB# | This is an active low signal form the DSP indicating that the current cycle is to the primary bus. |
| RDY# | This signal indicates that the current cycle being performed on the primary bus of the DSP can be completed. |
| HOLD# | The Hold signal is an active low signal used to request the DSP relinquish control of the primary bus. Once the hold has been acknowledge all address, data and status lines are tri-stated until Hold is released. This signal will be used to implement the DMA and DRAM Refresh. |
| HOLDA# | This is the Hold Acknowledge signal which is the active low indication that the DSP has relinquished control of the bus. |
| INT2# | This C31 interrupt is used by the ASIC for DMA and Command interrupts. |
| INTE1# | Interrupt the C31 on COM Port events. |
| INT0# | Analog Phone Interrupts. |
| Memory Signals | |
| MEMWR1# and MEMWR2# | These signals are active low write strobes for memory banks 1 and 2. |
| B1OE#, B2OE# | These signals are active low output enables for memory banks 1 and 2. |
| SR_CS# | This is a active low chip selected for the SRAM that makes up bank2. |
| CAS# | This the active low column address strobe to the DRAM. |
| RAS# | This the active low row address strobe to the DRAM. |
| H1D12, H1D24 | These signals are a 12 and 24 nS delay of the H1CLK. |
| MUX | Mux is the signal that controls the external DRAM address mux. When this signal is low the CAS addresses are selected and when it is high the RAS addresses are selected. |
| EEPROM SIGNALS | |
| EESK | This is the EEPROM clock signal. This signal is multiplexed with the DSP data signal 1D16. This signal can only be valid while the DSP is in reset. |
| EEDI | This is the input data signal to the EEPROM. This signal is multiplexed with the DSP data signal D17. This signal can only be valid while the DSP is in reset. |
| EEDO | This is the data output of the EEPROM. This signal is multiplexed with the DSP data signal D18. This signal can only be valid while the DSP is in reset. |
| EECS | This is the chip select signal for the EEPROM. This signal is NOT multiplexed and can only be drive active (HIGH) during DSP reset. |
| Stereo Audio Codec (SAC) | |
| SP_DC | This signal controls the SAC mode of operation. When this signal is high the SAC is in data or master mode. When this signal is lw the SAC is in control or slave mode. |
| SP_SCLK | This is the Soundport clock input signal. This clock will either originate from the Soundport or the ASIC. |
| SP_SDIN | This serial data input from the Soundport. The data here is shifted in on the falling edge of the SP_CLK. |
| SP_SDOUT | This is the serial data output signal for the Soundport. The data is shifted out on the rising edge of the SP_CLK. |
| SP_FSYNC | This is the frame synchronization signal for the Soundport. This signal will originate from the ASIC when the Soundport is in slave mode or the Soundport is being programmed in control mode. When the Soundport is in master mode the frame sync will originate from the Soundport and will have a frequency equal to the sample rate. |
| CODEC Signals | |
| 24.576MHZ | This clock signal is used to derive clocks used within the ASIC and the 2.048MHz CODEC clock. |
| COD_FS1, COD_FS2, DOC_FS3, COD_FS4 | These signals are the CODEC frame syncs, each signal correspond to one of the four CODECs. |
| COD_SDOUT | This signal is the serial data output signal of the CODES. |
| COD_SDIN | This signal is the serial data input signal to the CODECs. |
| COD_SCLK | This a 2.048MHz clock used to clock data in and out of the four CODECs. The serial data is clocked out on the rising edge and in on the falling edge. |
| Analog Phone Signals | |
| LPSENSL1 | Line1 off hook loop current sense. If this signal is low and BYPSRLY1 is high it indicates the Set 1 has gone off hook. If the signal is low and the BYPSRLY1 is low it indicates that the board has gone off hook. This signal is not latched and therefore is a Real-time-signal. |
| LPSENSPH1 | Set 1 off hook loop current sense. If this signal is low it indicates the Set 1 has gone off hook. This can only take place when BYPSRLY1 is low. This signal is not latched and therefore is a Real-time-signal. |

| | |
|---|---|
| LPSENSL2 | Line2 off hook loop current sense. If this signal is low and BYPSRLY2 is high it indicates the Set 1 has gone off hook. If the signal is low and the BYPSRLY2 is low it indicates that the board has gone off hook. This signal is not latched and therefore is a Real-time-signal. |
| LPSENSPH2 | Set 2 off hook loop current sense. If this signal is low it indicates the Set 1 has gone off hook. This can only take place when BYPSRLY2 is low. This signals is not latched and therefore is a Real-time-signal. |
| RINGDETL1 | Line 1 Ring Detect. If this input signal is low the Line is ringing. |
| RINGDETL2 | Line 2 Ring Detect. If this input signal is low the Line is ringing. |
| CALLDETL2 | Call Detect for Line 1. This signal is cleared low by software to detect 1200 baud FSK data between the first and second rings. |
| CALLDETL2 | Call Detect for Line 2. This signal is cleared low by software to detect 1200 baud FSK data between the first and second rings. |
| PDOHL1 | Pulse Dial Off hook for Line 1. This signal is pulsed to dial phone numbers on pulse dial systems. It is also used to take the line off hook when low. |
| PDOHL2 | Pulse Dial Off hook for Line 2. This signal is pulsed to dial phone numbers on pulse dial systems. It is also used to take the line off hook when low. |
| BYPSRLY1 and 2 | This is an active low output signal controlling the Bypass Relay output. When high the board is by-passed and the Line (1 or 2) is connected the desk Set (1 or 2). |
| LOOPDIS | |
| SWCLR# | |
| Miscellaneous Signals | |
| 6.144MHZ | This a 6.144 MHz clock signal used to drive the module that can attached to the board. The module will then use this signal to synthesize any frequency it requires. |
| TEST1, TEST2, TEST3, TEST4 | These are four test pins used by the ASIC designers two decrease ASIC manufacturing test vectors. The TEST2 pin is the output of the nand-tree used by ATE. |
| VDD, VSS | |

Those skilled in the art will understand that the present invention may comprise configurations of audio/comm board 206 other than the preferred configuration of FIG. 6.

Software Architecture for Conferencing System

The software architecture of conferencing system 100 shown in FIGS. 2 and 5 has three layers of abstraction. A computer supported collaboration (CSC) infrastructure layer comprises the hardware (i.e., video board 204 and audio/comm board 206) and host/board driver software (i.e., host interface 526 and DSP interface 528) to support video, audio, and comm, as well as the encode method for video (running on video board 204) and encode/decode methods for audio (running on audio/comm board 206). The capabilities of the CSC infrastructure are provided to the upper layer as a device driver interface (DDI).

A CSC system software layer provides services for instantiating and controlling the video and audio streams, synchronizing the two streams, and establishing and gracefully ending a call and associated communication channels. This functionality is provided in an application programming interface (API). This API comprises the extended audio and video interfaces and the communications APIs (i.e., conferencing API 506, video API 508, video manager 516, video capture driver 522, comm API 510, comm manager 518, Wave API 514, Wave driver 524, audio API 512, and audio manager 520).

A CSC applications layer brings CSC to the desktop. The CSC applications may include video annotation to video mail, video answering machine, audio/video/data conferencing (i.e., audio/video conferencing application 502 and data conferencing application 504), and group decision support systems.

Audio/video conferencing application 502 and data conferencing application 504 rely on conferencing API 506, which in turn relies upon video API 508, comm API 510, and audio API 512 to interface with video manager 516, comm manager 518, and audio manager 520, respectively. Comm API 510 and comm manager 518 provide a transport-independent interface (TII) that provides communications services to conferencing applications 502 and 504. The communications software of conferencing system 100 supports different transport mechanisms, such as ISDN (e.g., V.120 interface), SW56 (e.g., BATP's Telephone API), and LAN (e.g., SPX/IPX, TCP/IP, or NetBIOS). The TII isolates the conferencing applications from the underlying transport layer (i.e., transport-medium-specific DSP interface 528). The TII hides the network/connectivity specific operations. In conferencing system 100, the TII hides the ISDN layer. The DSP interface 528 is hidden in the datalink module (DLM). The TII provides services to the conferencing applications for opening communication channels (within the same session) and dynamically managing the bandwidth. The bandwidth is managed through the transmission priority scheme.

In a preferred embodiment in which conferencing system 100 performs software video decoding, AVI capture driver 522 is implemented on top of host interface 526 (the video driver). In an alternative preferred embodiment in which conferencing system 100 performs hardware video decoding, an AVI display driver is also implemented on top of host interface 526.

The software architecture of conferencing system 100 comprises three major subsystems: video, audio, and communication. The audio and video subsystems are decoupled and treated as "data types" (similar to text or graphics) with conventional operations like open, save, edit, and display. The video and audio services are available to the applications through video-management and audio-management extended interfaces, respectively.

Audio/Video Conferencing Application

Audio/video conferencing application 502 implements the conferencing user interface. Conferencing application 502 is implemented as a Microsoft® Windows 3.1 application. One child window will display the local video image and a second child window will display the remote video image. Audio/video conferencing application 502 provides the following services to conferencing system 100:

Manage main message loop.

Perform initialization and registers classes.

Handle menus.

Process toolbar messages.

Handles preferences.

Handles speed dial setup and selections.

Connect and hang up.

Handles handset window

Handle remote video.

Handle remote video window.

Handle local video.

Handle local video window.

Data Conferencing Application

Data conferencing application 504 implements the data conferencing user interface. Data conferencing application is implemented as a Microsoft® Windows 3.1 application. The data conferencing application uses a "shared notebook" metaphor. The shared notebook lets the user copy a file from the computer into the notebook and review it with a remote user during a call. When the user is sharing the notebook (this time is called a "meeting"), the users see the same information on their computers, users can review it together, and make notes directly into the notebook. A copy of the original file is placed in the notebook, so the original remains unchanged. The notes users make during the meeting are saved with the copy in a meeting file. The shared notebook looks like a notebook or stack of paper. Conference participants have access to the same pages. Either participant can create a new page and fill it with information or make notes on an existing page.

Conferencing API

Conferencing API 506 of FIG. 5 facilitates the easy implementation of conferencing applications 502 and 504. Conferencing API 506 of FIG. 5 provides a generic conferencing interface between conferencing applications 502 and 504 and the video, comm, and audio subsystems. Conferencing API 506 provides a high-level abstraction of the services that individual subsystems (i.e., video, audio, and comm) support. The major services include:

Making, accepting, and hanging-up calls.

Establishing and terminating multiple communication channels for individual subsystems.

Instantiating and controlling local video and audio.

Sending video and audio to a remote site through the network.

Receiving, displaying, and controlling the remote video and audio streams.

Conferencing applications 502 and 504 can access these services through the high-level conferencing API 506 without worrying about the complexities of low-level interfaces supported in the individual subsystems.

In addition, conferencing API 506 facilitates the integration of individual software components. It minimizes the interactions between conferencing applications 502 and 504 and the video, audio, and comm subsystems. This allows the individual software components to be developed and tested independent of each other. Conferencing API 506 serves as an integration point that glues different software components together. Conferencing API 506 facilitates the portability of audio/video conferencing application 502.

Conferencing API 506 is implemented as a Microsoft Windows Dynamic Link Library (DLL). Conferencing API 506 translates the function calls from conferencing application 502 to the more complicated calls to the individual subsystems (i.e., video, audio, and comm). The subsystem call layers (i.e., video API 508, comm API 510, and audio API 512) are also implemented in DLLs. As a result, the programming of conferencing API 506 is simplified in that conferencing API 506 does not need to implement more complicated schemes, such as dynamic data exchange (DDE), to interface with other application threads that implement the services for individual subsystems. For example, the video subsystem will use window threads to transmit/receive streams of video to/from the network.

Conferencing API 506 is the central control point for supporting communication channel management (i.e., establishing, terminating channels) for video and audio subsystems. Audio/video conferencing application 502 is responsible for supporting communication channel management for the data conferencing streams.

Figure 7:
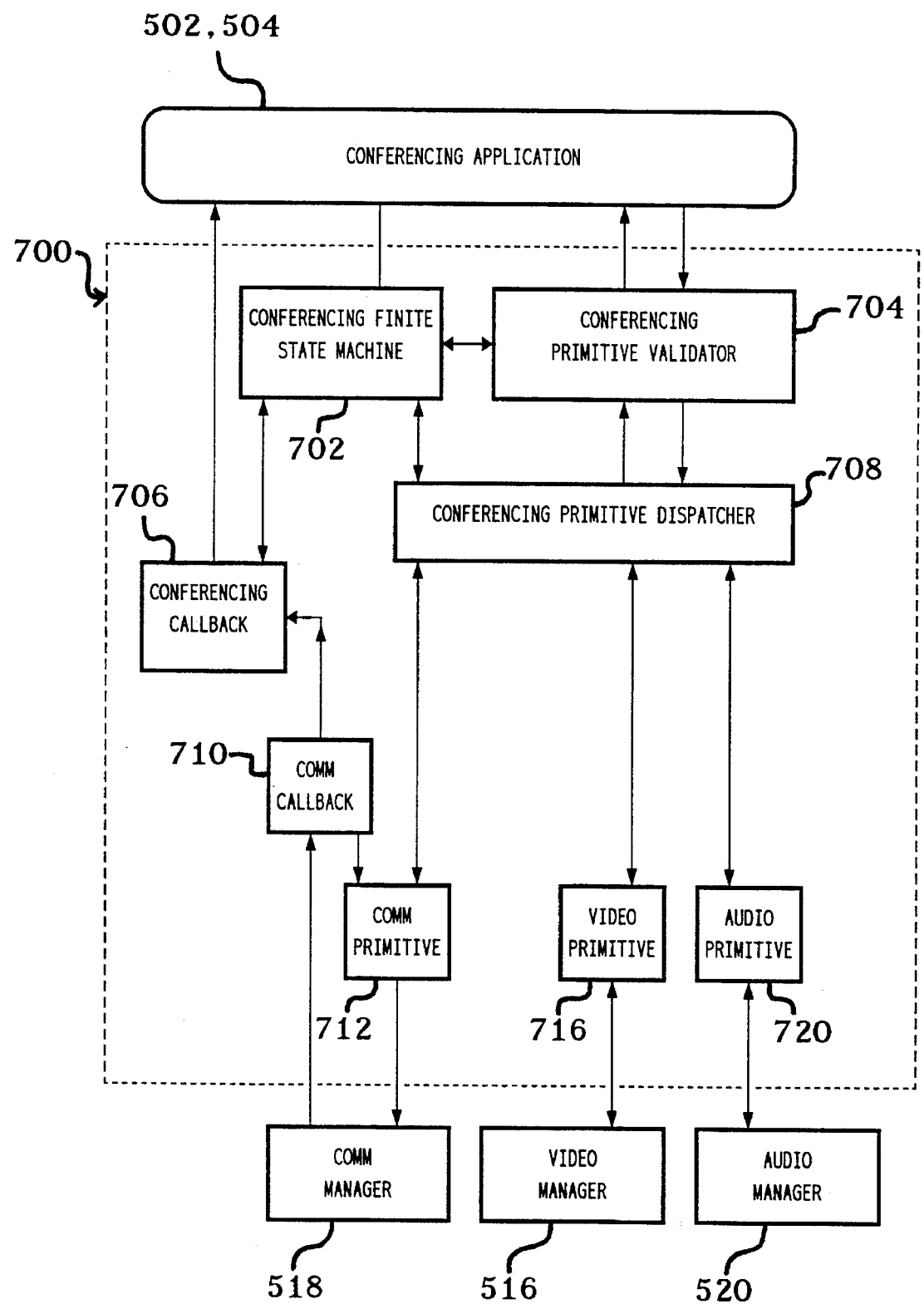
FIG. 7 is a block diagram of the conferencing interface layer between the conferencing applications of FIG. 5, on one side, and the comm, video, and audio managers of FIG. 5, on the other side.

Referring now to FIG. 7, there is shown a block diagram of the conferencing interface layer 700 between conferencing applications 502 and 504 of FIG. 5, on one side, and comm manager 518, video manager 516, and audio manager 520, on the other side, according to a preferred embodiment of the present invention. Conferencing API 506 of FIG. 5 comprises conferencing primitive validator 704, conferencing primitive dispatcher 708, conferencing callback 706, and conferencing finite state machine (FSM) 702 of conferencing interface layer 700 of FIG. 7. Comm API 510 of FIG. 5 comprises comm primitive 712 and comm callback 710 of FIG. 7. Video API 508 of FIG. 5 comprises video primitive 716 of FIG. 7. Audio API 512 of FIG. 5 comprises audio primitive 720 of FIG. 7.

Conferencing primitive validator 704 validates the syntax (e.g., checks the conferencing call state, channel state, and the stream state with the conferencing finite state machine (FSM) 702 table and verifies the correctness of individual parameters) of each API call. If an error is detected, primitive validator 704 terminates the call and returns the error to the application immediately. Otherwise, primitive validator 704 calls conferencing primitive dispatcher 708, which determines which subsystem primitives to invoke next.

Conferencing primitive dispatcher 708 dispatches and executes the next conferencing API primitive to start or continue to carry out the service requested by the application. Primitive dispatcher 708 may be invoked either directly from primitive validator 704 (i.e., to start the first of a set of conferencing API primitives) or from conferencing callback 706 to continue the unfinished processing (for asynchronous API calls). Primitive dispatcher 708 chooses the conferencing API primitives based on the information of the current state, the type of message/event, and the next primitive being scheduled by the previous conferencing API primitive.

After collecting and analyzing the completion status from each subsystem, primitive dispatcher 708 either (1) returns the concluded message back to the conferencing application by returning a message or invoking the application-provided callback routine or (2) continues to invoke another primitive to continue the unfinished processing.

There are a set of primitives (i.e., comm primitives 712, video primitives 716, and audio primitives 720) implemented for each API call. Some primitives are designed to be invoked from a callback routine to carry out the asynchronous services.

The subsystem callback routine (i.e., comm callback 710) returns the completion status of an asynchronous call to the comm subsystem to conferencing callback 706, which will conduct analysis to determine the proper action to take next. The comm callback 710 is implemented as a separate thread of execution (vthread.exe) that receives the callback Microsoft® Windows messages from the comm manager and then calls VCI DLL to handle these messages.

Conferencing callback 706 returns the completion status of an asynchronous call to the application. Conferencing callback 706 checks the current message/event type, analyzes the type against the current conferencing API state and the next primitive being scheduled to determine the actions to take (e.g., invoke another primitive or return the message to the application). If the processing is not complete yet, conferencing callback 706 selects another primitive to continue the rest of the processing. Otherwise, conferencing callback 706 returns the completion status to the application. The conferencing callback 706 is used only for comm related conferencing API functions; all other conferencing API functions are synchronous.

The major services supported by conferencing API 506 are categorized as follows:

Call and Channel Services (establish/terminate a conference call and channels over the call).

Stream Services (capture, play, record, link, and control the multimedia audio and video streams).

Data Services (access and manipulate data from the multimedia streams).

Interfacing with the Comm Subsystem

Conferencing API 506 supports the following comm services with the comm subsystem:

Call establishment—place a call to start a conference.

Channel establishment—establish four comm channels for incoming video, incoming audio, outgoing video, and outgoing audio. These 4 channels are opened implicitly as part of call establishment, and not through separate APIs. The channel APIs are for other channels (e.g., data conferencing).

Call termination—hang up a call and close all active channels.

Call Establishment

Establishment of a call between the user of conferencing system A of FIG. 1 and the user of conferencing system B of FIG. 1 is implemented as follows:

Conferencing APIs A and B call BeginSession to initialize their comm subsystems.

Conferencing API A calls MakeConnection to dial conferencing API B's number.

Conferencing API B receives a CONN_REQUESTED callback.

Conferencing API B sends the call notification to the graphic user interface (GUI); and if user B accepts the call via the GUI, conferencing API B proceeds with the following steps.

Conferencing API B calls AcceptConnection to accept the incoming call from conferencing API A.

Conferencing APIs A and B receives CONN_ACCEPTED message.

Conferencing APIs A and B call RegisterChanMgr for channel management.

Conferencing API A calls OpenChannel to open the audio channel.

Conferencing API B receives the Chan_Requested callback and accepts it via AcceptChannel.

Conferencing API A receives the Chan_Accepted callback.

The last three steps are repeated for the video channel and the control channel.

Conferencing API A then sends the business card information on the control channel, which conferencing API B receives.

Conferencing API B then turns around and repeats the above 6 steps (i.e., opens its outbound channels for audio/video/control and sends its business card information on its control channel).

Conferencing APIs A and B then notify the conferencing applications with a CFM_ACCEPT_NTFY callback.

Channel Establishment

Video and audio channel establishment is implicitly done as part of call establishment, as described above, and need not be repeated here. For establishing other channels such as data conferencing, the conferencing API passes through the request to the comm manager, and sends the comm manager's callback to the user's channel manager.

Call Termination

Termination of a call between users A and B is implemented as follows (assuming user A hangs up):

Conferencing API A unlinks local/remote video/audio streams from the network.

Conferencing API A then calls the comm manager's CloseConnection.

The comm manager implicitly closes all channels, and sends Chan_Closed callbacks to conferencing API A.

Conferencing API A closes its remote audio/video streams on receipt of the Chan_Closed callback for its inbound audio/video channels, respectively.

Conferencing API A then receives the CONN_CLOSE_RESP from the comm manager after the call is cleaned up completely. Conferencing API A notifies its application via a CFM_HANGUP_NTFY.

In the meantime, the comm manager on B would have received the hangup notification, and would have closed its end of all the channels, and notified conferencing API B via Chan_Closed.

Conferencing API B closes its remote audio/video streams on receipt of the Chan_Closed callback for its inbound audio/video channels, respectively.

Conferencing API B unlinks its local audio/video streams from the network on receipt of the Chan_Closed callback for its outbound audio/video channels, respectively.

Conferencing API B then receives a CONN_CLOSED notification from its comm manager. Conferencing API B notifies its application via CFM_HANGUP_NTFY.

Interfacing with the Audio and Video Subsystems

Conferencing API 506 supports the following services with the audio and video subsystems:

Capture/monitor/transmit local video streams.

Capture/transmit local audio streams.

Receive/play remote streams.

Control local/remote streams.

Snap an image from local video stream.

Since the video and audio streams are closely synchronized, the audio and video subsystem services are described together.

Capture/Monitor/Transmit Local Streams

The local video and audio streams are captured and monitored as follows:

Call AOpen to open the local audio stream.

Call VOpen to open the local video stream.

Call ACapture to capture the local audio stream from the local hardware.

Call VCapture to capture the local video stream from the local hardware.

Call VMonitor to monitor the local video stream.

The local video and audio streams are begun to be sent out to the remote site as follows:

Call ALinkOut to connect the local audio stream to an output network channel.

Call VLinkOut to connect the local video stream to an output network channel.

The monitoring of the local video stream locally is stopped as follows:

Call VMonitor(off) to stop monitoring the local video stream.

Receive/Play Remote Streams

Remote streams are received from the network and played as follows:

Call AOpen to open the local audio stream.

Call VOpen to open the local video stream.

Call ALinkIn to connect the local audio stream to an input network channel.

Call VLinkIn to connect the local video stream to an input network channel.

Call APlay to play the received remote audio stream.

Call VPlay to play the received remote video stream.

Control Local/Remote Streams

The local video and audio streams are paused as follows:

Call VLinkout(off) to stop sending local video on the network.

Call AMute to stop sending local audio on the network.

The remote video and audio streams are paused as follows:

If CF_PlayStream(off) is called, conferencing API calls APlay(off) and VPlay(off).

The local/remote video/audio streams are controlled as follows:

Call ACntl to control the gains of a local audio stream or the volume of the remote audio stream.

Call VCntl to control such parameters as the brightness, tint, contrast, color of a local or remote video stream.

Snap an Image from Local Video Streams

A snapshot of the local video stream is taken and returned as an image to the application as follows:

Call VGrabframe to grab the most current image from the local video stream.

Conferencing API 506 supports the following function calls by conferencing applications 502 and 504 to the video, comm, and audio subsystems:

| | |
|---|---|
| CF_Init | Reads in the conferencing configuration parameters (e.g., pathname of the directory database and directory name in which the conferencing software is kept) from an initialization file; loads and initializes the software of the comm, video, and audio subsystems by allocating and building internal data structures; allows the application to choose between the message and the callback routines to return the event notifications from the remote site. |
| CF_MakeCall | Makes a call to the remote site to establish a connection for conferencing. The call is performed asynchronously. |
| CF_AcceptCall | Accepts a call initiated from the remote site based on the information received in the CFM_CALL_NTFY message. |
| CF_RejectCall | Rejects incoming call, if appropriate, upon receiving a CFM_CALL_NTFY message. |
| CF_HangupCall | Hangs up a call that was previously established; releases all resources, including all types of streams and data structures, allocated during the call. |
| CF_GetCallState | Returns the current state of the specified call. |
| CF_CapMon | Starts the capture of analog video signals from the local camera and displays the video in the local_video_window which is pre-opened by the application. This function allows the user to preview his/her appearance before sending the signals out to the remote site. |
| CF_PlayRcvd | Starts the reception and display of remote video signals in the remote_video_window, which is pre-opened by the application; starts the reception and play of remote audio signals through the local speaker. |
| CF_Destroy | Destroys the specified stream group that was created by CF_CapMon or CF_PlayRcvd. As part of the destroy process, all operations (e.g., sending/playing) being performed on the stream group will be stopped and all allocated system resources will be freed. |
| CF_Mute | Uses AMute to turn on/off the mute function being performed on the audio stream of a specified stream group. This function will temporarily stop or restart the related operations, including playing and sending, being performed on this stream group. This function may be used to hold temporarily one audio stream and provide more bandwidth for other streams to use. |
| CF_SnapStream | Takes a snapshot of the video stream of the specified stream group and returns a still image (reference) frame to the application buffers indicated by the hBuffer handle. |
| CF_Control | Controls the capture or playback functions of the local or remote video and audio stream groups. |
| CF_SendStream | Uses ALinkOut to pause/unpause audio. |
| CF_GetStreamInfo | Returns the current state and the audio video control block (AVCB) data structure, preallocated by the application, of the specified stream groups. |
| CF_PlayStream | Stops/starts the playback of the remote audio/video streams by calling APlay/VPlay. |

These functions are defined in further detail later in this specification in a section entitled "Data Structures, Functions, and Messages."

In addition, conferencing API 506 supports the following messages returned to conferencing applications 502 and 504 from the video, comm, and audio subsystems in response to some of the above-listed functions:

| | |
|---|---|
| CFM_CALL_NTFY | Indicates that a call request initiated from the remote site has been received. |
| CFM_PROGRESS_NTFY | Indicates that a call state/progress notification has been received from the local phone system support. |
| CFM_ACCEPT_NTFY | Indicates that the remote site has accepted the call request issued locally. Also sent to the accepting |

| | |
|---|---|
| | application when CF_AcceptCall completes. |
| CFM_REJECT_NTFY | Indicates that the remote site has rejected or the local site has failed to make the call. |
| CFM_HANGUP_NTFY | Indicates that the remote site has hung up the call. |

Figure 8:
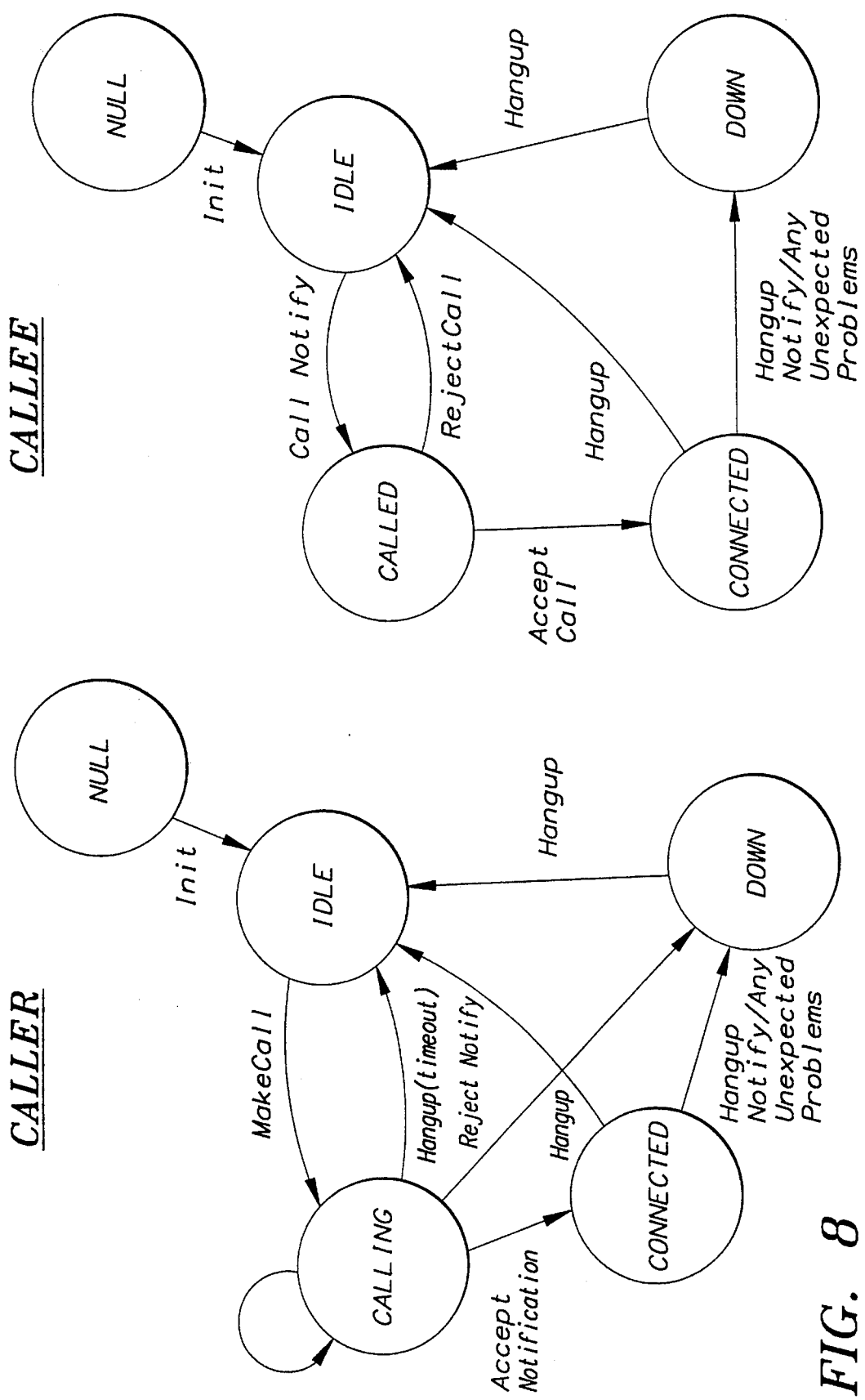
FIG. 8 is a representation of the conferencing call finite state machine (FSM) for a conferencing session between a local conferencing system (i.e., caller) and a remote conferencing system (i.e., callee)

Referring now to FIG. 8, there is shown a representation of the conferencing call finite state machine (FSM) for a conferencing session between a local conferencing system (i.e., caller) and a remote conferencing system (i.e., callee), according to a preferred embodiment of the present invention. The possible conferencing call states are as follows:

| | |
|---|---|
| CCST_NULL | Null State - state of uninitialized caller/callee. |
| CCST_IDLE | Idle State - state of caller/callee ready to make/receive calls. |
| CCST_CALLING | Calling state - state of caller trying to call callee. |
| CCST_CALLED | Called state - state of callee being called by caller. |
| CCST_CONNECTED | Call state - state of caller and callee during conferencing session. |
| CCST_CLOSING | A hangup or call cleanup is in progress. |

At the CCST_CONNECTED state, the local application may begin capturing, monitoring, and/or sending the local audio/video signals to the remote application. At the same time, the local application may be receiving and playing the remote audio/video signals.

Referring now to FIG. 9, there is shown a representation of the conferencing stream FSM for each conferencing system participating in a conferencing session, according to a preferred embodiment of the present invention. The possible conferencing stream states are as follows:

| | |
|---|---|
| CSST_INIT | Initialization state - state of local and remote streams after CCST_CONNECTED state is first reached. |
| CSST_ACTIVE | Capture state - state of local stream being captured. Receive state - state of remote stream being received. |
| CSST_FAILURE | Fail state - state of local/remote stream after resource failure. |

Conferencing stream FSM represents the states of both the local and remote streams of each conferencing system. Note that the local stream for one conferencing system is the remote stream for the other conferencing system.

In a typical conferencing session between a caller and a callee, both the caller and callee begin in the CCST_NULL call state of FIG. 8. The conferencing session is initiated by both the caller and callee calling the function CF_Init to initialize their own conferencing systems. Initialization involves initializing internal data structures, initializing communication and configuration information, opening a local directory data base, verifying the local user's identity, and retrieving the user's profile information from the database. The CF_Init function takes both the caller and callee from the CCST_NULL call state to the CCST_IDLE call state. The CF_Init function also places both the local and remote streams of both the caller and callee in the CSST_INIT stream state of FIG. 9.

Both the caller and callee call the CF_CapMon function to start capturing local video and audio signals and playing them locally, taking both the caller and callee local stream from the CSST_INIT stream state to the CSST_ACTIVE stream state. Both the caller and callee may then call the CF_Control function to control the local video and audio signals, leaving all states unchanged.

The caller then calls the CF_MakeCall function to initiate a call to the callee, taking the caller from the CCST_IDLE call state to the CCST_CALLING call state. The callee receives and processes a CFM_CALL_NTFY message indicating that a call has been placed from the caller, taking the callee from the CCST_IDLE call state to the CCST_CALLED call state. The callee calls the $CF_{13}$ AcceptCall function to accept the call from the caller, taking the callee from the CCST_CALLED call state to the CCST_CONNECTED call state. The caller receives and processes a CFM_ACCEPT_NTFY message indicating that the callee accepted the call, taking the caller from the CCST_CALLING call state to the CCST_CONNECTED call state.

Both the caller and callee then call the CF_PlayRcvd function to begin reception and play of the video and audio streams from the remote site, leaving all states unchanged. Both the caller and callee call the CF_SendStream function to start sending the locally captured video and audio streams to the remote site, leaving all states unchanged. If necessary, both the caller and callee may then call the CF_Control function to control the remote video and audio streams, again leaving all states unchanged. The conferencing session then proceeds with no changes to the call and stream states. During the conferencing session, the application may call CF_Mute, CF_PlayStream, or CF_SendStream. These affect the state of the streams in the audio/video managers, but not the state of the stream group.

When the conferencing session is to be terminated, the caller calls the CF_HangupCall function to end the conferencing session, taking the caller from the CCST_CONNECTED call state to the CCST_IDLE call state. The callee receives and processes a CFM_HANGUP_NTFY message from the caller indicating that the caller has hung up, taking the callee from the CCST_CONNECTED call state to the CCST_IDLE call state.

Both the caller and callee call the CF_Destroy function to stop playing the remote video and audio signals, taking both the caller and callee remote streams from the CSST_ACTIVE stream state to the CSST_INIT stream state. Both the caller and callee also call the CF_Destroy function to stop capturing the local video and audio signals, taking both the caller and callee local streams from the CSST_ACTIVE stream state to the CSST_INIT stream state.

This described scenario is just one possible scenario. Those skilled in the art will understand that other scenarios may be constructed using the following additional functions and state transitions:

If the callee does not answer within a specified time period, the caller automatically calls the CF_HangupCall function to hang up, taking the caller from the CCST_CALLING call state to the CCST_IDLE call state.

The callee calls the CF_RejectCall function to reject a call from the caller, taking the callee from the CCST_CALLED call state to the CCST_IDLE call state. The caller then receives and processes a CFM_REJECT_NTFY message indicating that the callee has rejected the caller's call, taking the caller from the CCST_CALLING call state to the CCST_IDLE call state.

The callee (rather than the caller) calls the CF_HangupCall function to hang up, taking the callee from the CCST_CONNECTED call state to the CCST_IDLE call state. The caller receives a CFM_HANGUP_NTFY message from the callee indicating that the callee has hung up, taking the caller from the CCST_CONNECTED call state to the CCST_IDLE call state. The CF_GetCallState function may be called by either the caller or the callee from any call state to determine the current call state without changing the call state.

During a conferencing session, an unrecoverable resource failure may occur in the local stream of either the caller or the callee causing the local stream to be lost, taking the local stream from the CSST_ACTIVE stream state to the CSST_FAILURE stream state. Similarly, an unrecoverable resource failure may occur in the remote stream of either the caller or the callee causing the remote stream to be lost, taking the remote stream from the CSST_ACTIVE stream state to the CSST_FAILURE stream state. In either case, the local site calls the CF_Destroy function to recover from the failure, taking the failed stream from the CSST_FAILURE stream state to the CSST_INIT stream state.

The CF_GetStreamInfo function may be called by the application from any stream state of either the local stream or the remote stream to determine information regarding the specified stream groups. The CF_SnapStream and CF_RecordStream functions may be called by the application for the local stream in the CSST_ACTIVE stream state or for the remote stream (CF_RecordStream only) in the CSST_ACTIVE stream state. All of the functions described in this paragraph leave the stream state unchanged.

Video Subsystem

The video subsystem of conferencing system 100 of FIG. 5 comprises video API 508, video manager 516, video capture driver 522, and host interface 526 running on host processor 202 of FIG. 2 and video microcode 530 running on video board 204. The following sections describe each of these constituents of the video subsystem.

Video API

Video API 508 of FIG. 5 provides an interface between audio/video conferencing application 502 and the video subsystem. Video API 508 provides the following services:

| | |
|---|---|
| Capture Service | Captures a single video stream continuously from a local video hardware source, for example, a video camera or VCR, and directs the video stream to a video software output sink (i.e., a network destination). |
| Monitor Service | Monitors the video stream being captured from the local video hardware in the local video window previously opened by the application. Note: This function intercepts and displays a video stream at the hardware board when the stream is first captured. This operation is similar to a "Short circuit" or a UNIX tee and is different from the "play" function. The play function gets and displays the video stream at the host. In conferencing system 100, the distinction between monitor and play services is that one is on the board and the other at the host. Both are carried out on the host (i.e., software playback). Rather, the distinction is this: monitor service intercepts and displays, on the local system, a video stream that has been captured with the local hardware (generated locally). By contrast, play service operates on a video stream that has been captured on a remote system's hardware and then sent to the local system (generated remotely). |
| Pause Service | Suspends capturing or playing of an active video stream; resumes capturing or playing of a previously suspended video stream. |
| Image Capture | Grabs the most current complete still image (called a reference frame) from the specified video stream and returns it to the application in the Microsoft ® DIB (Device-Independent Bitmap) format. |
| Play Service | Plays a video stream continuously by consuming the video frames from a video software source (i.e., a network source). |
| Link-In Service | Links a video network source to be the input of a video stream played locally. This service allows applications to change dynamically the software input source of a video stream. |
| Link-Out Service | Links a network source to be the output of a video stream captured locally. This service allows applications to change dynamically the software output source of a video stream. |
| Control Service | Controls the video stream "on the fly," including adjusting brightness, contrast, frame rate, and data rate. |
| Information Service | Returns status and information about a specified video stream. |
| Initialization/ Configuration | Initializes the video subsystem and calculates the cost, in terms of system resources, required to sustain certain video configurations. These costs can be used by other subsystems to determine the optimum product configuration for the given system. |

Video API 508 supports the following function calls by audio/video conferencing application 502 to the video subsystem:

| | |
|---|---|
| VOpen | Opens a video stream with specified attributes by allocating all necessary system resources (e.g., internal data structures) for it. |
| VCapture | Starts/stops capturing a video stream from a local video hardware source, such as a video camera or VCR. |
| VMonitor | Starts/stops monitoring a video stream captured from local a video camera or VCR. |
| VPlay | Starts/stops playing a video stream from a network, or remote, video source. When starting to play, the video frames are consumed from a network video source and displayed in a window pre-opened by the application. |
| VLinkIn | Links/unlinks a network . . . to/from a specified video stream, which will be played/is being played locally. |
| VLinkOut | Links/unlinks a network . . . to/from a specified video stream, which will be captured/is being captured from the local camera or VCR. |
| VGrabframe | Grabs the most current still image (reference frame) from a specified video stream and returns the frame in an application-provided buffer. |
| VPause | Starts/stops pausing a video stream captured/ played locally. |
| VCntl | Controls a video stream by adjusting its parameters (e.g., tint/contrast, frame/data rate). |
| VGetInfo | Returns the status (VINFO and state) of a video stream. |
| VClose | Closes a video stream and releases all system resources allocated for this stream. |
| VInit | Initializes the video subsystem, starts capture and playback applications, and calculates system utilization for video configurations. |

-continued

| | |
|---|---|
| VShutdown | Shuts down the video subsystem and stops the capture and playback applications. |
| VCost | Calculates and reports the percentage CPU utilization required to support a given video stream. |

These functions are defined in further detail later in this specification in a section entitled "Data Structures, Functions, and Messages."

Figure 10:
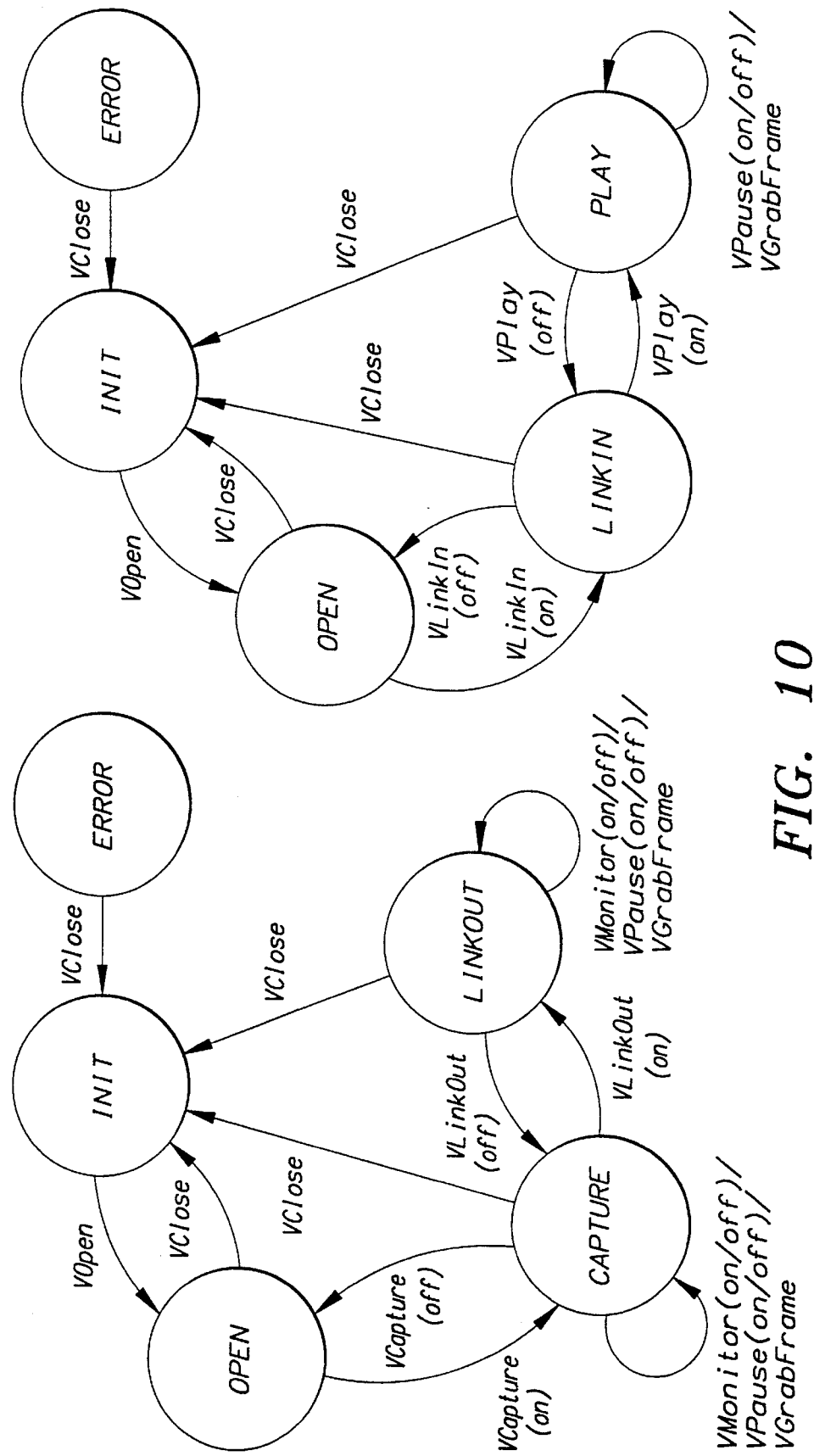
FIG. 10 is a representation of the video FSM for the local video stream and the remote video stream of a conferencing system during a conferencing session.

Referring now to FIG. 10, there is shown a representation of the video FSM for the local video stream and the remote video stream of a conferencing system during a conferencing session, according to a preferred embodiment of the present invention. The possible video states are as follows:

| | |
|---|---|
| VST_INIT | Initial state - state of local and remote video streams after the application calls the CF_Init function. |
| VST_OPEN | Open state - state of the local/remote video stream after system resources have been allocated. |
| VST_CAPTURE | Capture state - state of local video stream being captured. |
| VST_LINKOUT | Link-out state - state of local video stream being linked to video output (e.g., network output channel or output file). |
| VST_LINKIN | Link-in state - state of remote video stream being linked to video input (e.g., network input channel or input file). |
| VST_PLAY | Play state - state of remote video stream being played. |
| VST_ERROR | Error state - state of local/remote video stream after a system resource failure occurs. |

In a typical conferencing session between a caller and a callee, both the local and remote video streams begin in the VST_INIT video state of FIG. 10. The application calls the VOpen function to open the local video stream, taking the local video stream from the VST_INIT video state to the VST_OPEN video state. The application then calls the VCapture function to begin capturing the local video stream, taking the local video stream from the VST_OPEN video state to the VST_CAPTURE video state. The application then calls the VLinkOut function to link the local video stream to the video output channel, taking the local video stream from the VST_CAPTURE video state to the VST_LINKOUT video state.

The application calls the VOpen function to open the remote video stream, taking the remote video stream from the VST_INIT video state to the VST_OPEN video state. The application then calls the VLinkIn function to link the remote video stream to the video input channel, taking the remote video stream from the VST_OPEN video state to the VST_LINKIN video state. The application then calls the VPlay function to begin playing the remote video stream, taking the remote video stream from the VST_LINKIN video state to the VST_PLAY video state. The conferencing session proceeds without changing the video states of either the local or remote video stream.

When the conferencing session is to be terminated, the application calls the VClose function to close the remote video channel, taking the remote video stream from the VST_PLAY video state to the VST_INIT video state. The application also calls the VClose function to close the local video channel, taking the local video stream from the VST_LINKOUT video state to the VST_INIT video state.

This described scenario is just one possible video scenario. Those skilled in the art will understand that other scenarios may be constructed using the following additional functions and state transitions:

The application calls the VLinkOut function to unlink the local video stream from the video output channel, taking the local video stream from the VST_LINKOUT video state to the VST_CAPTURE video state.

The application calls the VCapture function to stop capturing the local video stream, taking the local video stream from the VST_CAPTURE video state to the VST_OPEN video state.

The application calls the VClose function to close the local video stream, taking the local video stream from the VST_OPEN video state to the VST_INIT video state.

The application calls the VClose function to close the local video stream, taking the local video stream from the VST_CAPTURE video state to the VST_INIT video state.

The application calls the VClose function to recover from a system resource failure, taking the local video stream from the VST_ERROR video state to the VST_INIT video state.

The application calls the VPlay function to stop playing the remote video stream, taking the remote video stream from the VST_PLAY video state to the VST_LINKIN video state.

The application calls the VLinkIn function to unlink the remote video stream from the video input channel, taking the remote video stream from the VST_LINKIN video state to the VST_OPEN video state.

The application calls the VClose function to close the remote video stream, taking the remote video stream from the VST_OPEN video state to the VST_INIT video state.

The application calls the VClose function to close the remote video stream, taking the remote video stream from the VST_LINKIN video state to the VST_INIT video state.

The application calls the VClose function to recover from a system resource failure, taking the remote video stream from the VST_ERROR video state to the VST_INIT video state.

The VGetInfo and VCntl functions may be called by the application from any video state of either the local or remote video stream, except for the VST_INIT state. The VPause and VGrabFrame functions may be called by the application for the local video stream from either the VST_CAPTURE or VST_LINKOUT video states or for the remote video stream from the VST_PLAY video state. The VMonitor function may be called by the application for the local video stream from either the VST_CAPTURE or VST_LINKOUT video states. All of the functions described in this paragraph leave the video state unchanged.

Video Manager

Figure 11:
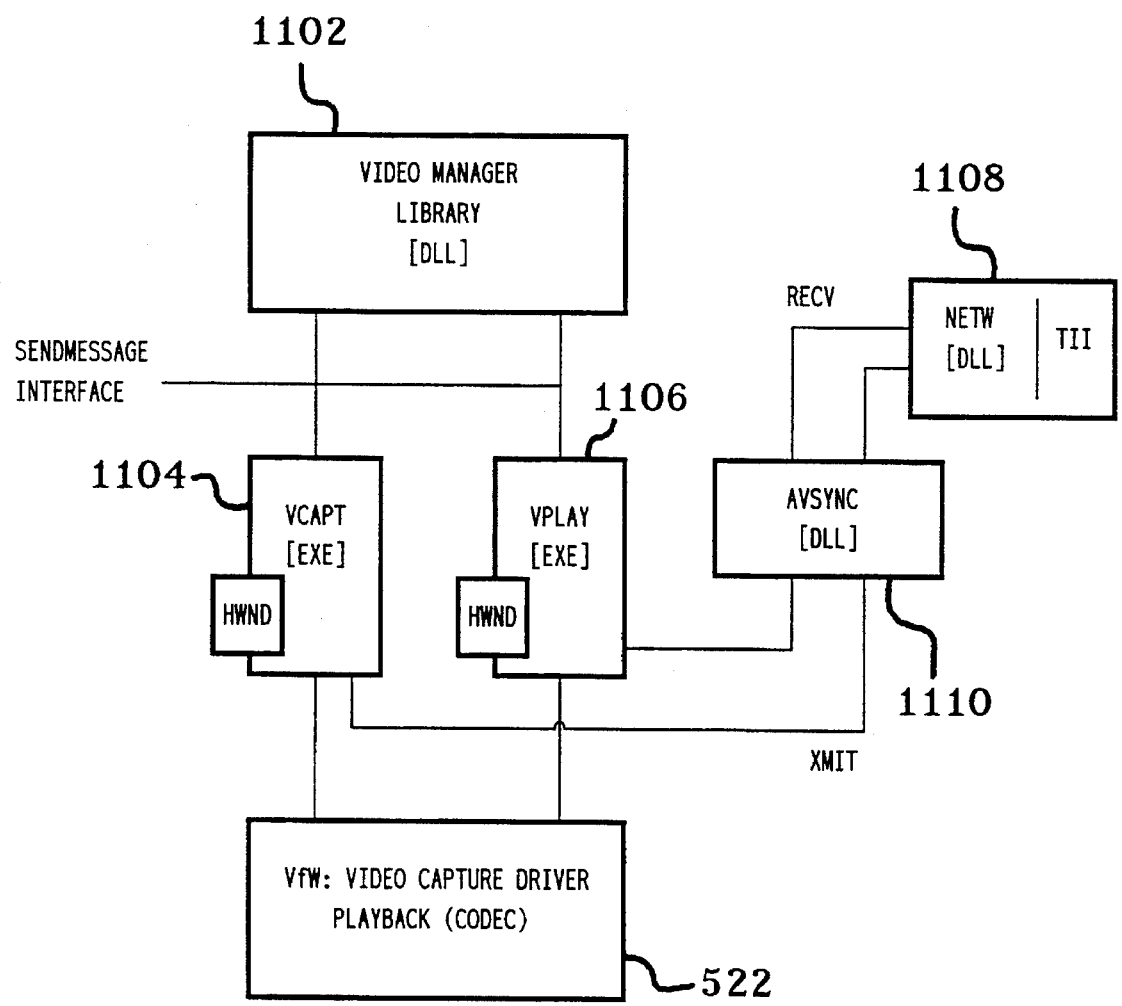
FIG. 11 is a block diagram of the software components of the video manager of the conference system of FIG. 5.

Referring now to FIG. 11, there is shown a block diagram of the software components of video manager (VM) 516 of FIG. 5, according to a preferred embodiment of the present invention. Video manager 516 is implemented using five major components:

| | |
|---|---|
| Library | (VM DLL 1102) A Microsoft ® Windows Dynamic Link Library (DLL) that provides the library of functions of video API 508. |
| Capture | (VCapt EXE 1104) A Microsoft ® Windows application (independently executable control thread with stack, message queue, and data) which controls the capture and distribution of video frames from |

|  |  |
|---|---|
| Playback | video board 204.<br>(VPlay EXE 1106) A Microsoft ® Windows application which controls the playback (i.e., decode and display) of video frames received from either the network or a co-resident capture application. |
| Network Library | (Netw DLL 1108) A Microsoft ® Windows DLL which provides interfaces to send and receive video frames across a network or in a local loopback path to a co-resident playback application. The Netw DLL hides details of the underlying network support from the capture and playback applications and implements (in a manner hidden from those applications) the local loopback function. |
| Audio-Video Synchronization Library | (AVSync DLL 1110) A Microsoft ® Windows DLL which provides interfaces to enable the synchronization of video frames with a separate stream of audio frames for the purposes of achieving "lip-synchronization." AVSync DLL 1110 supports the implementation of an audio-video synchronization technique described later in this specification. |

The five major components, and their interactions, define how the VM implementation is decomposed for the purposes of an implementation. In addition, five techniques provide full realization of the implementation:

|  |  |
|---|---|
| Stream Restart | A technique for initially starting, and restarting, a video stream. If a video stream consists entirely of encoded "delta" frames, then the method of stream start/restart quickly supplies the decoder with a "key" or reference frame. Stream restart is used when a video stream becomes out-of-sync with respect to the audio. |
| Synchronization | An audio-video synchronization technique for synchronizing a sequence, or stream, of video frames with an external audio source. |
| Bit Rate Throttling | A technique by which the video stream bit rate is controlled so that video frame data coexists with other video conferencing components. This technique is dynamic in nature and acts to "throttle" the video stream (up and down) in response to higher priority requests (higher than video data priority) made at the network interface. |
| Multiple Video Formats | A technique by which multiple video formats are used to optimize transfer, decode, and display costs when video frames are moved between video board 204 and host processor 202. This technique balances video frame data transfer overhead with host processor decode and display overhead in order to implement efficiently a local video monitor. |
| Self-Calibration | A self-calibration technique which is used to determine the amount of motion video PC system can support. This allows conferencing system 100 to vary video decode and display configurations in order to run on a range of PC systems. It is particularly applicable in software-playback systems. |

Capture/Playback Video Effects

This subsection describes an important feature of the VM implementation that has an impact on the implementation of both the capture and playback applications (VCapt EXE 1104 and VPlay EXE 1106). One of the key goals of VM capture and playback is that while local Microsoft® Windows application activity may impact local video playback, it need not effect remote video playback. That is, due to the non-preemptive nature of the Microsoft® Windows environment, the VPlay application may not get control to run, and as such, local monitor and remote playback will be halted. However, if captured frames are delivered as a part of capture hardware interrupt handling, and network interfaces are accessible at interrupt time, then captured video frames can be transmitted on the network, regardless of local conditions.

With respect to conferencing system 100, both of these conditions are satisfied. This is an important feature in an end-to-end conferencing situation, where the local endpoint is unaware of remote endpoint processing, and can only explain local playback starvation as a result of local activity. The preferred capture and playback application design ensures that remote video is not lost due to remote endpoint activity.

Video Stream Restart

The preferred video compression method for conferencing system 100 (i.e., ISDN rate video or IRV) contains no key frames (i.e., reference frames). Every frame is a delta (i.e., difference) frame based on the preceding decoded video frame. In order to establish a complete video image, IRV dedicates a small pan (preferably 1/85th) of each delta frame to key frame data. The part of an IRV delta frame that is key is complete and does not require inter-frame decode. The position of the key information is relative, and is said to "walk" with respect to a delta frame sequence, so that the use of partial key information may be referred to as the "walking key frame."

Figure 12:
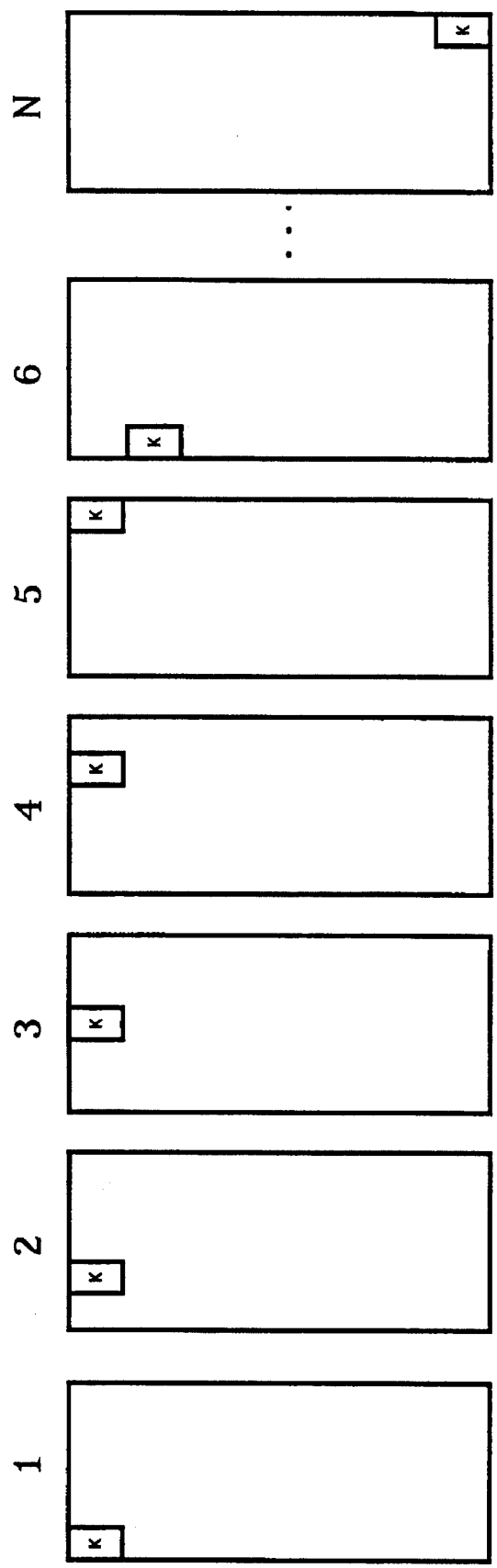
FIG. 12 is a representation of a sequence of N walking key frames.

Referring now to FIG. 12, there is shown a representation of a sequence of N walking key frames. For a walking key frame of size 1/N, the kth frame in a sequence of N frames, where (k<=N), has its kth component consisting of key information. On decode, that kth component is complete and accurate. Provided frame k+1 is decoded correctly, the kth component of the video stream will remain accurate, since it is based on a kth key component and a k+1 correct decode. A complete key frame is generated every N frames in order to provide the decoder with up-to-date reference information within N frames.

For a continuous and uninterrupted stream of video frames, the walking key frame provides key information without bit-rate fluctuations that would occur if a complete key frame were sent at regular intervals. However, without a complete key frame, video startup requires collecting all walking key frame components, which requires a delay of N frames. If video startup/restart occurs often, this can be problematic, especially if N is large. For example, at 10 frames per second (fps) with N=85, the startup/restart time to build video from scratch is 8.5 seconds.

In order to accelerate IRV stream startup and restart, an IRV capture driver "Request Key Frame" interface is used to generate a complete key frame on demand. The complete key frame "compresses" N frames of walking key frames into a single frame, and allows immediate stream startup once it is received and decoded. Compressed IRV key frames for (160×120) video images are approximately 6–8 KBytes in length. Assuming an ISDN bandwidth of 90 kbits dedicated to video, ISDN key frame transmission takes approximately 0.5–0.6 seconds to transmit. Given a walking key frame size of 1/85 (N=85), and a frame rate of 10 fps, use of a complete key frame to start/restart a video stream can decrease the startup delay from 8.5 secs to approximately ½ sec.

In order for walking key frame compression to be successful, the delta frame rate must be lowered during key frame transmission. Delta frames generated during key frame transmission are likely to be "out-of-sync" with respect to establishing audio-video synchronization, and given the size of a key frame, too many delta frames will exceed the overall ISDN bandwidth. The IRV capture driver bit rate controller takes into account key flame data in its frame generation logic and decreases frame rate immediately following a key flame.

A key frame once received may be "out-of-sync" with respect to the audio stream due to its lengthy transmission time. Thus, key flames will be decoded but not displayed, and the video stream will be "in-sync" only when the first follow-on delta frame is received. In addition, the "way-out-of-sync" window is preferably sized appropriately so that key flame transmission does not cause the stream to require repeated restarts.

Once it is determined that a stream requires restart, either as part of call establishment or due to synchronization problems, the local endpoint requiring the restart transmits a restart control message to the remote capture endpoint requesting a key frame. The remote capture site responds by requesting its capture driver to generate a key flame. The key frame is sent to the local endpoint when generated. The endpoint requesting the restart sets a timer immediately following the restart request. If a key flame is not received after an adequate delay, the restart request is repeated.

Audio/Video Synchronization

Video manager 516 is responsible for synchronizing the video stream with the audio stream in order to achieve "lip-synchronization." Because of the overall conferencing architecture, the audio and video subsystems do not share a common clock. In addition, again because of system design, the audio stream is a more reliable, lower latency stream than the video stream. For these reasons, the video stream is synchronized by relying on information regarding capture and playback audio timing.

For VM audio/video (A/V) synchronization, audio stream packets are timestamped from an external clock at the time they are captured. When an audio packet is played, its timestamp represents the current audio playback time. Every video frame captured is stamped with a timestamp, derived from the audio system, that is the capture timestamp of the last audio packet captured. At the time of video playback (decode and display, typically at the remote endpoint of a video conference), the video frame timestamp is compared with the current audio playback time, as derived from the audio system.

Two windows, or time periods, $\delta_1$ and $\delta_2$, are defined, with $\delta_1 < \delta_2$, as part of VM initialization. Let $V_T$ be the timestamp for a given video frame, and let $A_T$ be the current audio playback time when the video frame is to be played. A/V synchronization is defined as follows:

1. If $|A_T - V_T| \leq \delta_1$, then the video stream is "in-sync" and played normally (i.e., decoded and displayed immediately).
2. If $\delta_1 < |A_T - V_T| \leq \delta_2$, then the video stream is "out-of-sync" and a "hurry-up" technique is used to attempt re-synchronization. If a video stream remains out-of-sync for too many consecutive frames, then it becomes "way-out-of-sync" and requires a restart.
3. If $\delta_2 < |A_T - V_T|$, then the video stream is "way-out-of-sync" and requires a restart.

Because of the overall design of conferencing system 100, a video stream sent from one endpoint to another is "behind" its corresponding audio stream. That is, the transmission and reception of a video frame takes longer than the transmission and reception of an audio frame. This is due to the design of video and audio capture and playback sites relative to the network interface, as well as video and audio frame size differences. In order to compensate for this, the audio system allows capture and playback latencies to be set for an audio stream. Audio capture and playback latencies artificially delay the capture and playback of an audio stream.

As part of the VLinkOut function, video manager 516 calls audio manager 520 to set an audio capture latency. As part of the VLinkIn function, video manager 516 calls audio manager 520 to set an audio playback latency. Once the latencies are set, they are preferably not changed. The capture and playback latency values are specified in milliseconds, and defined as part of VM initialization. They may be adjusted as part of the Calibration process.

In order to attempt re-synchronization when a stream is not too far "out-of-sync" as defined by the above rules, an feature called "Hurry-up" is used. When passing a video frame to the codec for decode, if hurry-up is specified, then the codec performs frame decode to a YUV intermediate format but does not execute the YUV-to-RGB color conversion. Though the output is not color converted for RGB graphics display, the hurry-up maintains the playback decode stream for following frames. When Hurry-up is used, the frame is not displayed. By decreasing the decode/display cost per frame and processing frames on demand (the number of frames processed for playback per second can vary), it is possible for a video stream that is out-of-sync to become in-sync.

Bit Rate Throttling

Conferencing system 100 supports a number of different media: audio, video, and data. These media are prioritized in order to share the limited network (e.g., ISDN) bandwidth. A priority order of (highest-to-lowest) audio, data, and video is designated. In this scheme, network bandwidth that is used for video will need to give way to data, when data conferencing is active (audio is not compromised). In order to implement the priority design, a mechanism for dynamically throttling the video bit stream is used. It is a self-throttling system, in that it does not require input from a centralized bit rate controller. It both throttles down and throttles up a video bit stream as a function of available network bandwidth.

A latency is a period of time needed to complete the transfer of a given amount of data at a given bit rate. For example, for 10 kbits at 10 kbits/sec, latency=1. A throttle down latency is the latency at which a bit stream is throttled down (i.e., its rate is lowered), and a throttle up latency is the latency at which a bit stream is throttled up (i.e., its rate is increased).

Multiple Video Formats

Conferencing system 100 presents both a local monitor display and a remote playback display to the user. A digital video resolution of (160×120) is preferably used as capture resolution for ISDN-based video conferencing (i.e., the resolution of a coded compressed video stream to a remote site). (160×120) and (320×240) are preferably used as the local monitor display resolution. (320×240) resolution may also be used for high-resolution still images. Generating the local monitor display by decompressing and color converting the compressed video stream would be computationally expensive. The video capture driver 522 of FIG. 5 simultaneously generates both a compressed video stream and an uncompressed video stream. Video manager 516 makes use of the uncompressed video stream to generate the local monitor display. Video manager 516 may select the format of the uncompressed video stream to be either YUV-9 or 8-bits/pixel (bpp) RGB—Device Independent Bitmap (DIB) format. For a (160×120) local monitor, the uncompressed DIB video stream may be displayed directly. For a (320× 240) monitor, a (160×120) YUV-9 format is used and the display driver "doubles" the image size to (320×240) as part of the color conversion process.

In the RGB and YUV-9 capture modes, RGB or YUV data are appended to capture driver IRV buffers, so that the capture application (VCapt EXE 1104) has access to both fully encoded IRV frames and either RGB or YUV data. Conferencing system 100 has custom capture driver interfaces to select either RGB capture mode, YUV capture mode, or neither.

Self-Calibration

CPU, I/O bus, and display adapter characteristics vary widely from computer to computer. The goal of VM self-calibration is to support software-based video playback on a variety of PC platforms, without having to "hard-code" fixed system parameters based on knowledge of the host PC. VM self-calibration measures a PC computer system in order to determine the decode and display overheads that it can support. VM self-calibration also offers a cost function that upper-layer software may use to determine if selected display options, for a given video compression format, are supported.

There are three major elements to the self-calibration:
1. The calibration of software decode using actual video decompress cycles to measure decompression costs. Both RGB/YUV capture mode and IRV frames are decoded in order to provide accurate measurement of local (monitor) and remote video decode. YUV (160×120) and YUV (320×240) formats are also decoded (color converted) to provide costs associated with the YUV preview feature of the video subsystem.
2. A calibration of PC displays, at varying resolutions, using actual video display cycles to measure display costs.
3. A video cost function, available to applications, that takes as input frame rate, display rate, display resolution, video format, and miscellaneous video stream characteristics, and outputs a system utilization percentage representing the total system cost for supporting a video decompress and display having the specified characteristics.

The calibration software detects a CPU upgrade or display driver modification in order to determine if calibration is to be run, prior to an initial run on a newly installed system.

VM DLL

Referring again to FIG. 11, video manager dynamic link library (VM DLL) WB is a video stream "object manager." That is, with few exceptions, all VM DLL interfaces take a "Video Stream Object Handle" (HVSTRM) as input, and the interfaces define a set of operations or functions on a stream object. Multiple stream objects may be created.

Video API 508 defines all of external interfaces to VM DLL WB. There are also a number of VM internal interfaces to VM DLL WB that are used by VCapt EXE WC, VPlay EXE WD, Netw DLL WE, and AVSync DLL WF for the purposes of manipulating a video stream at a lower level than that available to applications. The vm.h file, provided to applications that use VM DLL WF, contains a definition of all EPS and VM internal interfaces. EPS interfaces are prefixed with a 'V'; VM internal interfaces are prefixed with a 'VM'. Finally, there are a number of VM private interfaces, available only to the VM DLL code, used to implement the object functions. For example, there are stream object validation routines. The self-calibration code is a separate module linked with the VM DLL code proper.

Video API calls, following HVSTRM and parameter validation, are typically passed down to either VCapt or VPlay for processing. This is implemented using the Microsoft® Windows SDK SendMessage interface. SendMessage takes as input the window handle of the target application and synchronously calls the main window proc of that application. As part of VM initialization, VM starts execution of the applications, VCapt and VPlay. As part of their WinMain processing, these applicationss make use of a VMRegister interface to return their window handle to VM DLL WB. From registered window handles, VM DLL WB is able to make use of the SendMessage interface. For every video API interface, there is a corresponding parameter block structure used to pass parameters to VCapt or VPlay. These structures are defined in the vm.h file. In addition to the WinExec startup and video API interface calls, VM DLL WB can also send a shutdown message to VCapt and VPlay for termination processing.

Immediately following the successful initialization of VCapt and VPlay, VM 516 calls the interface 'videoMeasure' in order to run self-calibration. The VCost interface is available, at run-time, to return measurement information, per video stream, to applications.

VCapt EXE

The video capture application (VCapt EXE WC) implements all details of video frame capture and distribution to the network, including:

- Control of the video board capture driver.
- Video format handling to support IRV and RGB/YUV capture mode.
- Video frame capture callback processing of captured video frames.
- Copy followed by PostMessage transfer of video frames to local playback application (VPlay EXE).
- Transmission, via Netw DLL WE, of video frames to the network.
- Mirror, zoom, camera video attributes, and miscellaneous capture stream control processing.
- Restart requests from a remote endpoint.
- Shutdown processing.

VCapt EXE WC processing may be summarized as a function of the Microsoft® Windows messages as follows:

WINMAIN
- Initialize application.
- Get VCapt EXE initialization (INI) settings.
- Open video board capture driver.
- Register window handle (and status) with VM DLL WB.
- Enter Microsoft® Windows message loop.

WM_VCAPTURE_CALL (ON)
- Register audio callback with audio manager 520.
- Set audio capture latency with audio manager 520.
- Initialize the video board capture stream based on stream object attributes.

WM_VLINKOUT_CALL (ON)
- Register Netw callback handler for transmission completion handling.
- Initialize bit rate throttling parameters.

WM_MONITOR_DATA_RTN
- Decrement reference count on video frame (user context buffers).

WM_PLAY_DATA_RTN
- Add buffer back to capture driver.

This message is only in loopback case of remote playback—preferably for testing only.

WM_RESTART_STREAM
- Request key frame from capture driver.

WM_VCNTL_CALL
- Adjust video stream controls based on VCntl parameters (from VM DLL WB).

WM_PLAYBACK
- Get stream format type (IRV, YUV).
- Set video board RGB/YUV capture mode controls: If IRV (160×120) playback then RGB; if IRV 320×240 playback, then YUV.

This message is from local playback application (VPlay

EXE WD) in response to local window (monitor) size changes.

WM_SHUTDOWN

Disable capture; includes closing the capture driver.

Un-initializes capture application.

DestroyWindow.

VCapt Capture Callback is a key component of the VCapt EXE application. VCapt Capture Callback processes individual frames received, in interrupt context, from the capture driver (ISVR.DRV). The main steps of callback processing are:

Time stamp the video frame using AVSync DLL WF.

Set the packet sequence number of the frame (for network error detection).

If the video stream is in the Monitor state, then copy the frame out of interrupt context into a local monitor playback frame first-in first-out (FIFO) device. If the video format is YUV, then only the frame header is copied, since YUV data does not go to the network, and is not "real-time."

If the video stream is in the LinkOut state of FIG. 10, then call the NETWSendFrame function to send the frame to the remote playback site, and then add the frame buffer back to the capture driver. Also, use interface DataRateThrottleDown to adjust the video bit rate, as needed.

VPlay EXE

The video playback application (VPlay EXE WD) implements all details of video playback, including:

Opening an instance of the IRV playback codec for each playback stream: local monitor and remote playback.

Maintaining display mode attributes for each stream, based on playback window sizes Maintain palette "awareness" for each video stream.

Receive video frames for decompress and display.

Filter video frames using AVSync DLL WF and playback frame FIFO state.

Restart video stream as necessary.

Decompress video flames via Microsoft® Windows 3.1 SendDriverMessage Codec interface.

Display video frames via Microsoft® GDI or DrawDIB interfaces.

Handle VM DLL messages generated as a result of video API interface calls.

Handle application shutdown.

In order to encapsulate decode and display attributes for a video stream in a "Display Object," references to a Display Object are passed to internal VPlay procedures. The structure of the Display Object is defined in the vplay.h include file.

VPlay EXE WD processing may be summarized as a function of the Microsoft® Windows messages as follows:

WINMAIN

Initialize application.

Get VPlay initialization (INI) settings.

Register window handle (and status) with VM DLL WB.

Enter Microsoft® Windows message loop.

WM_TIMER

Kill the outstanding restart timer.

If the stream associated with the message is still in the restart state, then RestartStream.

Initialize the video board capture stream based on stream object attributes.

WM_MONITOR_DATA

Validate stream state (MONITOR) and video frame data.

ProcessPlayFrame.

Set reference count to 0 (copy frame FIFO).

WM_PLAY_DATA

Validate stream state (PLAY) and video frame data.

ProcessPlayFrame.

NETWPostFrame to return frame buffer to the network.

WM_VMONITOR_CALL (ON)

Get video stream attributes and determine internal stream playback values.

Set up codec for stream; set up decompress structures.

RestartStream.

WM_VPLAY_CALL (ON)

Get video stream attributes and determine internal stream playback values.

Set up codec for stream; set up decompress structures.

RestartStream.

WM_VLINKIN_CALL (ON)

AVRegisterMonitor to set AVSync audio manager callback.

AVSetLatency to set audio manager playback latency.

NETWRegisterIn to register receive data complete callbacks from network and post video frame network buffers.

WM_VCNTL_CALL

Adjust video stream controls (via codec) based on VCntl parameters (from VM DLL WB).

WM_VGRABFRAME_CALL

Copy out the current RGB display buffer for the stream.

WM_MEASURE_BEGIN

Turn on video statistics gathering.

WM_MEASURE_END

Return decode and display playback statistics for the stream.

WM_MEASURE_BEGIN

Turn on video statistics gathering.

WM_SHUTDOWN

Clean up codec.

DestroyWindow.

Unregister Class.

The 'ProcessPlayFrame' procedure is a key component of the playback application (VPlay EXE WD). It processes individual frames received, in user context, from either the VCapt capture callback, in the case of local monitor playback, or from the Netw receive data complete callback, in the case of remote playback. The main steps of 'ProcessPlayFrame' processing are:

Send the video frame through the 'SyncFilter'.

If the frame is "way-out-of-sync," then restart the stream.

If the frame is "out-of-sync," then 'hurry_up'=TRUE.

Else, 'hurry_up'=FALSE.

Based on the stream display frequency attribute, determine if the frame should be displayed. If the frame is not to be displayed, then 'hurry_up'=TRUE; else 'hurry_up'=FALSE.

If the stream is REMOTE, then decode with IRV decompress.

If the stream is LOCAL, then:

If the stream is IRV (i.e., not RGB/YUV capture mode), then decode with IRV decompress;

Else if the stream is RGB capture mode, then copy to RGB display buffer;

Else if the stream is YUV capture mode, then decode with IRV Color Convert;

Else if the stream is YUV, then decode with IRV Color Convert;

If all flames have been decompressed (no more flames in playback frame FIFO) and 'hurry_up'==FALSE, then Display Frame.

SyncFilter, a procedure used by ProcessPlayFrame, is implemented as follows:

If the playback frame Fifo length is > AVFrameHighWaterMark, then return ("way-out-of-sync ").

If the stream is REMOTE, then if there is a Frame Packet Sequence Number Error, then return ("way-out-of-sync").

If the stream is REMOTE, then return (AVFrameSync (StreamObject, FramePtr)).

The first test is important: It states that the number of frames queued for playback has exceeded a high water mark, which indicates that VPlay EXE WD has been starved and the stream playback is "way-out-of-sync." The AVFrameSync interface (AVSync DLL WF) is preferably only used with remote streams, since local streams do not have the concept of an associated audio playback time.

DisplayFrame, a procedure used by ProcessPlayFrame, is implemented as follows: Based on the stream Display Object mode, use Microsoft® Windows DrawDib, BitBlt, or StretchBlt to display the frame. The display mode is a function of playback window size and video format resolution.

RestartStream is a procedure that handles details of stream restart. Its implementation is:

Clear the playback frame FIFO (the ClearFrameFifo procedure recycles queued video frames to the network or VCapt, as needed).

Set the stream state to 'RESTART'.

If the stream is LOCAL, then:

If YUV/RGB capture mode is not enabled, then PostMessage (WM_STREAM_RESTART, 0, 0) to VCapt EXE WC indicating a key frame request. If YUV/RGB capture mode is enabled, then every captured frame contains a RGB or YUV capture mode key frame, and a key frame request is unnecessary.

Else (stream is REMOTE) NETWSendCntl (WM_RESTART_STREAM) to have the network send a restart control message; Set the Key Frame Request timer.

One of the more important areas of the VPlay implementation is its "Palette Awareness" logic. In order that video displays retain proper colors in a palettized environment, VPlay must respond to a Microsoft® Windows palette change and get new palette messages. To accomplish this, VPlay "hooks" the window specified in the WM_VPLAY_CALL message parameter block, so that palette messages to the "hooked" window will be transmitted to a procedure within VPlay that properly handles the palette management.

Netw DLL

Network library (Netw DLL 1108) provides a library of network interfaces designed to hide the capture and playback applications from details of the underlying network service, including:

Management of network buffers.

Asynchronous interrupt-time callbacks when data is received or transmission is complete.

Video frame and control message transmission.

Compaction of video frame headers, from Microsoft® Video for Windows (VfW) defined headers to packed headers suitable for low-bandwidth networks (e.g., ISDN).

Transparent local loopback of video frames (supports single machine testing of video subsystem).

Netw DLL WE defines a 'SUPERVIDEOHDR' structure, which is an extension of the 'VIDEOHDR' structure defined by Microsoft® Video for Windows. The VIDEOHDR structure is used by VfW capture and playback applications on a single PC. The SUPERVIDEOHDR contains the VIDEOHDR structure, plus VM-specific control information, an area where VIDEOHDR data can be compacted for network transmission, and a contiguous frame data buffer. The contiguity of the SUPERVIDEOHDR structure allows the VfW structure to be used without modification by VCapt and VPlay (which are also VfW applications), while at the same time allowing a video frame to be transmitted on the network in a single operation.

The interfaces provided by the Netw DLL are as follows:

NETWCallbackIn—Callback used for VLinkIn streams; processes received data from the network.

NETWCallbackOut—Callback used for VLinkOut streams; processes send completions from the network.

NETWInit—Initializes network buffers.

NETWRegisterIn—Register a network input channel and post buffers for receiving data.

NETWRegisterOut—Register a network output channel.

NETWSendCntl—Send a control message.

NETWSendFrame—Send a video frame.

NETWPostFrame—Post a video frame buffer to the network interface.

NETWCleanup—Un-initialize NETW support; buffers, etc.

AVSync DLL

AVSync DLL WF provides a library of interfaces designed to support the capture and playback applications in the implementation of the audio-video synchronization technique, including:

Implementing audio system callbacks used to deliver timestamp values.

Implementing audio system latency settings.

Maintaining capture stream and playback stream timestamps.

Video frame comparison with video stream timestamp values.

The interfaces provided by the AVSync DLL are as follows:

AVInit—Initialization. Includes getting critical AV sync values from INI file.

AVRegisterMonitor—Register timestamp callback for a video stream.

AVUnRegisterMonitor—Unregister timestamp callback for a video stream.

AVSetALatency—Set a capture or playback audio latency value.

AVReSetALatency—Reset a capture or playback audio latency value.

AVFifoHighWaterMark—Return a configuration-defined value for the high water mark of a video frame FIFO. (Used in VPlay SyncFilter.)

AVFrameTimeStamp—Time stamp a video frame with an associated audio capture time stamp.

AVFrameSync—Determine if a video frame is "in-sync" as defined for "in-sync," "out-of-sync," and "way-out-of-sync" disclosed earlier in this specification.

Video Capture Driver

Video capture driver 522 of FIG. 5 follows driver specifications set forth in the Microsoft® Video for Windows (VfW) Developer Kit documentation. This documentation specifies a series of application program interfaces (APIs) to which the video capture driver responds. Microsoft® Video for Windows is a Microsoft extension to the Microsoft® Windows operating system. VfW provides a common framework to integrate audio and video into an application program. Video capture driver 522 extends the basic Microsoft® API definitions by providing six "custom" APIs that provide direct control of enhancements to the standard VfW specification to enable and control bit rate throttling and local video monitoring.

Bit rate throttling controls the bit rate of a transmitted video conference data stream. Bit rate throttling is based on two independent parameters: the quality of the captured video image and the image capture frame rate. A user of conferencing system 100 is able to vary the relative importance of these two parameters with a custom capture driver API. A high-quality image has more fine detail information than a low-quality image.

The data bandwidth capacity of the video conference communication channel is fixed. The amount of captured video data to be transmitted is variable, depending upon the amount of motion that is present in the video image. The capture driver is able to control the amount of data that is captured by changing the quality of the next captured video frame and by not capturing the next video frame ("dropping" the frame).

The image quality is determined on a frame-by-frame basis using the following equation:

$$\text{Quality} = \frac{(\text{TargetSize} - \text{ActualFrameSize})}{\text{ConstantScaleFactor}}$$

Quality is the relative image quality of the next captured frame. A lower Quality number represents a lower image quality (less image detail). TargetSize is the desired size of a captured and compressed frame. TargetSize is based on a fixed, desired capture frame rate.

Normally, the capture driver captures new video frames at a fixed, periodic rate which is set by the audio/video conference application program. The capture driver keeps a running total of the available communication channel bandwidth. When the capture driver is ready to capture the next video frame, it first checks the available channel bandwidth and if there is insufficient bandwidth (due to a large, previously captured frame), then the capture driver delays capturing the next video frame until sufficient bandwidth is available. Finally, the size of the captured video frame is subtracted from the available channel bandwidth total.

A user of conferencing system 100 may control the relationship between reduced image quality and dropped frames by setting the minimum image quality value. The minimum image quality value controls the range of permitted image qualities, from a wide range down to a narrow range of only the best image qualities.

Bit rate throttling is implemented inside of the video capture driver and is controlled by the following VfW extension APIs:

| | |
|---|---|
| CUSTOM_SET_DATA_RATE | Sets the data rate of the communications channel. |
| CUSTOM_SET_QUAL_PERCENT | Sets the minimum image quality value. |
| CUSTOM_SET_FPS | Sets the desired capture frame rate. |

The local video monitoring extension to VfW gives the video capture driver the ability to output simultaneously both a compressed and a non-compressed image data stream to the application, while remaining fully compatible with the Microsoft® VfW interface specification. Without local video monitoring, the audio/video conferencing application program would be required to decompress and display the image stream generated by the capture driver, which places an additional burden on the host processor and decreases the frame update rate of the displayed image.

The VfW interface specification requires that compressed image data be placed in an output buffer. When local video monitoring is active, an uncompressed copy of the same image frame is appended to the output buffer immediately following the compressed image data. The capture driver generates control information associated with the output buffer. This control information reflects only the compressed image block of the output buffer and does not indicate the presence of the uncompressed image block, making local video monitoring fully compatible with other VfW applications. A "reserved," 32-bit data word in the VfW control information block indicates to a local video monitor aware application that there is a valid uncompressed video image block in the output buffer. The application program may then read and directly display the uncompressed video image block from the output buffer.

The uncompressed image data may be in either Device Independent Bitmap (DIB) or YUV9 format. DIB format images may be displayed directly on the computer monitor. YUV9 format images may be increased in size while retaining image quality. YUV9 images are converted into DIB format before they are displayed on the computer monitor.

The capture driver allows the uncompressed video image to be captured either normally or mirrored (reversed left to right). In normal mode, the local video monitoring image appears as it is viewed by a video camera—printing appears correctly in the displayed image. In mirrored mode, the local video monitoring image appears as if it were being viewed in a mirror.

The CUSTOM_SET_DIB_CONTROL extension API controls the local video monitoring capabilities of the video capture driver.

Custom APIs for Video Capture Driver

The CUSTOM_SET_FPS message sets the frame rate for a video capture. This message can only be used while in streaming capture mode.

The CUSTOM_SET_KEY message informs the driver to produce one key frame as soon as possible. The capture driver will commonly produce one delta frame before the key. Once the key frame has been encoded, delta frames will follow normally.

The CUSTOM_SET_DATA_RATE message informs the driver to set an output data rate. This data rate value is in KBits per second and typically corresponds to the data rate of the communications channel over which the compressed video data will be transmitted.

The CUSTOM_SET_QUAL_PERCENT message controls the relationship between reducing the image quality and dropping video flames when the compressed video data stream size exceeds the data rate set by the CUSTOM_

SET_DATA_RATE message. For example, a CUSTOM_SET_QUAL_PERCENT value of 0 means that the driver should reduce the image quality as much as possible before dropping flames and a value of 100 means that video flames should be dropped before the image quality is lowered.

The CUSTOM_SET_DIB_CONTROL message controls the 8-bit DIB/YUV9 format image output when the IRV compression format has been selected. The IRV driver is able to simultaneously generate the IRV compressed data stream plus an uncompressed image in either DIB or YUV9 format. If enabled, the IRV driver can return the DIB image in either (80×60) or (160×120) pixel resolution. The (160×120) image is also available in YUV9 format. All images are available in either mirrored (reversed left to right) or a normal image. This API controls the following four parameters:

DIB enable/disable

Mirrored/normal image

The DIB image size

Image data format The default condition is for the uncompressed image to be disabled. Once set, these control flags remains in effect until changed by another CUSTOM_SET_DIB_CONTROL message. The uncompressed image data is appended to the video data buffer immediately following the compressed IRV image data. The uncompressed DIB or YUV9 data have the bottom scan-line data first and the top scan-line data last in the buffer.

The CUSTOM_SET_VIDEO message controls the video demodulator CONTRAST, BRIGHTNESS, HUE (TINT), and SATURATION parameters. These video parameters are also set by the capture driver at initialization and via the Video Control dialog box.

Video Microcode

The video microcode 530 of FIG. 5 running on video board 204 of FIG. 2 performs video compression. The preferred video compression technique is disclosed in later sections of this specification starting with the section entitled "Compressed Video Bitstream."

Audio Subsystem

The audio subsystem provides full duplex audio between two conferencing systems 100. The audio streams in both directions preferably run virtually error free, and do not break up due to activity on host processor 202. While the video subsystem is responsible for synchronizing video with audio, the audio subsystem provides an interface to retrieve synchronization information and for control over audio latency. The synchronization information and latency control is provided through an interface internal to the audio and video subsystems.

The audio subsystem provides an interface for control of the audio streams. Output volume, selection of an audio compression method, sample size, and sample rate are examples of audio attributes that may be selected or adjusted through the interface. In addition to controlling audio attributes, the audio subsystem provides an interface to send audio streams out to the network, receive and play audio streams from the network, and monitor the local audio stream.

When audio/comm board 206 is not being used for video conferencing, the Microsoft® Wave interface 514 provides access to the stereo audio codec (SAC). Wave driver 524 supports all of the predefined Microsoft® sample rates, full duplex audio, both eight and sixteen bit samples, and mono or stereo audio. Wave driver 524 provides the audio subsystem with a private interface that allows the Wave driver to be disabled.

In a preferred embodiment, the Microsoft® Wave interface performs record and playback of audio during a conferencing session. To achieve this, the audio subsystem and the Wave implementation cooperate during video conferencing so that the audio stream(s) can be split between the Wave interface and the source/sink of the audio subsystem.

Figure 13:
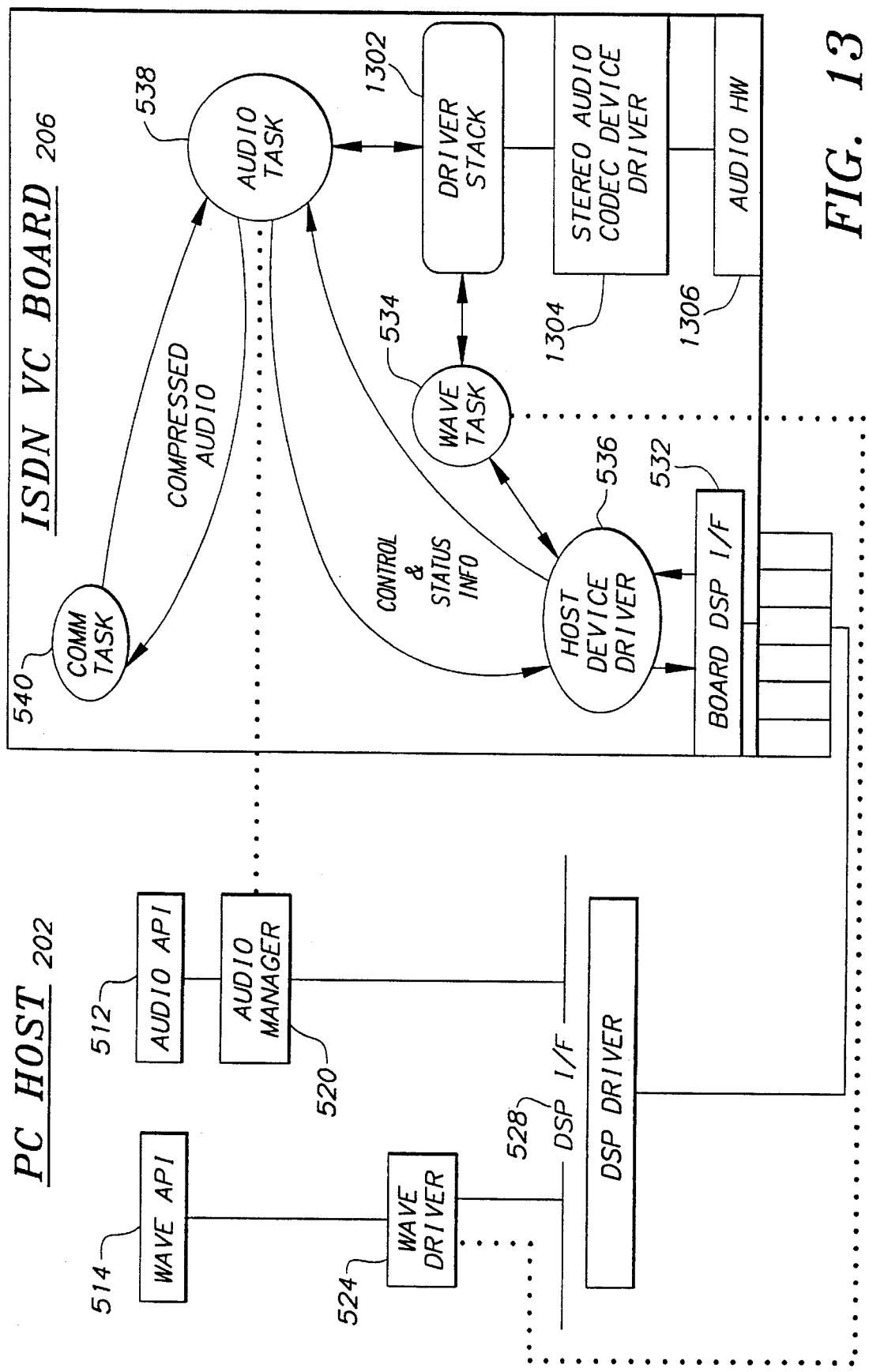
FIG. 13 is a representation of the audio FSM for the local audio stream and the remote audio stream of a conferencing system during a conferencing session.

Referring now to FIG. 13, there is shown a block diagram of the architecture of the audio subsystem, according to a preferred embodiment of the present invention. The audio subsystem is structured as a "DSP application." Conforming with the DSP architecture forces the audio subsystem's implementation to be split between host processor 202 and audio/comm board 206. Conceptually, audio tasks on the audio/comm board communicate directly with a counterpart on the host processor. For example, Wave driver 524 (on the host processor) communicates directly with Wave task 534 (on the audio/comm board). In FIG. 13, these communications are represented by broken lines representing virtual connections.

The bulk of the audio subsystem is implemented on the audio/comm board as a Spectron SPOX® DSP operating system task. The portion of the audio subsystem on the host processor provides an interface to control the SPOX® operating system audio task. The programming interface to the audio subsystem is implemented as a DLL on top of DSP interface 528. The DLL will translate all function calls into DSP messages and respond to messages passed from audio task 538 to the host processor.

The audio task 538 (running on the audio/comm board) responds to control information and requests for status from audio manager 520 (running on the host processor). The audio task is also responsible for hardware monitoring of the audio input source on the audio output sink. A majority of the audio task's execution time is spent fulfilling its third and primary responsibility: full duplex audio communication between two conferencing systems.

The conferencing application's interface to the audio subsystem is implemented on the host processor, and the audio processing and control is implemented on the audio/comm board as a SPOX® operating system task. These two software components interface with each other through messages passed through the DSP interface 528 of FIG. 5.

Referring again to FIG. 1, in order for the audio subsystem to achieve full duplex communication between two conferencing systems, there is a network connection (i.e., ISDN line 110) between two conferencing systems. Both conferencing systems run the same software. This allows the audio task on one conferencing system to communicate with another instantiation of itself on the other conferencing system. The ISDN connection is full duplex. There are two B-Channels in each direction. Logical audio channels flowing through the ISDN connection are provided by the network tasks and have no physical representation. The audio task on each of the conferencing systems is responsible for playing back the compressed audio generated on the remote system, and for transferring the compressed audio generated locally to the remote system.

Referring now to FIGS. 1 and 13, audio samples generated on conferencing system A are first sampled by microphone 104, digitized by the stereo audio codec (SAC), filtered and compressed by the stack of device drivers 1304, and delivered to the audio task 538. The audio task packetizes the compressed audio (by time stamping the audio information), and then sends the audio to comm task 540 for delivery to the remote system. The audio samples consumed (i.e., played back) by conferencing system A are delivered by the comm task after conferencing system B has gone through the same process as conferencing system A to generate and send a packet. Once conferencing system A has the audio packet generated by conferencing system B, the comm task records the time stamp, and sends the packet down the device stack 1302 to be decompressed and sent to the codec (i.e., audio hardware 1306). As the remote audio samples are being transferred to the codec, the codec may mix them with local audio samples (depending on whether the local system is in the monitor state or not), and finally sends the samples to the attached speaker 108.

Audio API

Referring again to FIG. 5, the audio API 512 for the audio subsystem is an internal programming interface used by other software components of the conferencing system, specifically video manager 516 and the conferencing API 506. The audio API is a library that is linked in with the calling application. The audio API translates the procedural interface into DriverProc messages. See Microsoft® Device Driver Development Kit (DDK) and Software Development Kit (SDK) for the definitions of the DriverProc entry point and installable device drivers. The audio API layer also keeps the state machine for the audio subsystem. This allows the state machine to be implemented only once for every implementation of the audio subsystem.

Audio API 512 of FIG. 5 provides an interface between audio/video conferencing application 502 and the audio subsystem. Audio API 512 provides the following services:

| | |
|---|---|
| Capture Service | Captures a single audio stream continuously from a local audio hardware source, for example, a microphone, and directs the audio stream to a audio software output sink (i.e., a network destination). |
| Monitor Service | Monitors the audio stream being captured from the local audio hardware by playing the audio stream locally.<br>Note: This function intercepts and displays a audio stream at the hardware board when the stream is first captured. This operation is similar to a "Short circuit" or a UNIX tee and is different from the "play" function. The play function gets and displays the audio stream at the host. |
| Play Service | Plays an audio stream continuously by consuming the audio data from an audio software source (i.e., a network source). |
| Link-In Service | Links an audio network source to be the input of an audio stream played locally. This service allows applications to change dynamically the software input source of an audio stream. |
| Link-Out Service | Links a network source to be the output of an audio stream captured locally. This service allows applications to change dynamically the software output source of an audio stream. |
| Control Service | Controls the audio stream "on the fly," including adjusting gain, volume, and latency. |
| Information Service | Returns requested information regarding the specified video stream. |
| Initialization/ Configuration | Initialize at OPEN time. |

Audio API 512 supports the following function calls by audio/video conferencing application 502 to the audio subsystem:

| | |
|---|---|
| AGetNumDevs | Retrieves the number of different audio managers installed on the system. |
| AGetDevCaps | Fills the ADevCaps structure with information regarding the specified audio manager. |
| AOpen | Opens an audio stream with specified attributes by allocating all necessary system resources (e.g., internal data structures) for it. |
| ACapture | Starts/stops capturing an audio stream from a local audio hardware source, such as a microphone. |
| AMonitor | Starts/stops monitoring an audio stream captured from a local microphone. |
| APlay | Starts/stops playing an audio stream by consuming the audio data from an audio network source. |
| ALinkIn | Links/unlinks a network input channel or an input file to/from the specified audio stream that will be played or is being played locally. |
| ALinkOut | Links/unlinks a network output channel to/from the specified audio stream that will be captured or is being captured from the local microphone. |
| ACntl | Controls an audio stream by adjusting its parameters (e.g., gain, volume). |
| AGetInfo | Returns the status (AINFO and state) of an audio stream. |
| AClose | Closes an audio stream and releases all system resources allocated for this stream. |
| ARegisterMonitor | Registers an audio stream monitor. |
| APacketNumber | Returns the packet number of the current audio packet being played back or recorded. |

These functions are defined in further detail later in this specification in a section entitled "Data Structures, Functions, and Messages."

Figure 14:
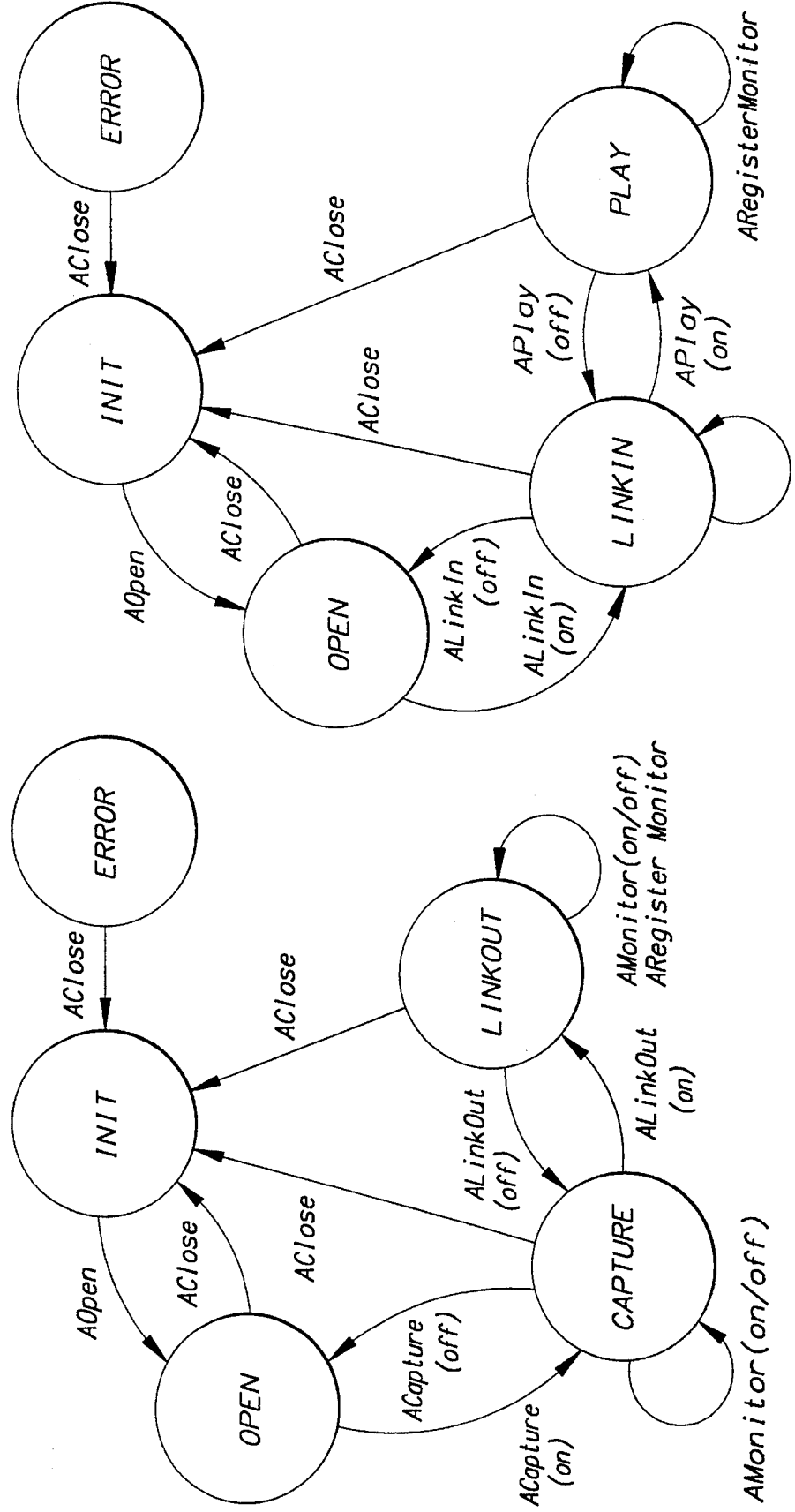
FIG. 14 is a block diagram of the architecture of the audio subsystem of the conferencing system of FIG. 5.

Referring now to FIG. 14, there is shown a representation of the audio FSM for the local audio stream and the remote audio stream of a conferencing system during a conferencing session, according to a preferred embodiment of the present invention. The possible audio states are as follows:

| | |
|---|---|
| AST_INIT | Initial state - state of local and remote audio streams after the application calls the CF_Init function. |
| AST_OPEN | Open state - state of the local/remote audio stream after system resources have been allocated. |
| AST_CAPTURE | Capture state - state of local audio stream being captured. |
| AST_LINKOUT | Link-out state - state of local audio stream being linked/unlinked to audio output (e.g., network output channel or output file). |
| AST_LINKIN | Link-in state - state of remote audio stream being linked/unlinked to audio input (e.g., network input channel or input file). |
| AST_PLAY | Play state - state of remote audio stream being played. |
| AST_ERROR | Error state - state of local/remote audio stream after a system resource failure occurs. |

In a typical conferencing session between a caller and a callee, both the local and remote audio streams begin in the AST_INIT audio state of FIG. 14. The application calls the AOpen function to open the local audio stream, taking the local audio stream from the AST_INIT audio state to the AST_OPEN audio state. The application then calls the ACapture function to begin capturing the local audio stream, taking the local audio stream from the AST_OPEN audio state to the AST_CAPTURE audio state. The application then calls the ALinkOut function to link the local audio stream to the audio output channel, taking the local audio stream from the AST_CAPTURE audio state to the AST_LINKOUT audio state.

The application calls the AOpen function to open the remote audio stream, taking the remote audio stream from the AST_INIT audio state to the AST_OPEN audio state. The application then calls the ALinkIn function to link the remote audio stream to the audio input channel, taking the remote audio stream from the AST_OPEN audio state to the AST_LINKIN audio state. The application then calls the APlay function to begin playing the remote audio stream, taking the remote audio stream from the AST_LINKIN audio state to the AST_PLAY audio state. The conferencing session proceeds without changing the audio states of either the local or remote audio stream.

When the conferencing session is to be terminated, the application calls the AClose function to close the remote audio channel, taking the remote audio stream from the AST_PLAY audio state to the AST_INIT audio State. The application also calls the AClose function to close the local audio channel, taking the local audio stream from the AST_LINKOUT audio state to the AST_INIT audio state.

This described scenario is just one possible audio scenario. Those skilled in the art will understand that other scenarios may be constructed using the following additional functions and state transitions:

The application calls the ALinkOut function to unlink the local audio stream from the audio output channel, taking the local audio stream from the AST_LINKOUT audio state to the AST_CAPTURE audio state.

The application calls the ACapture function to stop capturing the local audio stream, taking the local audio stream from the AST_CAPTURE audio state to the AST_OPEN audio state.

The application calls the AClose function to close the local audio stream, taking the local audio stream from the AST_OPEN audio state to the AST_INIT audio state.

The application calls the AClose function to close the local audio stream, taking the local audio stream from the AST_CAPTURE audio state to the AST_INIT audio state.

The application calls the AClose function to recover from a system resource failure, taking the local audio stream from the AST_ERROR audio state to the AST_INIT audio state.

The application calls the APlay function to stop playing the remote audio stream, taking the remote audio stream from the AST_PLAY audio state to the AST_LINKIN audio state.

The application calls the ALinkIn function to unlink the remote audio stream from the audio input channel, taking the remote audio stream from the AST_LINKIN audio state to the AST_OPEN audio state.

The application calls the AClose function to close the remote audio stream, taking the remote audio stream from the AST_OPEN audio state to the AST_INIT audio state.

The application calls the AClose function to close the remote audio stream, taking the remote audio stream from the AST_LINKIN audio state to the AST_INIT audio state.

The application calls the AClose function to recover from a system resource failure, taking the remote audio stream from the AST_ERROR audio state to the AST_INIT audio state.

The AGetDevCaps and AGetNumDevs functions may be called by the application from any audio state of either the local or remote audio stream. The AGetInfo, ACntl, and APacketNumber functions may be called by the application from any audio state of either the local or remote audio stream, except for the AST_INIT state. The AMonitor function may be called by the application for the local audio stream from either the AST_CAPTURE or AST_LINKOUT audio states. The ARegisterMonitor function may be called by the application for the local audio stream from the AST_LINKOUT audio state or for the remote audio stream from either the AST_LINKIN or AST_PLAY audio states. All of the functions described in this paragraph leave the audio state unchanged.

Audio Manager

The function of audio manager 520 of FIGS. 5 and 13, a Microsoft® Windows installable device driver, is to interface with the audio task 538 running on the audio/comm board 206 through the DSP interface 532. By using the installable device driver model, many different implementations of the audio manager may co-exist on the same machine. Audio manager 520 has two logical parts:

A device driver interface (DDI) that comprises the messages the device driver expects, and An interface with DSP interface 528.

Audio Manager Device Driver Interface

The device driver interface specifies the entry points and messages that the audio manager's installable device driver supports. The entry points are the same for all installable device drivers (i.e., Microsoft® WEP, LIBENTRY, and DriverProc). All messages are passed through the DriverProc entry point. Messages concerning loading, unloading, initializing, opening, closing, and configuring the device driver are predefined by Microsoft®. Those messages specific to the audio manager are defined in relation to the constant MSG_AUDIO_MANAGER (these message will range from DRV_RESERVED to DRV_USER as defined in Microsoft® WINDOWS.H). All messages that apply to an audio stream are serialized (i.e., the application does not have more than one message per audio stream pending).

The installable device driver implementing the audio manager responds to the open protocol messages defined by Microsoft®. The expected messages (generated by a Microsoft® OpenDriver SDK call to installable device drivers) and the drivers response are as follows:

| | |
|---|---|
| DRV_LOAD | Reads any configuration parameters associated with the driver. Allocates any memory required for execution. This call is only made the first time the driver is opened. |
| DRV_ENABLE | Set up the Wave driver to work with the audio manager. Ensures that an audio/comm board is installed and functional. For audio/comm board 206 of FIG. 2, this means the DSP interface 532 is accessible. This call is only made the first time the driver is opened. |
| DRV_OPEN | Allocates the per application data. This includes information such as the callback and the application instance data. If this is an input or output call, starts the DSP audio task and sets up communication between host processor and the DSP audio task (e.g., sets up mail boxes, registers callbacks). The audio manager may be opened once |

-continued for input, once for output (i.e., it supports one full duplex
conversation), and any number of times for device capabilities query.
This call is made each time OpenDriver is called.

These three messages are generated in response to a single application call (OpenDriver). The OpenDriver call is passed a pointer to the following structure in the lParam2 of the parameter of the call:

```
typedef struct OpenAudioManagerStruct {
    BOOL      GetDevCaps;
    LPACAPS   lpACps;
    DWORD     SynchronousError;
    LPAINFO   AInfo;
    DWORD     dwCallback;
    DWORD     dwCallbackInstance;
    DWORD     dwFlags;
    DWORD     wField;
} OpenAudioManager, FAR * lpOpenAudioManager;
```

All three messages receive this parameter in their lParam2 parameter. If the open is being made for either capture or playback, the caller is notified in response to an asynchronous event (i.e., DSP_OPEN generated by dspOpenTask). If the open is being done in order to query the devices capabilities (indicated by the field OpenAudioManager with GetDevCaps being set to TRUE), the open is synchronous and only fails if the board cannot be accessed.

The DRV_OPEN handler always checks for error conditions, begins execution of the audio thread, and allocates per audio stream state information. Once the open command sets state indicating that a DRV_OPEN is pending, it will initiate execution of the audio thread via the DSP interface.

dspOpenTask posts a callback when the audio thread has successfully begun. This callback is ignored unless it indicates an error. The task will call back to the audio driver once it has allocated all the necessary resources on the board. The callback from the DSP interface sets the internal state of the device driver to indicate that the thread is running. Once the task has responded, a DRV_OPEN message call back (i.e., post message) back to the caller of the open command with the following values:

Param1 equals A_OK, and

Param2 contains the error message returned by the board.

The installable device driver will respond to the close protocol messages defined by Microsoft®. The expected messages (generated by the Microsoft® SDK CloseDriver call to installable device drivers) and the drivers response are as follows:

| | |
|---|---|
| DRV_CLOSE | Frees the per application data allocated in DRV_OPEN message. |
| DRV_DISABLE | Shuts down the DSP audio task. Enables the Wave driver and Wave task. Frees all memory allocated during DRV_LOAD. |
| DRV_FREE | Ignored. |

This call sequence is symmetric with respect to the call sequence generated by OpenDriver. It has the same characteristics and behavior as the open sequence does. Namely, it receives one to three messages from the CloseDriver call dependent on the driver's state and it generates one callback per CloseDriver call. Three messages are received when the driver's final instance is being closed. Only the DRV_CLOSE message is generated for other CloseDriver calls.

DRV_CLOSE message closes the audio thread that corresponds to the audio stream indicated by HASTRM. The response to the close message is in response to a message sent back from the board indicating that the driver has closed. Therefore, this call is asynchronous. There is a race condition on close. The audio task could close down after the close from the DRV has completed. If this is the case, the DRIVER could be unloaded before the callback occurs. If this happens, the callback will call into nonexistent code. The full driver close sequence is preferably generated on the last close as indicated by the SDK. See Microsoft® Programmers Reference, Volume 1: Overview, pages 445–446).

The installable device driver implementing the host portion of the audio subsystem recognizes specific messages from the audio API layer. Messages are passed to the driver through the SendDriverMessage and are received by DrvProc. The messages and their expected parameters are:

| Message | lParam1 | lParam2 |
|---|---|---|
| AM_CAPTURE | BOOL | LPDWORD |
| AM_MUTE | BOOL | LPDWORD |
| AM_PLAY | BOOL | LPDWORD |
| AM_LINKIN | FAR * ALinkStruct | LPDWORD |
| AM_LINKOUT | FAR * ALinkStruct | LPDWORD |
| AM_CTRL | FAR * ControlStruct | LPDWORD |
| AM_REGISTERMON | LPRegisterInfo | LPDWORD |
| AM_PACKETNUMBER | NULL | NULL |

AM_CAPTURE Message

The AM_CAPTURE message is sent to the driver whenever the audio manager function ACapture is called. This message uses Param1 to pass a boolean value and Param2 is used for a long pointer to a DWORD where synchronous errors can be returned. The stream handle will be checked to ensure that it is a capture stream, and that there is not a message pending. The state is not checked because the interface module should keep the state. If an error state is detected, the appropriate error message will be returned. The BOOL passed in Param2 indicates whether to start or stop capturing. A value of TRUE indicates capturing should start, a value of FALSE that capturing should be stopped. ACAPTURE_TMSG is sent to the audio task running on the audio/comm board and the message pending flag is set for that stream. When the audio task receives the message via the DSP interface, it will change its state and call back to the driver. When the driver receives this callback, it will call back/post message to the appropriate entity on the host processor, and cancel the message pending flag. This call is a toggle, no state is kept by the driver, and it will call the DSP interface regardless of the value of the BOOL.

AM_MUTE Message

The AM_MUTE message is sent to the driver whenever the audio manager function AMute is called. This message uses Param1 to pass a boolean value and Param2 a long pointer to a DWORD for a synchronous error value. The stream handle is checked to ensure that it is a capture stream, and that no messages are pending. If an error state is detected, the appropriate error message is returned. The BOOL passed in Param1 indicates whether to start or stop muting. A value of TRUE indicates muting should start, a value of FALSE that muting should be turned off. The driver posts the message AMUTE_TMSG to the audio task through the DSP interface, and sets the message pending flag. When the driver receives this callback, it will call back/post message to the appropriate entity on the host processor, and then cancel the message pending flag.

AM_PLAY Message

The AM_PLAY message is sent to the driver whenever the audio manager function APlay is called. This message uses Param1 to pass an audio manager stream handle (HASTRM) and Param2 to pass a boolean value. The APlay message handler checks the stream handle to ensure that it is a playback stream, and verifies that there is not a message pending against this stream. If an error is detected, a call back/post message is made immediately. The BOOL passed in Param1 indicates whether to start or stop playing the remote stream. A value of TRUE indicates that playback should start, a value of FALSE that playback should stop. The APLAY_TMSG is posted to the audio task through the DSP interface and the message pending flag is set for this stream. When the callback is processed, the caller is notified (via callback/post message), and finally the message pending flag for this stream is canceled.

AM_LINKIN Message

The AM_LINKIN message is sent to the driver whenever the audio manager function ALinkIn is called. Param1 passes the Audio Manager stream handle (HASTRM). 1Param2 contains a pointer to the following structure:

```
typedef struct _ALinkStruct {
    BOOL        ToLink;
    CHANID      ChanId;
} ALinkStruct, FAR * lpALinkStruct;
```

ToLink contains a BOOL value that indicates whether the stream is being linked in or unlinked (TRUE is linked in and FALSE is unlinked). If no error is detected and ToLink is TRUE, the channel and the playback stream should be linked together. This is done by sending the Audio Task the ALINKIN_TMSG message with the channel ID as a parameter. This causes the Audio Task to link up with the specified comm channel and begin playing incoming audio. Channel ID is sent as a parameter to ALINKIN_TMSG implying that the channel ID is valid in the board environment as well as the host processor. In response to this message, the audio manager registers with the comm task as the owner of the stream.

Breaking the link between the audio stream handle and the channel ID is done when the ToLink field is set to FALSE. The audio manager sends the ALINKIN_TMSG to the task along with the channel ID. Since the link is made, the audio task responds to this message by unlinking the specified channel ID (i.e., it does not play any more audio).

Errors that the host task will detect are as follows:

The channel ID does not represents a valid read stream.

The audio stream handle is already linked or unlinked (detected on host processor).

The audio stream handle is not a playback handle.

If those or any interface errors (e.g., message pending) are detected, the callback associated with this stream is notified immediately. If no errors are detected, the ALINKIN_ TMSGS is issued to the DSP interface and the message pending flag is set for this stream. Upon receiving the callback for this message, the callback associated with this stream is made, and finally the message pending flag is unset.

AM_LINKOUT Message

The AM_LINKOUT message is sent to the driver whenever the audio manager function ALinkOut is called. Param1 passes the audio manager stream handle (HASTRM). 1Param2 contains a pointer to the following structure:

```
typedef struct _ALinkStruct {
    BOOL        ToLink;
    CHANID      ChanId;
} ALinkStruct, FAR * lpALinkStruct;
```

ToLink contains a BOOL value that indicates whether the stream is being linked out or unlinked (TRUE is linked out and FALSE is unlinked). If no error is detected and ToLink is TRUE, the channel and the audio in stream should be linked together. This is done by sending the Audio Task the ALINKOUT_TMSG message with the channel ID as a parameter. The Audio Task responds to this by sending audio over the logical channel through the comm task. Channel ID is sent as a parameter to ALINKOUT_TMSG implying that the channel ID is valid in the board environment as well as on the host processor.

Breaking the link between the audio stream handle and the channel ID is done when ToLink field is set to FALSE. The audio manager sends the ALINKOUT_TMSG to the task along with the channel ID. Since the link is made, the Audio Task responds to this message by unlinking the specified channel ID (i.e., it does not send any more audio).

Errors that the host task detects are as follows:

The channel ID does not represents a valid write stream.

The audio stream handle is already linked or unlinked (detected on the host processor).

The audio stream handle is not an audio handle.

If those or any interface errors (e.g., message pending) are detected, the callback associated with this stream is notified immediately. If no errors are detected, the ALINKOUT_ TMSG is issued to the DSP interface and the message pending flag is set for this stream. Upon receiving the callback for this message, the callback associated with this stream is made, and finally the message pending flag is unset.

AM_CRTL Message

The AM_CRTL message is sent to the driver whenever the audio manager function ACtrl is called. Param1 contains the HASTRM (the audio stream handle) and Param2 contains a long pointer to the following structure:

```
typedef struct _ControlStruct {
    LPAINFO     lpAinfo;
    DWORD       flags;
} ControlStruct, FAR * lpControlStruct;
```

The flags field is used to indicate which fields of the AINFO structure pointed to by lpAinfo are to be considered. The audio manager tracks the state of the audio task and only adjust it if the flags and AINFO structure actually indicate change.

Error checking will be for:

Valid audio stream state.

Values and fields adjusted are legal.

Pending calls on the current stream.

If there are any errors to be reported, the audio manager immediately issues a callback to the registered callback indicating the error.

If there are no errors, the audio manager makes the audio stream state as pending, saves a copy of the structure and the adjustment to be made, and begins making the adjustments one by one. The adjustments are made by sending the audio task the ACNTL_TMSG message with three arguments in the dwArgs array. The arguments identify the audio stream, the audio attribute to change, and the new value of the audio attribute. Each time the audio task processes one of these messages, it generates a callback to the audio manager. In the callback, the audio manager updates the stream's attributes, removes that flag from the flags field of the structure (remember this is an internal copy), and sends another ACNTL_TMSG for the next flag. Upon receiving the callback for the last flag, the audio manager calls back the registered callback for this stream, and unsets the pending flag for this stream.

AM_REGISTERMON Message

The AM_REGISTERMON message is sent to the driver whenever the audio manager function ARegisterMonitor is called. Param2 contains a LPDWORD for synchronous error messages and Param1 contains a long pointer to the following structure:

```
typedef struct _RegisterMonitor {
    DWORD      dwCallback;
    DWORD      dwCallbackInstance;
    DWORD      dwflags;
    DWORD      dwRequestFrequency;
    LPDWORD    lpdwSetFrequency
} RegisterMonitor, FAR * LPRegisterMonitor;
```

The audio manager calls this routine back with information about the status of the audio packet being recorded/played back by the audio task. There may only be one callback associated with a stream at a time. If there is already a monitor associated with the stream when this call is made, it is replaced.

Errors detected by the audio manager are:

Call pending against this audio stream.

Bad stream handle.

These errors are reported to the callback via the functions return values (i.e., they are reported synchronously).

If the registration is successful, the audio manager sends the audio task a AREGISTERMON_TMSG via the DSP Interface. The first DWORD of dwArgs array contains the audio stream ID, and the second specifies the callback frequency. In response to the AREGISTERMON_TMSG, the audio task calls back with the current audio packet number. The audio task then generates a callback for every N packets of audio to the audio manager. The audio manager callback generates a callback to the monitor function with AM_PACKET_NUMBER as the message, A_OK as PARAM1, and the packet number as PARAM2. When the audio stream being monitored is closed, the audio manager calls back the monitor with A_STREAM_CLOSED as PARAM1.

AM_PACKETNUMBER Message

The AM_PACKETNUMBER message is sent to the driver whenever the audio manager function APacketNumber is called. Param1 and Param2 are NULL. If a monitor is registered for this stream handle, the audio task is sent a APACKETNUMBER_TMSG message. In response to this message, the audio task calls back the audio manager with the current packet number. The audio manager in turn calls back the registered monitor with the current packet number.

This is one of the few calls/messages that generates both synchronous and asynchronous error messages. The messages have been kept asynchronous whenever possible to be consistent with the programming model. Synchronous errors that are detected are:

The stream has no monitor registered.

Bad HASTRM handle.

If there is no monitor registered (i.e., no callback function to call) or if the HASTRM handle is invalid (again no callback to call), the error is given synchronously (i.e., as a return value to the function). Asynchronous errors are as follows:

There is a call pending on this audio stream.

The stream is in an invalid state (i.e., not AST_LINK-OUT or AST_PLAY).

The asynchronous errors are given to the monitor function, not the callback registered with the audio stream on open.

Audio Manager Interface with the DSP Interface

This section defines the messages that flow between the audio task 538 on the audio/comm board 206 and the installable device driver on the host processor 202. Messages to the audio task are sent using dspPostMessage. The messages that return information from the audio task to the host driver are delivered as callback messages.

Host Processor to Audio/Comm Board Messages

All messages from the host processor to the audio/comm board are passed in a DSPMSG structure as the dwMsg field. Additional parameters (if used) are specified in the dwArgs DWORD array, and are called out and defined in each of the following messages:

| | |
|---|---|
| ACAPTURE_TMSG: | Causes the audio task to start or stop the flow of data from the audio source. This message is a toggle (i.e., if the audio is flowing, it is stopped; if it is not, it is started). |
| AMUTE_TMSG: | Toggles the codec into or takes it out of muting mode. |
| APLAY_TMSG: | Toggles playback of audio from a network source. |
| ALINKIN_TMSG: | Connects/disconnects the audio task with a virtural circuit supported by the network task. The virtual circuit ID is passed to the audio task in the first DWORD of the dwArgs array. The virtual circuit (or channel ID) is valid in both the host processor and the audio/comm board environment. |
| ALINKOUT_TMSG: | Connects the audio task with a virtual circuit supported by the network task. The virtual circuit ID is passed to the audio task in the first DWORD of the dwArgs array. |
| AREGISTERMON_TMSG: | Registers a monitor on the specified stream. The stream ID is passed to the audio task in the first DWORD of the dwArgs array, the second contains the notification frequency. |
| APACKETNUMBER_TMSG: | Issues a callback to the Audio Manager defining the current packet number ofr this stream. The stream ID is |

| | |
|---|---|
| | passed to the audio task in the first DWORD of the dwArgs array. |
| ACNTL_TMSG: | Sets the value of the specified attribute on the audio device. Three elements of the dwArgs array are used. The first parameter is the stream ID, the second indicates the audio attribute to be adjusted, and the third is the value of the audio attribute. |

Audio/Comm Board to Host Processor Messages

All messages from the audio/comm board to the host processor are passed back through the registered callback function. The message from the DSP task to the host driver are received in the dwParam1 parameter of the registered callback function.

Each message sent to the audio task (running on the audio/comm board) from the host processor is returned by the audio/comm board through the callback function. Each time a message is sent to the audio/comm board, a DSPMSG is generated from the audio/comm board to respond. The message is the same message that was sent to the board. The parameter is in DSPMSG.dwArgs[STATUS_INDEX]. This parameter is either ABOARD_SUCCESS or an error code. Error codes for each of the messages from the board were defined in the previous section of in this specification.

Messages that cause response to host processor action other than just sending messages (e.g., starting the audio task through the DSP interface) are as follows:

2. The audio task connects to the audio hardware on the audio/comm board via a stream of stackable drivers terminated by the SAC device driver. This connection is bi-directional. Stackable drivers on the stream running from the SAC driver to the audio task include the compression driver and automatic gain control driver.

3. The audio task connects with comm task 540 (the board-resident portion of the comm subsystem) via a mailbox interface exchanging control messages and a streams interface for exchanging data. The streams interface involves the use of pipe drivers. Ultimately, the interface allows the audio task to exchange compressed data packets of audio samples across ISDN lines with a peer audio task running on an audio/comm board located at the remote end of a video conference.

The audio task is composed of two SPOX® operating system tasks referred to as threads for the purposes of this specification. One thread handles the capture side of the audio subsystem, while the other supports the playback side.

| | |
|---|---|
| AOPEN_TMSG | Message returned in response to the device opening properly (i.e., called in response to dspOpenTask). |
| ASETUP_TMSG | Once the installable driver receives the AOPEN_TMSG from the board, it sends a data stream buffer to the task containing additional initialization information (e.g., compression and SAC stream stack and initial attributes). Once the task has processed this information, it sends an ASETUP_TMSG message to the host. |
| ACHANNEL_HANGUP_TMSG | This message is delivered to the host when the Communication subsystem notifies the task that the channel upon which it was transmitting/receiving audio samples went away. |

Wave Audio Implementation

The DSP Wave driver design follows the same architecture as the audio subsystem (i.e., split between the host processor and the audio/comm board). For full details on the Microsoft® Wave interface, see the Microsoft® Multimedia Programmer's Reference. Some of the control functions provided by the audio manager are duplicated in the Wave/Media Control Interface. Others, such as input gain or input and output device selection, are controlled exclusively by the Media control interface.

Audio Subsystem Audio/Comm Board-Resident Implementation

The audio task 538 of FIGS. 5 and 13 is actually a pair of SPOX® operating system tasks that execute on the audio/comm board 206 and together implement capture and playback service requests issued by the host processor side of the audio subsystem. Referring again to FIG. 13, the audio task connects to three other subsystems running under SPOX® operating system:

1. The audio task connects to and exchanges messages with the host processor side of the audio subsystem via the host device driver 536 (DSH_HOST). TMB_getMessage and TMB_postMessage calls are used to receive messages from and route messages to the audio manager 520 through the host device driver 536.

Each thread is created by the host processor side of the audio subsystem in response to an OpenDriver call issued by the application. The threads exchange compressed audio buffers with the comm task via a streams interface that involves bouncing buffers off a pipe driver. Control messages are exchanged between these threads and the comm task using the mailbox interface which is already in place for transferring messages between DSP tasks and the host device driver 536.

The playback thread blocks waiting for audio buffers from the comm task. The capture thread blocks waiting for audio buffers from the SAC. While active, each thread checks its dedicated control channel mailbox for commands received from the host processor as well as unsolicited messages sent by the comm task. A control channel is defined as the pair of mailboxes used to communicate between a SPOX® operating system task and its DSP counterpart running on the host processor.

Audio Task Interface with Host Device Driver

The host processor creates SPOX® operating system tasks for audio capture and playback. Among the input parameters made available to these threads at entry is the name each thread will use to create a stream of stackable drivers culminating in the SAC device driver. Once the tasks are created, they send an AOPEN_TMSG message to the host processor. This prompts the host processor to deliver a buffer of additional information to the task. One of the fields in the sent structure is a pathname such as:

"/tsp/gsm:0/mxr0/esp/Vcadc8K"

The task uses this pathname and other sent parameters to complete its initialization. When finished, it sends an ASETUP_TMSG message to the host signaling its readiness to receive additional instructions.

In most cases, the threads do not block while getting messages from TMB_MYMBOX or posting messages to TMB_HOSTMBOX. In other words, TMB_getMessage and TMB_putMessage are called with timeout=0. Therefore, these mailboxes are preferably of sufficient depth such that messages sent to the Host by the threads are not dropped. The dspOpenTask lpdspTaskAttrs "nMailboxDepth" parameter are preferably set higher than the default value of 4. The audio task / host interface does not support a data channel. Thus, the "nToDsp" and "nFromDsp" fields of dspOpenTask lpdspTaskAttrs are preferably set to 0.

Audio Task Interface with Audio Hardware

Figure 15:
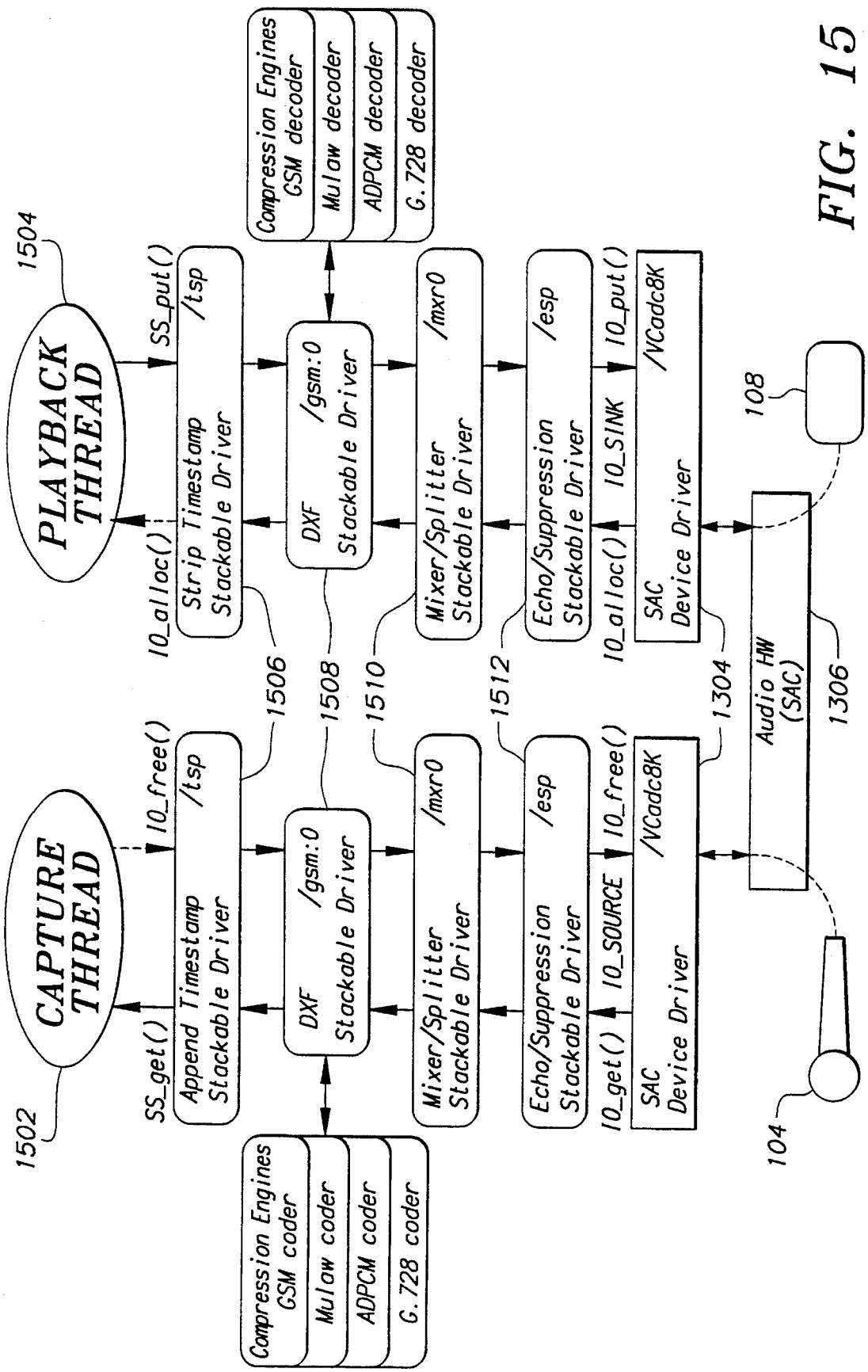
FIG. 15 is a block diagram of the interface between the audio task of FIG. 5 and the audio hardware of audio/comm board of FIG. 2.

Referring now to FIG. 15, there is shown a block diagram of interface between the audio task 538 and the audio hardware of audio/comm board 206 of FIG. 13, according to a preferred embodiment of the present invention. FIG. 15 illustrates how input and output streams to the audio hardware might look after successful initialization of the capture and playback threads, respectively.

On the capture side, audio data is copied into streams by the SAC device driver 1304 (the SAC). The buffer comes from a pool allocated to this IO_SOURCE driver via IO_free() calls. The data works its way up to the capture thread 1502 when the latter task issues an SS_get() call. The data is transformed each time it passes through a stackable driver. The mixer/splitter driver 1510 may amplify the audio signals or it may split the audio stream sending the second half up to the host to allow for the recording of a video conference. The data is then compressed by the compression driver 1508. Finally, timestamp driver 1506 appends a timestamp to the buffer before the capture thread receives it completing the SS_get(). The capture thread 1502 either queues the buffer internally or calls IO_free() (depending on whether the capture thread is trying to establish some kind of latency or is active but unlinked), or the capture thread sends the buffer to the comm task via the pipe driver interface.

On the playback side, audio data is received in streams buffers piped to the playback thread 1504 from the comm task. The playback thread internally queues the buffer or frees the buffer by passing the buffer back to the pipe driver; or the playback thread calls SS_put() to send the buffer down the playback stream ultimately to the SAC 1304 where the samples are played. First, the timestamp is stripped off the buffer by timestamp driver 1506. Next, the buffer is decompressed by decompression driver 1508. Prior to it being played, the audio data undergoes one or more transformations mixing in other sound or amplifying the sound (mixer/splitter driver 1510), and reducing or eliminating echoes (echo/suppression driver 1512). Once the data has been output to the sound hardware, the containing buffer is ready to be freed back up the stream satisfying an IO_alloc() issued from the layers above.

Timestamp Driver

The video manager synchronizes with the audio stream. Therefore, all the audio task needs to do is timestamp its stream and provide an interface allowing visibility by the video manager into this timestamping. The interface for this is through the host processor requests AREGISTERMON_TMSG and APACKETNUMBER_TMSG. The timestamp is a 32-bit quantity that is initialized to 1, incremented for each block passed to the audio task from the IO_SOURCE stack and added to the block. The timestamp is stripped from the block once received by the audio task executing on the remote node.

The appending and stripping of the timestamp is done by the timestamp driver 1506 of FIG. 15. Performing the stamping within a separate driver simplifies the audio task threads by removing the responsibility of setting up and maintaining this header. However, in order to implement the APACKETNUMBER_TMSG host command, the threads are able to access and interpret this header in order to determine the packet number.

On the capture side of the audio task, the capture thread will have allocated stream buffers whose size is large enough to contain both the packet header as well as the compressed data block. The timestamp driver deals with each buffer as a SPOX® operating system IO_Frame data type. Before the frames are IO_free()'ed to the compression stackable driver below, the timestamp driver subtracts the size of the packet header from the frame's current size. When the frame returns to the timestamp driver via IO_get(), the driver appends the timestamp by restoring the size to "maxsize" and filling the unused area with the new header. The handling is reversed for the playback side. Buffers received from the comm task contain both the compressed data block and header. The timestamp driver strips the header by reducing "size" to "maxsize" minus the header size.

(De)Compression Drivers

In a preferred embodiment, the DSP architecture bundles the encode and decode functions into one driver that is always stacked between the audio task and the host processor. The driver performs either compress or decompress functions depending on whether it is stacked within an IO_SINK or IO_SOURCE stream, respectively. Under this scheme, the audio task only handles uncompressed data; the stackable driver compresses the data stream on route to the host processor (IO_SINK) and decompresses the stream if data is being read from the host processor (IO_SOURCE) for playback.

In an alternative preferred embodiment, the audio task deals with compressed data in fixed blocks since that is what gets stamped or examined on route to or from the ISDN comm task, respectively. In this embodiment, the DSP architecture is implemented by the DXF transformation driver 1508. Either driver may be placed in an IO_SOURCE or IO_SINK stream.

Due to the audio subsystem's preference to manage latency reliably, the audio task threads know how much capture or playback time is represented by each compressed data sample. On the capture side, this time may be calculated from the data returned by the compression driver via the DCO_FILLEXTWAVEFORMAT control command. DCO_ExtWaveFormat data fields "nSamplesPerSec" and "wBitsPerSample" may be used to calculate a buffer size that provides control over latency at a reasonable level of granularity.

Consider the following example. Suppose we desire to increase or decrease latency in 50 millisecond increments. Suppose further that a DCO_FILLEXTWAVEFORMAT command issued to the compression driver returns the following fields:

nChannels         = 1
nSamplesPerSec    = 8000
nBlockAlign       = 0
wBitsPerSample    = 2

If we assume that compressed samples are packed into each 32-bit word contained in the buffer, then one TI C31 DSP word contains 16 compressed samples. The buffer size containing 50 ms worth of data would be:

$$\text{words} = (8000 \frac{\text{Samples}}{\text{Sec}} \times 0.05 \text{ Sec}) \div 16 \frac{\text{Samples}}{\text{word}} = 25$$

To this quantity, the capture thread adds the size of the packet header and uses the total in allocating as many streams buffers as needed to service its IO_SOURCE stream.

On the receiving side, the playback thread receives the packet containing the buffer of compressed data. The DCO_FILLEXTWAVEFORMAT control command is supported by the encoder, not the decoder which the playback thread has stacked in its IO_SINK stream. In fact, the thread has to send the driver a DCO_SETEXTWAVEFORMAT command before it will decompress any data. Thus, we need a mechanism for providing the playback thread a DCO_ExtWaveFormat structure for handshaking with decompression driver prior to entering the AST_PLAY state.

Mixer/Splitter Driver

The mixer/splitter driver 1510 (i.e., the mixer) is a stackable driver that coordinates multiple accesses to the SAC 1304, as required by conferencing. The mixer allows multiple simultaneous opens of the SAC for both input and output and mixes the channels. The mixer also supports priority preemption of the control-only SAC device "sacctrl."

The SPOX® operating system image for the audio/comm board has mappings in the device name space to transform references to SAC devices into a device stack specification that includes the mixer. For example, a task that attempts to open "/sac" will actually open "/mxr1/sac". The mapping is transparent to the task. To avoid getting mapped through the mixer, an alternative set of names is provided. The alternative names consist of the standard device name prefixed with "VC". For example, to open the device "adc8K" without going through the mixer, a task would use the name "/VCadc8K". To obtain priority access to the SAC, the software opens the device "/mxr0/VCadc8K".

For output operation, the software opens the mixer with device ID 0; any other client opens the mixer with device ID 1. Device ID 0 may be opened only once; when it is, all other currently open channels are muted. That is, output to the channel is discarded. Subsequent opens of device ID 1 are allowed if the sample rate matches. Device ID 1 may be opened as many times as there are channels (other than channel 0). All opens after the first are rejected, if the sample rate does not match the first open. When more than one channel is open and not muted, the output of all of them is mixed before it is passed on to the SAC.

For input operations, the software opens the mixer with device ID 0; any other client opens the mixer with device ID 1. Device ID 0 may be opened only once; when it is, if channel 1 is open, it is muted. That is, get operations return frames of silence. Device ID 1 may be opened once before channel 0 is open (yielding channel 1: normal record operation). Device ID 1 may also be opened once after channel 0 is opened (yielding channel 2: conference record operation). In the second case, the sample rate must match that of channel 0. Channel 1 returns data directly from the SAC (if it is not muted). Channel 0 returns data from the SAC mixed with data from any output channels other than channel 0. This allows the user to play back a recording during a video conference and have it sent to the remote participant. Channel 2 returns data from the SAC mixed with the output to the SAC. This provides the capability of recording both sides of conference.

There are four control channels, each of which may be opened only once. They are prioritized, with channel 0 having the highest priority, and channel 3 having the lowest. Only the open channel with the highest priority is allowed to control the SAC. Non-conferencing software, which opens "/sacctrl", is connected to channel 3, the lowest priority channel.

Mixer Internal Operation

For output operation, the mixer can, in theory, support any number of output channels. The output channels are all equivalent in the sense that the data from all of them is mixed to form the output sent to the SAC. However, there is one channel that is designated the main channel. The first channel opened that is not muted is the main channel. When the main channel is closed, if there are any other non-muted channels open, one of them is promoted to be the main channel. Opening channel 0 (conference output) mutes any channels open at the time and channel 0 cannot be muted. Thus, if channel 0 is open, it is always the main channel. Any open output channel that is not than the main channel is called an auxiliary channel.

When an IO_put operation is performed on a non-muted auxiliary channel, the frame is placed on the channel's ready list. When an IO_put operation is performed on the main channel, data from the auxiliary channels' ready lists are mixed with the frame, and the frame is passed immediately through to the SAC. If an auxiliary channel is not ready, it will be ignored (and a gap will occur in the output from that channel); the main channel cannot be held up waiting for an auxiliary channel.

When an IO_put operation is performed on a muted channel, the frame is placed directly on the channel's free list. The driver then sleeps for a period of time (currently 200 ms) to simulate the time it would take for the data in the frame to be played. This is actually more time than it would normally take for a block of data to be played; this reduces the CPU usage of muted channels.

An IO_alloc operation on the main channel is passed directly through to the SAC; on other channels, it returns a frame from the channel's free list. If a frame is not available, it waits on the condition freeFrameAvailable. When the condition is signaled, it checks again whether the channel is the main channel. If the main channel was closed in the meantime, this channel may have been promoted.

The mixer does not allocate any frames itself. All the frames it manages are those provided by the task by calling IO_free or IO_put. For an auxiliary channel, flames passed to IO_free are placed on the channel's free list. These are then returned to the task when it calls IO_alloc. After the contents of a frame passed to IO_put have been mixed with the main channel, the frame is returned to the channel's free list. Since I/O operations on the main channel (including IO_free and IO_alloc) are passed through to the SAC, no buffer management is done by the mixer for the main channel, and the free list and the ready list are empty. However, the mixer does keep track of all frames that have been passed through to the SAC by IO_free or IO_put and returned by IO_get or IO_alloc. This is done to allow for the case where the main channel is preempted by opening the priority channel. In this case, all frames that have been passed to the SAC are recalled and placed on the mixer's free list for that channel.

Another special case is when the main channel is closed, and there is another open non-muted channel. In this case, this other channel is promoted to be the main channel. The flames on its ready list are passed immediately to IO__put to be played, and the frames on its free list are passed to IO__free. These flames are, of course, counted, in case the new main channel is preempted again.

For output mixing, a frame on the ready list of an auxiliary channel is mixed with both the main output channel and with input channel 0 (conference input), if it is open. I/O operations on these two channels are running independently, so the mixer does not know which channel will perform I/O first, or whether operations on the two will strictly alternate, or even if they are using the same frame size. In practice, if the conference input channel is open, the main output channel is conference output, and the two use the same frame size; however, the mixer does not depend on this. However, the auxiliary channel typically will not be using the same frame size as either of the main channels.

To handle this situation, the mixer uses two lists and two index pointers and a flag for each channel. The ready list, where frames are placed when they arrive, contains frames that contain data that needs to be mixed with both the input and the output channel. When either the input side or the output side has used all the data in the first frame on the ready list, the frame is moved to the mix list. The flag is set to indicate whether the mix list contains data for the input side or the output side. If the mix list is empty, both sides take data from the ready list. When all the data in a frame on the mix list has been used, the frame is moved to the free list.

Mixing operations are done in units of a main-channel frame. This may take a portion of an auxiliary channel frame or it may take parts of more than one. The mixing routine loops over the main channel frame. Each pass through the loop, it determines which auxiliary channel frame to mix from, takes as much data from that frame as it can, and moves that frame to a new list if necessary. The auxiliary channel frame to mix from is either the first frame on the mix list, if it is non-empty and the flag is set to indicate that data has not been used from that frame yet, or the first frame on the ready list. The index, either inReadyIndex or outReadyIndex, specifies the first unused sample of the frame.

For example, suppose mixing is with the main input channel (conference in), and the data for an auxiliary output channel is such that the read list contains two frames C and D and the mix list contains two frames A and B, wherein mixFlags equals MXR__INPUT__DATA and inReadyIndex equals 40. Assume further that the frame size on the main channel is 160 words and the frame size on the auxiliary channel is 60 words.

The first time through the loop in mix__frame, the mix list is not empty, and the mix flag indicates that the data on the mix list is for the input channel. The unused 20 samples remaining in the first frame on the mix list are mixed with the first 20 samples of the main channel frame. inReadyIndex is incremented by 20. Since it is now equal to 60, the frame size, we are finished with the frame. The output channel is finished with it, since it is on the mix list, so the frame is moved to the free list and set inReadyIndex to 0.

The second time through the loop, mix__index is 20. All 60 samples are mixed out of the first frame on the mix list, and the frame is moved to the free list.

The third time through the loop, mix__index is 80. The mix list is empty. All 60 samples are mixed out of the first frame on the ready list. Again the frame is finished, but this time it came from the ready list, so it is moved to the mix list. The mix flag is changed to indicate that the mix list now contains data for the output channel. outReadyIndex is not changed, so the output channel will still start mixing from the same offset in the frame that it would have used if the frame had not been touched.

The fourth time through the loop, mix__index is 140. The mix list is not empty, but the mix flag indicates that the data on the mix list is for the output channel, so it is ignored. The remaining 20 samples are mixed from the first frame on the ready list. All the data in the frame has not been used, so it is left on the ready list; the next time a frame is processed on the main input channel, processing continues where it left off. After mixing is complete, the ready list contains only frame D, the mix list contains only frame C, mixFlags equals MXR__OUTPUT__DATA, and inReadyIndex equals 20.

After each step described, the data structures are completely self-consistent. In a more typical situation, the frames on the auxiliary channel will be much larger (usually 1024 words), and only a portion of a frame will be used for each frame on the main channel. However, the processing is always similar to one or two of the four steps described in the example.

For input operations, unlike the output channels, the three input channels have distinctly different semantics. The main channel is always channel 0 if it is open, and channel 1 if channel 0 is not open. Channel 1 will always be muted if it is open when channel 0 is opened, and cannot be opened while channel 0 is open. Channel 2 is never the main channel; it can be opened only while channel 0 is open, and will be muted if channel 0 is closed.

Operation of the main channel is similar to the operation described for output. When IO__get or IO__free is called, the request is passed on to the SAC. For channel 0, when the frame is returned from the SAC, any output ready on auxiliary output channels is mixed with it before the frame is returned to the caller.

When channel 2 (conference record) is open, output frames on channel 0 (conference output) and input frames on channel 0 (conference input) (including the mixed auxiliary output) are sent to the function record__frame. Record__frame copies these frames to frames allocated from the free list for channel 2, mixes the input and output channels, and places the mixed frames on the ready list. When IO__get operation is performed on channel 2, it retrieves a frame from the ready list, blocking if necessary until one is available. If there is no frame on the free list when record frame requires one, the data will not be copied, and there will be a dropout in the recording; however, the main channel cannot be held up waiting for the record channel.

For conference record mixing, record__frame needs to mix flames from both conference input and conference output into a frame for channel 2. Again, I/O operations on the conference channels are running independently. The mixer uses the mix list of the conference record channel as a holding place for partially mixed flames. readyIndex contains the number of samples in the first frame on the mix list which are completely mixed. The frame size contains the total number of samples from either channel that have been placed in the frame. The difference between the frame size and readyIndex is the number of samples that have been placed in the frame from one channel but not mixed with the other. The flag mixFlags indicates which channel these samples came from.

Mixing operations are done in units of a main-channel frame, as for output. This may take a portion of a record channel frame or it may take parts of more than one. The mixing routine loops over the main channel frame. Each pass through the loop, it does one of the following:

1. If the mix list contains data from the other channel, mix with the first frame on the mix list. readyIndex indicates the place to start mixing. If the frame is now fully mixed, move it to the ready list.
2. If the mix list contains data from this channel (or equal parts from both channels), and there is free space in the last frame on the mix list, copy the data into that frame. The frame size indicates the place to start copying.
3. If neither of the above is true, allocate a new frame from the free list and add it (empty) to the mix list. On the next iteration, case 2 will be done.

To provide mutual exclusion within the mixer, the mixer uses a semaphore. Every mixer routine that manipulates any of the data for a channel first acquires the semaphore. The semaphore mechanism is very similar to the monitor mechanism provided by SPOX® operating system. There are two major differences: (1) a task within a SPOX® operating system monitor cannot be suspended, even if a higher priority task is ready to run, and (2) when a task within a SPOX® operating system monitor is suspended on a condition, it implicitly releases ownership of all monitors. In the mixer, it is necessary to make calls to routines which may block, such as IO_alloc, while retaining ownership of the critical region. The semaphore is released when a task waits for a mixer-specific condition (otherwise, no other task would be able to enter the mixer to signal the condition), but it is not released when the task blocks on some condition unrelated to the mixer, such as within the SAC.

Echo Suppression Driver

The echo suppression driver (ESP) 1512 is responsible for suppressing echoes prevalent when one or both users use open speakers (rather than headphones) as an audio output device. The purpose of echo suppression is to permit two conferencing systems 100 connected by a digital network to carry on an audio conversation utilizing a particular microphone and a plurality of loudspeaker device choices without having to resort to other measures that limit or eliminate acoustic feedback ("coupling") from loudspeaker to microphone.

Specifically, measures obviated by the ESP include:

An audio headset or similar device to eliminate acoustic coupling.

A commercial "speakerphone" attachment that would perform the stated task off the PC and would add cost and complexity to the user.

The ESP takes the form of innovations embedded in the context of art known variously as "half-duplex speakerphones" or "half-duplex hands-free telephony" or "echo suppression." The ESP does not relate to art known as "echo cancellation."

The general ideas of "half-duplex hands-free telephony" are current practice. Electronic hardware (and silicon) exist that embody these ideas. The goal of this technology is to eliminate substantially acoustic coupling from loudspeaker to microphone by arranging that substantial microphone gain is never coincident with substantial speaker power output when users are speaking.

The fundamental idea in current practice is the following: Consider an audio system consisting of a receiving channel connected to a loudspeaker and a transmitting channel connected to a microphone. If both channels are always allowed to conduct sound energy freely from microphone to network and from network to loudspeaker, acoustic coupling can result in which the sound emanating from the loudspeaker is received by the microphone and thus transmitted back to the remote station which produced the original sound. This "echo" effect is annoying to users at best and at worst makes conversation between the two stations impossible. In order to eliminate this effect, it is preferable to place an attenuation device on each audio channel and dynamically control the amount of attenuation that these devices apply by a central logic circuit. This circuit senses when the remote microphone is receiving speech and when the local microphone is receiving speech. When neither channel is carrying speech energy, the logic permits both attenuators to pass audio energy, thus letting both stations receive a certain level of ambient noise from the opposite station. When a user speaks, the logic configures the attenuators such that the microphone energy passes through to the network and the network audio which would otherwise go to the speaker is attenuated (this is the "talk state"). When on the other hand speech is being received from the network and the local microphone is not receiving speech, the logic configures the attenuators conversely, such that the network speech is played by the speaker and the microphone's acoustic energy is muted by the attenuator on that channel (this is the "listen state").

The ESP operates without a separate dedicated speakerphone circuit device. The ESP operates over a network featuring an audio codec that is permitted to distort signal energies without affecting the performance of the algorithm. The ESP effectively distributes computational overhead such that redundant signal processing is eliminated.

The ESP is a distributed digital signal processing algorithm. In the following, the algorithm is spoken of as "distributed," meaning that two instantiations of it reside on the two conferencing systems connected by a digital network, and their operation is interdependent). "Frame energy" means a mean sum of the squares of the digitized audio samples within a particular time segment called a "frame."

The instantaneous configuration of the two attenuations is encoded as a single integer variable, and the attenuations are implemented as a fractional multiplier as a computational function of the variable.

In order to classify a signal as speech, the algorithm utilizes a frame energy threshold which is computed as an offset from the mathematical mode of a histogram in which each histogram bin represents the count of frames in a particular energy range. This threshold varies dynamically over time as it is recalculated. There exists a threshold for each of the two audio channels.

Since both stations need access to the threshold established at a particular station (in that one station's transmit stream becomes the other station's receive stream), the threshold is shared to both instantiations of the algorithm as an out-of-band network signal. This obviates the need for both stations to analyze the same signal, and makes the stations immune to any losses or distortion caused by the audio codec.

The energy of a transmitted audio frame is embedded within a field of the communication format which carries the digitally-compressed form of the frame. In this way, the interactive performance of the station pair is immune from any energy distortion or losses involved in the audio codec.

The ESP makes possible hands-free operation for video teleconferencing products. It is well-known that hands-free audio conversation is a much more natural conferencing usage model than that of an audio headset. The user is freed from a mechanical attachment to the PC and can participate as one would at a conference table rather than a telephone call.

Audio Task Interface with Comm Task

The interface between the audio task to the audio hardware is based on SPOX® operating system streams. Unfortunately, SPOX® operating system streams connect tasks to source and sink device drivers, not to each other. Audio data are contained within SPOX® operating system array objects and associated with streams. To avoid unnecessary buffer copies, array objects are passed back and forth between the comm and audio subsystems running on the audio/comm board using SPOX® operating system streams and a pipe driver. The actual pipe driver used will be based on a SPOX® operating system driver called NULLDEV. Like Spectron's version, this driver simply redirects buffers it receives as an IO_SINK to the IO_SOURCE stream; no buffer copying is performed. Unlike Spectron's pipe driver, however, NULLDEV does not block the receiving task if no buffers are available from the sending stream and discards buffers received from the IO_SOURCE stream if no task has made the IO_SINK stream connection to the driver. In addition, NULLDEV will not block or return errors to the sender. If no free buffers are available for exchange with the sender's live buffer, NULLDEV returns a previously queued live buffer. This action simulates a dropped packet condition.

Setup and teardown of these pipes will be managed by a message protocol between the comm task and audio task threads utilizing the existing TMB mailbox architecture built into the Mikado DSP interface.

The interface assumes that the comm task is running, an ISDN connection has been established, and channel ID's (i.e., virtual circuit ID's) have been allocated to the audio subsystem by the conferencing API. The capture and playback threads become the channel handlers for these ID's. The interface requires the comm task first to make available to the audio threads the handle to its local mailbox TMB_MYMBOX. This is the mailbox a task uses to receive messages from the host processor. The mailbox handle is copied to a global memory location and retrieved by the threads using the global data package discussed later in this specification.

Message Protocol

Like the comm task, the audio task threads use their own TMB_MYMBOX mailboxes for receiving messages from the comm task. For the purpose of illustration, the capture thread, playback thread and comm task mailboxes are called TMB_CAPTURE, TMB_PLAYBACK, and TMB_COMMMSG, respectively. The structure of the messages exchanged through these mailboxes is based on TMB_Msg defined in "TMB.H" such that:

```
typedef struct TMB_Msg {
    Int msg;
    Uns words[TMB_MSGLEN];
} TMB_Msg;
```

The messages that define this interface will be described via examples. Currently, specific message structures and constants are defined in the header file "AS.H".

Figure 16:
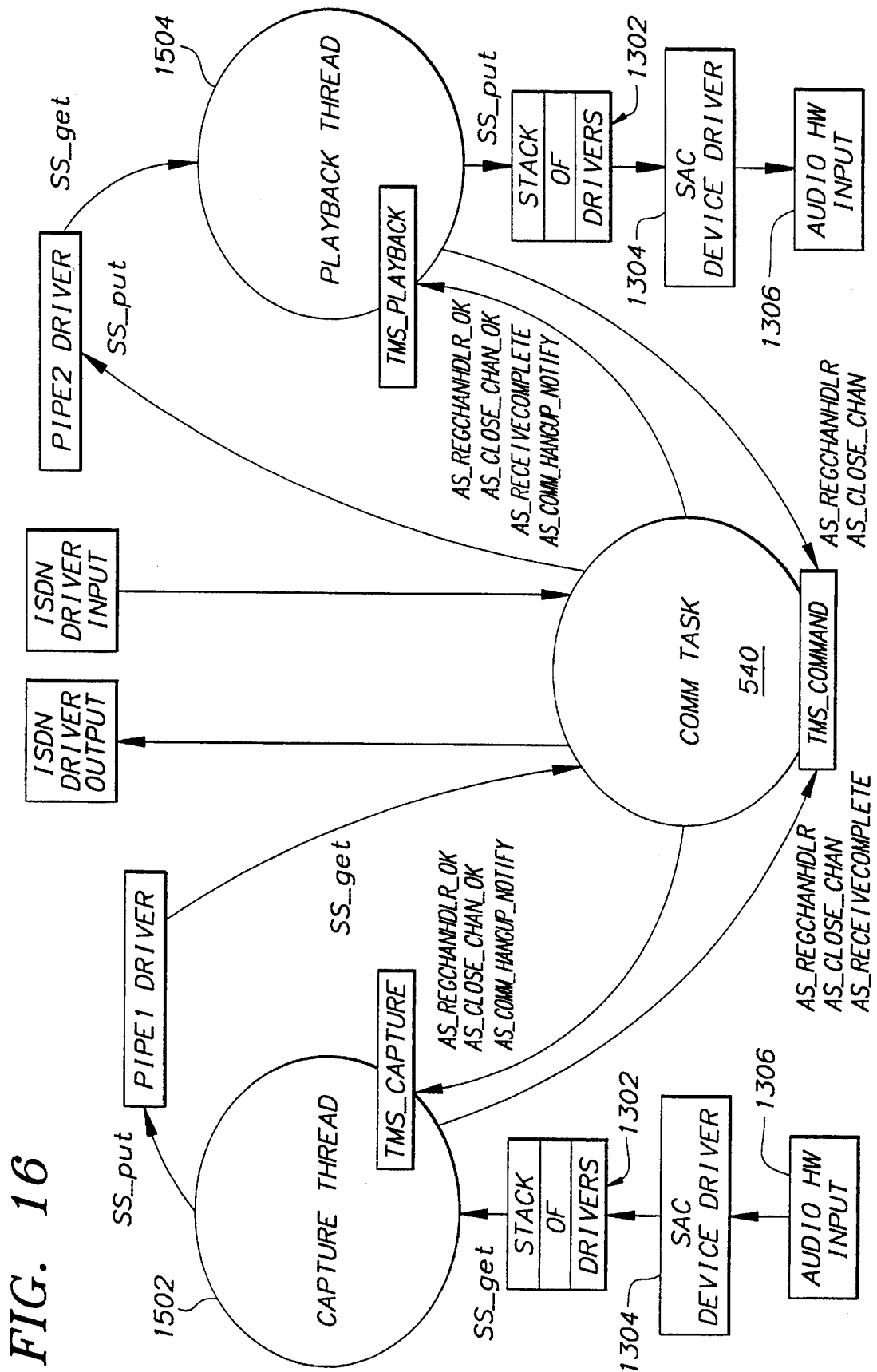
FIG. 16 is a block diagram of the interface between the audio task and the comm task of FIG. 5.

Referring now to FIG. 16, there is shown a block diagram of the interface between the audio task 538 and the comm task 540 of FIGS. 5 and 13, according to a preferred embodiment of the present invention. For audio capture, when the capture thread receives an ALINKOUT_TMSG message from the host processor, it sends an AS_REGCHANHDLR message to the TMB_COMMMSG mailbox. The message contains an on-board channel ID, a handle to the mailbox owned by the capture thread, and a string pointer to the pipe.

```
typedef struct AS_OPENMSG {
    Uns         msg;          /*msg == AS_REGCHANHDLR. */
    Uns         Channel_ID    /* On board channel ID */
    TMB_MBox    mailBox;      /* Sending Task's mailbox. */
    String      DevName;      /* Device name to open. */
} AS_OPENMSG;
```

Channel_ID is used to retrieve channel specific information. The task stores this information in the global name space. A pointer to this space is retrieved via the routine GD_getAddress(ID). The information has the following structure:

```
typedef struct COMM_AUDIO_DATA {
    struct {
        unsigned int             : 30;
        unsigned int initialized ; 1;
        unsigned int read        ; 1;
    }bool;
    Uns localID;
    Uns remoteID;
}CommAudioData, *CommAudioDataPtr;
```

This structure is declared in "AS.H" From this structure, the comm task can determine if the buffer is initialized (it always should be or the audio tasks would not be calling), if the task is expecting to read or write data to/from the network (if read is 1, the comm task will open the pipe for write and put data from the network there), and finally the local and remote IDs of the network channels.

The following pseudo code illustrates the actions performed by the capture thread to establish a link with the comm task:

```
AS_OPENMSG      *audio;
TMB_Msg         message;
CommAudioDataPtr  pCAData;
pCAData = (CommAudioDataPtr) GD_getAddress(AS_CAPTURE_CHAN)
<set pCAData fields>
audio = (AS_OPENMSG *) &message;
```

```
audio->msg = AS_REGCHANHDLR;
audio->Channel_ID = (Uns) AS_CAPTURE_CHAN;
audio->mailBox = (TMB_MBox) TMB_CAPTURE;
audio->DevName = (String) "/null";
TMB_postMessage( TMB_COMMMSG, audio, 0 );
```

The comm task's first action will be to call GD_getAddress() and retrieve an address to the CommAudioData structure. It validates the structure using the local and remote IDs linking the thread with the appropriate ISDN channel. Finally, the comm task responds by connecting to its end of audio->DevName ("/null") and returning status to the capture thread via a message directed to TMB_CAPTURE such that:

```
TMB_Msg              message;
CommAudioDataPtr     pCAData;
AS_OPENMSG           audio;
typedef struct AS_INFOMSG {
        Uns    msg;            /* AS_CLOSE_CHAN or AS_STATUS */
        Uns    Channel_ID;     /* On board channel ID */
        Uns    statusCode;     /* Status Code */
        Uns    statusExtra;    /* Additional status info */
} AS_INFOMSG *comm ;
TMB_getMessage (TMB_COMMMSG, (TMB_Msg)&audio, 0);
pCAData= (CommAudioDataPtr) GD_getAddress(audio.Channel_ID);
<validate pCAData fields and open audio.DevName>
comm = (AS_INFOMSG *) &message;
comm->msg = AS_STATUS;
comm->Channel_ID = audio.Channel_ID;
comm->statusCode = AS_REGCHANHDLR_OK;
TMB_postMessage (audio.mailbox, comm, 0);
```

If the comm task detects an error, the statusCode and statusExtra fields are set to the appropriate error codes defined in the section Status and Error Codes.

The capture thread subsequently receives stream buffers filled with time stamped and compressed audio data from the input driver stack via SS_get() calls and routes them to the comm task via the pipe driver. After each SS_put() to the pipe driver, the capture thread notifies the comm task that an incoming buffer is on the way via an AS_RECEIVECOMPLETE status message.

```
audio = (AS_INFOMSG *) &message;
audio->msg = AS_STATUS;
audio->Channel_ID = AS_CAPTURE_CHAN;
audio->statusCode = AS_RECEIVECOMPLETE;
TMB_postMessage (TMB_COMMMSG, audio, 0);
```

The comm task sends the buffers to the ISDN driver which transmits the data frame on the audio output's ISDN virtual channel.

Between each input streams buffer processed, the capture thread checks TMB_CAPTURE for new requests messages from the comm task or the host processor. When a second ALINKOUT_TMSG message is received from the host processor, the capture thread stops sending data buffers to the pipe driver and notifies the comm task of its intention to terminate the link:

```
audio = (AS_INFOMSG *) &message;
audio->msg = AS_CLOSE_CHAN;
audio->Channel_ID = AS_CAPTURE_CHAN;
```

-continued

```
TMB_postMessage (TMB_COMMMSG, audio, 0);
```

Capture treats the ALINKOUT_TMSG message as a toggle: the first receipt of the message establishes the link, the second receipt terminates it. The comm task first closes its half of the pipe driver and then terminates its connection with the capture thread via an AS_CLOSE_CHAN_OK message.

```
comm->msg = AS_STATUS;
comm->Channel_ID = Channel_ID;
comm->statusCode = AS_CHANCLOSE_OK;
TMB_postMessage (TMB_CAPTURE, comm, 0);
```

On the other side of the audio task, the playback thread waits for the ALINKIN_TMSG message from the host processor after first opening the IO_SINK side of a second pipe driver "/null2". When that message finally arrives, the playback thread opens the communication pathway to the comm task and registers as the audio input channel handler via an AS_REGCHANHDLR message. Like the capture thread, the playback thread supplies the channel ID, its response mailbox, and a string pointer to the second pipe driver:

```
pCAData = (CommAudioDataPtr) GD_getAddress(AS_PLAYBACK_CHAN)
<set pCAData fields>
audio = (AS_OPENMSG *) &message;
audio->msg = AS_REGCHANHDLR;
audio->Channel_ID = (Uns) AS_PLAYBACK_CHAN;
```

-continued

```
audio->mailBox = (TMB_MBox) TMB_PLAYBACK;
audio->DevName = (String) "/null2";
TMB_postMessage (TMB_COMMMSG, audio, 0);
```

Exactly as with the capture thread, the comm task behaves as follows:

```
TMB_getMessage (TMB_COMMMSG, (TMB_Msg)&audio, 0);
pCAData= (CommAudioDataPtr)
GD_getAddress(audio.Channel_ID);
<validate pCAData fields and open audio.DevName>
comm = (AS_INFOMSG *) &message;
comm->msg = AS_STATUS;
comm->Channel_ID = audio.Channel_ID;
comm->statusCode = AS_REGCHANHDLR_OK;
TMB_postMessage (audio.mailbox, comm, 0);
```

Once this response is received, the playback thread blocks waiting for notification of input buffers delivered by the comm task to its side the pipe driver. After each buffer is put to pipe, the comm task notifies the playback thread:

```
    comm = (AS_INFOMSG *) &message;
    comm->msg = AS_STATUS;
    comm->Channel_ID = Channel_ID;
    comm->statusCode = AS_RECEIVECOMPLETE;
    TMB_postMessage (TMB_PLAYBACK, comm, 0);
```

The playback thread collects each buffer and outputs the audio data by SS_put()'ing each buffer down the driver stack to the SAC 1304.

The handing of the second ALINKIN_TMSG request received from the host processor is the same as on the capture side. The playback thread closes "/null2" and uses AS_CLOSE_CHAN to sever its link with the comm task.

At any time during the link state, problems with or a normal shutdown of the ISDN logical channel may generate a hang-up condition. The comm task notifies the capture and/or playback thread via the unsolicited status message AS_COMM_HANGUP_NOTIFY:

```
comm = (AS_INFOMSG *) &message;
comm->msg = AS_STATUS;
comm->Channel_ID = Channel_ID;
comm->statusCode = AS_COMM_HANGUP_NOTIFY;
comm->statusExtra = <QMUX error>
TMB_postMessage (<TMB_PLAYBACK or TMS_CAPTURE>, comm, 0);
```

In response, the threads close the channel, notifying the host processor in the process.

As defined in "AS.H", the following are status and error codes for the statusCode field of AS_STATUS messages:

| | |
|---|---|
| AS_REGCHANHDLR_OK | AS_REGCHANHDLR request succeeded. |
| AS_REGCHANHDLR_FAIL | AS_REGCHANHDLR request failed. |
| AS_CHANCLOSE_OK | AS_CHANCLOSE request succeeded. |
| AS_CHANCLOSE_FAIL | AS_CHANCLOSE request failed. |
| AS_COMM_HANGUP_NOTIFY | Open channel closed. |
| AS_RECEIVECOMPLETE | Data packet has been sent to NULLDEV. |
| AS_LOST_DATA | One or more data packets dropped. |

Regarding buffer management issues, the audio task maintain a dynamically configurable amount of latency on the audio streams. To do this, both audio task threads have control over the size of the buffers that are exchanged with the comm task. As such, the comm task adopts the buffer size for the streams assigned it by the audio task. In addition, the number of buffers which exist within the NULLDEV link between the comm task and an audio task thread are defined by the threads. Mechanisms for implementing this requirement involves the following steps:

1. Both audio task threads create their SPOX® operating system stream connections to the NULLDEV pipe driver before registering with the comm task. Each thread issues an SS_create() specifying the buffer size appropriate for the audio compression method and time stamp framing to be performed on each buffer. In addition, the attrs.nbufs field is set to the desired number of buffers available for queuing audio data within the NULLDEV link.

2. When setting up its NULLDEV streams, the comm task sets the SS_create() buffer size parameter to −1 specifying that a "device-dependent value will be used for the stream buffer size". See SPECTRON's SPOX® Application Programming Reference Manual, Version 1.4, page 173. In addition, the attrs.nbufs are set to 0 ensuring that no additional buffers are added to the NULLDEV link.

3. After opening the stream, the comm task will query for the correct buffer size via an SS_sizeof() call. Thereafter, all buffers it receives from the capture thread and all buffers it delivers to the playback thread are this size. It uses this size when creating the SA_Array object used to receive from and send buffers to NULLDEV.

The comm task preferably performs no buffering of live audio data. Communication between audio task endpoints is unreliable. Because audio data is being captured, transmitted, and played back in real time, it is undesirable to have data blocks retransmitted across an ISDN channel.

Whether unreliable transmission is supported or not for the audio stream, the NULLDEV driver drops data blocks if live buffers back up. NULLDEV does not allow the sender to become buffer starved. It continues to exchange buffers with the task issuing the SS_put(). If no free buffers are available to make the exchange, NULLDEV returns the live buffer waiting at the head of its ready queue.

Global Data Package

The SPOX® operating system image for the audio/comm board contains a package referred to as the Global Data Package. It is a centralized repository for global data that is shared among tasks. The interfaces to this package are defined in "GD.H". The global data is contained in a GBLDATA struct that is defined as an array of pointers:

```
typedef struct GBLDATA {
        Ptr availableData[MAX_GLOBALS];
} GBLDATA;
```

Like all SPOX® operating system packages, the global data package contains an initialization entry point GD_init() that is called during SPOX® operating system initialization to set the items in GBLDATA to their initial values. Tasks that wish to access the global data will contain statements like the following to obtain the contents of the GBLDATA structure:

```
Ptr pointerToGlobalObject;
pointerToGlobalObject =
GD_getAdress(OBJECT_NUMBER);
```

In a preferred embodiment, there is no monitor or semaphore associated with the global data. So by convention, only one task will write to an item and all others will only read it. For example, all data pointers are set to NULL by GD_init(). A pointer such as availableData[CommMBox] would then be filled in by the comm task during its initialization with the following sequence:

```
pointerToGlobalData= GD_getAddress(AS_COMMMBOX );
pointerToGlobalData->CommMBox= TMB_MYMBOX;
```

Tasks that wish to communicate to the comm task can check that the task is present and obtain its mailbox handle as follows:

```
pointerToGlobalData= GD_getAddress(AS_COMMMBOX);
if (pointerToGlobalData->CommMBox != NULL) {
    /* COMMTASK is present */
    TMB_postMessage ( pointerToGlobalData->CommMBox ,
                    aMessage,
                    timeOutValue);
}
else {
    /* IT IS NOT */
}
```

NULLDEV Driver

The SPOX® operating system image for the audio/comm board contains a device driver that supports interprocess communication though the stream (SS) package. The number of distinct streams supported by NULLDEV is controlled by a defined constant NBRNULLDEVS in NULLDEV.H. Currently, NULLDEV supports two streams. One is used for the audio task capture thread to communicate with the comm task. The other is used by the playback thread to communicate with the comm task. The assignment of device names to tasks is done by the following two constants in ASTASK.H:

```
#define AS_CAPTURE_PIPE      "/null"
#define AS_PLAYBACK_PIPE     "/null2"
```

Support for additional streams may be obtained by changing the NBRNULLDEVS constant and recompiling NULLDVR.C. The SPOX® operating system config file is also adjusted by adding additional device name strings to this section as follows:

```
driver NULLDEV_driver {
        "/null":    devid = 0;
        "/null2":   devid = 1;
};
```

The next device is the sequence has devid=2.

SS_get() calls to NULLDEV receive an error if NULLDEV's ready queue is empty. It is possible to SS_put() to a NULLDEV stream that has not been opened for SS_get() on the other end. Data written to the stream in this case is discarded. In other words, input live buffers are simply appended to the free queue. SS_put() never returns an error to the caller. If no buffers exist on the free queue for exchange with the incoming live buffer, NULLDEV removes the buffer at the head of the ready queue and returns it as the free buffer.

Comm Subsystem

The communications (comm) subsystem of conferencing system 100 of FIG. 5 comprises comm API 510, comm manager 518, and DSP interface 528 running on host processor 202 of FIG. 2 and comm task 540 running on audio/comm board 206. The comm subsystem provides connectivity functions to the conferencing application programs 502 and 504. It maintains and manages the session, connection, and the virtual channel states. All the connection control, as well as data communication are done through the communication subsystem.

Figure 17:
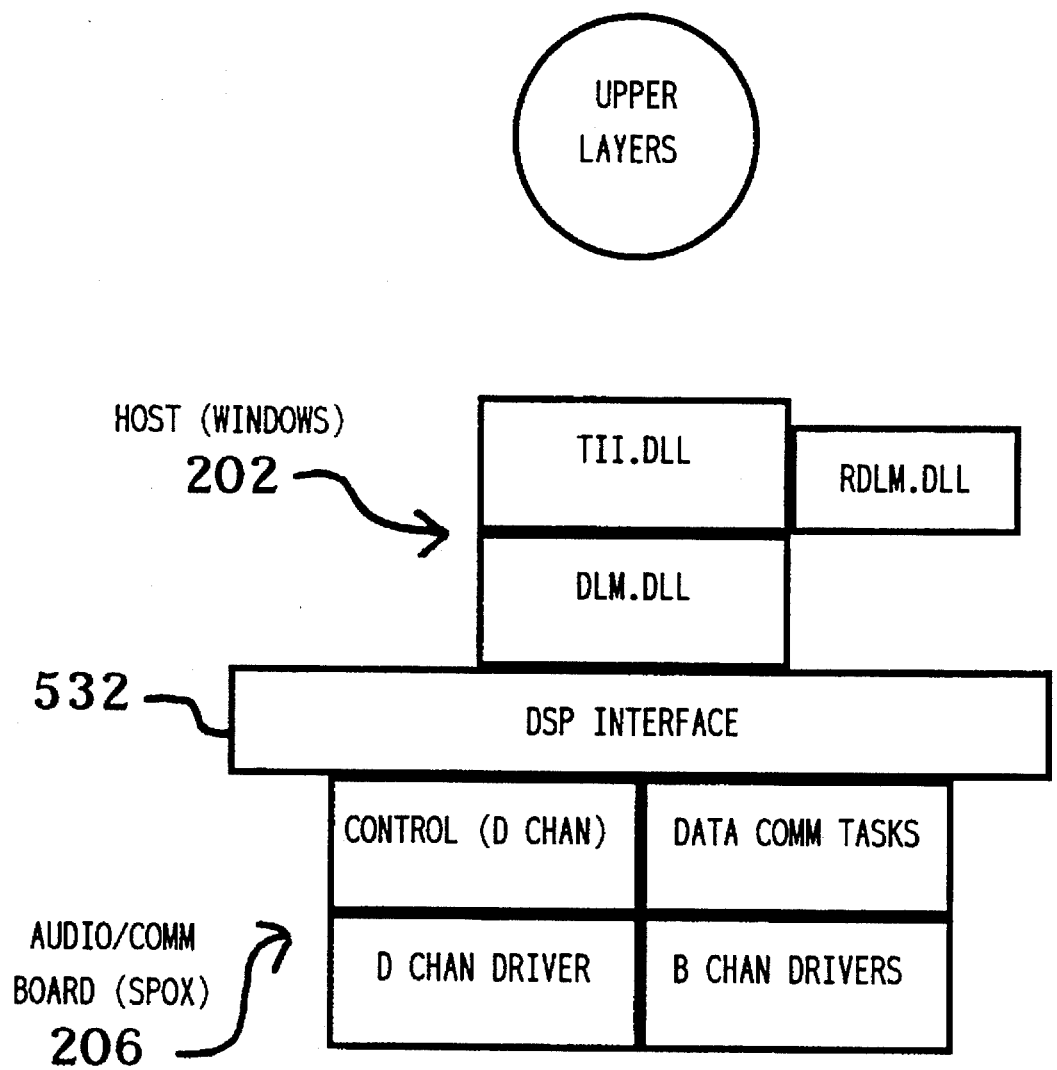
FIG. 17 is a block diagram of the comm subsystem of the conferencing system of FIG. 5.

Referring now to FIG. 17, there is shown a block diagram of the comm subsystem of conferencing system 100 of FIG. 5, according to a preferred embodiment of the present invention. The comm subsystem consists of the following layers that reside both on host processor 202 and the audio/comm board 206:

Transport independent interface (TII.DLL),

Reliable datalink module (DLM.DLL+KPDAPI.DLL, where KPDAPI.DLL is the back-end of the DLM which communicates with the DSP interface), and Datalink module.

TII.DLL and RDLM.DLL reside entirely on the host processor. Datalink module comprises DLM.DLL residing on the host processor, and control (D channel), D channel driver, data comm tasks, and B channel drivers residing on audio/comm board 206.

The comm interface provides a "transport independent interface" for the conferencing applications. This means that the comm interface hides all the network dependent features of the conferencing system. In a preferred embodiment, conferencing system 100 uses the ISDN Basic Rate Interface (BRI) which provides 2*64 KBits/sec data (B) channels and one signaling (D) channel (2B+D). Alternative preferred embodiment may use alternative transport media such as local area networks (LANs) as the communication network.

Figure 18:
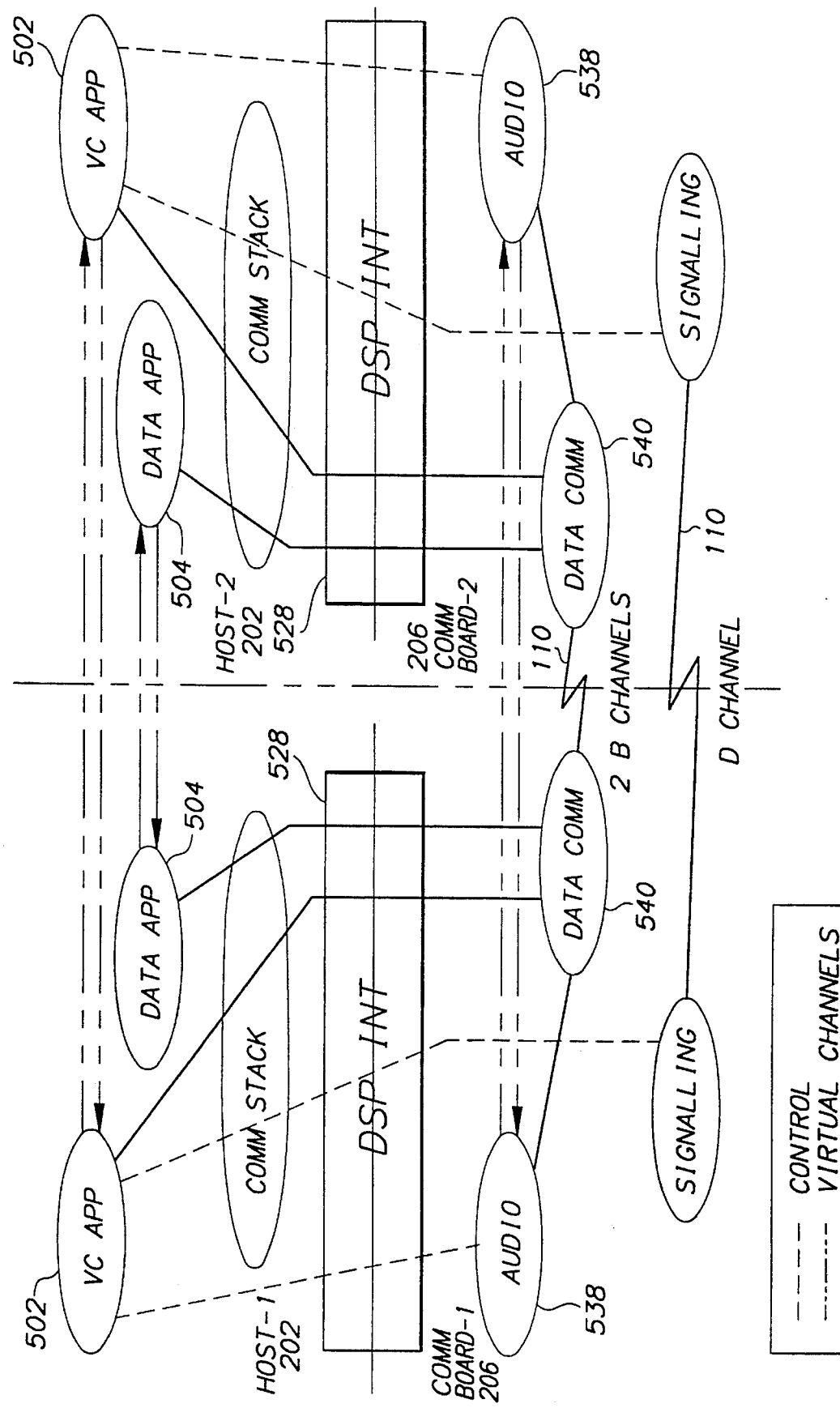
FIG. 18 is a block diagram of the comm subsystem architecture for two conferencing systems of FIG. 5 participating in a conferencing session.

Referring now to FIG. 18, there is shown a block diagram of the comm subsystem architecture for two conferencing systems 100 participating in a conferencing session, according to a preferred embodiment of the present invention. The comm subsystem provides an asynchronous interface between the audio/comm board 206 and the conferencing applications 502 and 504.

The comm subsystem provides all the software modules that manage the two ISDN B channels. The cotton subsystem provides a multiple virtual channel interface for the B channels. Each virtual channel is associated with transmission priority. The data queued for the higher priority channels are transmitted before the data in the lower priority queues. The virtual channels are unidirectional. The conferencing applications open write-only channels. The conferencing applications acquire read-only channels as a result of accepting a open channel request from the peer. The DLM supports the virtual channel interface.

During a conferencing session, the comm subsystem software handles all the multiplexing and inverse multiplexing of virtual channels over the B channels. The number of available B channels (and the fact that there is more than one physical channel available) is not a concern to the application.

The comm subsystem provides the D channel signaling software to the ISDN audio/comm board. The comm subsystem is responsible for providing the ISDN B channel device drivers for the ISDN audio/comm board. The comm subsystem provides the ISDN D channel device drivers for the ISDN audio/comm board. The comm software is preferably certifiable in North America (U.S.A., Canada). The signaling software is compatible with NI1, AT&T Custom, and Northern Telecom DMS-100.

The comm subsystem provides an interface by which the conferencing applications can gain access to the communication hardware. The goal of the interface is to hide the implementation of the connectivity mechanism and provide an easy to use interface. This interface provides a very simple (yet functional) set of connection control features, as well as data communication features. The conferencing applications use virtual channels for data communication. Virtual channels are simplex, which means that two virtual channels are open for full duplex communication between peers. Each conferencing application opens its outgoing channel which is write-only. The incoming (read-only) channels are created by "accepting" an "open channel" request from the peer.

qMUX MULTIPLE CHANNEL STREAMING MODULE

The QSource Multiple Channel Streaming Module (qMUX) is based on the need to utilize the high bandwidth of two bearer (B) channels (each at 64 kbps) as a single high-speed channel for the availability of multiple upper layer users. This section specifies the various interfaces between QSource qMUX module and other QSource modules or application modules to achieve this objective.

Qsource qMUX is a data link provider for one or more end-to-end connected upper layers to exchange data between themselves at a higher data rate than is possible over a single bearer (B) channel. qMUX accepts messages from upper layer providers and utilizes both B channels to transfer the data. On the receiving end, qMUX will reassemble received buffers from Layer 1 in sequential order into a user message and deliver the message to the awaiting upper layer. There is no data integrity insured by qMUX. There is no Layer 2 protocol (i.e., LAPB) used in the transmission of packets between the two endpoints; however, packets are transmitted using HDLC flaming. Throughout this section, the term ULP means Upper Layer Process or qMUX User.

qMUX is a data link provider process that receives user data flames from upper layers (data link user) and equally distributes them over the two B channels. This achieves a higher bandwidth for an upper layer than if a single B channel was used. Several higher processes can be multiplexed through the qMUX process, each being assigned its own logical channel through qMUX. This logical channel is known as a qMUX logical identifier (qLI).

A priority is assigned to each qLI as it is opened. This priority ensures that buffers of higher priority are sent before buffers of lesser priority are transmitted over the B channels. This enables an upper layer, whose design ensures a smaller bandwidth usage, to be handled in a more timely manner, ensuring a more rapid exchange of data between the two end users.

qMUX is an unreliable means of data transfer between two end users. There is no retransmission of message data. Although received packets are delivered to the higher requesting layers, there is no guarantee of data integrity maintained between the two cooperating qMUX processes. Packets may be lost between the two endpoints because there is no Layer 2 protocol (i.e., LAPB) used in the transmission of packets between the two endpoints; however, packets are transmitted using HDLC framing. In order to provide reliability, a transport provider such as TP0 (modified to work with qMUX) is preferably used as a ULP. qMUX considers a message as one or more data buffers from the higher layer. These chained buffers are unchained, assigned sequence numbers within the message sequence, and transferred to the far end. Each buffer contains a sequence number that reflects its place within the message.

At the receiving end, the buffers are reassembled into messages and delivered to the awaiting upper layer. Message integrity is not guaranteed. Messages are discarded on the receiving end if buffers are not received before final reassembly and delivery.

All messages transmitted by qMUX are preferably split into an even number of buffers, independent of message size. Two processes, namely SM2 and SCUD, split messages into equal buffers. In an alternative preferred embodiment, messages are split after exceeding a specific size (160 octets). Splitting messages into an even number of buffers, regardless of size, ensures timely delivery of data. In another alternative preferred embodiment, qMUX transmits a message contained in a single buffer.

Upper layers ensure that both endpoints are synchronized on their qLI (logical channel identifier) and priority. Once both B channels are established, the ULP establishes a qMUX logical interface with the qMUX process. This qLI, assigned by the ULP, allows for the transfer of data between qMUX and the ULP. This qLI assignment may be transferred or reassigned to another ULP, by use of the qMUX_BIND_REQUEST primitive. The qLI may be used by only one ULP at a time. The maximum qLI value in a system is defined as a startup parameter (MAX_LOGICAL_CHANNELS). A ULP requesting a qLI when all of the assignable qLI are in use is denied.

If a message is received for a qLI that is not assigned, then the message is discarded. A received message has the sending qLI and the intended receiver's qLI contained in the message. If the ULP assigned to the qLI does not have an outstanding request to receive data when a message is received, the message is discarded as well.

A qLI of 0 (zero) is used as a control channel for a ULP requesting assignment as a controlling ULP. The controlling qLI may be used to synchronize the two end ULPs cooperating in the data exchange.

When a qLI is requested, the requesting ULP assigns a priority for the handling of messages. Those ULPs requiring a high throughput with very little bandwidth should request a high priority to its messages. Priority is valid for outgoing messages only; that is, the priority is used when the buffer is queued to the B channel driver.

Data transfer between the ULP and qMUX is performed on a message basis. A message is defined to be one or more data buffers containing user data. The buffers are disassembled, assigned sequence numbers, and transferred over the available bandwidth of the two B channels in their assigned priority order, and re-assembled on the far-end for delivery to a requesting ULP. Should a fragment of the message not be delivered, the entire message is discarded; no retransmission of the message or its- pans are attempted by qMUX.

End-to-End flow control is not performed by qMUX. Before buffers are queued to layer 1, the queue depth is checked. If the number of buffers on a B-channel queue exceeds 15, the message is discarded, and notification given to the ULP.

qMUX maintains a message window per qLI that effectively buffers incoming messages. This guards against network transit delays that may exist due to the two bearer channels in use. The current size of the message window is three. For example, it is possible for qMUX to have completely assembled message numbers 2 and 3, while waiting for the final part of message 1. When message 1 is completely assembled, all three are then queued, in message order, to the appropriate ULP. If any part of message 4 is received before message 1 is complete, message 1 is discarded and the ULP notified. The message window then slides to include messages 2, 3, and 4. Since messages 2 and 3 are complete, they are forwarded to the ULP and the window slides to message 4.

The following primitives are sent from the ULP to qMUX:

| | |
|---|---|
| qMUX_DATA_REQUEST | Indicates the message carries application data. The message is comprised of one or more QSource system buffers. |
| qMUX_ATTACH_REQUEST | A request by a ULP for a qLI assignment. Both B channels are assumed to be connected at this time; the state of the two B channels is unaltered. This request can also be used to request a controlling qLI (0) for a ULP. |
| qMUX_BIND_REQUEST | A request by a ULP to have the specified qLI bound to the requesting ULP. All subsequent received traffic is directed to the requesting ULP. |
| qMUX_DEATTACH_REQUEST | Used by a ULP to end its usage of a qLI. All subsequent messages received are discarded for this qLI. This is used by a ULP to end the logical connection and reception of data. |

The following primitives are sent from qMUX to the ULP:

| | |
|---|---|
| qMUX_DATA_INDICATION | Indicates that user data is contained in the message. The message is one or more QSource system buffers. |
| qMUX_OK_ACK | Acknowledges to the ULP that a previously received primitive was received successfully. The qLI is returned within the acknowledgement. |
| qMUX_ERROR_ACK | Informs the ULP that a previously issued request was invalid. The primitive in error and the associated qLI (if valid) are conveyed back to the ULP. |

The following primitives are exchanged between PH (B channel Driver) and qMUX:

| | |
|---|---|
| PH_DATA_REQUEST | Used to request that the user data contained in the QSource system buffer be transmitted on the indicated B channel. |
| PH_DATA_INDICATION | Used to indicate to qMUX that the user data in the QSource system buffer is intended for an ULP. This particular buffer may only be a part of a message. |

The following example of the usage of qMUX by two cooperating ULPs (referred to as ULP-A and ULP-B) assumes that a connection has already been established:

The session manager sends a QMUX_CONNECT_REQ primitive to qMUX that states that both B-channels are available. ULP-A and ULP-B establish both B Channels at their respective ends.

ULP-A issues a qMUX_ATTACH_REQUEST for a controlling qLI to qMUX, and two qMUX_ATTACH_REQUESTs for a data exchange path. The first path is for sending and the second is for receiving data.

ULP-B also issues a qMUX_ATTACH_REQUEST for a controlling qLI (of zero) to qMUX, and two qMUX_ATTACH_REQUESTs for a data exchange path. ULP assigns zero for the controlling qLI requests and qLI 5 and 6 for ULP-A and qLI 5 and 6 for LP-B.

ULP-A formats a peer-to-peer (ULP-A to ULP-B) request for informing ULP-B that messages for ULP-A should be directed over qLI 6. ULP-A sends the message via qMUX over the controlling qLI.

ULP-B also formats a peer-to-peer (ULP-B to ULP-A) request for informing ULP-A that messages for ULP-B should be directed over qLI 6. ULP-B sends the message via qMUX over the controlling qLI.

ULP-A receives the request from ULP-B from the controlling qLI. A response is formatted which gives the qLI for ULP-A as 6 and ULP-B as 6. It is sent to qMUX for transfer over the controlling qLI.

ULP-B receives the request from ULP-A from the controlling qLI. A response is formatted which gives the qLI for ULP-B as 6 and ULP-A as 6. It is sent to qMUX for transfer over the controlling qLI.

Once both ULP peers have received the responses to their peer-to-peer requests, they an exchange data.

The following scenario illustrates the interface and design of qMUX for the exchange of data/video/audio:

ULP-A issues a qMUX_DATA_REQUEST over qLI 5 for delivery at the far-end to qLI 6. The message was segmented into two QSource system buffers by SM2/SCUD and sent to the B channels as follows:

Segment one: marked as START_OF_MESSAGE, sending qLI is 5, receiving qLI is 6, sequence number is 1 (one). It is sent to the B channel driver for B channel 1 with a primitive of PH_DATA_REQ.

Segment two: marked as END_OF_MESSAGE, sending qLI is 5, receiving qLI is 6, sequence number is 2 (two). It is sent to the B channel driver for B channel 2 with a primitive of PH_DATA_REQ.

qMUX at the receiving end receives the buffers as follows:

Segment one: received from B channel driver on B channel 1. Buffer has header of START OF_MESSAGE, sequence number 1. State is now AWAITING_EOM for qLI 6.

Segment two: END_OF_MESSAGE received. Buffer is chained to buffer two. Primitive is made qMUX_DATA_INDICATION and sent to the ULP-B who had bound itself to qLI 6. State is now set to AWAITING_START_OF_MESSAGE.

The above activity occurs during the message window for this qLI. The message window is currently set at three. A message window exists on a qLI basis.

Comm API

Comm API 510 of FIG. 5 provides an interface between conferencing applications 502 and 504 and the comm subsystem. Comm API 510 consists of a transport-independent interface (TII.DLL of FIG. 17). The TII encapsulates the network driver routines provided to the upper-layer modules (ULMs).

Comm API 510 provides the following services and functions:

Initialization Commands
  BeginSession: Begins a comm session. Only one "thread" of execution is allowed to begin the comm session for a given media. This thread specified the session handler, which is the focal point of all the connection management events. All connection related events are given to the session handler.
  EndSession: Ends a comm session.

Connection Control Commands
  MakeConnection: Makes connection to a remote peer. A MakeConnection command sends a connection request to the session handler of the specified "address".
  CloseConnection: Closes a connection. This command closes all the open virtual channels and the connection. All the relevant handlers are notified of the events caused by this command.
  AcceptConnection: Accepts a peer's request for connection. The session handler of the application which has received a connection request issues this command, if it wants to accept the connection.
  RejectConnection: Rejects a peer's request for connection.

Virtual-Channel Management
  RegisterChanMgr: Registers the piece of code that will handle channel events. This call establishes a channel manager. The job of channel manager is to field the "open channel" requests from the connected peer.
  RegisterChanHandler: Registers the piece of code that will handle data events. The channel handler is notified of the data related events, such as receipt of data and completion of sending of a data buffer.
  OpenChannel: Opens a virtual channel for sending data.
  AcceptChannel: Accepts a virtual channel for receiving data.
  RejectChannel: Rejects the virtual channel request.
  CloseChannel: Closes an open channel.

"Data" exchange
  SendData: Sends data over a virtual channel.
  ReceiveData: Posts buffers for incoming data over a virtual channel.

Communications Statistics
  GetChanInfo: Returns information about a given channel (e.g., the reliability and priority of the channel).
  GetChanStats: Returns statistical information about a given channel (e.g., number of transmissions, receives, errors).
  GetTiiStats: Returns statistical information about the current TII channels.

Transport-Independent Interface

Comm API 510 supports calls to three different types of transport-independent interface functions by conferencing applications 502 and 504 to the comm subsystem: connection management functions, data exchange functions, session management, and communications statistics functions. Connection management functions provide the ULM with the ability to establish and manage virtual channels for its peers on the network. Data exchange functions control the exchange of data between conferencing systems over the network. Communications statistics functions provide information about the channels (e.g., reliability, priority, number of errors, number of receives and transmissions). These functions are as follows:

| Connection Management Functions | |
|---|---|
| RegisterChanMgr | Registers a callback or an application window whose message processing function will handle low-level notifications generated by data channel initialization operations. This function is invoked before any OpenChannel calls are made. |
| RegisterChanHandler | Registers a callback or an application window whose message processing function will handle low-level notifications generated by data channel input/output (I/O) activities. The channels that are opened will receive CHAN_DATA_SENT, and the accepted channels will receive CHAN_RECV_COMPLTE. |
| OpenChannel | Requests a sub-channel connection from the peer application. The result of the action is given to the application by invoking the callback routine specified in the RegisterChanHandler. The application must specify an ID for this transaction. This ID is passed to the callback routine of posted in a message. Note: All Connection requests are for establishing connections for sending data. The receive channels are opened as the result of accepting a ConnectChannel request. |
| AcceptChannel | A peer application can issue AcceptChannel in response to a CHAN_REQUEST (OpenChannel) message that has been received. The result of the AcceptChannel call is a one-way communication sub-channel for receiving data. Incoming data notification will be sent to the callback or window application (via PostMessage) to the ChannelHandler. |
| RejectChannel | Rejects an OpenChannel request |

-continued

| | |
|---|---|
| | (CHAN_REQUEST message) from the peer. |
| CloseChannel | Closes a sub-channel that was opened by AcceptChannel or ConnectChannel. |
| Data Exchange Functions | |
| SendData | Sends data. Data is normally sent via this mechanism. |
| ReceiveData | Receives data. Data is normally received through this mechanism. This call is normally issued in response to a DATA_AVAILABLE message. |
| Communications Statistics Functions | |
| GetChanInfo | Returns channel information. |
| GetChanStats | Returns various statistical information about a channel. |
| GetTiiStats | Returns various statistical information about a TII channel. |

These functions are defined in further detail later in this specification in a section entitled "Data Structures, Functions, and Messages."

In addition, comm API 510 supports three types of messages and callback parameters returned to conferencing applications 502 and 504 from the comm subsystem in response to some of the above-listed functions: session messages, connection messages, and channel messages. Session messages are generated in response to change of state in the session. Connection messages are generated in response to the various connection-related functions.

Message and Callback Parameters

This section describes the parameters that are passed along with the messages generated by the communication functions. The events are categorized as follows:

| | |
|---|---|
| Connection Events: | Connection-related messages that are sent to the session handler (e.g., connection request, connection accepted, connection closed). |
| Channel Events: | Channel-related messages that are handled by the channel manager (e.g., channel request, channel accepted, channel closed). |
| Data Events: | Events related to data communication (e.g., data sent, receive completed). These events are handled by the channel handlers. Each virtual channel has a channel handler. |

Session Handler Messages

The following messages are generated in response to the various connection related functions:

| | | |
|---|---|---|
| CONN_REQUESTED | | |
| wParam | Connection handle | |
| lparam | Pointer to incoming connection information structure: | |
| | { | |
| | WORD | Session handle |
| | LPTADDR | Pointer to caller's address |
| | LPCONN_CHR | Pointer to connection attributes |
| | } | |
| CONN_ACCEPTED | Response to MakeConnection or AcceptConnection request. | |
| wParam | Connection handle | |
| lParam | Pointer to connection information structure: | |
| | { | |
| | DWORD | TransId (specified by user in earlier request) |
| | LPCONN_CHR | Pointer to connection attributes |
| | } | |
| CONN_REJECTED | Response to MakeConnection request. | |
| wParam | Reason | |
| lParam | TransId (specified by application in earlier request | |
| CONN_TIMEOUT | Response to MakeConnection request). | |
| lParam | TransId (specified by application in earlier request) | |
| CONN_ERROR | Indication of connection closed due to fatal error. | |
| wParam | Connection handle | |
| lParam | Error | |
| CONN_CLOSED | Indication of remote Close. | |
| wParam | Connection handle | |
| CONN_CLOSE_RESP | Response to CloseConnection request. | |
| wParam | Connection handle | |
| lParam | TransId (specified by application in earlier Close request) | |
| SESS_CLOSED | Response to EndSession request. | |
| wParam | Session handle | |

Channel Manager Messages

The following messages are generated in response to the various channel management functions as described with the function definitions:

| | | |
|---|---|---|
| CHAN_REQUESTED | Indication of remote OpenChannel request. | |
| wParam | Channel handle | |
| lparam | Pointer to Channel Request information structure: | |
| | { | |
| | DWORD | TransId (to be preserved in Accept/RejectChannel) |

|  |  |
|---|---|
|  | HCONN           Connection handle |
|  | LPCHAN_INFO    Pointer to CHAN_INFO passed by remote application |
|  | } |
| CHAN_ACCEPTED | Response to OpenChannel request. |
| wParam | Channel handle |
| lParam | TransID specified by application in OpenChannel request |
| CHAN_REJECTED | Response to OpenChannel request. |
| lParam | TransID specified by application in OpenChannel request. |
| CHAN_CLOSED | Indication of remote CloseChannel. |
| wParam | Channel handle |
| CHAN_CLOSE_RESP | Response to CloseChannel request. |
| wParam | Channel handle |
| lParam | TransID specified by application in CloseChannel |

Channel Handler Messages

The following messages are generated in response to the various channel I/O functions as described with the function definitions:

| | |
|---|---|
| CHAN_DATA_SENT | Response to SendData. |
| wParam | Actual bytes sent |
| lParam | TransID specified by application in SendData |
| CHAN_RCV_COMPLETE | Response to ReceiveData. |
| wParam | Actual bytes received |
| lParam | TransID specified by application in ReceiveData |
| CHAN_DATA_LOST | |
| wParam | Bytes discarded |
| lParam | TransID specified by application |

Data Structures

The following are the important data structures for the comm subsystem:

| | |
|---|---|
| TADDR, KPTADDR: | Address structure for caller/callee. |
| CHAN_INFO, LPCHAN_INFO: | Channel information structure. |
| CONN_CHR, LPCONN_CHR: | Connection Attributes structure. |

The comm subsystem provides two different methods of event notification to the conferencing applications: Microsoft® Windows messages and callbacks. A conferencing application program instructs the comm subsystem as to which method should be used for notification of different events. Microsoft® Windows messages employ the Microsoft® Windows messaging mechanism to notify the conferencing application that an event has occurred. For callbacks, the comm subsystem calls a user procedure when an event has taken place. There are restrictions on what the conferencing application may or may not do within a callback routine.

Figure 19:
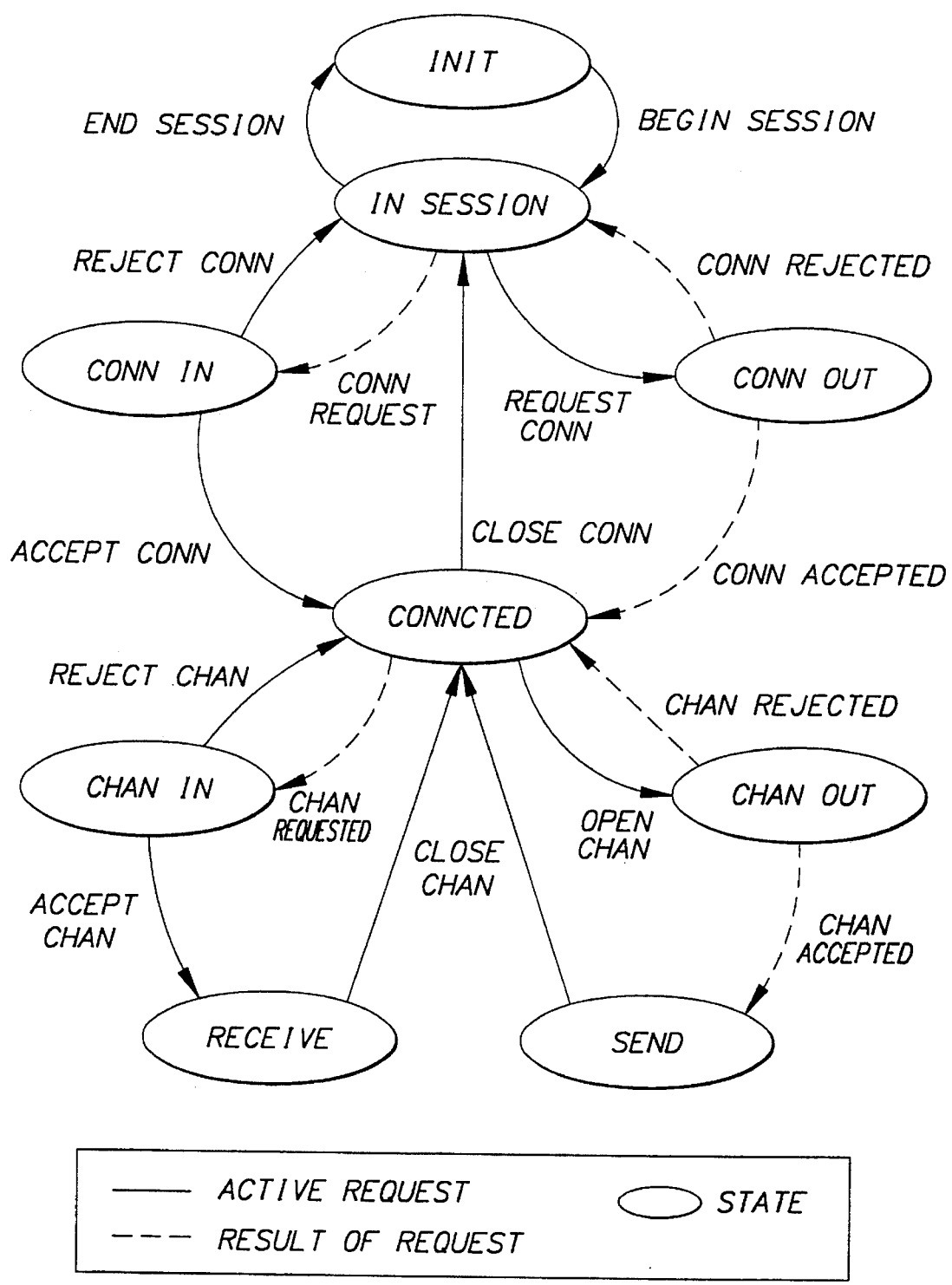
FIG. 19 is a representation of the comm subsystem application FSM for a conferencing session between a local site and a remote site.

Referring now to FIG. 19, there is shown a representation of the comm subsystem application finite state machine (FSM) for a conferencing session between a local conferencing system (i.e., local site or caller) and a remote conferencing system (i.e., remote site or callee), according to a preferred embodiment of the present invention. The possible application states are as follows:

| | |
|---|---|
| INIT | Initial or null state |
| IN_SESSION | Conferencing session begun |
| CONN_IN | Incoming connection request received from remote site |
| CONN_OUT | Outgoing connection request made to remote site |
| CONNCTED | Connection accepted (by local site for incoming connection and by remote site for outgoing connection) |
| CHAN_IN | Incoming channel request received from remote site |
| CHAN_OUT | Outgoing channel request made to remote site |
| RECEIVE | Incoming channel accepted by local site |
| SEND | Outgoing channel accepted by remote site |

Figure 20:
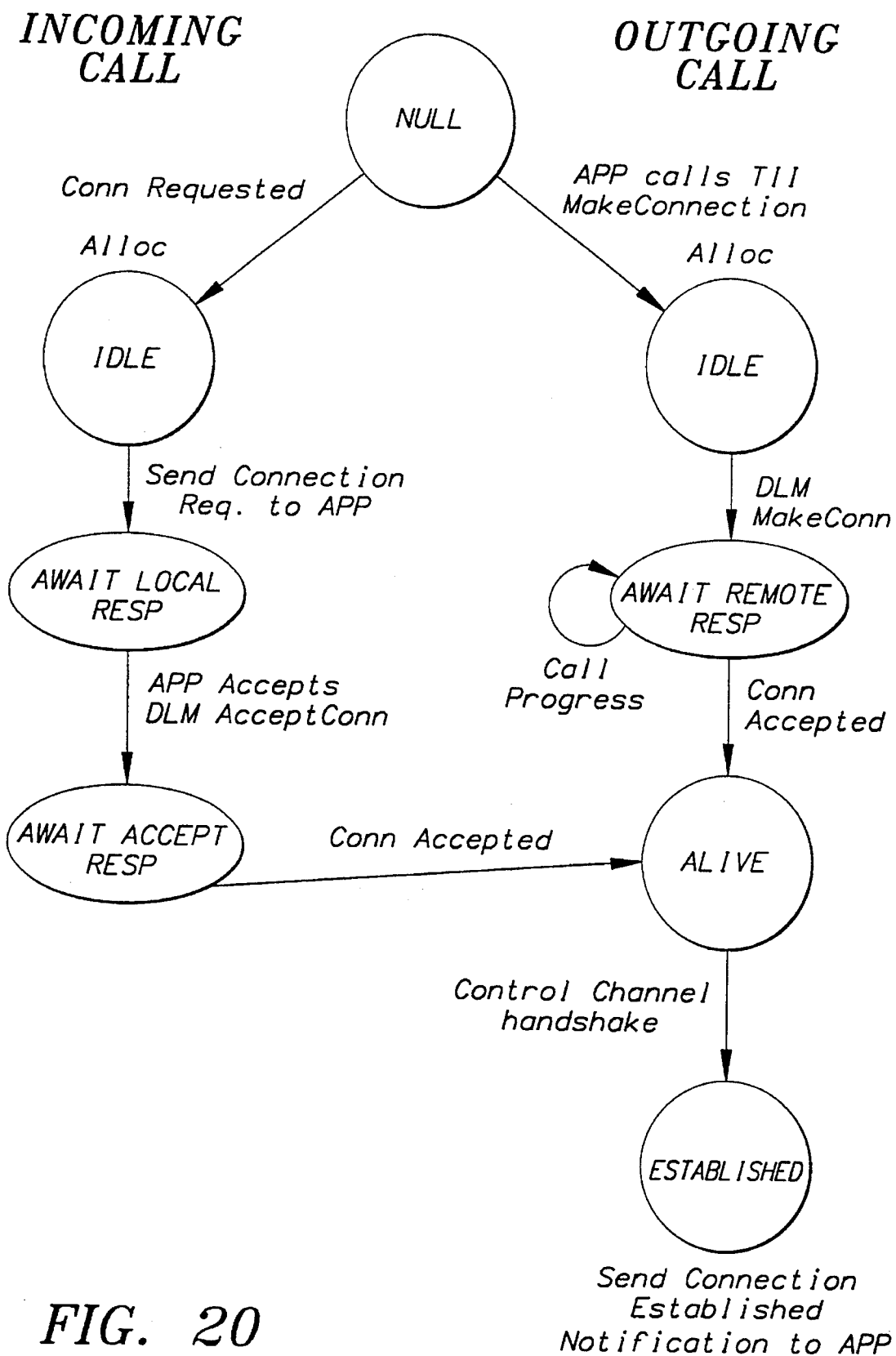
FIG. 20 is a representation of the comm subsystem connection FSM for a conferencing session between a local site and a remote site.

Referring now to FIG. 20, there is shown a representation of the comm subsystem connection FSM for a conferencing session between a local site and a remote site, according to a preferred embodiment of the present invention. The possible connection states are as follows:

| | |
|---|---|
| NULL | Null state |
| IDLE | Idle state |
| AWAIT_LOCAL_RESP | Awaiting response from local site |
| AWAIT_ACCEPT_RESP | Awaiting acceptance response |
| AWAIT_REMOTE_RESP | Awaiting response from remote site |
| ALIVE | Connection is alive |
| ESTABLISHED | Connection is established |

Figure 21:
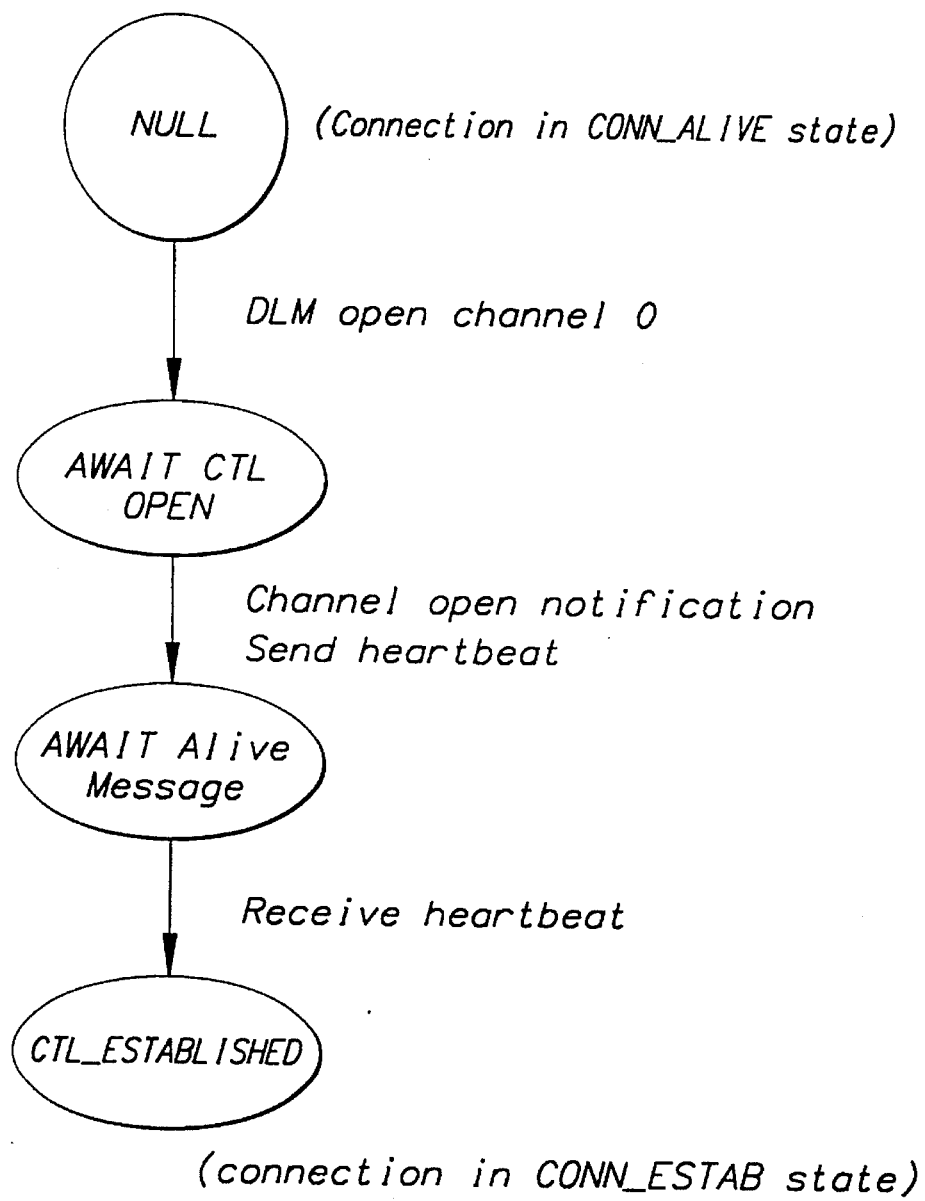
FIG. 21 is a representation of the comm subsystem control channel handshake FSM for a conferencing session between a local site and a remote site.

Referring now to FIG. 21, there is shown a representation of the comm subsystem control channel handshake FSM for a conferencing session between a local site and a remote site, according to a preferred embodiment of the present invention. The possible control channel handshake states are as follows:

| | |
|---|---|
| NULL | Null state |
| AWAIT_CTL_OPEN | Awaiting opening of control channel 0 |
| AWAIT_ALIVE_MESSAGE | Awaiting message that control channel is alive |
| CTL_ESTABLISHED | Control channel established |

Figure 22:
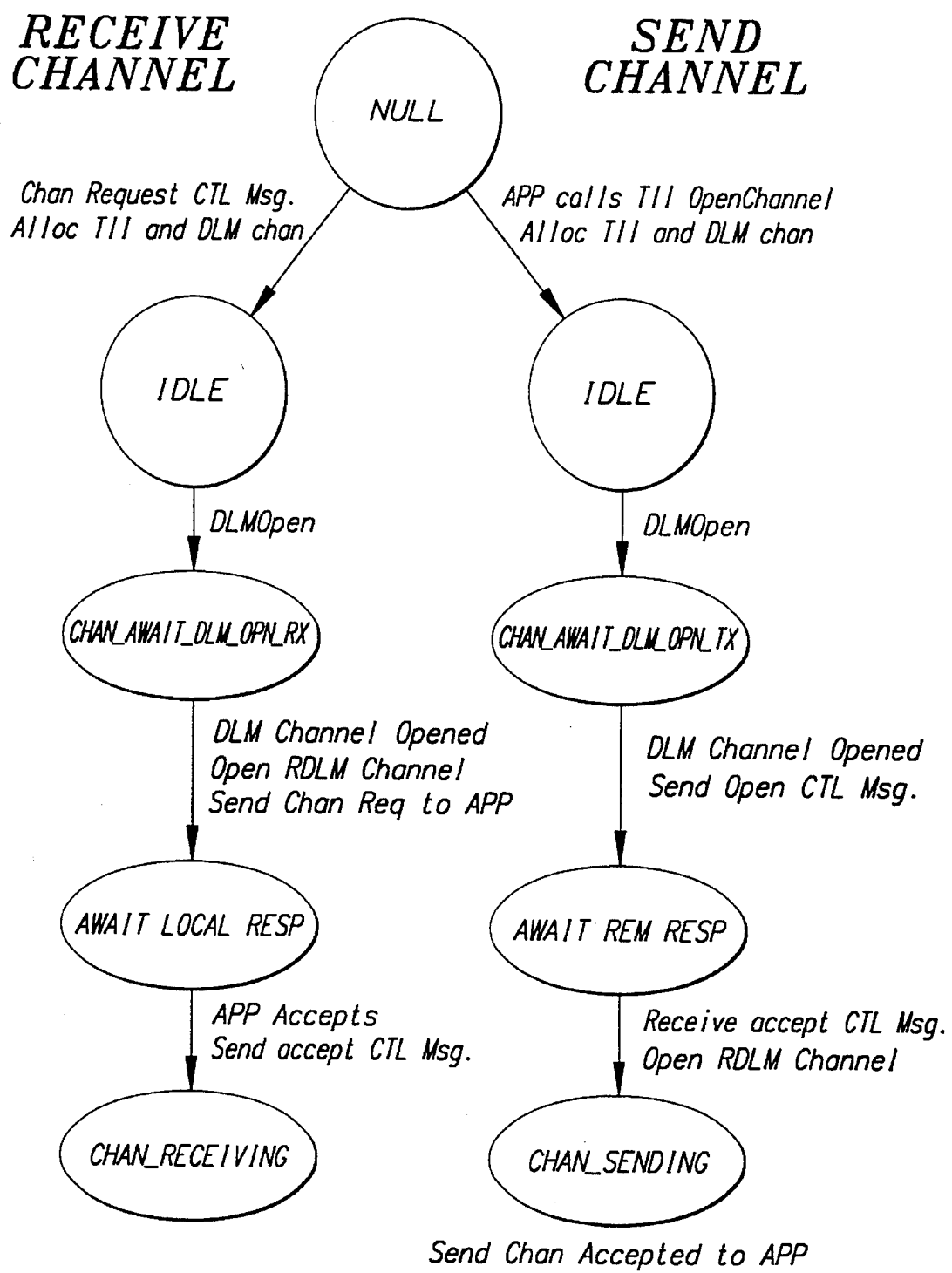
FIG. 22 is a representation of the comm subsystem channel establishment FSM for a conferencing session between a local site and a remote site.

Referring now to FIG. 22, there is shown a representation of the comm subsystem channel establishment FSM for a conferencing session between a local site and a remote site, according to a preferred embodiment of the present invention. The possible channel establishment states are as follows:

| | |
|---|---|
| NULL | Null state |
| IDLE | Idle state |
| CHAN_AWAIT_DLM_OPN_RX | Awaiting DLM to open receive channel |
| AWAIT_LOCAL_RESP | Awaiting local application response to request to open receive channel |
| CHAN_RECEIVING | Receive channel open |

| | |
|---|---|
| CHAN_AWAIT_DLM_OPN_TX | Awaiting DLM to open send channel |
| AWAIT_REM_RESP | Awaiting remote application response to request to open send channel |
| CHAN_SENDING | Send channel open |

Figure 23:
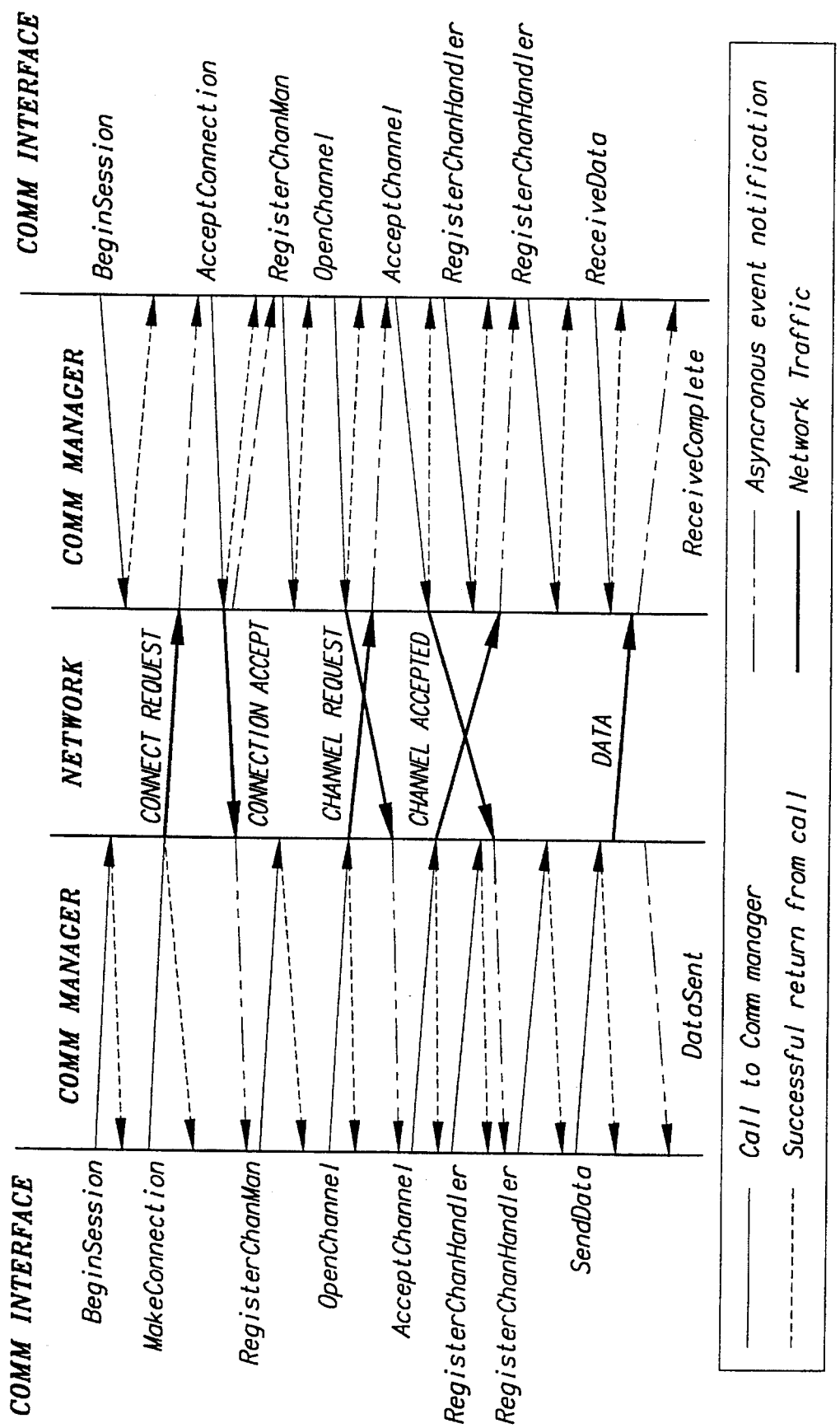
FIG. 23 is a representation of the comm subsystem processing for a typical conferencing session between a caller and a callee.

Referring now to FIG. 23, there is shown a representation of the comm system processing for a typical conferencing session between a caller and a callee, according to a preferred embodiment of the present invention. Both the caller and callee call the BeginSession function to begin the conferencing session. The caller then calls the MakeConnection function to initiate a connection to the callee, which causes a ConnectRequest message to be sent to the callee. The callee responds by calling the AcceptConnection function, which causes a ConnectAccept message to be sent to the caller and the callee.

Both the caller and callee then call the RegisterChanMan function to register the channel. Both the caller and callee then call the OpenChannel function to open a channel to the other, which causes ChannelRequest messages to be exchanged between the caller and callee. Both the caller and callee call the AcceptChannel function to accept the channel requested by the other, which causes ChannelAccepted messages to be exchanged between the caller and callee. Both the caller and callee call the RegisterChanHandler function two times to register both the incoming and outgoing channels.

The callee calls the ReceiveData function to be ready to receive data from the caller. The caller then calls the SendData function, which causes conferencing data to be sent to the callee. The caller receives a locally generated DataSent message with the sending of the data is complete. The callee receives a ReceiveComplete message when the receipt of the data is complete. Note that the caller does not receive a message back from the callee that the data was successfully received by the callee.

The scenario of FIG. 23 is just one possible scenario. Those skilled in the art will understand that other scenarios may be constructed using other function calls and state transitions.

Comm Manager

The comm manager 518 of FIG. 5 comprises three dynamically linked libraries of FIG. 17: transport independent interface (TII), reliable datalink module (RDLM.DLL) and datalink module interface (DLM.DLL). The DLM interface is used by the TII to access the services of the ISDN audio/comm board 206. Other modules (i.e., KPDAPI.DLL and DSP.DRV) function as the interface to the audio/comm board and have no other function (i.e., they provide means of communication between the host processor portion of the DLM and the audio/comm portion of the DLM. The host processor portion of the DLM (i.e., DLM.DLL) uses the DSP interface 528 of FIG. 5 (under Microsoft® Windows 3.x) to communicate with the ISDN audio/comm board side portions. The DLM interface and functionality must adhere to the DLM specification document.

The TII provides the ability to specify whether or not a virtual channel is reliable. For reliable channels, TII employs the RDLM to provide reliability on a virtual channel. This feature is used to indicate that the audio and video virtual channels are unreliable, and the data virtual channel is reliable.

Data Link Manager

The DLM subsystem maintains multiple channels between the clients and supports data transfers up to 64K per user message. The upper layer using DLM assumes that message boundaries are preserved (i.e., user packets are not merged or fragmented when delivered to the upper layer at the remote end).

Before data can be transferred via DLM, the two communicating machines each establish sessions and a connection is set up between them. This section details the functions used to establish sessions and connections. DLM provides the following functions for call control:

DLM_BeginSession
DLM_EndSession
DLM_Listen
DLM_MakeConnection
DLM_AcceptConnection
DLM_RejectConnection
DLM_CloseConnection The following calls should be allowed in an interrupt context: DLM_MakeConnection, DLM_AcceptConnection, DLM_RejectConnection, and DLM_CloseConnection. These functions may generate the following callbacks to the session callback handler, described below.

CONN_REQUESTED
CONN_ESTABLISHED
CONN_REJECTED
CONN_CLOSE COMPLETE
CONN_CLOSE NOTIFY
SESS_CLOSED
SESS_ERROR
CONN_ERROR

Most of the session and connection management functions of the DLM are asynchronous. They initiate an action and when that action is complete, DLM will call back to the user via the session callback. The calling convention for the callback is as follows:

```
void FAR PASCAL ConnectionCallback (LPEVENTSTRUCT Event);
    Event is a far pointer to a structure:
    struct EVENTSTRUCT
    {
        WORD      EventType;
        WORD      Status;
        BYTE      DlmId;
        BYTE      MdmId;
        DWORD     DlmSessionId;
        DWORD     DlmConnId;
        DWORD     Token;
        LPTADDR   Addr;
        LPCONNCHR Characteristics;
    }
where:
```

| | |
|---|---|
| EventType | Specifies the type of event which triggered the callback. |
| Status | Indicates the status of the event. |
| DlmId | Unique ID of the DLM performing the callback. (Equals 0 for ISDN.) |
| MdmId | Unique ID of the MDM that processed the event. (Equals 0 for ISDN.) |
| DlmSessionId | Indicates the Session ID, assigned by DLM, on which this event occurred. (Equals 0 for ISDN.) |
| DlmConnId | Indicates the Connection Id, assigned by DLM, on which this event occurred. (Equals 0 for ISDN.) |

| | |
|---|---|
| Token | The token value was given in the call to initiate an action. When the callback notifies the user that the action is complete, the token is returned in this field. |
| Addr | Specifies the LPTADDR of the caller. |
| Characteristics | This field is a LPCONNCHR to the connection characteristics. |

For each function defined below which generates a callback, all of the fields of the DLM event structure are listed. If a particular field contains a valid value during a callback, an X is placed in the table for the callback. Some fields are only optionally returned by the DLM (and underlying MDMs). Optional fields are noted with an 'O' in the tables. If a pointer field is not valid or optionally not returned the DLM will pass a NULL pointer in its place. The upper layer should not assume that pointer parameters such as LPEVENTSTRUCT, LPTADDR, and LPCONNCHR are in static memory. If the upper layer needs to process them in a context other than the callback context it should make a private copy of the data.

```
DLM_BeginSession:     Prepares DLM for subsequent connection
                      establishment. it is done at both ends
                      before a connection is made or accepted.
WORD DLM_BeginSession       (BYTE       DlmId,
                             BYTE       MdmId,
                             LPTADDR    LocalAddress
                             FARPROC    SessionCallback,
                             LPDWORD    lpDlmSessionId);
Parameters:
DlmId:            Global identifier of the DLM that is to be used.( = 0
                  for ISDN)
MdmId:            Global identifier of the MDM that is to be used.( = 0
                  for ISDN)
LocalAddress      Far Pointer to a TADDR at which the local
                  connection will be made. This may not be relevant
                  for DLMs such as ISDN.
SessionCallback   Callback function for the session responses.
lpDlmSessionId    Output parameter, the session ID allocated.
                  (ISDN will return a Session Id = 0). Only a
                  single session need be supported by ISDN.
Return Value:     Status Indication
E_NOSESSION       Session could not be opened.
E_IDERR           DlmID parameter does not match the DLM ID of the
                  called library.
Local Callbacks:
None
Peer Callbacks:
None
This function does not perform a listen. Session IDs are unique
across all DLMs. Uniqueness is guaranteed.
DLM_EndSession:   Ends the specified session at the given
                  address. Any outstanding connections and/or
                  channels on the session and their callbacks
                  are completed before the local SESS_CLOSED
                  callback.
WORD      DLM_EndSession (DWORD DlmSessionId);
Parameters:
DlmSessionId:          Session identifier returned in DLM_BeginSession
Return Value:          Status Indication
E_SESSNUM              DlmSessionID is not valid.
E_SESSUNUSED           Session is not in use.
E_SESSCLOSED           Session has been closed.
E_SESSNOTOPEN          Session is not open.
E_IDERR                Session is not active on this DLM.
Local Callbacks:
SESS_CLOSED
Event Parameter       SESS_CLOSED
EventType                  X
Status                     X
DlmId                      X
MdmId                      X
DLMSessionId               X
DLMConnId
Token
Addr
Characteristics
Peer Callbacks:
    NONE
DLM_Listen:   Initiates a listen on the specified connection.
              When an incoming connection request arrives,
              asynchronous notification is done to the Session
              callback function. The Listen stays in effect
              until DLM_EndSession is performed.
WORD DLM_Listen       (DWORD     DlmSessionId,
                       LPCONNCHR Characteristics);
```

-continued

```
Parameters:
DlmSessionID      Session identifier returned in
                  DLM _BeginSession.
Characteristics   Desired characteristics of an incoming
                  connection. Passed uninterpreted to the
                  lower layers.
Return Value:           Status indication
E_SESSNUM               DlmSessionID is not valid.
E_SESSUNUSED            Session is not in use.
E_SESSCLOSED            Session has been closed.
E_SESSNOTOPEN           Session is not open.
E_IDERR                 Session is not active on this DLM.
Local Callbacks:
    CONN_REQUESTED
Event Parameter       CONN_REQUESTED
EventType                    X
Status                       X
DlmId                        X
MdmId                        X
DLMSessionId                 X
DLMConnId                    X
Token
Addr                         X
Characteristics              X
Peer Callbacks:
None
DLM_MakeConnection:    Makes a connection to the specified address.
                       It generates a callback when the connection
                       is complete which provides the DLM connection
                       ID to be used in all further operations on
                       this connection. Connection IDs are unique
                       across all DLMs. Uniqueness is guaranteed.
                       (ISDN support a single connection, with a
                       Connection Id = 0).
WORD DLM_MakeConnection     (DWORD        DlmSessionId,
                             LPCONNCHR    Characteristics,
                             DWORD        Token,
                             LPTADDR      RemoteAddress);
Parameters:
DlmSessionID:     Session identifier returned in
                  DLM_BeginSession,
Characteristics   Desired characteristics of the connection.
                  Passed uninterpreted to the lower layers.
Token             Uninterpreted token returned to the upper
                  layer in the response callback.
RemoteAddress     Address on the remote site on which to make
                  the connection.
Return Value:           Status Indication
E_SESSNUM               DlmSessionID is not valid.
E_SESSUNUSED            Session is not in use.
E_SESSCLOSED            Session has been closed.
E_SESSNOTOPEN           Session is not open.
E_IDERR                 Session is not active on this DLM.
E_NOCONN                Unable to allocate local connection.
Local Callbacks:
    CONN_ESTABLISHED
    CONN_REJECTED
Event Parameter      CONN_REJECTED       CONN_ESTABLISHED
EventType                   X                    X
Status                      X                    X
DlmId                       X                    X
MdmId                       X                    X
DLMSessionId                X                    X
DLMConnId                                        X
Token                       X                    X
Addr                                             O
Characteristics                                  X
Peer Callbacks:
CONN_REQUESTED Satisfies a previous DLM_Listen on this address.
Event Parameter      CONN_REQUESTED
EventType                   X
Status                      X
DlmId                       X
MdmId                       X
DLMSessionId                X
DLMConnId                   X
Token
Addr                        X
Characteristics             X
DLM_AcceptConnection:   Accepts an incoming connection request.
```

```
WORD DLM_AcceptConnection        (DWORD DlmConnID,
                                  DWORD Token);
Parameters:
DlmConnID:        Connection identifier returned previously in the
                  CONN_REQESTED callback.
Token             Uninterpreted DWORD returned to the caller in the
                  CONN_ESTABLISHED response callback.
Return Value:     Status Indication
E_SESSNUM         ConnID is not valid.
E_SESSUNUSED      Session is not in use.
E_SESSNOTOPEN     Session is not open.
E_IDERR           ConnID does not refer to a connection on this DLM.
E_CONNNUM         ConnID is not valid.
E_CONNUNUSED      Connection is not in use.
E_CONNSTATE       Connection has been closed or is already open.
Local Callbacks:
    CONN_ESTABLISHED
Event Parameter     CONN_ESTABLISHED
EventType                   X
Status                      X
DlmId                       X
MdmId                       X
DLMSessionId                X
DLMConnId                   X
Token                       X
Addr                        O
Characteristics             X
Peer Callbacks:
CONN_ESTABLISHED    Satisfies a previous DLM_MakeConnection on
                    this address.
Event Parameter     CONN_ESTABLISHED
EventType                   X
Status                      X
DlmId                       X
MdmId                       X
DLMSessionId                X
DLMConnId                   X
Token                       X
Addr                        O
Characteristics             X
DLM_RejectConnection:   Rejects an incoming connection request.
                        It returns a WORD status.
WORD DLM_RejectConnection(DWORD DlmConnId);
Parameters:
DlmConnID:        Connection identifier returned in the
                  CONN_REQESTED callback.
Return Value:     Status Indication
E_SESSNUM         ConnID is not valid.
E_SESSUNUSED      Session is not in use.
E_SESSNOTOPEN     Session is not open.
E_IDERR           ConnID does not refer to a connection on this DLM.
E_CONNNUM         ConnID is not valid.
E_CONNUNUSED      Connection is not in use.
E_CONNSTATE       Connection has been closed or is already open.
Local Callbacks:
    None
Peer Callbacks:
CONN_REJECTED     Satisfies a previous DLM_MakeConnection on this
                  address.
Event Parameter     CONN_REJECTED
EventType                   X
Status                      X
DlmId                       X
MdmId                       X
DLMSessionId                X
DLMConnId
Token                       X
Addr
Characteristics
DLM_CloseConnection:    Tears down an established connection.
                        This call is allowed only for
                        connections that are established.
WORD DLM_CloseConnection        (DWORD DlmConnId,
                                 DWORD Token);
Parameters:
DlmConnID:        Connection identifier returned in the
                  CONN ESTABLISHED callback or through a call to
                  DLM_MakeConnection.
Token             Uninterpreted value returned to the upper layer in
                  the response callback.
```

```
Return Value:         Status Indication
E_SESSNUM             ConnID is not valid.
E_SESSUNUSED          Session is not in use.
E_SESSNOTOPEN2        Session is not open.
E_IDERR               ConnID does not refer to a connection on this DLM.
E_CONNNUM             ConnID is not valid.
E_CONNUNUSED          Connection is not in use.
E_CONNCLOSED          Connection has been closed already.
Local Callbacks:
    CONN_CLOSE_COMPLETE
Event Parameter       CONN_CLOSE_COMPLETE
EventType             X
Status                X
DlmId                 X
MdmId                 X
DLMSessionId          X
DLMConnId             X
Token                 X
Addr
Characteristics
Peer Callbacks:
CONN_CLOSE_NOTIFY
Event Parameter       CONN_CLOSE_NOTIFY
EventType             X
Status                X
DlmId                 X
MdmId                 X
DLMSessionId          X
DLMConnId             X
Token
Addr
Characteristics
```

Referring now to FIG. 29, there are shown diagrams indicating typical connection setup and teardown sequences.

Interfaces—Channel Management & Data Transfer

Once connections are established between two machines, DLM will provide the user with multiple logical channels on the connections. This section details the functions and callbacks used to set up, tear down, and send data on channels. DLM has the following entry points for channel management and data transfer.

DLM_Open

DLM_Send

DLM_PostBuffer

DLM_Close

DLM_GetCharacteristics

Each of these functions is callable from an interrupt or callback context. These functions generate callbacks into the user's code for completion of a send operation, receipt of data, and events occurring on a given channel. These callbacks are described and their profiles given a later section of this specification.

```
DLM Open       Initializes a new data channel for a connection. It
               does not communicate with the remote site. Its role is
               simply to declare the channel identifier to the DLM
               so that incoming and outgoing packets can then use
               the given channel.
WORD DLM_Open   (DWORD ConnID,
                BYTE ChannelID,
                LPCHANCHR Characteristics,
                FARPROC EventCallback,
                FARPROC ReceiveCallback,
                FARPROC SendCallback)
Parameters:
ConnID:        Connection on which to open the channel.
ChannelID      Identifier of the channel to open, between
               0 and N where N is implementation
               defined. The value of 255 is reserved to
               indicate an unknown or invalid channel in
               callback functions.
Characteristics Desired characteristics of the channel.
EventCallback  Callback function for events occurring on
               this channel. (This includes all events
               except for data received and send
               complete)
ReceiveCallback Callback function for data reception on
               this channel.
SendCallback   Callback function for data sent on this
               channel.
Return Value:  Status Indication
E_NOCHAN       Unable to allocate channel ID or ID
               already in use.
E_SESSNUM      ConnID is not valid.
E_SESSUNUSED   Session is not in use.
E_SESSCLOSED   Session has been closed.
E_SESSNOTOPEN  Session is not open.
E_IDERR        ConnID does not refer to a connection
               on this DLM.
E_CONNNUM      ConnID is not valid.
E_CONNUNUSED   Connection is not in use.
E_CONNCLOSED   Connection has been closed.
E_CONNNOTOPEN  Connection is not currently open.
Local Callbacks:
    CHANNELOPEN callback to the event callback for this
channel.
DLM_Send       Entry point for sending data via the DLM.
WORD DLM_Send   (DWORD ConnID,
                BYTE FAR *Buffer,
                WORD BufferSize,
                BYTE OriginatingChannel,
                BYTE ReceivingChannel,
                DWORD CallerToken)
Parameters:
ConnID:        Connection to use.
Buffer         Far pointer to the user buffer to send.
BufferSize     Number of bytes in the user buffer.
OriginatingChannel Local channel on which to send the data.
ReceivingChannel Channel ID from the remote machine which
               receives the data.
CallerToken    Token which will be returned to the user in
```

| | the send complete callback for this buffer. |
|---|---|
| Return Value: | Status Indication |
| E_NOCHAN | Originating channel is not valid or is closed. |
| E_SESSNUM | ConnID is not valid. |
| E_SESSUNUSED | Session is not in use. |
| E_SESSCLOSED | Session has been closed. |
| E_SESSNOTOPEN | Session is not open. |
| E_IDERR | ConnID does not refer to a connection on this DLM. |
| E_CONNNUM | ConnID is not valid. |
| E_CONNUNUSED | Connection is not in use. |
| E_CONNCLOSED | Connection has been closed. |
| E_CONNNOTOPEN | Connection is not currently open. |
| E_CHANNUM | Originating channel ID is not valid. |
| E_CHANUNUSED | Originating channel is not in use. |
| E_CHANCLOSED | Originating channel is closed. |
| E_NOMEM | Unable to allocate enough memoly to perform the send. |
| E_INTERNAL | An internal error has occurred within the DLM. |
| Local Callbacks: | |
| Callback to the send complete function for this channel when this buffer is posted to the net. | |

The return value of DLM_Send specifies the synchronous status of the send. If it indicates success, the request has been accepted to be sent on the network for this channel and at some time the send complete callback will be activated for this buffer. Between the call to DLM_Send and the send complete callback, the user must not change the contents of the buffer. When the callback occurs, DLM is finished with the buffer and the user is free to alter it in any fashion. The DLM does not guarantee that the call to DLM_Send completes before the send complete callback occurs. If the synchronous status indicates that the send operation has failed, the send complete callback will not be activated for this buffer and the buffer is immediately available for modification by the user.

| DLM_PostBuffer | Supplies buffers to DLM in which to place incoming data. |
|---|---|
| WORD DLM_PostBuffer | (DWORD ConnID, BYTE FAR *Buffer, WORD BufferSize, BYTE ChannelID, DWORD CallerToken) |
| Parameters: | |
| ConnID: | Connection to use. |
| Buffer | Far pointer to the user buffer to use. |
| BufferSize | Size of the user buffer in bytes. |
| ChannelID | Local channel to use this buffer for. |
| CallerToken | Token which will be returned to the user in the data receive callback for this buffer. |
| Return Value: | Status Indication |
| E_NOCHAN | ChannelID is not valid or is closed. |
| E_SESSNUM | ConnID is not valid. |
| E_SESSUNUSED | Session is not in use. |
| E_SESSCLOSED | Session has been closed. |
| E_SESSNOTOPEN | Session is not open. |
| E_IDERR | ConnID does not refer to a connection on this DLM. |
| E_CONNNUM | ConnID is not valid. |
| E_CONNUNUSED | Connection is not in use. |
| E_CONNCLOSED | Connection has been closed. |
| E_CONNNOTOPEN | Connection is not currently open. |
| E_CHANNUM | ChannelID is not valid. |
| E_CHANUNUSED | Channel is not in use. |
| E_CHANCLOSED | Channel is closed. |
| E_NOMEM | Unable to allocate enough memory to store the buffer. |
| E_INTERNAL | An internal error has occurred within the DLM. |
| Local Callbacks: | |
| Callback to the data receive function for this channel when DLM loads the user buffer with incoming data. | |

The return value is a word indicating the status of the operation. If it indicates success, the buffer has been enqueued for the given channel and will be used for incoming data. If it indicates failure, a receive callback will never occur for this buffer. DLM preserves the order of buffers on data receives. Provided that no errors occur, the first buffer posted will be the first one used for data, the second one will be the second used, etc.

| DLM_Close | Used to close a previously opened channel. |
|---|---|
| WORD DLM_Close | (WORD ConnID, BYTE Channel) |
| Parameters: | |
| ConnID: | Connection on which to close the channel. |
| Channel | Local channel to close. |
| Return Value: | Status Indication |
| E_SESSNUM | ConnID is not valid. |
| E_SESSUNUSED | Session is not in use. |
| E_SESSCLOSED | Session has been closed. |
| E_SESSNOTOPEN | Session is not open. |
| E_IDERR | ConnID does not refer to a connection on this DLM. |
| E_CONNNUM | ConnID is not valid. |
| E_CONNUNUSED | Connection is not in use. |
| E_CONNCLOSED | Connection has been closed. |
| E_CONNNOTOPEN | Connection is not currently open. |
| E_CHANNUM | Channel is not valid. |
| E_CHANUNUSED | Channel is not in use. |
| E_CHANCLOSED | Channel is already closed. |
| Local Callbacks: | |
| Callback to the event callback function for this channel with the CHANNELCLOSED event after the close has completed. | |

The function DLM_Close shuts down a given channel. All future references to this channel are considered invalid. It performs a forced shutdown in that the callback functions for all pending sends and receives are immediately activated with a status value indicating that a close occurred. DLM does not guarantee that the call to DLM_Close will return before the callback is activated.

| DLM_GetCharacteristics | Gets relevant data about the DLM (a synchronous call). |
|---|---|
| WORD DLM_GetCharacteristics(LPCEMSTRUCT Characteristics) | |
| Parameters: | |
| LPCHARSTRUCT | Far pointer to the characteristics structure to be filled by this call. |
| Local Callbacks: | |
| None | |

Send Callback

The send complete callback is activated whenever data has been extracted from a user's buffer and enqueued for transmission. It is not a guarantee that the data has actually been delivered to the remote site. The entry point for the send complete callback is defined SendCallback parameter to DLM_Open. This is a far pointer to a far pascal function defined as follows.

| void FAR PASCAL SendCallback | (DWORD ConnID, BYTE FAR *BufferSent, WORD ByteCount, BYTE OriginatingChannel, BYTE ReceivingChannel, |
|---|---|

|  |  |
|---|---|
|  | DWORD Token, |
|  | WORD StatusOfSend) |
| Parameters: |  |
| ConnID: | Connection on which data was sent. |
| Buffer | Far pointer to the user buffer sent. |
| BufferSize | Number of bytes sent to the network. |
| OriginatingChannel | Local channel on which to the data was sent. |
| ReceivingChannel | Channel ID from the remote machine which will receive the data. |
| CallerToken | Token which was given in the call to DLM_Send for this buffer. |

Data Receive Callback

The data receive callback is activated when data has arrived on the network for a particular channel. The entry point for the data receive callback is defined in the ReceiveCallback parameter to DLM_Open, described below. It must be a far pointer to a far pascal function defined as follows:

|  |  |
|---|---|
| void FAR PASCAL ReceiveCallback | (DWORD ConnID, |
|  | BYTE FAR *BufferReceived, |
|  | WORD ByteCount, |
|  | BYTE OriginatingChannel, |
|  | BYTE ReceivingChannel |
|  | DWORD Token, |
|  | WORD StatusOfReceive) |
| Parameters: |  |
| ConnID: | Connection on which the data was received. |
| BufferReceived | The user supplied buffer that was received. |
| ByteCount | The number of bytes received. |
| OriginatingChannel | Channel identifier of the channel on the remote machine which sent the data. |
| ReceivingChannel | Channel identifier on the local machine that received the data. |
| Token | Token value that was given in DLM PostBuffer when this buffer was posted to DLM. |
| StatusOfReceive | Status of the operation. |
| The StatusOfReceive parameter can be any of the following values: |  |
| E_OK | Indicates that the receive succeeded. |
| E_TOOSMALL | Indicates that the beginning of a data packet has arrived and the given buffer was enqueued but it is too small to contain the entire data packet. |
| E_CLOSED | Indicates that the buffer was in the receive queue when the channel on the local machine was closed. |
| E_DATADROP | Indicates that a data packet has arrived and there is no buffer in the queue for the receiving channel. |
| E_PARTIAL | Indicates that part of a data packet has been dropped, either by the network or by internal memory limitations of the MDM or DLM. The buffer represents everything received up to the dropped data. |

The state of the parameters depends on the status of the operation. The table below lists all possible status values correlating them with the values returned in the other parameters, and entry of Valid indicates that this parameter contains meaningful data. The connection ID is always valid.

| Status | Buffer | ByteCount | Originating Channel | Receiving Channel | Token |
|---|---|---|---|---|---|
| E_OK | Valid | Valid | Valid | Valid | Valid |
| E_TOOSMALL | Valid |  |  | Valid | Valid |
| E_CLOSED | Valid |  |  | Valid | Valid |
| E_DATADROP | NULL |  |  | Valid | Valid |
| E_PARTIAL | Valid | Valid | Valid | Valid | Valid |

When errors E_TOOSMALL, E_DATADROP or E_PARTIAL are returned the upper layer may not depend on the contents of the returned data buffer.

|  |  |
|---|---|
| EventCallback | Activated when an action completes for a given channel. The entry point for the channel event callback is defined in the EventCallback parameter to DLM_Open. It is a far pointer to a far pascal function defined as follows. |

|  |  |
|---|---|
| void FAR PASCAL EventCallback | (DWORD ConnID, |
|  | BYTE Channel, |
|  | WORD Event, |
|  | WORD Status) |
| Parameters: |  |
| ConnID: | Connection on which the event occurred. |
| Channel | Channel on which the event occurred. |
| Event | The type of the event |
| Status | Status of the operation. |
| The event may be any of the following values. |  |
| CHANNEL_OPEN | The given channel has been opened and is now available for data transfer. |
| CHANNEL_CLOSED | The given channel has been closed. |

DSP Interface

The ISDN comm task 540 of FIG. 5 which run on the ISDN audio/comm board 206 of FIG. 2 communicate with the host processor 202 via the DSP interface 528. The host processor operates under Microsoft® Windows 3.x environment.

Comm Task

The comm task 540 of FIG. 5 communicates with the audio task 538 on the ISDN audio/comm board 206. The channel ID of the audio virtual channel is accessible to both the host processor and the audio/comm board. The model is as follows:

- A channel is opened by the host processor or an open channel request is granted by the host processor.
- The host processor signals the audio task on the audio/comm board that a channel is accepted/opened on its behalf.
- The audio task on the audio/comm board notifies the comm task that all incoming (if the channel was accepted) or outgoing (if the channel was opened) will be handled by the on-board audio task.

Application-Level Protocols

The application-level protocols for conferencing system 100 of FIG. 5 are divided into those for the video, audio, and data streams.

Video Protocol

Figure 24:
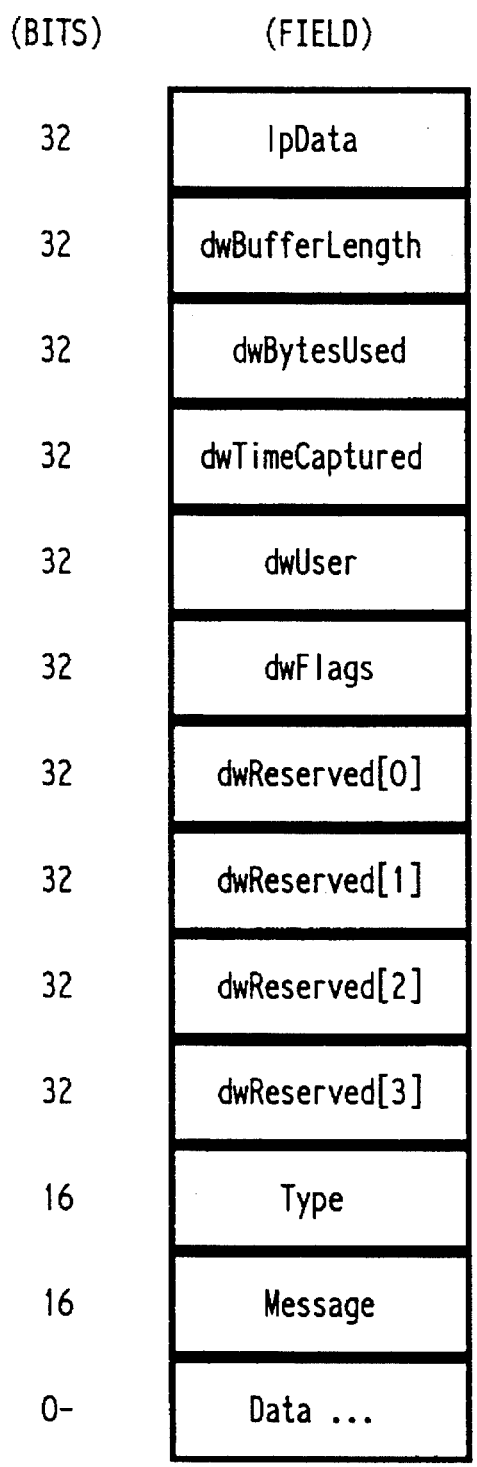
FIG. 24 is a representation of the structure of a video packet as sent to or received from the comm subsystem of the conferencing system of FIG. 5.

Referring now to FIG. 24, there is shown a representation of the structure of a video packet as sent to or received from the comm subsystem, according to a preferred embodiment of the present invention. Source video is video that is captured (and optionally monitored) on the local conferencing system and sent to the comm subsystem for transmission to a remote system. Sink video is video that is captured remotely, received from the comm subsystem, and played back on the local system. The first ten fields (i.e., those from lpData through dwReserved[3]) are defined by Microsoft® as the VIDEOHDR structure. See the Microsoft® Programmer's Guide in the Microsoft® Video for Windows Development Kit. The video packet fields are defined as follows:

video software redirects the VIDEOHDR lpData pointer to the Data array which starts at the end of the packet. In this way, the packet header and data are kept contiguous in linear memory. The VIDEOHDR dwBufferLength field is used to indicate the actual amount of video data in the buffer and therefore the amount of data to be sent/received. Note that the receiving application must redirect lpData to its copy of Data since the memory pointer only has local significance. In a preferred embodiment, Data length has an upper bound of 18K bytes.

Compressed Video Bitstream

Figure 25:
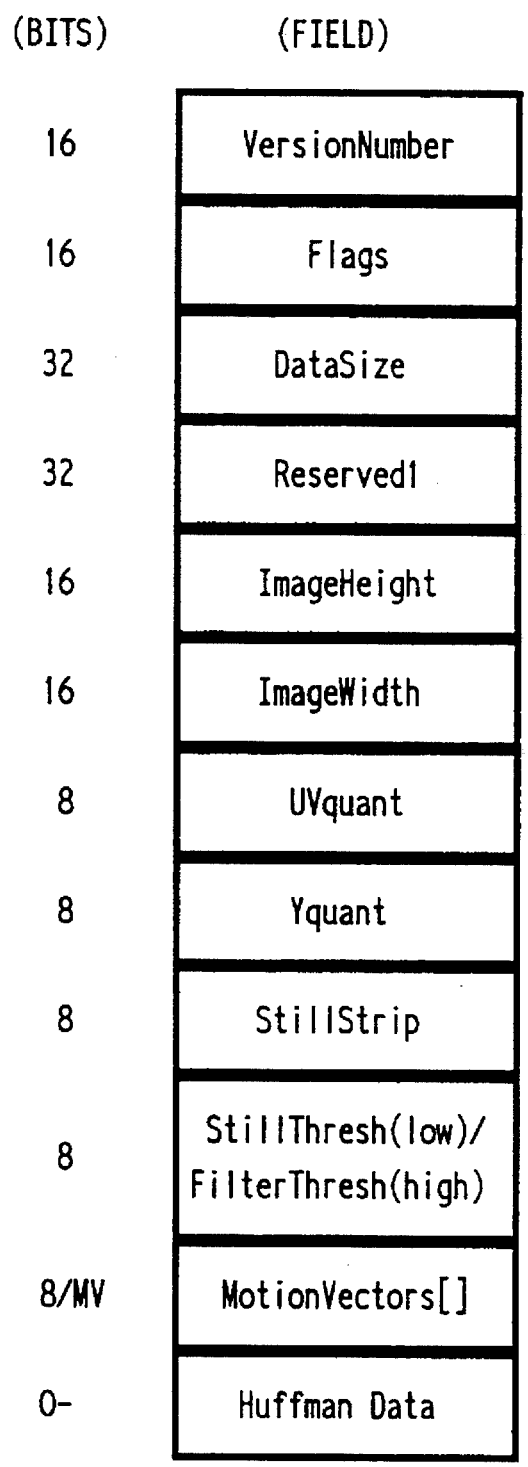
FIG. 25 is a representation of the compressed video bitstream for the conferencing system of FIG. 5.

Referring now to FIG. 25, there is shown a representation of the compressed video bitstream for conferencing system 100, according to a preferred embodiment of the present invention. Each compressed video bitstream represents one frame of video data stored in the Data field for a video data packet of FIG. 24. The video compression/decompression method associated with the compressed video bitstream of FIG. 25 is used for low-data-rate, relatively-low-frame-rate, teleconferencing applications. The method preferably operates at approximately (160×120) resolution, a data rate of approximately 100 Kb/sec, and a frame rate of around 10 frames/sec. Under these conditions, the compressed video bitstream may be encoded or decoded in real-time by an Intel® i750® processor, or decoded in real-time by an Intel® architecture processor such as an Intel® 80386, 80486, or Pentium® processor.

The fields of the compressed video bitstream of FIG. 25 are defined as follows:

| | |
|---|---|
| lpData | Long pointer to the video frame data buffer. |
| dwBufferLength | Length of the data buffer pointed to by lpData, in bytes. |
| dwBytesUsed | Length of bytes used in the data buffer. |
| dwTimeCaptured | Time, in milliseconds, between the current frame and the beginning of the capture session. This field is preferably used to carry a timestamp used to synchronize audio and video frames at the receiving endpoint. |
| dwUser | Reserved for application use. |
| dwFlags | Information about the data buffer, defined flags are:<br>VHDR_DONE     Data buffer is ready for the application.<br>VHDR_INQUEUE     Data buffer is queued pending playback.<br>VHDR_KEYFRAME     Data buffer is a key frame.<br>VHDR_PREPARED     Data buffer has been prepared for use by the driver. |
| dwReserved | Reserved for driver use. |
| Type | Type of the packet, defined types are:<br>VDATA (=1)     Video data packet.<br>VCNTL (=2)     Control packet. |
| Message | Unused for video data packets. For control packets, may be one of the following:<br>RESTART (=WM_USER+550h) Request for a key frame.<br>When a RESTART control packet is sent, no video frame data is sent. WM_USER is a Microsoft® Windows defined value and is preferably 400h. RESTART indicates the video stream needs to be restarted to recover from problems. WM_USER is a Microsoft°-defined constant, indicating that all values greater than this number are application-defined constants. |
| Data | Compressed video frame data. |

Video data packets are used to exchange actual video frame data and are identified by the Type field. In this case, the

| | |
|---|---|
| VersionNumber | Compression method ID. |
| Flags | Contains various flag bits defined as follows:<br>FLAGS_MV 1<br>FLAGS_FILTER 2<br>FLAGS_STILL_IMAGE 4<br>FLAGS_STILL_BLKS 8 |
| DataSize | Size of the bitstream in units of bits. |
| Reserved1 | Reserved field. |
| ImageHeight | Height of image in pixels. |
| ImageWidth | Width of image in pixels. |
| UVquant | Base quantization value for the U and V planes. |
| Yquant | Base quantization value for the Y plane. |
| StillStrip | Strip of blocks encoded as still blocks (for delta images only). If StillStrip = 0, there is no still strip. Otherwise, the strip of blocks is determined as follows. Consider the blocks of the Y, V, and U planes in raster order as a linear sequence of blocks. Divide this sequence of blocks into groups of 4 blocks, and number each group with the sequential integers 1, 2, 3, etc. These numbers correspond to the value of StillStrip. In a preferred embodiment, all planes have dimensions that are integer multiples of 4. |
| StillThresh | Locations of additional blocks in the image that are encoded as still blocks (only if the FLAGS_STILL_BLKS flag is set). The rule for identifying these blocks is based on the quantization value quant for each block as determined during the decoding procedure. A block is a still block if<br>    quant <= StillThresh<br>These still blocks are independent of the blocks in the still strip, which are encoded as still blocks regardless of their quant values. |
| FilterThresh | Blocks to which the loop filter is to be applied (only if the FLAGS_FILTER flag is set) The rule for applying the loop filter is to apply it to a block if<br>    quant <= FilterThresh |
| MotionVectors[] | Array describing the motion vectors used in decoding the image (only present if the FLAGS_MV flag is set). There is one 8_bit motion vector field for each (16×16) block in the image. |
| huffman data | The compressed data for the image. |

FLAGS_MV indicates whether motion vectors are present in the bitstream (i.e., whether the MotionVectors[] array is present). A delta frame with FLAGS_MV=0 is interpreted as one in which all the motion vectors are 0. FLAGS_FILTER indicates whether the loop filter is enabled for this image. If enabled, then the loop filter may be used on each block in the image, as determined by the value of FilterThresh. FLAGS_STILL_IMAGE indicates whether the image is a still frame or a delta (non-still) frame. A still frame is one in which all blocks are encoded as still blocks. In a delta frame, most blocks are delta blocks, but there may be a strip of still blocks in the image, as specified by the StillStrip field, and there may be additional still blocks as determined by the value of StillThresh. FLAGS_STILL_BLKS indicates whether "additional still blocks" are enabled for this image. If enabled, then any block with quantization value less than or equal to StillThresh is coded as a still block.

A quantization value is a number in the range 0–15 that indicates one of a set of sixteen (8×8) quantization matrices, with 0 indicating the coarsest quantization and 15 indicating the finest. The UVquant and Yquant variables are referred to as base quantization values. The base quantization value is the value selected for use at the beginning of a plane, and is used for the entire plane unless changed by a NEWQ code inserted in the bitstream. The preferred 16 quantization matrices are:

```
5 5 6 6 7 7 8 8
5 5 6 6 7 7 8 8
6 6 6 6 7 7 8 8
6 6 6 6 7 7 8 8
7 7 7 7 7 7 8 8
7 7 7 7 7 7 8 8
```

-continued

```
8 8 8 8 8 8 8 8
8 8 8 8 8 8 8 8
5 4 5 5 6 6 7 7
4 4 5 5 6 6 7 7
5 5 5 5 6 6 7 7
5 5 5 5 6 6 7 7
6 6 6 6 6 6 7 7
6 6 6 6 6 6 7 7
7 7 7 7 7 7 7 7
7 7 7 7 7 7 7 7
5 4 5 5 5 5 7 7
4 4 5 5 5 5 7 7
5 5 5 5 5 5 7 7
5 5 5 5 5 5 7 7
5 5 5 5 5 5 7 7
5 5 5 5 5 5 7 7
7 7 7 7 7 7 7 7
7 7 7 7 7 7 7 7
5 4 5 5 5 5 6 6
4 4 5 5 5 5 6 6
5 5 5 5 5 5 6 6
5 5 5 5 5 5 6 6
5 5 5 5 5 5 6 6
5 5 5 5 5 5 6 6
6 6 6 6 6 6 6 6
6 6 6 6 6 6 6 6
5 4 5 5 5 5 6 6
4 4 5 5 5 5 6 6
5 5 5 5 5 5 6 6
5 5 5 5 5 5 6 6
5 5 5 5 5 5 6 6
5 5 5 5 5 5 6 6
6 6 6 6 6 6 6 6
6 6 6 6 6 6 6 6
5 4 4 4 5 5 6 6
4 4 4 4 5 5 6 6
4 4 4 4 5 5 6 6
4 4 4 4 5 5 6 6
4 4 4 4 5 5 6 6
5 5 5 5 5 5 6 6
```

-continued

```
5 5 5 5 5 5 6 6
6 6 6 6 6 6 6 6
6 6 6 6 6 6 6 6
5 4 4 4 5 5 5 5
4 4 4 4 5 5 5 5
4 4 4 4 5 5 5 5
4 4 4 4 5 5 5 5
5 5 5 5 5 5 5 5
5 5 5 5 5 5 5 5
5 5 5 5 5 5 5 5
5 5 5 5 5 5 5 5
5 4 4 4 4 4 5 5
4 4 4 4 4 4 5 5
4 4 4 4 4 4 5 5
4 4 4 4 4 4 5 5
4 4 4 4 4 4 5 5
4 4 4 4 4 4 5 5
5 5 5 5 5 5 5 5
5 5 5 5 5 5 5 5
4 3 4 4 5 5 6 6
3 3 4 4 5 5 6 6
4 4 4 4 5 5 6 6
4 4 4 4 5 5 6 6
5 5 5 5 5 5 6 6
5 5 5 5 5 5 6 6
6 6 6 6 6 6 6 6
6 6 6 6 6 6 6 6
4 3 4 4 5 5 5 5
3 3 4 4 5 5 5 5
4 4 4 4 5 5 5 5
4 4 4 4 5 5 5 5
5 5 5 5 5 5 5 5
5 5 5 5 5 5 5 5
5 5 5 5 5 5 5 5
5 5 5 5 5 5 5 5
4 3 4 4 4 4 5 5
3 3 4 4 4 4 5 5
4 4 4 4 4 4 5 5
4 4 4 4 4 4 5 5
4 4 4 4 4 4 5 5
4 4 4 4 4 4 5 5
5 5 5 5 5 5 5 5
5 5 5 5 5 5 5 5
4 3 3 3 4 4 5 5
3 3 3 3 4 4 5 5
3 3 3 3 4 4 5 5
3 3 3 3 4 4 5 5
4 4 4 4 4 4 5 5
4 4 4 4 4 4 5 5
5 5 5 5 5 5 5 5
5 5 5 5 5 5 5 5
4 3 3 3 4 4 4 4
3 3 3 3 4 4 4 4
3 3 3 3 4 4 4 4
3 3 3 3 4 4 4 4
4 4 4 4 4 4 4 4
4 4 4 4 4 4 4 4
4 4 4 4 4 4 4 4
4 4 4 4 4 4 4 4
4 3 3 3 3 3 5 5
3 3 3 3 3 3 5 5
3 3 3 3 3 3 5 5
3 3 3 3 3 3 5 5
3 3 3 3 3 3 5 5
3 3 3 3 3 3 5 5
5 5 5 5 5 5 5 5
5 5 5 5 5 5 5 5
4 3 3 3 3 3 4 4
3 3 3 3 3 3 4 4
3 3 3 3 3 3 4 4
3 3 3 3 3 3 4 4
3 3 3 3 3 3 4 4
3 3 3 3 3 3 4 4
4 4 4 4 4 4 4 4
4 4 4 4 4 4 4 4
3 3 2 2 2 2 3 3
3 3 2 2 2 2 3 3
2 2 2 2 2 2 3 3
2 2 2 2 2 2 3 3
2 2 2 2 2 2 3 3
2 2 2 2 2 2 3 3
3 3 3 3 3 3 3 3
3 3 3 3 3 3 3 3
```

There is one motion vector per (16×16) block of the Y plane, listed in block raster-scan order. The number of (16×16) blocks in the image, and hence the size of this array, can be determined from ImageHeight and ImageWidth as:

((ImageHeight+15)>>4)*((ImageWidth+15)>>4)

In each byte of the MotionVector[] array, the upper 4 bits specifies the X component of the motion vector and the lower 4 bits specifies the Y component (both in two's-complement notation). Both components of the motion vector are between +7 and −7, inclusive. The motion vectors preferably apply to the Y plane only; the U and V planes are processed by the decoder using motion vectors of 0.

Video Decoding Procedure

For conferencing system 100, images are encoded in a 9-bit YUV format (i.e., YUV 4:1:1 format), in which there are three 8-bit planes of pixels (Y, U, and V) with U and V subsampled by 4× in both directions. Each plane is subdivided into a grid of (8×8) blocks of pixels, and each block is encoded using a frequency-domain transform. The planes are encoded in the order Y, V, and U, and within each plane the blocks are traversed in rasterscan order.

If a given plane's dimensions are not evenly divisible by 8, "partial blocks" at the right or bottom edges will occur. Partial blocks are encoded by padding them out to the full (8×8) size (using whatever method the encoder chooses, such as replicating the last column and/or row or pixels) and encoding them as if they were full blocks. In the decoder, such blocks are reconstructed by first decoding the full (8×8) block but then writing only the partial block to the final image bitmap in memory. The decoder can determine the location and sizes of partial blocks entirely from its knowledge of the image dimensions (ImageHeight and ImageWidth).

Each (8×8) block is encoded using a transform method. Instead of the discrete cosine transform (DCT), a simpler transform known as the discrete slant transform (DST) is used. The DST is almost as good at the DCT, in terms of compression and quality, but is simpler and faster for both an Intel® i750® processor and an Intel® architecture processor such as an Intel® 80386, 80486, or Pentium® processor to compute.

All the data in the bitstream, after the header, is Huffman encoded. Unlike H.261 and MPEG, which have a multiplicity of Huffman tables, for conferencing system 100, a single Huffman table is used for encoding all values. This single Huffman table is:

| | #codes |
|---|---|
| 0xx | 4 |
| 10xxx | 8 |
| 110xxxx | 16 |
| 1110xxxxx | 32 |
| 11110xxxxxx | 64 |
| 111110xxxxxx | 64 |
| 1111110xxxxxx | 64 |
| Total | 252 |

This table defines 252 Huffman codes of lengths 3, 5, 7, 9, 11, 12, and 13 bits. Only the first 231 of these Huffman codes are preferably used; the remaining ones are reserved for fixture expansion.

In the pseudo-code below, the function huffdec() appears. This function does a huffman-decoding operation on the next bits in the bitstream, and returns the index of the code word in a lexicographically-ordered list, like so:

| Code word | Value returned |
|-----------|----------------|
| 000       | 0              |
| 001       | 1              |
| 010       | 2              |
| 011       | 3              |
| 10000     | 4              |
| 10001     | 5              |
| 10010     | 6              |
| etc.      |                |

The first step in decoding a block is to decode what are known as the "run/value pairs" (or run/val pairs, for short) for the block. Each run/val pair represents one non-zero DST frequency-domain coefficient.

This procedure also updates the current quantization value (held in the variable quant) when a NEWQ code is received from the bitstream. The value of quant is initialized at the start of each plane (Y, U, and V) to either Yquant or UVquant, but may be adjusted up or down by NEWQ codes in the bitstream. Note the following important rule, not made explicit by the pseudo-code below: a NEWQ code may preferably only occur at the beginning of a block. A decoder may use this fact to make decoding faster, since it need not check for NEWQ codes in the middle of parsing a block.

The procedure for decoding the run/val pairs and NEWQ codes is as follows:

```
k = 0;
while (1)
{
    v = huffdec( );
    if (v == EOB)
        break;
    else if (v == NEWQ)
        quant += tosigned(huffdec( ));
    else if (v == ESC)      //  get explicit run,val from
                            //  bitstream
    {
        run[k++] = huffdec( ) + 1;
        val[k++]= tosigned(huffdec( ) | (huffdec( ) << 6));
    }
    else                    //  lookup run,val in tables
    {
        run[k++] = runtbl[v];
        val[k++] = valtbl[v];
    }
}
```

The function tosigned() converts from an unsigned number to a non-zero signed number, as follows:

```
tosigned(n)
{
    v = (n >> 1) + 1;
    if (n & 1) v = -v;
    return(v);
}
```

This conversion is used on both the quantization change and the explicit value read after an ESC, both of which are non-zero signed numbers. EOB, ESC, and NEWQ are specific decoded values defined as follows:

EOB=0
ESC=30
NEWQ=6

Finally, runtbl[] and valtbl[] are preferably defined as follows:

runtbl[ ] = {
| 0 | 1 | 1 | 2 | 2 | 1 | 0 | 1 |
|---|---|---|---|---|---|---|---|
| 1 | 1 | 3 | 3 | 2 | 1 | 1 | 5 |
| 4 | 4 | 5 | 6 | 6 | 3 | 1 | 2 |
| 1 | 3 | 1 | 2 | 7 | 1 | 0 | 2 |
| 7 | 9 | 8 | 4 | 1 | 5 | 1 | 1 |
| 2 | 4 | 2 | 8 | 10 | 3 | 13 | 1 |
| 1 | 1 | 1 | 1 | 1 | 11 | 2 | 15 |
| 1 | 4 | 1 | 7 | 9 | 14 | 7 | 21 |
| 7 | 20 | 11 | 3 | 5 | 4 | 16 | 5 |
| 2 | 1 | 1 | 1 | 1 | 1 | 32 | 1 |
| 1 | 1 | 2 | 2 | 1 | 24 | 1 | 27 |
| 12 | 12 | 13 | 13 | 29 | 12 | 13 | 14 |
| 14 | 31 | 29 | 28 | 28 | 30 | 10 | 10 |
| 10 | 11 | 10 | 12 | 10 | 21 | 9 | 9 |
| 30 | 31 | 11 | 23 | 14 | 19 | 18 | 19 |
| 19 | 21 | 18 | 18 | 19 | 22 | 23 | 20 |
| 22 | 21 | 20 | 22 | 22 | 20 | 16 | 26 |
| 26 | 16 | 15 | 32 | 15 | 27 | 15 | 18 |
| 17 | 17 | 25 | 17 | 17 | 24 | 25 | 16 |
| 2 | 3 | 1 | 3 | 3 | 3 | 3 | 2 |
| 3 | 2 | 3 | 4 | 4 | 3 | 3 | 3 |
| 3 | 3 | 4 | 3 | 3 | 1 | 1 | 1 |
| 1 | 2 | 1 | 1 | 1 | 1 | 1 | 1 |
| 2 | 2 | 2 | 9 | 2 | 2 | 2 | 2 |
| 2 | 6 | 6 | 6 | 6 | 6 | 9 | 6 |
| 6 | 6 | 6 | 8 | 8 | 8 | 7 | 8 |
| 7 | 7 | 7 | 7 | 5 | 5 | 4 | 4 |
| 4 | 4 | 4 | 4 | 4 | 4 | 5 | 4 |
| 6 | 5 | 5 | 5 | 5 | 5 | 5 |   |
} valtbl[ ] = {
| 0 | -1 | 1 | -1 | 1 | -2 | 0 | 2 |
|---|----|---|----|---|----|---|---|
| -3 | 3 | -1 | 1 | 2 | 4 | -4 | -1 |
| 1 | -1 | 1 | -1 | 1 | -2 | -6 | -2 |
| 5 | 2 | -5 | -3 | -1 | 6 | 0 | 3 |
| 1 | 1 | 1 | -2 | -7 | 2 | -9 | 10 |
| -5 | 2 | 5 | -1 | -1 | 3 | 1 | -10 |
| -8 | -11 | 7 | 8 | 9 | -1 | 4 | -1 |
| -13 | 4 | -12 | 2 | -1 | 1 | -3 | -1 |
| -2 | 1 | 1 | 4 | -2 | 7 | -1 | -4 |
| 6 | 17 | -15 | -14 | 11 | 12 | -1 | 13 |
| 14 | 15 | -4 | -6 | -16 | -1 | -18 | 1 |
| -1 | 2 | -2 | -1 | 1 | 1 | 2 | -2 |
| -1 | 1 | -1 | -1 | 1 | -1 | 1 | 2 |
| 3 | -2 | -2 | -2 | -3 | 2 | 2 | 3 |
| 1 | -1 | 2 | 1 | 2 | 2 | -1 | 1 |
| -1 | 1 | 2 | 1 | -2 | -2 | -1 | 2 |
| -1 | -2 | -1 | 1 | 2 | -2 | 1 | -1 |
| 1 | -2 | 2 | 1 | 1 | -1 | -2 | -2 |
| 2 | 1 | 1 | -2 | -1 | 1 | -1 | 2 |
| -10 | -4 | -22 | -6 | -7 | -9 | -8 | 11 |
| -10 | 12 | 6 | -8 | -9 | 10 | -3 | 9 |
| 8 | 7 | -7 | 5 | -5 | 21 | 20 | 19 |
| -21 | 10 | 16 | -17 | -19 | -20 | 18 | 22 |
| 8 | 7 | -7 | -2 | -8 | -9 | -11 | -12 |
| 9 | 6 | 5 | 4 | 3 | -4 | -3 | -2 |
| -3 | -5 | 2 | 3 | 2 | -2 | -5 | -3 |
| 5 | 4 | 3 | -4 | 7 | -7 | 9 | 8 |
| 6 | 5 | -5 | 3 | -3 | -4 | 6 | -6 |
| -6 | 5 | -6 | 4 | 3 | -3 | -5 |   |

The next step in decoding is to convert the run/val pairs into an (8×8) block of DST coefficients, as follows: Define the scan path through an (8×8) matrix by the following numbers:

| 0  | 1  | 4  | 9  | 17 | 18 | 37 | 38 |
|----|----|----|----|----|----|----|----|
| 2  | 3  | 8  | 10 | 19 | 25 | 39 | 45 |
| 5  | 7  | 11 | 14 | 24 | 26 | 44 | 46 |
| 6  | 12 | 13 | 15 | 27 | 32 | 47 | 53 |
| 16 | 20 | 23 | 28 | 31 | 33 | 52 | 54 |
| 21 | 22 | 29 | 30 | 34 | 35 | 55 | 60 |
| 36 | 40 | 43 | 48 | 51 | 56 | 59 | 61 |

| 41 | 42 | 49 | 50 | 57 | 58 | 62 | 63 | where the scan path is found by traversing these numbers in increasing order. The (8×8) block of DST coefficients coeff[8][8] is created by the following procedure:

```
for (i=0; i<8; i++)
    for (j=0; j<8; j++)
        coeff[i][j] = 0;
start at position "-1" on the scan path (one step "before"
0) for (each run/val pair)
{
    step forward by 'run' positions on the scan path
    deposit 'val' at the new position
}
```

The next step is to dequantize the block of coefficients. This is done by applying quantization matrix number quant, as follows:

```
for (i=0; i<8; i++)
    for (j=0; j<8; j++)
        coeff[i][j] = coeff[i][j] << qmatrix[quant][i][j];
```

The next step is to undo "DC prediction," which is used to further compress the DC coefficient coeff[0][0] in still blocks. If the block being decoded is a still block (either because this is a still image, or because this block is part of the still strip in a relative image), DC prediction is undone by applying the following equations:

coeff[0][0]+=prevDC prevDC=coeff[0][0]

The value of prevDC is initialized to 8*128 at the start of each image plane.

The next step is to transform the (8×8) coefficient array into the spatial domain. This is done by applying an (8×1) DST to each of the 8 rows and 8 columns of coeff[][]. The (8×1) DST can be described as follows:

```
slant8x1(s,d,fwd)     //  s = src array, d = dst array,
int s[ ],d[ ],fwd;    //  fwd = 1 for forward xform, 0 for
                      //  inverse
{
    int r1,r2,r3,r4,r5,r6,r7,r8;
    int t,tl,*p;
    if (fwd)
    {
        p = s;
        r1 = *p++;
        r2 = *p++;
        r3 = *p++;
        r4 = *p++;
        r5 = *p++;
        r6 = *P++;
        r7 = *p++;
        r8 = *p++;

SlantPart1;
        SlantPart2;
        SlantPart3;
        SlantPart4;

p = d;
        *p++ = r1;
        *p++ = r4;
        *p++ = r8;
        *p++ = r5;
        *p++ = r2;
        *p++ = r6;
        *p++ = r3;
        *p++ = r7;
    }
    else
    {
        p = s;
        r1 = *p++;
        r4 = *p++;
        r8 = *p++;
        r5 = *p++;
        r2 = *p++;
        r6 = *p++;
        r3 = *p++;
        r7 = *p++;

SlantPart4;
        SlantPart3;
        SlantPart2;
        SlantPart1;

p = d;
        *p++ = r1;
        *p++ = r2;
        *p++ = r3;
        *p++ = r4;
        *p++ = r5;
        *p++ = r6;
        *p++ = r7;
        *p++ = r8;
    }
}
``` where butterfly(x,y) is the following operation:

butterfly(x,y):

t=x+y;

y=x−y;

X=t;

and SlantPart1, SlantPart2, SlantPart3, SlantPart4 are four macros defined as follows:

```
#define SlantPart1 \
    bfly(r1,r4); \
    bfly(r2,r3); \
    bfly(r5,r8); \
    bfly(r6,r7); \ define SlantPart2 \
    bfly(r1,r2); \
    reflect(r4,r3); \
    bfly(r5,r6); \
    reflect(r8,r7);

#define SlantPart3 \
    bfly(r1,r5); \
    bfly(r2,r6); \
    bfly(r7,r3); \
    bfly(r4,r8);

#define SlantPart4 \
    t = r5 − (r5>>3) + (r4>>1); \
    r5 = r4 − (r4>>3) − (r5>>1); \
    r4 = t;

#define reflect(s1,s2) \
    t = s1 + (s1>>2) + (s2>>1); \
    s2 = −s2 −(s2>>2) + (s1>>1); \
    s1 = t;
```

The (8×1) DSTs are preferably performed in the following order: rows first, then columns. (Doing columns followed by rows gives slightly different, incorrect results.) After doing the (8×1) DSTs, all 64 values in the resulting (8×8) array are preferably right-shifted by 3 bits, and then clamped to the range (−128, 127), if a delta block, or to the range (0, 255), if a still block.

If the block being decoded is a still block, no more processing is required. The DST calculation produces the block of reconstructed pixels to be written to the image.

If the block being decoded is a relative block, the block of reconstructed pixels is calculated as:

```
for (i=0; i<8; i++)
    for (j=0; j<8; j++)
        image[i] [j] = clamp0_255(prev[i] [j] + array[i] [j]);
``` where array[][] is the result of the DST calculation, prev[][] is the (8×8) block of pixels from the previous image, and clamp0_255() is a function that clamps a value to the range (0,255). The previous block is the one in the same spatial location as the block in the current image, but offset by the motion vector for that block, which is either determined from the MotionVector array (if processing the Y plane) or is 0 (if processing the U or V plane, or if FLAGS_MV==0).

During decoding the loop filter may need to be selectively applied. If the FLAGS_FILTER flag is set, and if a block is not a still block, and if the quantization value for a block satisfies $$quant<=FilterThresh$$

and if the block is not empty (i.e., does not consist of only EOB), then the loop filter is applied to prev[] before adding the array[][] deltas. The preferred loop filter is a filter with kernel as follows:

$$\begin{matrix} 1 & . & 1 \\ . & x & . \\ 1 & . & 1 \end{matrix}$$

where the pixel marked x is replaced by:

$$x=(a+b+c+d)>>2$$

where a, b, c, d are the four pixels in the corners of the (3×3) block. On the edges of an (8×8) block, a one-dimensional (1 0 1) kernel is preferably used. The corner pixels of the block are preferably not filtered.

Intra/Inter Decision Rules

A certain class of motion compensated video compression systems encode certain blocks in motion compensated difference images as "intra" blocks and others as "inter" blocks. The decision to encode a block as an intra or inter block is based on a decision rule which is referred to as the "intra/inter decision rule". This section describes a preferred method for generating an intra/inter decision rule for conferencing system 100. The intra/inter decision rule generated by this method is (1) computationally simple, (2) encoded implicitly (requiring no bits for differentiating intra vs. inter blocks, (3) adaptive to spatiotemporal image content, and (4) statistically optimal in providing a means of differentiation between motion compensation artifacts and scene features.

The conventional objective of encoding some blocks as intra in motion compensated difference frames is to reduce the number of bits required to encode those blocks that have low spatial variation but high temporal variation. The objective of encoding some blocks as intra in difference frames is to reduce the effects of high frequency motion compensation artifacts (sometimes referred to as "mosquitoes" in the literature) without having to use (computationally expensive) loop filtering. An area in a motion compensated difference frame that exhibits mosquitoes when encoded as a quantized difference will instead appear blurred if encoded as a quantized intra.

The preferred technique for generating an intra/inter decision rule for a given motion compensated video compression system works as follows:

Given:
1. A transform
2. A set of N quantizers for Inter blocks ($Q_1, Q_2, \ldots, Q_N$)
3. A set of M quantizers for Intra blocks ($K_1, K_2, \ldots, K_N$)
4. A set of "training data" that is representative of the application in hand.

Let SAD(i,j) denote the "Sum of absolute differences" for block (i,j) in a motion compensated difference image.

Step 1:

For each Quantizer $Q_i$, perform the following operation:
  a. Compress the training data, using $Q_i$ as the quantizer for all the blocks in the all the motion compensated difference images.
  b. By a visual observation of the (compressed and decompressed) training image sequences, collect all blocks that contain perceptible mosquitoes.
  c. From the set of blocks collected in (b), find the block with the lowest SAD. Denote the SAD of the block with the lowest SAD as $LSAD_i$ (corresponding to quantizer $Q_i$).
  d. From the set of blocks collected in (b), select a subset of n blocks with the lowest SADs in the set.
  e. For each block in the subset collected in (d), determine the number of bits required to encode the block. Let B be the average number of bits required to encode a block in the subset. For each intra quantizer $K_j$, determine the average number of bits $BK_j$ required to encode a block in the subset as an intra (using quantizer $K_j$). From the set $\{BK_1, BK_2, \ldots, BK_M\}$, find j such that $|B-BK_j|$ is minimized. $K_j$ is the intra quantizer assigned to $Q_i$.

Step 2:

From Step 1, for each $Q_i$, there is a corresponding $LSAD_i$ which is the lowest SAD value for which there are perceptible motion compensation artifacts and an intra quantizer $K_j$. The intra/inter decision rule is defined as follows:

For each block (p,q) in a motion compensated difference frame, given a quantizer $Q_i$ (as determined by an external quantizer selection process) the block is encoded as intra if and only if $SAD(p,q)>LSAD_i$. Intra quantizer $K_j$ is used to encode the block.

A major advantage of the intra/inter decision rules generated by this technique is that the intra/inter decision is implicit in the method and is known to both the encoder and decoder. Therefore, it does not need to be explicitly transmitted and thus requires no bits.

Post Reconstruction Loop Filtering

This section describes a preferred method of "loop filtering" for conferencing system 100 for the reduction of high frequency artifacts associated with motion compensated video compression for the present invention. A traditional loop filtering operation operates on the previously decoded (reference) image. Certain blocks of the previously decoded image are low-pass filtered prior to motion compensation. This reduces the high frequency content in the reference block and, as a result, the high frequency content in the final output.

In the preferred method of loop filtering, a low-pass filter is applied to certain blocks after the motion compensation and addition operation to generate a filtered reconstructed image. This approach to loop filtering has two major advantages:

1. It is easier to implement, since the motion estimation and differencing operations may be merged into one operation.
2. It has a greater low-pass filtering effect on the reconstructed image since the final image is filtered instead of the reference image only.

Adaptive Loop Filter Switching Criteria

This section describes a preferred method for generating a criterion for the switching ("on" or "off") of a loop filter in conferencing system 100. The loop filter switching criterion generated by this method is better adapted to the spatiotemporal image content and provides a differentiation between motion compensation artifacts and scene features. A traditional loop filtering operation operates on the previously decoded (reference) image. Certain macroblocks (typically 16×16 areas) of the previously decoded image are low-pass filtered prior to motion compensation. This reduces the high frequency content in the reference macroblock and, as a result, the high frequency content in the final output.

The objective of loop filtering is to reduce high frequency artifacts associated with residual quantization noise in motion compensated difference images. Ideally, only those macroblocks should be filtered that exhibit such motion compensation artifacts. A criterion for deciding whether or not a given macroblock should be loop filtered or not is referred to as the "loop filter switching criterion."

A conventional loop filter switching criterion is to apply a loop filter if the macroblock has a non-zero motion vector and not to apply it if the motion vector for the given macroblock is the zero vector. A major drawback of this criterion is that it filters macroblocks that have non-zero motion but no motion compensation artifacts.

The preferred method for generating a loop filter switching criterion works as follows:

Given:
1. A transform
2. A set of N Quantizer ( Q1, Q2, . . . , QN )
3. A set of representative "training data" for the application at hand.

Let SAD(i,j) denote the "Sum of absolute differences" for Macroblock (i,j) in a motion compensated difference image.

Step 1:
For each Quantizer Qi, perform the following operation:
a. Compress the training data, using Qi as the quantizer for all the macroblocks in the all the motion compensated difference images.
b. By a visual observation of the (compressed and decompressed) training image sequences, collect all macroblocks that contain perceptible high frequency motion compensation artifacts (sometimes referred to as "mosquitoes" in the literature).
c. From the set of macroblocks collected in (b), find the macroblock with the lowest SAD. Denote the SAD of the macroblock with the lowest SAD as LSADi (corresponding to quantizer Qi).

Step 2:
From Step 1, for each Qi, there is a corresponding LSADi which is the lowest SAD value for which there are perceptible motion compensation artifacts. The loop filter switching criterion is defined as follows:

For each Macroblock (p,q) in a motion compensated difference frame, given a quantizer Qi (as determined by an external quantizer selection process) the loop filter is applied if only if SAD(p,q)>LSADi.

Design of Quantization Tables

This section describes a preferred method for designing quantization tables to be used for quantization in conferencing system 100. This preferred method exploits the perceptual properties of the human visual system in a statistical sense to arrive at quantization tables that minimize perceived quantization artifacts at a given effective bit rate.

In conventional video compression systems, the quantization process is spatially adaptive. Different regions in the image are quantized using different quantizers. In a transform-based video compression system that uses linear quantization, the quantization operation may be completely specified by a table of numbers, each of which corresponds to the (linear) quantizer step size to be used to quantize a specific frequency band in the transform domain.

The present invention relates to the design of the quantization table Q[8][8] for conferencing system 100. The design process is as follows:

Given:
1. Transform-based conferencing system 100
2. A set of video sequences that are representative of the application at hand
3. A specification of target bitrate (or compression ratio) for the application.

Objective:
To design a set of N quantization tables Q1, Q2, . . . , QN such that:
a. QN/2 results in target bitrate for typical video sequences.
b. Q1, . . . , QN meet a specified dynamic range specification. For a given video sequence, the bitrate generated using Q1 should be about K times the bitrate generated by QN. Here K is the dynamic range specification and is usually dependant on the variability of the allocated channel bandwidth of the channel over which the compressed video bitstream is being transmitted.
c. Q1, . . . , QN minimize the perceived artifacts in the processed (compressed and decompressed) video sequence at their point of operation (in terms of bit rate).

Procedure:
Step 1. Design of Q1

Q1 is the weakest quantizer table and is designed so as to generate no perceptible artifacts at the expense of a bitrate that is potentially much higher than Target Bitrate. Q1 is designed as follows:

Set Q[i][j]=1 for all i,j (all frequency bands)
Starting from the lowest frequency band to the highest frequency band,
For each band (i,j),
a. Increment Q[i][j]
b. Use Q[8][8] as the quantizer in the given video compression system
c. If there are any perceivable artifacts in the processed video sequence,
i. Decrement Q[i][j]
ii. Goto the next band
Else goto (a)

The above process generates a quantizer table (Q1) that is at the perceptual threshold, referred to as the perceptual threshold quantizer (PTQ).

Step 2. Design of Q2, Q3, . . . , QN/2

Let B1 be the bitrate generated using quantizer Q1 with a typical video sequence. Let BT be the target bitrate. The objective now is to design Q2, Q3, . . . QN/2 such that QN/2 generates target bitrate (BT) for typical sequences and Q2, Q3, . . . , QN/2−1 generate monotonically decreasing intermediate bitrates between B1 and BT. From the perspective of a bitrate controller, it is desirable to have a linear decrease in bitrate with quantizer table index. Tables Q2, Q3, ..., QN/2 are designed with this requirement in mind. The following is the design procedure for tables Q2, Q3, ..., QN/2:

Let dB=(B1−BT)/(N/2).
Set Q2=Q1
For each quantizer Qk, k=2 to N/2
Starting from the highest frequency band to the lowest frequency band,
For each band (i,j)
  a. Set Qk=Qk−1
  b. Increment all Qk[i][j] with the same horizontal or vertical frequency
  c. Use Qk[8][8] as the quantizer in the given video compression system
  d. If the bitrate is reduced by dB,
    i. Save the state of Qk[8][8]
    ii. Goto the next band at 1
    Else goto 2.
  e. Amongst the quantizer states saved in (d)(i), select that quantizer that has the least perceptible artifacts for typical video. This is the choice for Qk.

Step 3. Design of QN/2+1, ..., QN.

From the perspective of a bitrate controller, it is desirable to have a progressively increasing decrease in bitrate with quantizer table index from table N/2+1 to table N. The design of tables QN/2+1, ..., QN is the same as the design for tables 2, ... ,N/2 except that for each new table, dQ increases instead of remaining constant. The magnitudes of the dQs for quantizers QN/2+1, ... ,QN depend on the desired dynamic range in bitrate and the manner of decrease in bitrate with quantizer table index. For example, if the desired dynamic range is BT to BT/4 from QN/2 to QN and the decrease in bitrate is logarithmic then $dQ(N/2 + 1) = dQ(N/2)$ for $i = (N/2 + 2)$ to $(N/2)$ $dQi = kdQi - 1$ $dQ(N/2 + 1) + dQ(N/2 + 2) + \ldots + dQN = BT - BT/4$ $dQ(N/2)(1 + k + k*k + k*k*k + \ldots) = 3BT/4$ $(1 + k + k*k + k*k*k + \ldots) = 3BT/4/(dQN/2)$ $(1 + 2 + 3 + 4 + \ldots + (N/2 - 1)) \log k = \log(3BT/4/dQN/2)$ $\log k = \log(3BT/4/dQN/2)/N/4$ $k = (3BT/4/dQN/2)$ to the power $4/N$ Adaptive Transform Coefficient Scanning This section describes a preferred method of transform coefficient scanning in conferencing system 100, a transform-based image and video compression system, that exploits the properties of the transform and the associated quantization technique to generate coefficient scan orders that generate the lowest bitrates. The image (for image compression) or motion compensated difference (for motion compensated video compression) is transformed. The transformed coefficients are quantized. The transformed quantized coefficients are scanned in a certain order from a two dimensional array to a one dimensional array. This one dimensional array is re-represented by a run-length—value (RV) representation. This representation is then entropy coded and the result transmitted or stored to be decoded.

The preferred method applies to the "scan" part of the processing where the quantized transformed coefficients are scanned from a two dimensional array to a one dimensional array. The purpose of this scanning is to facilitate efficient representation by a RV representation. The same scan-order is applied to every block in the representation.

The preferred method of scanning involves the following operations:
Given:
  1. A transform.
  2. A set of N quantizers (typically quantization matrices) denoted by Q1, Q2, ..., QN.
  3. Representative "training" data for the target application.
Step 1.
For each quantizer Qi, generate quantized transformed blocks for all of the training data.
Step 2.
Compute the average amplitude for each of the transform coefficients from the quantized transformed blocks for all the training data.
Step 3.
Sort the average amplitudes computed in Step 2.
Step 4.
For quantizer Qi, the scan order Si is generated by the locations of the (amplitude sorted) coefficients from Step 3. The largest coefficient is the first in the scan order and the smallest is the last.

Using this preferred method, a scan order Si is generated for each quantizer Qi. In the encode and decode process, for each block for which Qi is used as the quantizer, Si is used as the scan order.

The advantage of this invention over previous scanning techniques is that due to the adaptive scan orders, the RV representations are more efficient and for a given quantizer, fewer bits are required to encode a given block than with conventional nonadaptive zigzag scanning.

Spatially Adaptive Quantization

This section describes a preferred method of spatially adaptive quantization for conferencing system 100. The preferred method provides a means of efficiently encoding motion compensated difference images. A conventional non-adaptive quantization technique simply takes a given quantizer for each frame and applies that quantizer uniformly to every macroblock (16×16 area) in the image. An adaptive quantization technique applies different quantizers to different macroblocks in a given frame. Information about which quantizer has been applied to which block is also encoded and transmitted.

The preferred method of spatially adaptive quantization is based on the "sum of absolute difference" (SAD) that has already been computed for each macroblock by the motion estimation subroutine. The preferred quantizer selection method works as follows:
Step 1.
The mean SAD for the entire frame is computed. This denoted by MSAD.
Step 2.
For each macroblock, if the SAD of the macroblock is lower than the mean, then it is assigned a finer quantizer than the mean quantizer (which is the global quantizer for this frame passed down by the bit-rate controller). Conversely, if the SAD in the macroblock is higher than the mean, then it is assigned a coarser quantizer.

In a case where there are 16 quantizers, numbered 1 through 16 with higher numbers denoting finer quantizers, let SAD(i,j) be the SAD associated with the current macroblock (i,j). Let MSAD be the mean SAD in the frame. Let Q(i,j) denote the quantizer assigned to the current macroblock. Let QG denote the global quantizer for the frame. Then Q(i,j) is assigned as:

Q(i,j)=QG+8*log2 ((SAD(i,j)+2MSAD)/(2SAD(i,j)+MSAD))

Q(i,j) is saturated to the range (1,16) after performing the above operation.

There are 2 major advantages of the preferred spatially adaptive quantization technique over conventional techniques:

1. The spatial adaptation is based on values that have already been computed in the motion estimation routine. Therefore the spatial adaptation process is computationally simple.
2. The spatial adaptation process generates an optimal quality image given the bit-budget of the current frame by distributing bits to different macroblocks in proportion to the perceived effect of quantization on that macroblock.

Fast Statistical Decode

Host processor 202 preferably performs fast statistical decoding. Fast statistical decoding on host processor 202 allows time efficient decoding of statistically coded data (e.g., Huffman decoding). Moreover, since statistical Huffman coding uses code words that are not fixed (bit) length, the decoding of such codewords is generally accomplished one bit at a time. The preferred method is as follows:

1. Get next input bit and juxtapose with bits already in potential codeword (initially none).
2. If potential codeword is a complete codeword, then emit "symbol ", eliminate bits in potential codeword, and go to (1). Otherwise, if potential codeword is not a complete codeword, then go to (1).

The preferred method or the present invention provides decoding of one "symbol" in one operation, as follows:

a. Get next (fixed number) several input bits.
b. Use the input bits to select a symbol and emit symbol.
c. Go to (a).

The statistical code used is designed to be "instantaneous," which means that no codeword "A" is a "prefix" of any codewords "B". This allows a lookup table to be constructed which may be indexed by a potential codeword, unambiguously yielding a symbol corresponding to the codeword. The potential codeword is guaranteed to contain a complete codeword since it starts with a codeword, and it is as long as the longest codeword.

Contrast, Brightness, and Saturation Controls

This section describes a preferred integer implementation of contrast, brightness, and saturation controls for the present invention for adjusting and for application of the controls to realtime video. The implementation has two parts. The first is a method of generating translation tables to implement adjustable brightness, contrast, and saturation controls. The second is a method of using the tables to change the appearance of video being displayed.

The generation of the tables uses integer operations in the generation of tables that express floating point relations. Prior to application of any controls, the video data consists of a description of the Y, V, and U components at 8 bits per value. The problem is to provide a translation from the decoded Y values to Y values that reflect the current setting of the brightness and contrast controls, and further to provide a translation from the decoded U and V values to U and V values that reflect the current setting of the saturation control.

The method begins with an identity translation table (f(x)=x). As controls are changed, the identity translation becomes perturbed cumulatively. In the case of brightness, control changes are indicated by a signed biased value providing both direction and magnitude of the desired change. The current translation table are changed into f(x)= x−k, for x>=k, and f(x)=0 for 0<=x<k (decrease) or f(x)= x+k, for x<=255−k, and f(x)=255 for 255>=x >255−k (increase).

In the case of contrast, control changes are indicated by a scaled fractional value. The value indicated "n" represents "(n+1)/SCALE" change: a "change" of (SCALE−1) yields no change, a change of (SCALE) yields a change by 1/SCALE in each of the translation table values. The definition of contrast as y'=(n*(y−128))+128 (for 8 bit values) is then provided by subtracting 128 from the translation table value, multiplying by SCALE, multiplying by the indicate control change value, and then dividing by SCALE twice to remove the scale multiple implied in the representation of the control change value, and the multiply explicitly performed here. 128 is then added to the modified translation table value and the result is clamped to the range of 0 to 255 inclusive.

This method avoids the use of floating point arithmetic in the computation of the proper translation table values. In the definition offered of "contrast" the value "n" is a floating point number. Saturation is simply contrast as applied to the chrominance data, and is handled in the same way as the contrast control, but with a different copy of the translation table.

The translation tables are made available to the host processor in the same locale as the data that they are used to translate: after generation of the modified translation tables, the tables are appended to the data area for the luminance and chrominance, at known fixed offsets from the start of same data areas (on a per instance basis, each video window has its own copy of this data.) This allows the host processor to access the translation tables with a 1 processor clock penalty in address generation (for an Intel® 486 microprocessor; there is no penalty on an Intel® Pentium® processor), and with a high degree of locality of reference, and no pointer register reloads (due to the fixed offset.)

The translation of the decoded Y, V, and U values is performed by reading and translating eight values and then writing the eight translated values as two 32-bit values to the destination. This is important to Intel® architecture microprocessors, and in particular is important to the Intel® 486 processor, which usually runs with a write saturated bus.

For the method of performing the translation, the BX register is assumed to contain zeroes in the high order 8(24) bits. The low order 8 bits are loaded with the value to translate, and the value is used as the base register with an index register (set to the offset of the translation table+base of data buffer) in an indirect load to accomplish the translation. The destination of the load is changed as the operation is repeated over multiple values, until register storage is exhausted, at which point the translated values are written out and the cycle repeats. The process here described executes at a sustained three or four clocks per value translated.

Audio Protocol

Figure 26:
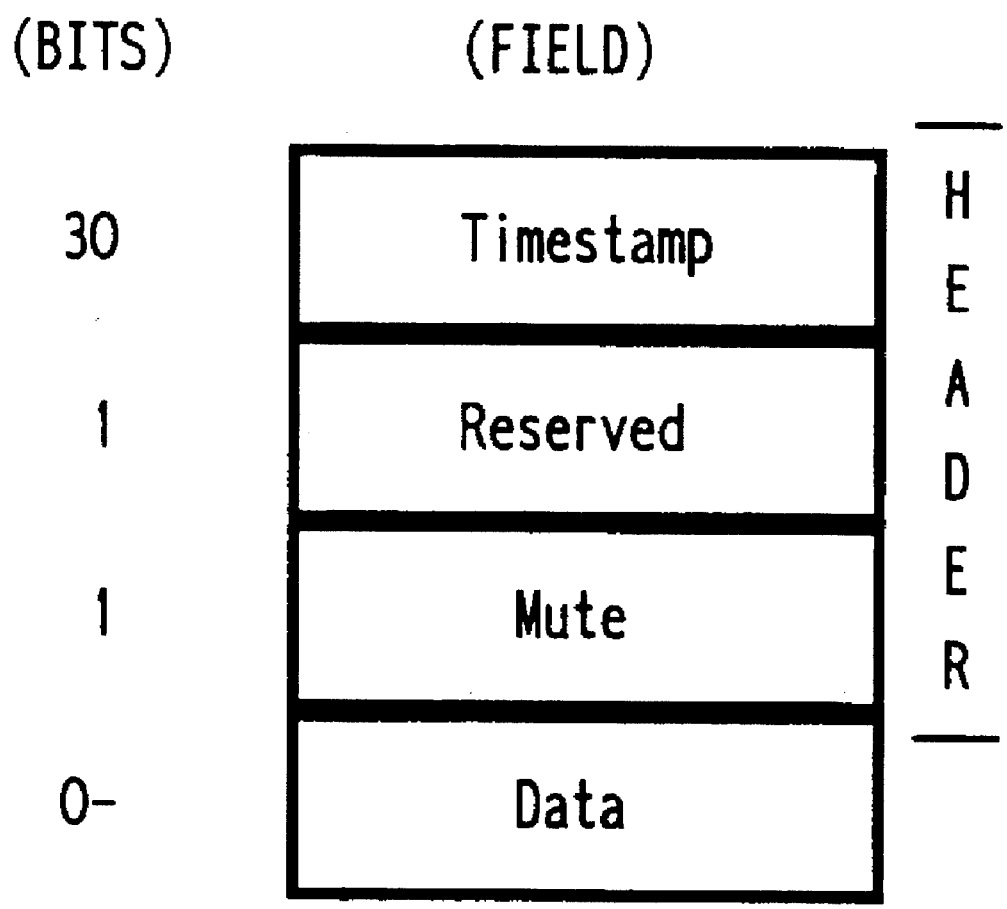
FIG. 26 is a representation of a compressed audio packet for the conferencing system of FIG. 5.

Referring now to FIG. 26, there is shown a representation of a compressed audio packet for conferencing system 100, according to a preferred embodiment of the present invention. Source audio is audio that is captured (and optionally monitored) at the local system and sent to the comm subsystem for transmission. Sink audio is audio that is received from the comm subsystem for playback on the local system. Audio is preferably handled on audio/comm board 206 and not on host processor 202. The compressed audio packet of FIG. 26 is that which is actually sent/received from the communications subsystem and not necessarily that manipulated by an application on the host processor. The audio packet fields are defined as follows:

| | |
|---|---|
| Timestamp | Value used to synchronize audio and video frames at the receive endpoint. The audio stream preferably generates timestamps as a master clock that are copied to the captured video frames before transmission. |
| Reserved | Reserved field. |
| Mute | Bit indicates whether or not the audio stream is muted or not. The audio is muted when the bit is set. When the Mute bit is set, no audio data is sent. |
| Data | Compressed audio data. |

The length of the audio data is not explicitly specified in the packet header. A receiving endpoint's comm subsystem reassembles an audio packet and therefore implicitly knows the length and can report it to its application. The length of an audio packet is a run-time parameter and depends on the compression method and the amount of latency desired in the system. The preferred audio compression/decompression method implementation has 100 msecond latency, which translates to 200 bytes of compressed audio data per packet.

Compressed Audio Bitstream

The preferred audio stream for conferencing system 100 is a modification of the European Groupe Speciale Mobile (GSM). GSM was developed in the context of the standardization of the European digital mobile radio. It resulted from the combination of the Regular-Pulse Excitation/Linear-Predictive-Coding codec developed by Philips (Germany) with the Multi-Pulse-Excitation/Linear-Predictive-Coding codec devised by IBM (France). For further information, see the ETSI-GSM Technical Specification, GSM 06.10, version 3.2.0, UDC 621.396.21, published by the European Telecommunication Standards Institute in Valbonne Cedex, France.

The data rate of the standard GSM codec is 13.0 kbits/sec. The preferred GSM implementation for conferencing system 100 has a bit rate of 16 kbits/sec. The mean opinion score (MOS) quality rating of the preferred GSM implementation is 3.54. It is not prone to rapid quality degradation in the presence of noise. The relative complexity is about 2 MOPSs/s. Due to implementation processing considerations, the standard GSM implementation is adjusted to yield the preferred GSM implementation. In addition, headers are added to provide extra control information, such as frame counting and muting.

In order to save processing, the 260-bit audio frame is not packed. This results in a 320-bit frames. These frames occur every 20 mseconds. This increases the bit rate from 13 kbits/sec to 16 kbits/sec. The composition of the preferred audio frame is as follows:

```
typedef struct  {unsigned int lar1:   6;    /* stp parameters */
                 unsigned int lar2:   6;
                 unsigned int lar3:   5;
                 unsigned int lar4:   5;
                 unsigned int lar5:   4;
                 unsigned int lar6:   4;
                 unsigned int lar7:   3;
                 unsigned int lar8:   3;    } STP;
typedef struct  {unsigned int lag     7;
                 unsigned int gain    2;    /* ltp parameters */
                 unsigned int grid    2;    /* rpe parameters */
                 unsigned int xmax    6;
                 unsigned int x0      3;    /* pulse amplitude*/
                 unsigned int x1      3;
                 unsigned int x2      3;
                 unsigned int x3      3;
                 unsigned int x4      3;
                 unsigned int x5      3;
                 unsigned int x6      3;
                 unsigned int x7      3;
                 unsigned int x8      3;
                 unsigned int x9      3;
                 unsigned int x10     3;
                 unsigned int x11     3;
                 unsigned int x12     3;    } LTP_RPE
typedef struct  {STP      frame;
                 LTP_RPE  subframe(4);      } GSMBITS;
```

The result of not packing these structs on a Texas Instruments® C31 DSP, a 32-bit processor, is a 320-bit frame. At a frame rate of 50 frames/sec, the data rate is 16.0 kbits/sec.

A header has also been added to groups of frames. The length of the header is one 32-bit word. The MSB is a mute flag (1=mute). The remaining bits represent a timestamp. This time stamp is not actually time, but is preferably a frame counter. The initial value of it is arbitrary. It is therefore a relative number representing the progress of audio frames and useable for synchronization.

Data Protocol

Data packets are inside TII packets. The data conferencing application will have its own protocol inside the TII protocol stack.

Communication-Level Protocols

The application-level audio, video, and data packets described in the previous section are sent to the comm subsystem for transmission to the remote site. The comm subsystem applies its own data structure to the application-level packets, which the comm subsystem treats as generic data, and defines a protocol for transport. In a preferred embodiment of the present invention, the basic transport is unreliable. That is, at the basic level, there is no guarantee that application data will reach the destination site and, even if it does, there is no guarantee as to the correctness of the data delivered. Some applications will use the unreliable communication services, such as audio and video. For applications requiring guaranteed delivery of data, reliability is built on the basic unreliable service. Application data is an example of a data type requiring reliable transport; control information between peer processes is another.

Reliable Transport Comm Protocols

Referring now to FIG. 27, there is shown a representation of the reliable transport comm packet structure, according to a preferred embodiment of the present invention. For reliable transport, conferencing system 100 preferably uses a protocol akin to LAPB. Since transport is preferably on ISDN B-channels, which are assumed to have already been set up, there is no need to include those portions of LAPB that deal with circuit establishment and teardown (e.g. SABM, FRMR, UA, and DISC). Therefore, the preferred reliable transport comm protocol is void of those portions. The fields of the preferred reliable transport comm packet are defined as follows:

| | |
|---|---|
| Control | Defines the type of packet and relays acknowledgment information. The types of packets are: Information (I), Receiver Ready (RR), Receiver Not Ready (RNR), and Reject (REJ). |
| Length | Length of the client data portion of the packet, in bytes. |
| CRC | Cyclic redundancy check code. |

For an Information (I) packet, the format of the control field is as follows:

| (Bit) | 0 | 1–3 | 4 | 5–7 |
|---|---|---|---|---|
| (Field) | 0 | NS | P | NR |

The NS bit field is used to refer to a send sequence number. NS is interpreted as specifying to the receiving site the next packet to be sent. The NR bit field is used to refer to a receive sequence number. It is used to acknowledge to a sender that the receiver has received packet NR-1 and is expecting packet NR. The P bit field is the LAPB poll bit and is are not used in the preferred embodiment. All sequence numbers are modulo-8 meaning that at most 7 packets can be outstanding. It is the responsibility of the transmitting sites to assure that they do not have more than 7 packets outstanding. An Information packet is used to send client data. The receive acknowledgment can be piggybacked on in the NR bit field.

The Receiver Ready (RR), Receiver Not Ready (RNR), and Reject (REJ) packets are supervisory packets that are used for acknowledgment, retransmission, and flow control. They are not used to carry client data.

For a Receiver Ready (RR) packet, the format of the control field is as follows:

| (Bit) | 0 | 1 | 2 | 3 | 4 | 5–7 |
|---|---|---|---|---|---|---|
| (Field) | 1 | 0 | 0 | 0 | PF | NR |

The PF bit field is the LAPB poll/final bit and is not used in the preferred embodiment. The RR packet is used in two cases. The first case is to acknowledge packet receipt when there are no packets pending transmission on which to piggyback the acknowledgment. The second case is when the link is idle. In this case, an RR packet is sent periodically to assure the remote site that the local site is still alive and doing well.

For a Receiver Not Ready (RNR) packet, the format of the control field is as follows:

| (Bit) | 0 | 1 | 2 | 3 | 4 | 5–7 |
|---|---|---|---|---|---|---|
| (Field) | 1 | 0 | 1 | 0 | PF | NR |

The RNR packet is sent by a receiver to indicate to the remote site that the remote site should stop sending packets. Some condition has occurred, such as insufficient receive buffers, rendering the remote site unable to accept any further packets. The RNR packet is intended to be used for temporary flow control. When the remote site is able to accept more packets it issues an RR frame.

For a Reject (REJ) packet, the format of the control field is as follows:

| (Bit) | 0 | 1 | 2 | 3 | 4 | 5–7 |
|---|---|---|---|---|---|---|
| (Field) | 1 | 0 | 0 | 1 | PF | NR |

The REJ packet is sent as a form of negative acknowledgment. The receiver of an REJ packet interprets the NR bit field as a request to retransmit all packets from NR to the most currently sent, inclusive.

Unreliable Transport Comm Protocols

At the lowest layer of conferencing system 100, an unreliable protocol is preferably used to transport data on the ISDN B-channels. For those applications requiring reliability, the reliable protocol discussed in the previous section is added on top of the unreliable protocol discussed in this section. The unreliable protocol sits atop of HDLC framing which the unreliable protocol uses for actual node-to-node transport of packets. Even though HDLC framing is used, a data link protocol is not implemented. In particular, there is no guarantee that data packets will be delivered or that they will be uncorrupted at the receive node of a link. The CRC validation of the HDLC is used to detect corrupted data.

The unreliable protocol provides for logical channels and virtualization of the two Basic Rate ISDN B-channels. Logical channels are local site entities that are defined between the DLM and TII is layer and the client (i.e., application program) using them. The logical channels provide the primary mechanism clients use to send multiple data types (e.g., audio, video, data). The layer services multiplex these data types together for transmission to the remote sites.

In a preferred embodiment, logical channel zero is used as a control channel. Site peers (i.e., two conferencing systems in a conferencing session) use this control channel to exchange information on their use of other logical channels. Logical channels are half-duplex. Therefore, two channels are necessary to send and receive data. A priority attribute is associated with a logical channel (and therefore with a data type). The unreliable protocol asserts that higher priority data will always be sent ahead of lower priority data when both are pending. Priorities are assigned by an API call to the TII services. Audio has the highest priority, then data, and last video.

Although the ISDN Basic Rate Interface (BRI) defines two physical 64 kbit/second B-channels for data, the services at both DLM and TII virtualize the separate B-channels as a single 128 kbit/second channel. Client data types, defined by their logical channels, are multiplexed into a single virtual stream on this channel. In a preferred embodiment, this inverse multiplexing is accomplished by breaking all packets into an even number of fragments and alternating transmission on the two physical B-channel connections. Initially, after channel establishment, the first fragment is sent on the B1-channel, the second on the B2-channel, etc. At the receiving site, fragments are collected for reassembly of the packet.

Figure 28:
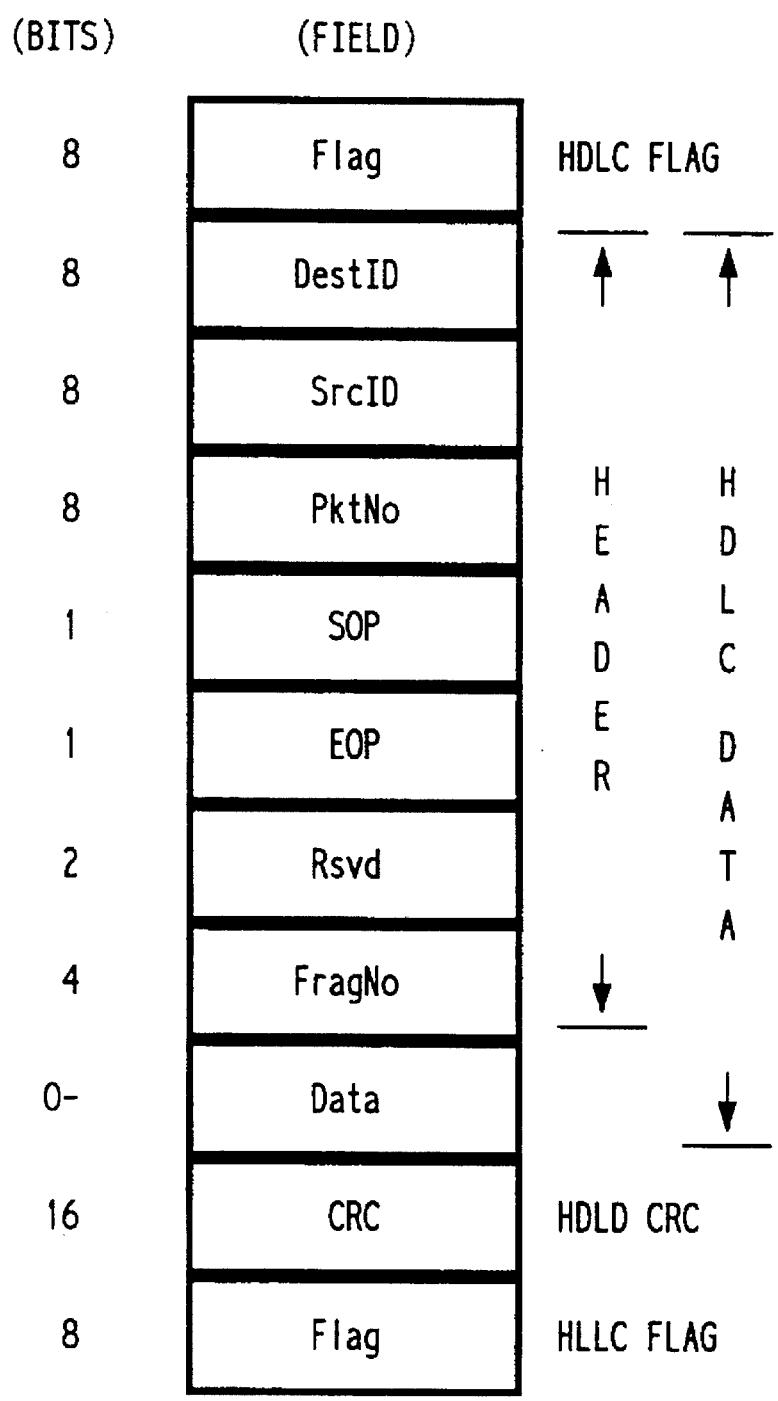
FIG. 28 is a representation of the unreliable transport comm packet structure.

Referring now to FIG. 28, there is shown a representation of the unreliable transport comm packet structure, according to a preferred embodiment of the present invention. The fields of the preferred unreliable transport comm packet are defined as follows:

| | |
|---|---|
| Flag | Standard HDLC Flag field. |
| DestID | The receiving site's logical channel identifier. The transmitting site peer acquires this ID by communicating to the remote site before exchanging data. This is done using a control logical channel (i.e., channel zero). |
| SrcID | The sending site's logical channel identifier. The type of data in the packet can be determined by knowing the logical channel ID-to-data type mapping. The current implementation uses the following mapping: The mapping is from DLM channels to TII channels, which occur at the TII level. At the time the TII channel is opened for a datatype, TII dynamically assigns unique DLM channels for different data types in ascending order starting from one (1). |
| PktNo | The packet sequence number. Distinguished from the FragNo field which counts the fragments within a packet. The PktNo field is used by the receiving site peer to implement a sliding window protocol. This |

|       |                                                                 |
| ----- | --------------------------------------------------------------- |
|       | allows packet buffering which is used to compensate for transmission delays. |
| SOP   | If the SOP bit is set, then the current fragment is the start of a packet. |
| EOP   | If the EOP bit is set, then the current fragment is the end of a packet. |
| Rsvd  | Reserved field.                                                 |
| FragNo| The fragment sequence number. Distinguished from the PktNo field which counts the number of whole packets. The FragNo is used by the receiving site peer to reassemble fragments into packets. The SOP and EOP fields are used to locate the start and end of a whole packet, respectively. |
| Data  | The data field.                                                 |
| CRC   | Standard HDLC CRC field.                                        |
| Flag  | Standard HDLC Flag field.                                       |

Data Structures, Functions, and Messages

This section contains the data structures and definitions of the functions and messages for conferencing API 506, video API 508, audio API 512, and comm API 510.

Conferencing API Data Structures, Functions, and Messages

Conferencing API 506 utilizes the following data types:
LPHCALL Pointer to a call handle.

| | |
|---|---|
| LPAVCB | Pointer to an Audio Video Control Block (AVCB). |
| LPCCB | Pointer to a Configuration Control Block (CCB). |
| LPBITMAPINFO | Pointer to a Microsoft ® Windows BITMAPINFO structure that defines a DIB (Device-Independent Bitmap). |
| LPHSTGRP | Pointer to the handle of a stream group. |
| LPABBUSCARDINFO | Pointer to a ABBUSCARDINFO, which defines the personal card information, from Address Book. Contains business card information; format is specified by the GUI. |

Conferencing API 506 utilizes the following structures that are passed to conferencing API 506 in function calls (e.g., CF_Init, CF_CapMon) and then passed by conferencing API 506 to the audio/video managers:

```
MCB (Media Control Block)
>>    WORD     wType         Media type:
>>                           CFMT_AUDIO - Audio Type (e.g., narrow or wide band)
>>                           CFMT-VIDEO - Video Type CCB (Configuration Control Block)
>>    WORD     wVersion      Version Number
>>    MCB      mtMedia[]     list of Media types supported by the system.

AVCB (Audio Video Control Block)
>>    WORD     wType         Local or remote AVCB type:
>>                           CFAVCB_LOCAL - local AVCB type
>>                           CFAVCB_REMOTE - remote AVCB type >>    Union {
>>              // local AVCB
>>              struct {
>>                   WORD wAIn                         Audio input hardware source
>>                   WORD           wAGain             Gain of the local microphone
>>                   WORD           wAMute             On/Off flag for audio muting
>>                   WORD           wVIn               Video input source
>>                   DWORDdwVDRate                     Maximum video data rate
>>                   WORD           wVContrast         Video contrast adjustment
>>                   WORD           wVTint             Video tint adjusunent
>>                   WORD           wVBrightness       Video brightness adjustment
>>                   WORD           wVColor            Video color adjustment
>>                   WORD           wVMonitor          On/Off flag for local video monitoring
>>                   WORD           wVMute             On/Off flag for local video muting. As the flag is
                                                       turned on/off, it will temporarily stop or restart the
                                                       related operations, including playing and sending,
                                                       being performed on this stream group. This can be
                                                       temporarily hold one video stream and provide
                                                       more bandwidth for other streams to use. For
                                                       example, a video stream can be paused while an
                                                       audio stream continues, to speed up a file transfer.
>>              } localcb >>              // remote AVCB
>>              struct {
>>                   WORD wAOut           Audio output hardware destination
>>                   WORD wAVol           Volume of the local speaker
>>                   WORD wAMute          On/Off flag for audio muting
>>                   WORD wVOut           Video output source
>>                   WORD wVContrast      Video contrast adjustment
>>                   WORD wVTint          Video tint adjustment
>>                   WORD wVBrightness    Video brightness adjustment
>>                   WORD wVColor         Video color adjustment
>>                   WORD wVMute          On/Off flag for local video muting
>>              } remotecb
>>    }

>>              // ADDR Information -    the address to be used for the conf. application to make a
                                         Connection/call, via issuing the CF_MakeCall with the remote site.
>>              // NOTE: This is the same as the TADDR structure defined by TII.
```

```
>>      struct {
>>              WORD wType          Type of Address, e.g., phone number, internet
>>                                  address, etc.
>>              WORD wSize          Size of the following address buffer
>>              LPSTR lpsAddrBuf    Address buffer
>>      }
```

Conferencing Call States:

| | |
|---|---|
| CCST_NULL | Null State |
| CCST_IDLE | Idle State |
| CCST_CONNECTED | Connected state |
| CCST_CALLING | Calling State |
| CCST_ACCEPTING | Accepting State |
| CCST_CALLED | Called state |
| CCST_CLOSING | Closing State |

Conferencing Channel States:

| | |
|---|---|
| CHST_READY | Ready State |
| CHST_OPEN | Opened state |
| CHST_OPENING | Opening state |
| CHST_SEND | Send state |
| CHST_RECV | Recv state |
| CHST_RESPONDING | Responding state |
| CHST_CLOSING | Closing state |

Conferencing Stream States:

| | |
|---|---|
| CSST_INIT | Init state |
| CSST_ACTIVE | Active state |
| CSST_FAILED | Failure state |

CStatus Return Values:

CF_OK
CF_ERR_PATHNAME
CF_ERR_CCB
CF_ERR_AVCB
CF_ERR_TOO_MANY_CAPTURE
CF_ERR_CALLBACK
CF_ERR_FIELD
CF_ERR_STATE
CF_ERR_CARDINFO
CF_ERR_STRGRP
CF_ERR_FFORMAT

CF_ERR_HANDLE
CF_ERR_PHONE#
CF_ERR_TIMEOUT
CF_ERR_INSUFF_BUFSIZE
CF_ERR_CALL
CF_ERR_RESOURCE_FAIL

In the above return values, CF_ERR_xxx means that the "xxx" parameter is invalid.

The functions utilized by conferencing API 506 are defined as follows:

CF_Init

This function reads in the conferencing configuration parameters (e.g., directory names in which the conferencing system software are kept) from an initialization file (e.g., c:\cyborg\vconf.ini), loads and initializes the software of video, comm., and audio subsystems. In addition, this function acquires the phone resource that no other applications can access the resource until this application makes a call to CF_Uninit later to relinquish the phone resource.

Also, it allows the application to choose between the messaging and the callback interfaces to return the event notifications. The callback interface allows the conferencing software to call a user designated function to notify the application of incoming events. The messaging interface allows the conferencing to notify the application of incoming events by posting messages to application message queues. The parameters to the function varying depending on the notification method chosen.

```
CStatus CF_Init(  LPSTR         lpIniFile,
                  LPADDR        lpLocalAddr,
                  LPCONN_CHR    lpConnAttributes,
                  WORD          wFlag,
                  CALLBACK      cbAppCall,
                  LPCCB         lpCcb)
input       lpIniFile:       the pathname to the conferencing INI file.
lpLocalAddr:       pointer to the local address
lpConnAttributes:  pointer to the attributes requested for incoming calls
wFlag:      Indicates the type of notification to be used:
            CALLBACK_FUNCTION    for callback interface
            CALLBACK_WINDOW      for post message interface
cbAppCall:  the callback routine or the message interface to return the notifications
            from the remote site to the application.
output lpCcb:      returns the handle to the configuration control block, preallocated by
            the application that contains the configuration information.
Valid state(s) to issue:
    Null State
State after execution:
    CCST_IDLE
Return values:
    CF_OK
    CF_ERR_PATHNAME
    CF_ERR_CCB
    CF_ERR_CALLBACK
    CF_ERR_RESOURCE_FAIL
    CF_ERR_ALREADY_INITIALIZED
```

Callback routine:
    FuncName (WORD wMessage, WORD wParam, LONG lParam)
    wMessage:   the Window message type (e.g., CFM_XXXX_NTFY)
    wParam:     the Call Handle
    lParam:     additional Information which is message-specific NOTE: the parameters of the callback function are equivalent to the last three parameter passed to a Window message handler function (Win 3.1).

CF_Uninit

This function writes out the conferencing configuration parameters back to the initialization file (e.g., c:\cyborg\vconf.ini), unloads and uninitializes the software of video, comm., and audio subsystems. In addition, this function relinquishes the phone resource acquired with CF_Init.

---

CStatus CF_Uninit (LPCCB lpCcb)
input lpCcb:   the handle to the configuration control block that
         contains the configuration information.
Valid state(s) to issue:
    CCST_IDLE
State after execution:
    CCST_NULL
Return values:
    CF_OK
    TBD

---

Status Message:
    CFM_UNINIT_NTFY:    UnInit complete.
Communication

Call Management

The Call Management functions will provide the application the ability to establish and manage calls/connections to its peers on the network.

CF_MakeCall

This function makes a call to the remote site to establish a call/connection for the video conferencing. This call will be performed asynchronously.

After all related operations for CF_MakeCall is eventually complete, the callback routine (or the message) specified in the CF_Init function will return the status of this call.

The peer application will receive a CFM_CALL_NTFY callback/message as a result of this call.

---

CStatus CF_MakeCall (    LPADDR             lpAddress,
                         LPCONN_CHR         lpConAttributes,
                         LPABBUSCARDINFO    lpabCardInfo,
                         WORD               Timeout,
                         LPMTYPE            lpMedia)
input lpAddress:       pointer to the address structure of the destination (or Callee),.
lpConnAttributes pointer to the attributes requested for the call.
lpabCardInfo:    pointer to business card information of the caller.
wTimeOut:        Number of seconds to wait for peer to pickup the phone.
lpMedia:         pointer to a list of desirable media types.
                 If a null pointer is specified, the default (best possibility) will
                 be selected.
Valid state(s) to issue:
    CCST_IDLE
State after execution:
    CCST_CALLING
Return values:
    CF_OK
    CF_ERR_STATE
    CF_ERR_HANDLE
    CF_ERR_RESOURCE_FAIL
Peer Messages:
    A CFM_CALL_NTFY message will be delivered to the remote site
    to indicate the call request.
Status Messages:
    CFM_ACCEPT_NTFY:                         The peer process has accepted
                                             the call
    CFM_PROGRESS_NTFY:                       The optional progress
                                             information of the call
            CF_PROG_DIAL_TONE
            CF_PROG_DIALING
            CF_PROG_RINGBACK
    CFM_REJECT_NTFY:                         The error reported for the
                                             call
            CF_REJ_TIMEOUT
            CF_REJ_ADDRESS
            CF_REJ_NETWORK_BUSY
            CF_REJ_STATION_BUSY
            CF_REJ_RESOUCE_FAIL

---

CF_13 AcceptCall

This function is issued to accept a call request, received as part of the CFM_CALL_NTFY callback/message, that was initiated from the peer.

Both sides will receive a CFM_ACCEPT_NTFY callback/message as a result of this call.

```
CStatus CF_AcceptCall (    HCALL              hCall,
                           LPABBUSCARDINFO    lpabCallee,
                           LPMTYPE            lpMedia)
input hCall:       handle to the call (returned by the
             CFM_CALL_NTFY message).
lpabCallee:  pointer to ABBUSCARDINFO of the callee who
             issues this function.
lpMedia:     pointer to a list of desirable media types. If a
             null pointer is specified, the default (best
             possibility) will be selected.
Valid state(s) to issue:
       CCST_CALLED
State after execution:
       CCST_ACCEPTING
Return values:
       CF_OK
       CF_ERR_STATE
       CF_ERR_CARDINFO
       CF_ERR_HANDLE
       CF_ERR_RESOURCE_FAIL
Peer Messages:
       A CFM_ACCEPT_NTFY message will be received
       by the remote site.
Status Messages:
       A CFM_ACCEPT_NTFY message will be received
       by the accepting site.
```

CF_RejectCall

Upon receiving a CFM_CALL_NTFY message, this function can be issued to reject the incoming call request. In fact, this function neither picks up the incoming call, nor sends a rejection message to the remote. Instead, it will simply ignore the call notification and let the peer application time-out. This would avoid the unnecessary telephone charge or the unpleasant rejection to the caller.

The peer application will receive a CFM_TIMEOUT_NTFY callback/message as a result of this call.

```
CStatus CF_RejectCall (HCALL hCall)
input hCall:   handle to the call (returned by the
         CFM_CALL_NOTIFY message).
Valid state(s) to issue:
       CCST_CALLED
State after execution:
       CCST_IDLE
Return values:
       CF_OK
       CF_ERR_STATE
       CF_ERR_RESOURCE_FAIL
Peer Messages:
       A CFM_REJECT_NTFY message will be resulted to
       the remote app
Status Messages:
       none
```

CF_HangupCall

This function hangs up a call that was previously established. It releases all system resources, including all types of streams, channels, and data structures, allocated during this call.

```
CStatus CF_HangupCall (HCALL hCall)
input hCall:   handle to the call
Valid state(s) to issue:
       CCST_CONNECTED
State after execution:
       CCST_CLOSING
Return values:
       CF_OK
       CF_ERR_STATE
       CF_ERR_RESOURCE_FAIL
Peer Message:
       A CFM_HANGUP_NTFY message will be delivered
       to the remote site.
Status Message:
       A CFM_HANGUP_NTFY message will be delivered
       to the local site when the Hangup is complete.
```

CF_GetCallInfo

This function returns the current status information of the specified call.

```
CStatus CF_Get-   ( HCALL              hCall,
CallInfo            LPCONN_CHR         lpConnAttributes,
                    LPWORD             lpwState,
                    LPMTYPE            lpMedia
                    LPABBUSCARDINFO    lpabCardInfo)
input hCall:             handle to the call
output lpwState:          current call state
lpConnAttributes:  Connection Attributes
lpMedia:           a list of selected media types used for this call.
                   Note that this list can be different from the
                   desired list.
lpabCardInfo:      peer's business card information
Valid state(s) to issue:
       all call states
State after execution:
       unchanged
Return values:
       CF_OK
       CF_ERR_RESOURCE_FAIL
       CF_ERR_HANDLE
```

Channel Management

These Channel Management functions will provide the application the ability to establish and manage virtual channels to its peers on the network.

CF_RegisterChanMgr

This function registers a callback or an application window whose message processing function will handle notifications generated by network channel initialization operations. This function must be invoked before any CF_OpenChannel calls are made.

```
CStatus CF_RegisterChanMgr    ( HCALL       hCall,
                                WORD        wFlag,
                                CALLBACK    cbNetCall)
input hCall:     handle to the call
wflag:     Indicates the type of notification to be used:
           CALLBACK_FUNCTION    for callback
                                interface
           CALLBACK_WINDOW      for post message
                                interface
cbNetCall: Either a pointer to a callback function, or a
           window handle to which messages will be posted,
           depending on flags.
Valid state(s) to issue:
``` call state

CCST_CONNECTED
State after execution:
call state

CCST_CONNECTED
Return values:
    CF_OK
    CF_ERR_HANDLE
Callback routine format:
    FuncName (UINT Message, WPARAM wparam,
    LPARAM lparam)
    Message:   The message type
    wParam:   Word parameter passed to function
    lParam:   Long parameter passed to function
NOTE: the callback function parameters are equivalent to the
second, third, as fourth parameters that are delivered to a
Window message handler function (Win 3.1).
Status Messages: none
Peer Messages: none CF_OpenChannel This routine requests to open a network channel with the peer application. The result of the action is given to the application by invoking the callback routine specified by the call to CF_RegisterChanMgr. The application must specify an ID for this transaction. This ID is passed to the callback routine or posted in a message.

Note that the channels to be opened by the CF_OpenChannel call is always "write-only", whereas the channels to be opened by the $CF_{13}$ AcceptChannel call is always "read-only".

CStatus CF_OpenChannel (HCALL hCall,
LPCHAN_INFO lpChan, DWORD dwTransID)
input hCall:    handle to the call.
lpChan:    Pointer to a channel structure. Filled by
    application.
    The structure contains:
    - A channel number.
    - Priority of this channel relative to other
    channels on this connection. Higher
    numbers represent higher priority.
    - Timeout value for the channel
    - Reliability of the channel.
    - Channel specific information.
    See CHAN_INFO definition in TII.
dwTransID:    An application defined identifier that is returned
    with status messages to identify the channel
    request that the message belongs to.
Valid state(s) to issue:
call state CCST_CONNECTED
channel state CHST_READY
State after execution:
call state CCST_CONNECTED
channel state CHST_OPENING
Return values:
    CF_OK
    CF_ERR_HANDLE
    CF_ERR_STATE
    CF_ERR_PRIORITY
    CF_ERR_NO_CHANMGR
    CF_ERR_CHAN_NUMBER
    CF_ERR_CHAN_INUSE
Status Messages:

| | |
|---|---|
| CFM_CHAN_ACCEPT_NTFY: | The peer process has accepted request. |
| CFM_CHAN_REJECT_NTFY: | The Peer process has rejected request. |
| CFM_CHAN_TIMEOUT_NTFY: | No answer from peer |
| Peer Messages: | |
| CFM_CHAN_OPEN_NTFY: | |

$CF_{13}$ AcceptChannel

A peer application can issue AcceptChannel in response to a CFM_CHAN_OPEN_NTFY (OpenChannel) message that has been received. The result of the AcceptChannel call is a one-way network channel for receiving data.

Note that the channels to be opened by the CF_OpenChannel call is always "write-only", whereas the channels to be opened by the $CF_{13}$ AcceptChannel call is always "read-only".

CStatus CF_AcceptChannel (HCHAN hChan, DWORD
dwTransID)
input hChan:    handle to the channel
dwTransID:    A user defined identifier that was received as part
    of the CFM_CHAN_OPEN_NTFY message.
Valid state(s) to issue:
call state CCST_CONNECTED
channel state CHST_RESPONDING
State after execution:
call state CCST_CONNECTED
channel state CHST_OPEN
Return values:
    CF_OK
    CF_ERR_HANDLE
    CF_ERR_STATE
    CF_ERR_CHAN_NUM
Status Messages: none
Peer Messages:
    CFM_CHAN_ACCEPT_NTFY    The TransID is sent in lParam.

CF_RejectChannel

This routine rejects an CFM_CHAN_OPEN_NTFY from the peer.

CStatus CF_RejectChannel (HCHAN hChan, DWORD
dwTransID)
input hChan:    Handle to the channel.
dwTransID:    A user defined identifier that was receive as part
    of the CFM_CHAN_OPEN_NTFY message.
Valid state(s) to issue:
call state CCST_CONNECTED
channel state CHST_RESPONDING
State after execution:
call state

CCST_CONNECTED channel state

CHST_READY
Return values:
    CF_OK
    CF_ERR_HANDLE
    CF_ERR_STATE
    CF_ERR_CHAN_NUM
Status Messages: none
Peer Messages:
    CFM_CHAN_REJECT_NTFY    The TransID is sent as lParam.

CF_RegisterChanHandler

This function registers a callback or an application window whose message processing function will handle notifications generated by network channel IO activities. The channels that are opened will receive CFM_DATA_SENT_NTFY, and the accepted channels will receive CFM_RECV_COMPLTE_NTFY.

CStatus CF_RegisterChanHandler (HCHAN hChan, WORD wFlag, CALLBACK cbChanHandleCall)
input hChan:    handle to the channel.
wFlag:    Indicates the type of notification to be used:
    CALLBACK_FUNCTION    for callback interface
    CALLBACK_WINDOW    for post message interface
    NOCALLBACK    for polled status interface.
cbChanHandleCall:
    Either a pointer to a callback function, or a window handle to which messages will be posted, depending on flags.
Valid state(s) to issue:
call state CCST_CONNECTED
channel state CHST_OPEN
State after execution:
call state CCST_CONNECTED
channel state CHST_SEND (FOR OUTGOING CHANNEL)
    CHST_RECV (FOR INCOMING CHANNEL)
Return values:
    CF_OK
    CF_ERR_HANDLE
    CF_ERR_STATE
    CF_ERR_CHAN_NUMBER
Callback routine format:
    FuncName (UINT Message, WPARAM wParam, LPARAM lParam)
    Message:    The message type
    wParam:    Word parameter passed to function
    lParam:    Long parameter passed to function (TransID)
NOTE that the callback function parameters are equivalent to the second, third, as fourth parameters that are delivered to a Window message handler function (Win 3.1).
Status Messages: none
Peer Messages: none CF_CloseChannel This routine will close a network channel that was opened by CF_13 AcceptChannel or CF_OpenChannel. The handler for this channel is automatically de-registered.

CStatus CF_CloseChannel (HCHAN hChan, DWORD dwTransID)

input hChan:    handle to the Channel to be closed.
dwTransID:    An application defined identifier that is returned with the response notification.
Valid state(s) to issue:
call state CCST_CONNECTED
channel state CHST_SEND, CHST_RECV, CHST_OPEN
State after execution:
call state CCST_CONNECTED
channel state CHST_CLOSING
Return values:
    CF_OK
    CF_ERR_HANDLE
    CF_ERR_STATE
Status Messages:
    CFM_CHAN_CLOSE_NTFY:
Peer Messages:
    CFM_CHAN_CLOSE_NTFY:

Data Exchange

All the data communication is done in "message passing" fashion. This means that any send will satisfy any receive on a specific channel, regardless of the length of the sent data and the receive buffer length. If the length of the sent message is greater than the length of the posted receive buffer the data will be truncated.

All these calls are "asynchronous", which means that the data in the send buffer must not be changed until a CFM_DATA_SEND_NTFY notification has been sent to the application, and the contents of receive buffer is not valid until a CFM_RECV_COMPLETE_NTFY has been received for that channel.

CF_SendData

Send data to peer. If there are no receive buffers posted on the peer machine, the data will be lost.

CStatus CF_SendData (HCHAN hChan, LPSTR lpsBuffer, WORD Buflen, DWORD dwTransID)
input hChan:    Handle to the channel.
lpsBuffer:    A pointer to the buffer to be sent.
Buflen:    The length of the buffer in bytes.
dwTransID:    This is a user defined transaction ID which will be passed to the channel handler along with other status message data to identify the transaction that the response belongs to.
Valid state(s) to issue:
call state CCST_CONNECTED
channel state CHST_SEND
State after execution:
call state CCST_CONNECTED
channel state CHST_SEND
Return values:
    CF_OK
    CF_ERR_CHAN_NUMBER
    CF_ERR_STATE
    CF_CHAN_TRAN_FULL (Channel transaction table full)
Status Messages:
    CFM_DATA_SENT_NTFY
        Tells the application that the data has been extracted
        from the buffer and it is available for reuse.
    CFM_DATA_LOST_NTFY
        This message will be delivered to the caller if the
        data could not be sent.
Peer Messages:
    CFM_RECV_COMPLETE_NTFY
        indicates that data was received.
    CFM_CHAN_DATA_LOST_NTFY
        this message will be delivered to the peer if there are
        no RecvData calls pending.

CF_RecvData

Data is received through this mechanism. Normally this call is issued in order to post receive buffers to the system. When the system has received data in the given buffers, the Channel Handler will receive a CFM_RECV_COMPLETE_NTFY.

CStatus CF_RecvData (HCHAN hChan, LPSTR lpsBuffer,
WORD Buflen, DWORD dwTransID)
input

| | |
|---|---|
| hChan: | Handle to the channel |
| lpsBuffer: | A pointer to the buffer to be filled in. |
| Buflen: | The length of the buffer in bytes. Max. bytes to receive. |
| dwTransID: | This is a user defined transaction ID which will be passed to the channel handler along with other status message to identify the transaction that the response belongs to. |

Valid state(s) to issue:
call state

CCST_CONNECTED
channel state

CHST_RECV
State after execution:
call state

CCST_CONNECTED
channel state

CHST_RECV
Return values:
    CF_OK
    CF_ERR_CHAN_NUMBER
    CF_ERR_STATE
    CF_CHAN_TRAN_FULL (Channel transaction table full)
Status Messages:
    CFM_RECV_COMPLETE_NTFY
        indicates that data was received.
    CFM_CHAN_DATA_LOST_NTFY
        indicates that the buffer was too small for an incoming
        data message, or some other data error. The contents of
        the data buffer are undefined.
Peer Messages:
    none Communication Control & Statistics
CF_Get
ChanInfo This function will return various statistical information about a channel. For examples: Bandwidth information, number of sends/second, number of receives/second, etc. Full set of statistical information will be defined at a later time.

CStatus CF_GetChanInfo (HCHAN hChan,
LPCHAN_INFO lpCsInfo)
input

| | |
|---|---|
| hChan: | Handle to the specified Channel |
| lpCsInfo: | Pointer to a CHAN_INFO struct. |

Valid state(s) to issue:
call state

CCST_CONNECTED
channel state

Any except CHST_NULL, CHST_READY
State after execution:
call state

CCST_CONNECTED
channel state

UNCHANGED
Return values:
    CF_OK
    CF_ERR_CHAN_NUMBER
Status Messages: none
Peer Messages: none Capture, Record, & Playback These "convenience" calls will provide the application the ability to capture, record, and playback the audio/video streams from the specified source (e.g., from the local Audio/Video HW or from the Network) and/or to the specified sync (e.g., local Audio/Video HW, File, or Network).

CF_CapMon

This function starts the capture of video signals from the local camera and displays them (via the HW "monitor" function) in the local_video window which is pre-opened by the application. Also, it starts the capture of audio signals from the local microphone and plays them back through the local speaker. Note that as part of the capture function, this "monitor" function is slightly different from the "play" function descibed later in "CF_PlayRcvd" and "CF_PlayStream". The "monitor" function is a low-overhead display operation supported by the Video hardware that moves uncompressed digital video from camera to the monitor screen. Therefore, this function only works for local video stream. For the remote video stream received from the network, the "Play" function must be used to display it on the screen (see later section for more details). Also, the monitor function can be turned on/off later using CF_ControlStream calls.

This function allows the user to preview his/her appearance and sound before sending the signals out to the remote.

CStatus CF_CapMon (HWND hWnd, LPHSTGRP lphStgrp,
lpAInfo, lpVInfo)
input

| | |
|---|---|
| hWnd: | handle to the local_Video_window pre-opened by the application |
| lpAInfo: | Pointer to AINFO structure describing Audio stream attributes |
| lpVInfo: | Pointer to VINFO structure describing Video stream attributes | output

| | |
|---|---|
| lphStgrp: | pointer to the handle of a stream group to be captured |

Valid state(s) to issue:
    CSST_INIT
State after execution:
    CSST_ACTIVE
Return values:
    CF_OK

CF_ERR_TOO_MANY_CAPTURE
CF_ERR_HANDLE
CF_ERR_RESOURCE_FAIL

CF_PlayRcvd

This function starts the reception and display (via the software "Play" function) of remote video signals in the remote_video_window which is pre-opened by the application. Also, it starts the reception and play of remote audio signals back through the local speakers. The "Play" function that is automatically invoked as part of this function can be later turned on/off by the application by issuing calls to CF_PlayStream.

Note that the call can only be correctly issued after the phone connection is made. Otherwise, "CF_ERR_STATE" will be returned by the call. Also,

---

CStatus CF_PlayRcvd (HWND hWnd, HCALL hCall,
LPHSTGRP lphStgrp)
input hWnd:      handle to the remote_video_window pre-opened by
           the application
hCall:     handle to the call
lpAInfo:   Pointer to AINFO structure describing Audio stream
           attributes
lpVInfo:   Pointer to VINFO structure describing Video stream
           attributes
output lphStgrp:  pointer to the handle to a stream group to be
           received
Valid state(s) to issue:
    CCST_CONNECTED & CSST_INIT
State after execution:
    CCST_CONNECTED & CSST_ACTIVE
Return values:
    CF_OK
    CF_ERR_HANDLE
    CF_ERR_STATE
    CF_ERR_RESOURCE_FAIL

---

CF_PlayStream

This function starts or stops playing the captured video and audio streams of a specified stream group.

---

CStatus CF_PlayStream (HWND hWnd, HSTGRP hStgrp,
Word wFlag)
input hWnd:    handle to the "Play" window pre-opened by the
         application
hStgrp:  handle to the stream group
wFlag:   start/stop flag
Valid state(s) to issue:
    CSST_ACTIVE
State after execution:
    CSST_ACTIVE
Return values:
    CF_OK
    CF_ERR_STATE
    CF_ERR_STRGP
    CF_ERR_HANDLE
    CF_ERR_RESOURCE_FAIL

---

CF_RecordStream

This function starts or stops recording the captured video and audio streams of a specified stream group into a specified file. Currently, the only supported file format is AVI File. Also, recording streams in a file will overwrite, instead of append, to an existing file.

---

CStatus CF_RecordStream (HSTGRP hStgrp, Word wFormat,
Word wFlag, LPSTR lpFile)
input hStgrp:   handle to the stream group
wFormat:  the file format for recording
wFlag:    start/stop flag
lpFile:   the pathname to the AVI file to record the A/V
          streams
Valid state(s) to issue:
    CSST_ACTIVE
State after execution:
    CSST_ACTIVE
Return values:
    CF_OK
    CF_ERR_STATE
    CF_ERR_STRGP
    CF_ERR_RESOURCE_FAIL
    CF_ERR_FILE

---

Stream Control & Status

These "convenience" calls will provide the application the ability to control and obtain the status information of the specified stream group.

CF_ControlStream

This function set the parameters to control the capture or playback functions of the local or remote video and audio stream groups.

---

CStatus CF_ControlStream (HSTGRP hStgrp,
WORD wfield, LPAVCB lpAvcb)
input hStgrp:  handle to a stream group
wfield:  field of the AVCB to be modified, the valid fields
         for local and remote AVCB are listed below:
         TBD
lpAvcb:  Pointer to the AVCB
Valid state(s) to issue:
    all states except CSST_INIT
State after execution:
    unchanged
Return values:
    CF_OK
    CF_ERR_FIELD
    CF_ERR_STRGP
    CF_ERR_STATE
    CF_ERR_RESOURCE_FAIL

---

CF_GetStreamInfo

This function returns the current state and the AVCB, preallocated by the application, of the specified stream groups.

---

CStatus CF_GetStreamInfo (LHSTGRP hStgrp, LPWORD
lpwState, LPAVCB lpAvcb)
input hStgrp:    handle to a stream group
output lpwState:  return current application state
lpAvcb:    return the pointer to the AVCB preallocated by the
           application.
Valid state(s) to issue:
    all states
State after execution:
    unchanged
Return values:
    CF_OK
    CF_ERR_RESOURCE_FAIL

---

CF_DestroyStream

This function destroys the specified stream group that was created by CF_CapMon or CF_PlayRcvd. As part of the destroy process, all operations (e.g., sending/playing) being performed on the stream group will be stopped and all allocated system resources will be freed.

---

CStatus CF_DestroyStream (HSTGRP hStgrp)
input hStgrp: handle to a stream group to be destroyed
Valid state(s) to issue:
    All stream states except CSST_INIT
State after execution:
    CSST_INIT
Return values:
    CF_OK
    CF_ERR_STGRP

---

Network Linking

These "convenience" calls will provide the application the ability to start/stop sending active captured audio/video streams to the network.

CF_SendStream

This function starts or stops sending the captured video and audio streams of a specified stream group to the remote.

---

CStatus CF_SendStream (HCALL hCall, HSTGRP hStgrp, Word wFlag)
input hCall: handle to the call
hStgrp: handle to the stream group
wFlag: start/stop flag
Valid state(s) to issue:
    CSST_ACTIVE
State after execution:
    CSST_ACTIVE
Return values:
    CF_OK
    CF_ERR_STATE
    CF_ERR_STGRP
    CF_ERR_CALL
    CF_ERR_RESOURCE_FAIL

---

CF_Mute

This function stops or resumes sending the captured video and audio streams of a specified stream group to the remote site.

---

CStatus CF_Mute (HCALL hCall, HSTGRP hStgrp, Word wFlag)
input hCall: handle to the call
hStgrp: handle to the stream group
wFlag: start/stop flag
Valid state(s) to issue:
    CSST_ACTIVE
State after execution:
    CSST_ACTIVE
Return values:
    CF_OK
    CF_ERR_STATE
    CF_ERR_STGRP
    CF_ERR_CALL
    CF_ERR_RESOURCE_FAIL

---

Frame Grabbing

CF_SnapStream

This function takes a snapshot of the video stream of the specified stream group and returns a still image (reference) frame in a buffer allocated by the VCI DLL to the application. Currently, the only supported image format is DIB.

---

CStatus CF_SnapStream (HSTGRP hStgrp, WORD wFormat, LPDWORD lpdwbufsize, LPBITMAPINFO lpDib)
input hStgrp: handle to a stream group
wFormat: still image format )
output lpdwbufsize: size of the returned buffer.
lpDib: pointer to the DIB buffer allocated by the VCI DLL.
Valid state(s) to issue:
    CSST_ACTIVE
State after execution:
    unchanged
Return values:
    CF_OK
    CF_ERR_STATE
    CF_ERR_STGRP
    CF_ERR_BUFFER
    CF_ERR_INSUFF_BUFSIZE
    CF_ERR_RESOURCE_FAIL

---

The messages utilized by conferencing API 506 are defined as follows:

This section describes the messages generated by VCI and the parameters that are passed along with them.

Call Messages

CFM_CALL_NTFY

This is a notification message that the system has just received a call request initiated from the remote site.

---

CFM_CALL_NTFY
Returned Parameters

| | | |
|---|---|---|
| wParam | HCALL | handle to the call. This handle should be used to accept/reject the call. |
| lParam | LPV_CBACK | pointer to a structure containing incoming call info:<br>{<br>  LPADDR    Pointer to address of Caller<br>  LPCONN_CHR  Pointer to Connection Attributes<br>} |

Valid Call States To Receive the Notification:
    CCST_IDLE
State after receiving the message:
    CCST_CALLED

---

CFM_PROGRESS_NTFY

This is a notification message that returns the status of the call in progress from the phone system.

---

CFM_PROGRESS_NTFY
Returned Parameters

| | | |
|---|---|---|
| wParam | HCALL | handle to the call in progress |
| lParam | DWORD | substate of the call |

Valid wSubstate values:
    CF_PROG_DIAL_TONE
    CF_PROG_DIALING
    CF_PROG_RINGBACK
Valid Call States To Receive the Notification:
    CCST_CALLING
State after receiving the message:
    CCST_CALLING

---

CFM_ACCEPT_NTFY

The remote site has accepted the call request issued locally.

CFM_ACCEPT_NTFY
Returned Parameters

| | | |
|---|---|---|
| wParam | HCALL | handle to the call. |
| lParam | LPV_CBACK | pointer to a structure containing call info: |
| | | { |
| | LPCONN_CHR | Pointer to Connection Attributes |
| | LPABBUSCARDINFO | Pointer to Business-Card info of peer |
| | LPMTYPE | Pointer to Media Types structure |
| | | } |

Valid Call States To Receive the Notification:
    CCST_ACCEPTING/CCST_CALLING
State after receiving the message:
    CCST_CONNECTED

CFM_REJECT_NTFY

The connection/call can not be made due to the situation described in the substates.

CFM_REJECT_NTFY
Returned Parameters lParam   DWORD   substate of the call
Valid wSubstate values:
    CF_REJ_TIMEOUT
    CF_REJ_ADDRESS
    CF_REJ_NETWORK_BUSY
    CF_REJ_STATION_BUSY
    CF_REJ_RESOUCE_FAIL
Valid Call States To Receive the Notification:
    CCST_CALLING
State after receiving the message:
    CCST_IDLE

CFM_HANGUP_NTFY

The remote site has hung up the call, or this is a response to a locally initiated Hangup.

CFM_HANGUP_NTFY
Returned Parameters wParam   HCALL   handle to the call
Valid Call States To Receive the Notification:
    CCST_CONNECTED and CCST_CLOSING
State after receiving the message:
    CCST_IDLE

Channel Messages

The following messages are generated in response to the various channel related functions as described with the function definitions.

CFM_CHAN_ACCEPT_NTFY

This is a notification message indicating that the peer has accepted the Open Channel request (via issuing a CF_13 Accept_Channel call).

CFM_CHAN_ACCEPT_NTFY
Returned Parameters

| | | |
|---|---|---|
| wparam | HCHAN | Handle to the channel to be used subsequently by the application. |
| lParam | DWORD | TransID provided by the application, that identifies the application transaction related to this notification. |

Valid States To Receive the Notification:
call state

CCST_CONNECTED
channel state

CHST_OPENING
State after receiving the message:
call state

CCST_CONNECTED
channel state

CHST_OPEN

CFM_CHAN_REJECT_NTFY

This is a notification message indicating that the peer has rejected the Open Channel request (via issuing a CF_RejectChannel).

CFM_CHAN_REJECT_NTFY
Returned Parameters

| | | |
|---|---|---|
| lParam | DWORD | Trans ID provided by the application, that identifies the application transaction related to this notification. |

Valid States To Receive the Notification:
call state

CCST_CONNECTED
channel state

CHST_OPENING
State after receiving the message:
call state

CCST_CONNECTED
channel state

CHST_READY

CFM_CHAN_TIMEOUT_NTFY

This is a notification message indicating that the peer has failed to answer the Open Channel request before the local timer expires.

CFM_CHAN_TIMEOUT_NTFY
Returned Parameters

| | | |
|---|---|---|
| lParam | DWORD | TransID provided by the application, that identifies the application transaction related to this notification. |

Valid States To Receive the Notification:
call state

CCST_CONNECTED
channel state

CHST_OPENING
State after receiving the message:
call state

CCST_CONNECTED channel state

CHST_READY

CFM_CHAN_OPEN_NTFY
This is a notification message indicating that the peer has initiated an Open Channel request (via issuing a CF_Open_Channel call).

CFM_CHAN_OPEN_NTFY
Returned Parameters

| wParam | HCHAN | Handle to the Channel to be used subsequently by the application. |
|---|---|---|
| lParam | LPV_CBACK | Pointer to info about incoming channel request |
| | | { |
| | DWORD | TransId (to be used in Accept/ Reject Channel) |
| | HCALL | Handle to Connection |
| | LPCHAN_INFO | Channel Info passed by peer |
| | | } |

Valid States To Receive the Notification:
call state

CCST_CONNECTED
channel state

CHST_READY
State after receiving the message:
call state

CCST_CONNECTED
channel state

CHST_RESPONDING

CFM_CHAN_CLOSE_NTFY
This is a notification message indicating that the peer has initiated a Close Channel request (via issuing a CF_Close_Channel call). This may also be in response to a locally initiated Close Channel.

CFM_CHAN_CLOSE_NTFY
Returned Parameters

| wParam | HCHAN | Handle to the Channel |
|---|---|---|
| lParam | DWORD | If the callback is a remote Close indication, lParam = 0 |
| | | If the callback is a response to a locally initiated CloseChannel lParam = TransID specified by app. |

Valid States To Receive the Notification:
call state

CCST_CONNECTED
channel state

CHST_SEND, CHST_RECV, CHST_OPEN
State after receiving the message:
call state

CCST_CONNECTED
channel state

CHST_READY

CFM_DATA_SENT_NTFY
This is a notification message indicating that the data in the buffer has been sent out (via the previous call to the CF_Send_Data). The data buffer used in the CF_Send_Data is now available for reuse.

CFM_DATA_SENT_NTFY
Returned Parameters

| wParam | WORD | The actual number of bytes sent. |
|---|---|---|
| lParam | DWORD | TransID provided by the application, that identifies the application transaction related to this notification. |

Valid States To Receive the Notification:
call state

CCST_CONNECTED
channel state

CHST_SEND
State after receiving the message:
call state

CCST_CONNECTED
channel state

CHST_SEND

CFM_RCV_COMPLETE_NTFY
This is a notification message indicating that the system has received data in the buffer posted by the application (via issuing CF_RecvData calls).

CFM_RCV_COMPLETE_NTFY
Returned Parameters

| wParam | WORD | The actual number of bytes received |
|---|---|---|
| lParam | DWORD | TransID provided by the application, that identifies the application transaction related to this notification. |

Valid States To Receive the Notification:
call state

CCST_CONNECTED
channel state

CHST_RECV
State after receiving the message:
call state

CCST_CONNECTED
channel state

CHST_RECV

CFM_DATA_LOST_NTFY
This is a notification message indicating that the data sent is lost because the peer had no data buffers available to receive it. This message will be delivered to both the sender and the receiver applications.

CFM_DATA_LOST_NTFY
Returned Parameters

| wParam | WORD | Number of bytes lost |
|---|---|---|
| lParam | DWORD | TransID provided by the application, that identifies the application transaction related to this notification. |

Valid States To Receive the Notification:
call state

CCST_CONNECTED
channel state

CHST_SEND
   CHST_OPEN
State after receiving the message:

-continued

| call state | |
|---|---|
| CCST_CONNECTED | |
| channel state | |
| UNCHANGED | |

Video API Data Structures, Functions, and Messages

Video API 508 utilizes the following data types:

| | |
|---|---|
| VSTATUS | Video subsystem interface return status type. WORD (16-bit) value. |
| HVSTRM | Handle to a video stream |
| LPHVSTRM | Pointer to the handle to a video stream |
| LPVINFO | Pointer to a video information (VINFO) structure |
| HVCCB | Handle to the Video Configuration Control Block (VCCB) |
| LPCHANID | Pointer to the network channel ID (CHANID) |

Video API 508 utilizes the following structures:

3.1.2. Structure Types

| | VINFO (Video Stream Information) | | |
|---|---|---|---|
| >> | WORD | wType | Local or remote video stream |
| >> | WORD | wReserved | DWORD alignment, future use |
| >> | DWORD | dwFlags | Flags bits: various exclusive attributes |
| >> | WORD | wContrast | Contrast adjustment |
| >> | WORD | wTint | Color adjustment |
| >> | WORD | wSaturation | Saturation value |
| >> | WORD | wBrightness | Brightness adjustment |
| >> | WORD | wDisplayRate | Monitor/Playback window Blt rate; <= IRV frame rate |
| >> | WORD | wReserved2 | DWORD alignment, future use |
| >> | Union { | | |
| >> | // local video stream | | |
| >> | struct { | | |
| >> | WORD | wCaptureSource | Video capture source (placeholder) |
| >> | WORD | wCaptureFormat | Video capture format (IRV, YUV-9, etc.) |
| >> | DWORD | wCaptureDriver | Four CC code |
| >> | WORD | wDataRate | Maximum video data rate (kbits/sec) |
| >> | WORD | wMaxFrameRate | 1–30 |
| >> | WORD | wQualityPercent | 0–100; 0 = Lowest quality, least number of frames dropped; 100 = Highest quality, most number of frames dropped |
| >> | } local | | |
| >> | // remote video stream | | |
| >> | struct | | |
| >> | WORD | wPlaybackTarget | Video playback hardware (placeholder) |
| >> | WORD | wReserved | Alignment, future use |
| >> | } remote | | |
| >> | HASTRM | hAStrm | Associated audio stream, as needed |
| >> | } | | |

Video API 508 utilizes the following constants:

| | Constants |
|---|---|
| State values: | |
| VST_INIT | Init state |
| VST_OPEN | Open state |
| VST_CAPTURE | Capture state |
| VST_PLAY | Play state |
| VST_LINKIN | Link In state |
| VST_LINKOUT | Link Out state |
| VST_ERROR | Error state |
| Status Values | |
| V_OK | for successful return (=0) |
| V_ERR | general error occurred in the system |
| V_ERR_VINFO | invalid VINFO |
| V_ERR_HWND | invalid window handle |
| V_ERR_STATE | invalid stream state to issue this function |
| V_ERR_HVSTRM | invalid stream handle |
| V_ERR_CHANID | invalid network channel |
| V_ERR_RSCFAIL | system resource failure |
| V_ERR_FLAG | duplicated operation or invalid flag |
| V_ERR_FIELD | invalid VINFO field |

The functions utilized by video API 508 are defined as follows:

VOpen

This function opens a video stream. An info structure specifies stream attributes. Caller specifies window messages or callback function for stream event notification. Stream event notification is TBD.

VSTATUS VOpen (LPVINFO lpVInfo, LPHVSTRM lphVStrm, DWORD dwCallback,
    DWORD dwCallbackInstance, DWORD dwFlags,
    int far * lpwField)

input

| | |
|---|---|
| lpVinfo: | pointer to the video information structure, VINFO, with specified attributes. If a NULL LPVINFO is specified, the default attributes set up as part of configuration will be used. |
| dwCallback: | Specifies the address of a callback function or a handle to a window. In the case of a window, the low-order word is used. Messages sent to a callback function are similar to messages sent to a window, except they have two DWORD parameters instead of a UINT and a DWORD parameter. See the Microsoft Multimedia Programmer's Guide, pp. 5–10 for guidelines in writing a callback function. |
| dwCallbackInstance: | Specifies user instance data passed to the callback. Unused if dwCallback is a window. |
| dwFlags: | VOpen flags parameter; flag values OR'd into parameter. For parameter dwCallback, values are: CALLBACK_FUNCTION indicates callback function used. CALLBACK_WINDOW indicates window handle. | output

| | |
|---|---|
| VSTATUS: | returned parameter; see return values, below. |
| lphVstrm: | pointer to an opened video stream handle, returned if VSTATUS=V_OK. |
| lpwField: | a field in VINFO was incorrect. This parameter is valid only when VSTATUS returns the value: V_ERR_VINFO. A −1 indicates VINFO was more generally in error. |

Valid state(s) to issue:
    VST_INIT
State after successful execution (V_OK):
    VST_OPEN
Return values:
    V_OK                    : for successful return (=0)
    V_ERR_VINFO             : invalid VINFO
    V_ERR_RSCFAIL           : system resource failure

3.3.2. VCapture

This function starts/stops capturing a video stream from a local video hardware source, such as a video camera or VCR. The captured video can be displayed in a window by using the VMonitor function. A capture source is not explicitly defined but implied to be the local video capture hardware and driver.

VSTATUS VCapture(HVSTRM hVStrm, BOOL bFlag)
input hVStrm:     handle to a video stream.
bFlag:              On/Off flag. Off=FALSE and On=TRUE.
Valid state(s) to issue:
    VST_OPEN                (VCapture - on)
    VST_CAPTURE             (VCapture - off)
State after execution:
    VST_OPEN                -> VST_CAPTURE
    VST_CAPTURE             -> VST_OPEN
Return values:
    V_OK                    : for successful return (=0)
    V_ERR_STATE             : invalid stream state to issue this
                              function
    V_ERR_HVSTRM            : invalid stream handle
    V_ERR_RSCFAIL           : system resource failure

VMonitor

This function starts/stops monitoring (displaying video in a window) a video stream captured from local video camera or VCR. The capture source is specified in the VCapture function; see above.

VSTATUS VMonitor(HVSTRM hVStrm, HWND hWnd, BOOL bFlag)
input hVStrm:     handle to a video stream.
hWnd:       handle to a window, pre-opened by the app, in
            which monitoring is to take place.
            If bFlag=FALSE, then the previously specified
            monitor window is disassociated from the stream
            (and the specified window is ignored).
bFlag:      On/Off flag. Off=FALSE and On=TRUE.
Valid state(s) to issue:
    VST_CAPTURE/VST_LINKOUT
State after execution:
    unchanged
Return values:
    V_OK                    : for successful return
    V_ERR_STATE             : invalid stream state to issue this
                              function
    V_ERR_FLAG              : duplicated operation
    V_ERR_HVSTRM            : invalid stream handle
    V_ERR_HWND              : invalid window handle
    V_ERR_RSCFAIL           : system resource failure

3.3.4. VLinkOut

Link a network video sink to a video stream for remote transmission. Usage: Local capture to network output.

VSTATUS VLinkOut(HVSTRM hVStrm, HCHAN hChan, BOOL bFlag)
input hAStrm      : handle to the video stream.
hChan       : channel handle of the video output sink.
              If bFlag=FALSE, then the previously
              specified channel is disassociated from the
              stream (and the specified channel is ignored).
bFlag       : link or unlink flag. Link=TRUE; Unlink=FALSE.
Valid state(s) to issue:
    VST_CAPTURE             (VLinkOut - link)
    VST_LINKOUT             (VLinkOut - unlink)
State after execution:
    VST_CAPTURE             -> VST_LINKOUT
    VST_LINKOUT             -> VST_CAPTURE
Return values:
    V_OK                    : for successful return
    V_ERR_STATE             : invalid stream state
    V_ERR_CHANID            : invalid network channel for
                              video output source
    V_ERR_RSCFAIL           : system resource failure

3.3.5. VLinkIn

Link a network video source to a video stream for playback. Usage: Network input to local playback.

VSTATUS VLinkIn(HVSTRM hVStrm, HCHAN hChan, BOOL bFlag)
input hVStrm:     handle to the video stream.
hChan:      channel handle of the video input source.
            If bFlag=FALSE, then the previously specified
            channel is disassociated from the stream (and the
            specified channel is ignored).
bFlag:      link or unlink flag. Link=TRUE; Unlink=FALSE.
            If FALSE, then ChanId is disassociated from the
            stream.
Valid state(s) to issue:
    VST_OPEN                VLinkIn - link)
    VST_LINKIN              VLinkIn - unlink)
State after execution:
    VST_OPEN                -> VST_LINKIN
    VST_LINKIN              -> VST_OPEN
Return values:
    V_OK                    : for successful return
    V_ERR_STATE             : invalid stream state
    V_ERR_CHANID            : invalid network channel for
                              video input source
    V_ERR_RSCFAIL           : system resource failure

3.3.6. VPlay

This function starts/stops playing a linked-in video stream by consuming a video stream from a video network source and displaying it in a window. Specifics of the video network source are assigned the stream using the VLinkIn function; see above.

VSTATUS VPlay(HVSTRM hVStrm, HWND hWnd, BOOL bFlag)
input hVStrm:     handle to the video stream.
hWnd:       handle to a window pre-opened by the app.
bFlag:      start play or stop play flag. Play=TRUE; Stop
            Play=FALSE.
            If stop play, then hWnd is disassociated from the
            stream (and the specified window is ignored).
Valid state(s) to issue:
    VST_LINKIN              (VPlay - on)
    VST_PLAY                (VPlay - off)
State after execution:
    VST_PLAY                -> VST_LINKIN
    VST_LINKIN              -> VST_PLAY
Return values:
    V_OK                    : for successful return

-continued

| | |
|---|---|
| V_ERR_STATE | : invalid stream state to issue this function |
| V_ERR_HVSTRM | : invalid stream handle |
| V_ERR_RSCFAIL | : system resource failure |
| V_ERR_FLAG | : duplicated operation |

VPause

This function pauses or unpauses a video stream captured or played locally.

NOTE: This function is currently unimplemented. Its function has been found to be available via combinations of the other stream functions. To pause a local stream, use VMonitor (off); to pause the remote stream, use VPlay (off). To mute the local video stream, at the remote site, use VLink-Out (off).

```
VSTATUS VPause(HVSTRM hVStrm, BOOL bFlag)
input
``` hVStrm: handle to the video stream.
bFlag: PauseOn/PauseOff flag. PauseOn=TRUE; PauseOff=FALSE.
Valid state(s) to issue:
    VST_CAPTURE
    VST_PLAY
    VST_LINKOUT
State after execution:
    Unchanged
Return values:

| | |
|---|---|
| V_OK | : for successful return |
| V_ERR_STATE | : invalid stream state to issue this function |
| V_ERR_HVSTRM | : invalid stream handle |
| V_ERR_FLAG | : duplicated operation |
| V_ERR_RSCFAIL | : system resource failure |

3.3.8. VGrabframe

This function grabs the most current still image (key frame) from a specified video stream. The frame is returned in a DIB format. VGrabframe allocates the DIB bits buffer, and the user must free it. The user provides the DIB BITMAPINFO structure, of maximum extent, which is of fixed length.

```
VSTATUS VGrabframe(HVSTRM hVStrm, LPSTR FAR
*lplpvbits, LPBITMAPINFO lpbmi)
input
``` hVStrm: handle to the video stream.
lpbmi: pointer to a DIB BITMAPINFO structure. The BITMAPINFO must have an extent equal to a bmiColors array with 256 entries, giving a BITMAPINFO structure of maximum length.
output lplpvbits: pointer to a pointer to a DIB image buffer that is allocated by the video manager and freed by the application. Windows GlobalAlloc (with memory attributes GMEM_MOVEABLE | GMEM_SHARE) and GlobalLock are used to allocate the DIB bits memory.
Valid state(s) to issue:
    VST_MONITOR
    VST_PLAY
State after execution:
    Unchanged
Return values:

| | |
|---|---|
| V_OK | : for successful return |
| V_ERR_STATE | : invalid stream state to issue this function |
| V_ERR_HVSTRM | : invalid stream handle |
| V_ERR_RSCFAIL | : system resource failure |

VCntl

This function controls a video stream by adjusting its parameters (e.g., Tint/Contrast, Frame/Data Rate).

```
VSTATUS VCntl(HVSTRM hVStrm, LPVINFO lpVInfo,
WORD wField)
input
``` hVStrm: : handle to the video stream
output lpVInfo: : pointer to the video information structure, VINFO, that was preallocated by the apps, but filld by the vide manager.
wField: : field value to be changed.
Valid state(s) to issue:
    all states except VST_INIT
State after execution:
    unchanged
Return values:

| | |
|---|---|
| V_OK | : for successful return |
| V_ERR_HVSTRM | : invalid stream handle |
| V_ERR_STATE | : invalid stream state to issue this function |
| V_ERR_FIELD | : invalid VINFO field |
| V_ERR_LPVINFO | : invalid VINFO pointer |
| V_ERR_RSCFAIL | : system resource failure |

3.3.10. VGetInfo

This function returns the status of a video stream.

```
VSTATUS VGetInfo(HVSTRM hVStrm, LPVINFO lpVInfo,
LPWORD lpwState)
input
``` hVStrm: handle to the video stream.
output lpVInfo: handle to the video information structure, VINFO, that was preallocated by the apps, but filled by the video manager
lpwState: pointer to a WORD where the state of the specified stream can be returned.
Valid state(s) to issue:
    all states except VST_INIT
State after execution:
    unchanged
Return values:

| | |
|---|---|
| V_OK | : for successful return |
| V_ERR_STATE | : invalid stream state to issue this function |
| V_ERR_HVSTRM | : invalid stream handle |
| V_ERR_LPVINFO | : invalid VINFO pointer |

VClose

This function closes a video stream and releases all system resources allocated for the stream.

```
VSTATUS VClose(HVSTRM hVStrm)
input
``` hVStrm: handle to the video stream.
Valid state(s) to issue:
    All STATES except in VST_INIT
State after execution:
    ST_INIT
Return values:

| | |
|---|---|
| V_OK | : for successful return |
| V_ERR_HVSTRM | : invalid stream handle |

3.4. Video Subsystem Functions

The subsystem functions are used to manage and return information about the video subsystem as a whole. This includes subsystem initialization, shutdown, and cost, or utilization, information.

3.4.1. VInit

This function initializes the video subsystem. Capture and playback applications can be started. Windows INI file entries are used to configure the subsystem.

Subsystem initialization also includes the measurement of the CPU and display subsystem (graphics adapter) in order to provide video cost information; see VCost, below.

```
VSTATUS VInit(dwInitFlags)
input dwInitFlags:        initialization flags. Flag bits are OR'd
                    to determine interface options. Current
                    flag bits are:
                        VM_CAPT_INIT:   start capture
                                        application
                        VM_PLAY_INIT:   start playback
                                        application
Return values:
    V_OK:           for successful return
    V_ERR:          general error
```

3.4.2. VShutdown

This function uninitializes, or stops, the video subsystem. Capture and playback applications are stopped.

```
VSTATUS VShutdown( )
Return values:
    V_OK:           for successful return
    V_ERR:          general error
```

VCost

This function gives the percentage utilization of the CPU required to support a given video stream.

The function can be called repeatedly, and at any time after the video manager is initialized (VInit called). Repeated calls can be used to determine an "optimal" configuration of local and remote video windows.

```
VSTATUS VCost(wRes, wDispFreq, wFrameRate, wFormat,
dwFlags, lpwCost)
input wRes:          resolution of a video display window.
wDispFreq:     display frequency of a video display window.
               Display frequency is a function of the
               FrameRate.
               1 = All frames; 2 = Every other frame; 3 =
               Every third frame; etc. 0 = no frames
               displayed.
wFrameRate:    captured video frame rate (fps). For IRV, this
               is typically 10–15 fps.
wFormat:       defines the video compression algorithm.
               Currently supported values are:
                   CAPT_FORMAT_IRV
                   CAPT_FORMAT_YUV
dwFlags:       Flags which further specify specific video
               attributes.
               Currently supported values are:
                   LOCAL_STREAM     (=0x1)
                   REMOTE_STREAM    (=0x2)
               These values specify whether the video in
               question originates locally or remotely.
output lpwCost:       pointer to a WORD where a system utilization
               value can be returned. The value returned is a
               system utilization percentage. It is 0 or
               greater. Values greater than 100 can be
               returned.
Return values:
    V_OK:      for successful return
    V_ERR:     general error
```

Audio API Data Structures, Functions, and Messages

Audio API 512 utilizes the following data types:

| | |
|---|---|
| HASTRM | Handle to an audio stream |
| LPHASTRM | Pointer to the handle of an audio stream |
| AINFO | Audio information structure |
| LPAINFO | Pointer to an audio information structure |
| ACCB | Audio Compression Control Block |
| LPACCB | Pointer to the Audio Compression Control Block |
| ADEVCAPS | Audio Device Capabilities structure |
| LPACAPS | Pointer to the Audio Device Capabilities structure |
| STATUS | Status code returned by Audio Subsystem |

Audio API 512 utilizes the following structures:

ADevCaps

| | | |
|---|---|---|
| OUT WORD | wVersion | Version of the audio manager |
| OUT WORD | wMid | Manufacturer ID |
| OUT WORD | wPid | Product ID |
| OUT char | szPname [MAXPNAMELEN] | NULL terminated string containing the name of the audio manager |
| OUT DWORD | dwFormats | Sample wave formats supported by subsystem when no compression is used |
| OUT WORD | wChannels | Number of audio channels supported by driver (mono (1) or stereo (2)) |
| IN WORD | nAcceptCoders | Size of ACCB array referenced by lpACCB |
| OUT WORD | nReturnCoders | Number of ACCB structures returned in ACCB array referenced by lpACCB |
| IN LPACCB | lpACCB | Pointer to an array of ACCB structures. There should be an ACCB structure per supported compression algorithm. |

ACCB (Audio Compression Control Block)

| | | |
|---|---|---|
| char | szProdName [MAXCOMPRESS] | Name of Compression Algorithm |
| WAVEFORMAT | wf | Wave format as defined Microsoft Multimedia Programmer's Reference |
| WORD | wBitsPerSample | Number of bits per sample per channel. |
| WORD | cbExtraSize | Extra number in bytes of the WAVEFORMAT structure. |
| WORD | wAvgCompRation | Specifies the average compression ratio provided by the compression device |
| WORD | samplesPerFrame | The smallest number of audio samples required by the compression device to generate a frame. |

AINFO (IN/OUT Information of an Audio Stream)

| | | |
|---|---|---|
| WORD | wType | Local or remote audio stream |
| WORD | wCompress | Index into compression table |
| DWORD | dwResolution | Resolution in milliseconds with which Audio Manager can adjust latency on an audio stream |
| DWORD | dwLatency | Milliseconds of |

```
              Union {
                // local audio stream
              struct {
                WORD          wIn              Audio input hardware
                                               source
                WORD          wGain            Gain of the local
                                               microphone
                WORD          wAux             Volume of the moni-
                                               tor audio stream.
              } local
                // remote audio stream
              struct {
                WORD          wOut             Audio output hard-
                                               ware destination
                WORD          wVol             Volume of the local
                                               speaker
              } remote
              }
```

Audio API 512 utilizes the following constants:

```
State values:

AST_INIT              Init state
AST_OPEN              Open state
AST_CAPTURE           Capture state
AST_PLAY              Play state
AST_LINKIN            Link In state
AST_LINKOUT           Link Out state
AST_ERROR             Error state
Status values:

A_OK                  successful return
A_ERR_STATE           invalid stream state
A_ERR_HASTRM          invalid stream handle
A_ERR_LPAINFO         invalid AINFO pointer
A_ERR_FIELD           invalid AINFO field
A_ERR_LPHCHAN         invalid network channel
A_ERR_RSCFAIL         system resource failure
A_ERR_STREAM          too many outstanding audio streams
A_ERR_PENDING         call pending on the audio subsystem
A_ERR_NODEV           invalid Audio Manager device
                      number
A_ERR_NOCALLBACK      APacketNumber issued without a
                      registered callback function
A_STREAM_CLOSED       Hang-up received on an audio
                      stream
A_ERR_NOSUPPORT       Feature not supported in current
                      release of Audio Manager
```

The functions utilized by audio API 512 are defined as follows:

AGetNumDevs or AInit (synchronous)

This function retrieves the number of different Audio Managers installed on the system. AGetNumDevs and AInit perform the same function. AInit exists for symmetry with the Video Manager

```
UINT AGetNumDevs (void) or AInit (void)
Valid state(s) to issue:
    ANY
State after execution:
    NO CHANGE
Return values:
    Number of Audio Manager available on the system.
```

AGetDevCaps (synchronous)

This function fills the ADevCaps structure with information regarding the specified Audio Manager.

```
AStatus AGetDevCaps (UINT wDeviceID, LPACAPS lpCaps)
input wDeviceID:      Identifies the Audio Manager to query. Use a
                integer from 0 to one less than the number of
                installed audio managers.
lpCaps:         Specifies a far pointer to an ADevCaps structure.
                An array of ACCB structures must be allocated to
                receive a list of audio compression algorithms
                supported by the Audio Manager. The ADevCaps
                fields lpACCB and wAcceptCoders should be set
                to reference this array and the array size,
                respectively.
Valid state(s) to issue:
    ANY
State after execution:
    NO CHANGE
Return values:
    A_OK                : for successful return
    A_ERR_NODEV         : invalid wDeviceID
```

AOpen (asynchronous or synchronous)

This function opens an audio stream with specified attributes.

```
AStatus AOpen (LPAINFO lpAInfo, UINT wDeviceID,
    DWORD dwCallback, DWORD dwCallbackInstance,
    DWORD dwFlags, LPWORD lpwField, LPHASTRM
    lphAStrm)
input:

lpAInfo:             The audio information structure, AInfo,
                     with specified attributes. NOTE: normally
                     wCompress is set to 0; this will select
                     the default coder to be used on the audio
                     stream.
wDeviceID:           Identifies the Audio Manager to use. The
                     value can range from zero to one less
                     than the value returned by
                     AGetNumDevs.
dwCallback:          Based on value of dwFlags, specifies the
                     address of a callback function or a handle
                     to a window.
dwCallbackInstance:  Specifies user instance data passed to the
                     callback. This parameter is not used when
                     dwCallback is a windows handle.
dwFlags:             Defines whether the application interface
                     to Audio Manager will be asynchronous
                     or synchronous. If dwFlags is
                     CY_CALLBACK_NONE, the interface
                     is synchronous and dwCallback is a
                     Window handle used by the audio sub-
                     system to block while the underlying
                     asynchronous audio manager completes its
                     service. IF dwFlags is CY_
                     CALLBACK_FUNCTION or CY_
                     CALLBACK_WINDOW, the interface is
                     asynchronous and the parameter
                     dwCallback is a Window handle or a
                     function.
output lpwField:            One or more fields in AInfo were
                     incorrect. This parameter is set only
                     when AStatus returns the value:
                     A_ERR_FIELD. Its value is a bit-mask
                     which identifies which fields are invalid.
lphAStrm:            If dwFlags is CY_CALLBACK_NONE
                     specifying that a synchronous interface
                     with the audio subsystem is being used,
                     the subsystem will return the handle to
                     the new audio stream in this variable
                     when AStatus is A_OK.
callback void CALLBACK AudioManagerFunc(hAStrm, Message,
        dwCallbackInstance,
    dwParam1,
``` dwParam2)
AudioManagerFunc is a place holder for the function name provided by the caller. The function must be included in an EXPORT statement in a DLL. The callback must also be locked in memory as it is called at interrupt time. Since the callback is executed in an interrupt context, limited functionality is available to it.
Callback Parameters:

| | | |
|---|---|---|
| HASTRM | hAStrm | : Audio stream to which callback applies. |
| UINT | Message | : Message returned by the audio subsystem. |
| DWORD | dwCallbackInstance | : caller specific instance data. |
| DWORD | dwParam1 | : Message specific parameter. |
| DWORD | dwParam2 | : Message specific parameter. |

Valid state(s) to issue:
    AST_INIT
State after execution:
    AST_OPEN
Return Messages/Callbacks
    AM_OPEN   : Posted at callback time. The value of Param1 is one of the values defined in Param1 Values below. The value of Param2 is a HASTRM if Param1 is A_OK.
Return/Param1 Values:

| | |
|---|---|
| A_OK | : for successful return |
| A_ERR_STREAM | : too many outstanding audio streams |
| A_ERR_LPAINFO | : invalid AINFO pointer |
| A_ERR_FIELD | : invalid AINFO Field(s) |
| A_ERR_RSCFAIL | : system resource failure |
| A_ERR_PENDING | : open call pending on the audio subsystem |
| A_ERR_NOSUPPORT | : invalid dwFlags field |
| A_ERR_NODEV | : invalid wDeviceID |

ACapture (asynchronous or synchronous)

This function starts/stops capturing an audio stream from a local audio hardware source, such as a microphone.

AStatus ACapture(HASTRM hAStrm, BOOL bFlag)
input

| | |
|---|---|
| hAStrm: | handle of an audio stream |
| bFlag: | on/off flag. |

Valid state(s) to issue:

| | |
|---|---|
| AST_OPEN | (ACapture - on) |
| AST_CAPTURE | (ACapture - off) |

State after execution:

| | |
|---|---|
| AST_OPEN | -> AST_CAPTURE |
| AST_CAPTURE | -> AST_OPEN |

Return Messages/Callbacks
    AM_CAPTURE   : Posted at callback time. The value of Param1 is one of the values defined in Param1 Values below. The value of Param2 is the state of the stream: TRUE means capturing, FALSE means capture disabled.

Return/Param1 Values:

| | |
|---|---|
| A_OK | : for successful return |
| A_ERR_STATE | : invalid stream state |
| A_ERR_HASTRM | : invalid stream handle |
| A_ERR_RSCFAIL | : system resource failure |
| A_ERR_FLAG | : duplicated operation |
| A_ERR_PENDING | : call pending on the audio subsystem for this stream. |

AMute (asynchronous or synchronous)

This function starts/stops muting of an audio stream captured from local microphone or being played back on the speakers.

AStatus AMute(HASTRM hAStrm, BOOL bFlag)
input

| | |
|---|---|
| hAStrm: | pointer to the handle of an audio stream |
| bFlag: | on/off flag. |

Valid state(s) to issue:
    AST_CAPTURE/AST_LINKOUT
    AST_LINKIN/AST_PLAY
State after execution:
    Unchanged
Return Messages/Callbacks
    AM_MUTE   : Posted at callback time. The value of Param1 is one of the values defined in Param1 Values below. The value of Param2 is the state of the stream: TRUE means muting, FALSE means muting is disabled.

Param1 Values:

| | |
|---|---|
| A_OK | : for successful return |
| A_ERR_STATE | : invalid stream state |
| A_ERR_FLAG | : duplicated operation |
| A_ERR_HASTRM | : invalid stream handle |
| A_ERR_RSCFAIL | : system resource failure |

Return values:

| | |
|---|---|
| A_OK | : for successful return |
| A_ERR_PENDING | : call pending on the audio subsystem for this stream. |

APlay (asynchronous or synchronous)

This function starts/stops playing an audio stream received from a network source. See details in "ALinkIn".

AStatus APlay(HASTRM hAStrm, BOOL bFlag);
input

| | |
|---|---|
| hAStrm: | handle to the audio stream |
| bFlag: | on/off flag. |

Valid state(s) to issue:

| | |
|---|---|
| AST_LINKIN | (APlay - on) |
| AST_PLAY | (APlay - off) |

State after execution:

| | |
|---|---|
| AST_LINKIN | -> AST_PLAY |
| AST_PLAY | -> AST_LINKIN |

Return Messages/Callbacks
    AM_PLAY   : Posted at callback time. The value of Param1 is one of the values defined in Param1 Values below. The value of Param2 is the state of the stream: TRUE means playing, FALSE means play disabled.

Return/Param1 Values:

| | |
|---|---|
| A_OK | : for successful return |
| A_ERR_STATE | : invalid stream state |
| A_ERR_HASTRM | : invalid stream handle |
| A_ERR_FLAG | : duplicated operation |
| A_ERR_RSCFAIL | : system resource failure |
| A_ERR_PENDING | : call pending on the audio subsystem |

-continued for this stream.

ALinkIn (asynchronous or synchronous)

This function links/unlinks an input network channel to/from the specified audio stream. Once linked, the audio stream can be played on the local speakers/headphones via the APlay function defined earlier.

```
AStatus ALinkIn (HASTRM hAStrm, LPHCHAN lphChan,
BOOL bFlag);
input hAStrm:       handle to the audio stream
lphChan:      pointer to a channel handle identifying the audio
              network input source
bFlag:        link or unlink flag.
Valid state(s) to issue:
    AST_OPEN              (ALinkIn - link)
    AST_LINKIN            (ALinkIn - unlink)
State after execution:
    AST_OPEN              -> AST_LINKIN
    AST_LINKIN            -> AST_OPEN
Return Messages/Callbacks
    AM_LINKIN    : Posted at callback time. The value of
                   Param1 is one of the values defined in
                   Param1 Values below. The value of Param2
                   is the state of the stream: TRUE means
                   linked, FALSE means unlinked.
Return/Param1 Values:
    A_OK                  : for successful return
    A_ERR_STATE           : invalid stream state
    A_ERR_HASTRM          : invalid stream handle
    A_ERR_FLAG            : duplicated operation
    A_ERR_LPHCHAN         : invalid network channel handle for
                            audio input source
    A_ERR_PENDING         : call pending on the audio subsystem
    A_ERR_RSCFAIL         : system resource failure
```

ALinkOut (asynchronous and synchronous)

This function links/unlinks an output network channel to/from the specified audio stream that will be captured or is being captured from the local microphone.

```
AStatus ALinkOut(HASTRM hAStrm, LPHCHAN lphChan,
BOOL bFlag);
input hAStrm:       handle to the audio stream
lphChan:      pointer to a channel handle identifying the network
              output destination
bFlag:        link or unlink flag.
Valid state(s) to issue:
    AST_CAPTURE           (ALinkOut - link)
    AST_LINKOUT           (ALinkOut - unlink)
State after execution:
    AST_CAPTURE           -> AST_LINKOUT
    AST_LINKOUT           -> AST_CAPTURE
Return Messages/Callbacks
    AM_LINKOUT   : Posted at callback time. The value of
                   Param1- is one of the values defined in
                   Param1 Values below. The value of
                   Param2 is the state of the stream: TRUE
                   means linked, FALSE means unlinked.
Return/Param1 Values:
    A_OK                  : for successful return
    A_ERR STATE           : invalid stream state
    A_ERR_HASTRM          : invalid stream handle
    A_ERR_FLAG            : duplicated operation
    A_ERR_LPHCHAN         : invalid network channel for audio
                            output source
    A_ERR_RSCFAIL         : system resource failure
    A_ERR_PENDING         : call pending on this audio stream.
```

ACntl (asynchronous or synchronous)

This function can be used to control the amount of latency on an audio stream. In addition, the gains of an audio stream being captured or the volume of an audio stream being played back can also be set. Finally, the locally captured audio input can be monitored by setting the wAux AINFO field.

```
AStatus ACntl(HASTRM hAStrm, LPAINFO lpAInfo, WORD
wField)
input hAStrm        : handle to the audio stream
lpAInfo       : pointer to the audio information structure,
                AInfo, with specified attributes.
wField        : the selected field of AInfo to change.
Valid state(s) to issue:
    all states except AST_INIT
State after execution:
    unchanged
Return Messages/Callbacks
    AM_CNTL      : Posted at callback time. If there is an error,
                   the value of Param1 is one of the values listed
                   below in Param1 Values and Param2 is ZERO
                   (i.e. if Param2 == 0) ERROR;). If the
                   command is successful, the value of Param1 is
                   wField and the value of Param2 is the pointer
                   lpAInfo passed to the call ACntl.
Return/Param1 Values:
    A_OK                  : for successful return
    A_ERR_HASTRM          : invalid stream handle
    A_ERR_STATE           : invalid stream state
    A_ERR_LPAINFO         : invalid AINFO pointer
    A_ERR_FIELD           : invalid AINFO Field
    A_ERR_RSCFAIL         : system resource failure
    A_ERR_PENDING         : call pending on this audio stream.
```

AGetInfo (asynchronous and synchronous)

This function returns the AINFO and state of an audio stream.

```
AStatus AGetInfo(HASTRM hAStrm, LPAINFO lpAInfo,
LPWORD lpwState)
input hAStrm:       handle to the audio stream
output lpAInfo:      pointer to the handle of AINFO that was preallocated
              by the apps, but filled by the audio manager
lpwState:     state of the specified stream
Valid state(s) to issue:
    all states except AST_INIT
State after execution:
    unchanged
Return Messages/Callbacks
    AM_GETINFO   : Posted at callback time. If there is
                   an error, the value of Param1 is one
                   of the values listed below in Param1
                   Values and Param2 is ZERO (i.e. if
                   Param2 == 0) ERROR;). If the
                   command is successful, both Param1
                   and Param2 are ZERO.
Return/Param1 Values:
    A_OK                  : for successful return
    A_ERR_STATE           : invalid stream state
    A_ERR_HASTRM          : invalid stream handle
    A_ERR_LPAINFO         : invalid AINFO pointer
    A_ERR_RSCFAIL         : system resource failure
    A_ERR_PENDING         : call pending on this audio stream.
```

AClose (asynchronous and synchronous)

This function closes an audio stream and releases all system resources allocated for this stream.

```
AStatus AClose(HASTRM hAStrm)
``` input

| | |
|---|---|
| hAStrm: | handle to the audio stream |

Valid state(s) to issue:
    All STATES except in AST_INIT
State after execution:
    AST_INIT
Return Messages/Callbacks
    AM_CLOSE : Posted at callback time. Param1 is one of the Param1 Values listed below. Param2 is the stream handle passed to AClose.
Return/Param1 Values:

| | |
|---|---|
| A_OK | : for successful return |
| A_ERR_HASTRM | : invalid stream handle |
| A_ERR_PENDING | : call pending on this audio stream. |

ARegisterMonitor (asynchronous)

This function registers an audio stream monitor. The Audio Manager maintains a packet count on each open stream. This count represents a running clock where the elapse time since the initiation of the audio stream is simply the packet count times the latency represented by each packet. Initiation here refers to the moment a local audio stream enters the AST_CAPTURE state. Users of the audio subsystem gain access to this clock source via an audio stream monitor.

AStatus ARegisterMonitor(HASTRM hAStrm, DWORD
    dwCallback, DWORD dwCallbackInstance, DWORD
    dwFlags, DWORD dwRequestFrequency, LPDWORD
    lpdwSetFrequency)
input

| | |
|---|---|
| hAStrm: | handle to the audio stream |
| dwCallback: | Specifies the address of a callback function or a handle to a window. |
| dwCallbackInstance: | Specifies user instance data passed to the callback. This parameter is not used with windows callbacks. |
| dwFlags: | Specifies whether the parameter dwCallback is a Window handle or a function. If it is a Window handle, the value is set to CY_CALLBACK_WINDOW. If it is a function, dwFlags is set to CY_CALLBACK_FUNCTION. |
| dwRequestFrequency: | Specifies the period (in milliseconds) the Audio Manager should playback or record audio before reporting the current elapsed time to the caller. A value of zero means don't callback (use APacketNumber to force a callback). | output

| | |
|---|---|
| lpdwSetFrequency: | The Audio Manager returns via this far pointer the actual period (in milliseconds) between AM_PACKETNUMBER callbacks. This number will be set as close as possible to dwRequestFrequency based on the resolution of latency associated with the audio stream (see AINFO field dwResolution). |

Valid state(s) to issue:
    AST_PLAY, AST_LINKIN, AST_CAPTURE, AST_LINKOUT
callback void CALLBACK AudioManagerFunc(hAStrm, Message, dwCallbackInstance, dwParam1, dwParam2)
AudioManagerFunc is a place holder for the function name provided by the caller. The function must be included in an EXPORT statement in a DLL. The callback must also be locked in memory as it is called at interrupt time. Since this callback is executed in an interrupt context, limited functionality is available to it.
Callback Parameters:

| | | |
|---|---|---|
| HASTRM | hAStrm | : Audio stream to which callback applies. |
| UINT | Message | : Message returned by the audio subsystem. |
| DWORD | dwCallbackInstance | : caller specific instance data. |
| DWORD | dwParam1 | : Stream status. |
| DWORD | dwParam2 | : Current packet number multiplied by the packet latency (in milliseconds) |

State after execution:
    NO CHANGE
Return Messages/Callbacks
    AM_PACKETNUMBER  : Posted at callback time.
Param1 Values:

| | |
|---|---|
| A_OK | : for successful return |
| A_STREAM_CLOSED | : for successful return |

Return values:

| | |
|---|---|
| A_OK | : for successful return |
| A_ERR_STATE | : invalid stream state |
| A_ERR_HASTRM | : invalid stream handle |
| A_ERR_PENDING | : call pending on this audio audio stream. |

APacketNumber (asynchronous)

This function returns the elapsed time (in milliseconds) since the packet on an audio stream was captured.

AStatus APacketNumber(HASTRM hAStrm)
input

| | |
|---|---|
| hAStrm: | handle to the audio stream |

Valid state(s) to issue:
    AST_LINKOUT, AST_PLAY, AST_CAPTURE, AST_LINKOUT
State after execution:
    NO CHANGE
Return Messages/Callbacks
    AM_PACKETNUMBER  : Posted at callback time. The value of Param1 is one of the values defined in Param1 Values below.. Param2 is the current packet number multiplied by the packet latency (in milliseconds).
Param1 Values:

| | |
|---|---|
| A_OK | : for successful return |
| A_STREAM_CLOSED | : for successful return |

Return values:

| | |
|---|---|
| A_OK | : for successful return |
| A_ERR_STATE | : invalid stream state |
| A_ERR_HASTRM | : invalid stream handle |

| | |
|---|---|
| A_ERR_PENDING | : call pending on the audio subsystem |
| A_ERR_NOCALLBACK | : callback must be registered with ARegisterMonitor |

AShutdown (synchronous)

This function forcefully closes all open audio streams and unloads any open Audio Manager drivers.

BOOL AShutdownAPacketNumber (void)
Valid state(s) to issue:
  any state accept AST_INIT
State after execution:
  AST_INIT Return Messages/Callbacks
  none
Return values:
  TRUE   : for successful return Comm API Data Structures, Functions, and Messages Comm API 510 utilizes the following data types:

```
typedef WORD    HSESS, FAR *LPHSESS;     // session handle
typedef WORD    HCONN, FAR *LPHCONN;     // connection handle
typedef WORD    HCHAN, FAR *LPHCHAN;     // channel handle
//
// TII RETURN CODE VALUES.
//
typedef enum _TSTATUS
{
    SUCCESSFUL              = 0,
    PRIORITY_IN_USE         = 1,
    CHAN_TRAN_FULL          = 2,
    CHAN_INVALID            = 3,
    CONN_BAD_ID             = 4,
    DRIVER_NOT_INSTALLED    = 5,
    HANDLE_INVALID          = 6,
    INVALID_CONTROL_OP      = 7,
    INVALID_INFOTYPE        = 8,
    NO_CHAN_MGR             = 9,
    NO_DATA_AVAIL           = 10,
    NO_OPEN_CHAN            = 11,
    NO_SESSION              = 12,
    NO_CONNECTION           = 13,
    NO_CONNECT_REQUEST      = 14,
    RELIABLE_OPS_PENDING    = 15,
    REQUEST_WITHDRAWN       = 16,
    TOO_MANY_SESSIONS       = 17,
    TRAN_INVALID            = 18,
    TRANSPORT_ERR           = 19,
    INVALID_PARM            = 20,
    ALREADY_CONNECTED       = 21,
    GLOBAL_ALLOC_FAIL       = 22,
    INVALID_STATE           = 23,
    NO_PKT_BUFS             = 24,
    GALLOC_ERR              = 25,
    TOO_MANY_CONN           = 26,
    TOO_MANY_CHAN_MGR       = 27,
    TOO_MANY_CHANNELS       = 28,
    WATCHDOG_TIMEOUT        = 29
}   TSTATUS;
//
// CONNECTION ATTRIBUTES STRUCTURE
//
typedef CONNCHARACTS CONN_CHR, FAR *LPCONN_CHR;
//
// CHANNEL INFO STRUCTURE
//
typedef struct tagCHAN_INFO
{
    WORD Id;
    WORD State;
    WORD Timeout;
    BYTE Priority;
    BYTE Reliability;
    BYTE Info [16];     // User Info
}   CHAN_INFO, FAR *LPCHAN_INFO;
//
// CONNECTION INFO STRUCTURE
//
typedef struct tagCONN_INFO
{
```

```
    WORD    wState;
    WORD    wNumInChans;
    WORD    wNumOutChans;
}   CONN_INFO, FAR *LPCONN_INFO;
//
// lParam structure for Session handler
// (in cases where multiple parameters are returned via lParam)
//
typedef struct tagSESS_CB {
    union       tagSESS_EV {
        struct      tagConReq {
            HSESS               hSess;
            LPTADDR             lpCallerAddr;
            LPCONN_CHR          lpAttributes;
        } ConReq;
        struct      tagConAcc {
            DWORD               dwTransId;
            LPCONN_CHR          lpAttributes;
        } ConAcc;
    } SESS_EV;
}   SESS_CB, FAR *LPSESS_CB;
//
// lParam structure for Channel Manager
// (in cases where multiple parameters are returned via lParam)
//
typedef struct tagCHANMGR_CB {
    union   tagCHANMGR_EV {
        struct       tagChanReq {
            DWORD               dwTransId;
            HCONN               hConn;
            LPCHAN_INFO         lpChanInfo;
        } ChanReq;
    } CHANMGR_EV;
}   CHANMGR_CB, FAR *LPCHANMGR_CB;
//
//Structure for Channel Statistics
//
typedef         struct CHAN_STATS_tag {
    DWORD       Tx;
    DWORD       Rx;
    DWORD       Err;
    DWORD       OkNotify;
    DWORD       ErrNotify;
    DWORD       ErrNotifyBuf;
    DWORD       NopNotify;
    DWORD       Bytes;
    DWORD       OkNotifyBytes;
    DWORD       ErrNotifyBytes;
}   CHAN_STATS, FAR *LP_CHAN_STATS;
//
//Structure for TII Statistics
//
#define         MAX_CHAN_STATS 17
typedef         struct TII_STATS_tag {
    DWORD           RoundTripLatencyMs;
    CHAN_STATS      ChanStats [MAX_CHAN_STATS];
}   TII_STATS, FAR *LP_TII_STATS;
//
// Address Structure
//
typedef struct tag_TADDR {
    WORD    AddressType;
    WORD    AddressLength;
    BYTE    Address [80];
}   TADDR, FAR *LPTADDR;
//
// Connection Characteristics
//
typedef struct tag_CONNCHARACTS {
    WORD    Quality;
    WORD    BitRate;
}   CONNCHARACTS, FAR *LPCONNCHARACTS;
```

Comm API 510 utilizes the following constants:

```
#define BITRATE_112KB           0
#define BITRATE_120KB           1
```

```
#define BITRATE_128KB                    2
#define CHAN_ACCEPTED                    FIRST_TII_MSG +1
#define CHAN_BADID                       FIRST_TII_MSG +2
#define CHAN_CLOSED                      FIRST_TII_MSG +3
#define CHAN_DATA_AVAIL                  FIRST_TII_MSG +4
#define CHAN_DATA_SENT                   FIRST_TII_MSG +5
#define CHAN_CLOSE_RESP                  FIRST_TII_MSG +6
#define CHAN_RCV_COMPLETE                FIRST_TII_MSG +7
#define CHAN_REJECTED                    FIRST_TII_MSG +8
#define CHAN_REJECT_NCM                  FIRST_TII_MSG +9
#define CHAN_REQUESTED                   FIRST_TII_MSG +10
#define CHAN_TIMEOUT                     FIRST_TII_MSG +11
#define CONN_ACCEPTED                    FIRST_TII_MSG +12
#define CONN_CLOSE_RESP                  FIRST_TII_MSG +13
#define CONN_CLOSED                      FIRST_TII_MSG +14
#define CONN_REJECTED                    FIRST_TII_MSG +15
#define CONN_REQUESTED                   FIRST_TII_MSG +16
#define CONN_TIMEOUT                     FIRST_TII_MSG +17
#define CHAN_LOST_DATA                   FIRST_TII_MSG +18
#define COMM_INTERNAL_ERROR              FIRST_TII_MSG +19
#define CONN_ERROR                       FIRST_TII_MSG +20
#define SESS_CLOSED                      FIRST_TII_MSG +21
#define CONN_PROGRESS                    FIRST_TII_MSG +22
#define TRANS_ERR                        FIRST_TII_MSG +99
//
// CONN_PROGRESS substates. These will be returned in wParam.
//
#define T_PRG_BUSY                       1
#define T_PRG_RINGING                    2
#define T_PRG_OTHER                      3    // place-holder for
othercodes
//
// CONN_REJECTED substates. These will be returned in wParam.
//
#define T_REJ_BUSY                       1
#define T_REJ_REJECTED                   2
#define T_REJ_NET_CONGESTED              3
#define T_REJ_NO RESPONSE                4
#define T_REJ_NET_FAIL                   5
#define T_REJ_INTERNAL                   6
//
// Flag indicating multiple connections allowed for session (in
// BeginSession)
//
#define    MULTI_CONN_SESS       0x8000
//
// TII Channel States (returned by GetChanInfo)
//
#define    T_CHAN_NULL           0x00
#define    T_CHAN_SENDING        0x06
#define    T_CHAN_RECEIVING      0x07
```

The functions utilized by comm API 510 are defined below. One or two groups of messages may be listed along with each function description: status messages and peer messages. A status message is a callback/message that the caller will receive in response to the function call. Peer messages are notifications that will be delivered to the peer application as a result of invoking the function.

Session Management

Functions in this section will initialize all the internal structures of the Comm sub-system and enable the application to initiate and receive calls.

| | |
|---|---|
| BeginSession | Initializes the software and hardware of the appropriate modules of the comm subsystem. It also designates the method that the comm subsystem is to use to notify the application of incoming calls and related events. Two types of event notification are supported: callbacks and messaging. The callback interface allows the comm system to call a user designated function to notify the application of incoming events. The messaging interface allows the comm system to notify the application of incoming events by posting messages to application message queues. The parameters to the function vary depending on the notification method chosen. BeginSession |

|   |   |
|---|---|
|   | is not allowed in interrupt/callback contexts. |
| TSTATUS BeginSession | (LPTADDR lpLocalAddr, LPCONN_CHR lpConnAttributes, WORD Flags, LPVOID CallBack, LPHSESS lpSessionHandle) |
| lpLocalAddr | Pointer to the local address at which to listen for incoming calls. The Listen stays in effect until the session is ended. Notification for all connection events for this local address will be sent to the specified Callback. |
| lpConnAttributes | Pointer to the Connection Attributes for incoming calls. |
| Flags: | Indicates the type of notification to be used: CALLBACK_FUNCTION    for callback interface CALLBACK_WINDOW    for post message interface |
| CallBack: | Either a pointer to a callback function, or a window handle to which messages will be posted, depending on flags. The "callBack" will become the "Session Handler" for this session. |
| lpSessionHandle | Pointer to the Session Handle to be returned synchronously. This Session Handle is used by the application to initiate outgoing calls. It will also be returned to the Session Handler with incoming call notifications for this session. |

Return values:
SUCESSFUL
DRIVER_NOT_INSTALLED
TOO_MANY_SESSIONS
Callback routine format:
FuncName(UINT Message, WPARAM wParam, LPARAM lParam)
    Message:  The message type
    wParam:  Word parameter passed to function
    lParam:  Long parameter passed to function
All the connection related activities are handled by the session handler.
The callback function parameters are equivalent to the second, third, and fourth parameters that are delivered to a Microsoft ® Windows message handler function (Win 3.1).
Status Messages: none
Peer Messages: none

| | |
|---|---|
| EndSession | Closes all the open connections and prevents the application from receiving and originating calls for the specified session. |
| TSTATUS EndSession (HSESS SessionHandle, BOOL ForceClose) | |
| SessionHandle | Session Handle |
| ForceClose: | If true, then close session even if reliable channels having pending operations are open. |
| Return values: | |
| SUCESSFUL | End session was successfully initiated. |
| RELIABLE_OPS_PENDING | Couldn't close due to uncompleted operations channels designated as reliable. |

Status Messages:
SESS_CLOSED:    EndSession complete.
Peer Messages: none

Connection Management

These calls provide the ULM the ability to establish and manage connections to its peers on the network.

| | |
|---|---|
| MakeConnection | Attempts to connect to a peer application. The Session Handler (callback routine or the message handler) for the specified Session will receive status of the connection. When the connection is accepted by the peer, the Connection Handle will be given to the Session Handler. The peer session will receive a CONN_REQUESTED callback/message as a result of this call. |
| TSTATUS MakeConnection | (HSESS Sessionhandle, DWORD TransId, LPTADDR lpCalleeAddr, LPCONN_CHR lpConnAttributes, WORD TimeOut, WORD ChanMgrFlags, LPVOID ChanMgr) |
| SessionHandle | Handle for session, obtained via BeginSession. |
| TransId | User defined identifier which will be returned to the Session Handler along with |

| | |
|---|---|
| | the response notification. |
| lpCalleeAddr: | Pointer to the address structure (containing a phone number, IPaddress etc.) of callee. |
| lpConnAttributes | Pointer to the connection attributes. |
| Timeout: | Number of seconds to wait for peer to pickup the phone. |
| ChanMgr: | The Channel Manager for this connection. This is either a pointer to a callback function, or a window handle to which messages will be posted, depending on chanMgrFlags. The Channel Manager may also be set up separately via RegisterChanMgr. |
| ChanMgrflags: | Indicates the type of notification to be used for the Channel Manager:<br>CALLBACK_FUNCTION  for callback interface<br>CALLBACK_WINDOW  for post message interface |

Return values:
Status Messages (sent to the Session Handler):

| | |
|---|---|
| CONN_ACCEPTED: | The peer process has accepted the call |
| CONN_REJECTED: | The Peer process has rejected the call |
| CONN_TIMEOUT: | No answer from peer |
| CONN_BUSY: | Called destination is busy. |

Peer Messages:
CONN_REQUESTED

| | |
|---|---|
| AcceptConnection | Issued in response to a CONN_REQUESTED callback/message that has been received (as a consequence of a MakeConnection call issued by a peer). AcceptConnection notifies the peer that the connection request has been accepted. The local Session Handler will also receive an asynchronous notification when the Accept operation is complete. |
| TSTATUS AcceptConnection | (HCONN hConn, WORD ChanMgrFlags, LPVOID ChanMgr) |
| hConn: | Handle to the connection (received as part of the CONN_REQUESTED callback/message). |
| ChanMgr: | The Channel Manager for this connection. This is either a pointer to a callback function, or a window handle to which messages will be posted, depending on ChanMgrFlags. The Channel Manager may also be set up separately via RegisterChanMgr. |
| ChanMgrflags: | Indicates the type of notification to be used for the Channel Manager:<br>CALLBACK_FUNCTION  for callback interface<br>CALLBACK_WINDOW  for post message interface |

Return values:

| | |
|---|---|
| SUCESSFUL | The Accept operation has been initiated. |
| HANDLE_INVALID | The handle was invalid |
| REQUEST_WITHDRAWN | The connect request was withdrawn (peer session was terminated). |
| NO_CONNECT_REQUEST accepted | There was no connect request to be |

Status Messages:
CONN_ACCEPTED
Peer Messages:
CONN_ACCEPTED

| | |
|---|---|
| RejectConnection | Issued in response to a CONN_REQUESTED callback/message that has been received (as a consequence of a MakeConnection call issued by a peer). RejectConnection notifies the peer that the connection request has been rejected. |

TSTATUS RejectConnection (HCONN hConn)

| | |
|---|---|
| hConn: | Handle to the connection (received as part of the CONN_REQUESTED callback/message). |

Return values:

| | |
|---|---|
| SUCESSFUL | Connection reject was returned to peer. |
| HANDLE_INVALID | The handle was invalid |
| REQUEST_WITHDRAWN | The connect request was withdrawn |
| NO_CONNECT_REQUEST rejected | There was no connect request to be |

Status Messages: none
Peer Messages:
CONN_REJECTED

| | |
|---|---|
| CloseConnection | Closes the connection that was opened after an AcceptConnection or an accepted call after a MakeConnection function. |

-continued

```
TSTATUS CloseConnection (HCONN hConn, BOOL Force, DWORD TransId)
hConn:          Handle to the connection to be closed.
Force:          If true, then close the connection regardless of any
                pending operations on reliable channels.
TransId         User specified identifier which will be returned to
                the local Session Handler with the asynchronous
                response notification (CONN_CLOSE_RESP).
Return values:
SUCESSFUL                       Disconnect initiated.
HANDLE_INVALID                  The handle was invalid
NO_CONNECTION                   Connection was not open
RELIABLE_OPS_PENDING            Could not close due to pending
                                operations on channels designated as
                                reliable.
Status Messages:
CONN_CLOSE_RESP
Peer Messages:
CONN_CLOSED
RegisterChanMgr    Registers a callback or an application window
                   whose message processing function will handle
                   low level notifications generated by data
                   channel initialization operations. This
                   function is invoked before any channels can be
                   opened or accepted. As part of connection
                   establishment (MakeConnection,
                   AcceptConnection), a default Channel Manager
                   may be installed for a connection. The
                   RegisterChanMgr function allows the application
                   to override the default Channel Manager for
                   specific Channel IDs.
TSTATUS RegisterChanMgr     (HCONN hConn, WORD Flags, LPVOID
                            CallBack, WORD ChanId)
hConn:          Handle to the Connection
Flags:          Indicates the type of notification to be used:
                CALLBACK_FUNCTION       for callback interface
                CALLBACK_WINDOW         for post message interface
CallBack:       Either a pointer to a callback function, or a window
                handle to which messages will be posted, depending
                on flags. All Channel Manager callbacks
ChanId          Specifies the Channel Id for which the Channel Manager is
                being installed. It corresponds to the Channel Id Number
                specified in the CHAN_INFO structure; it is defined by
                the application and is not to be confused with the
                Channel Handle assigned by TII for a channel. A value of
                0x0FFFF indicates all Channel Ids.
Return values:
SUCESSFUL                   Channel Manager registered.
HANDLE_INVALID              The handle was invalid
Callback routine format:
FuncName (UINT Message, WPARAM wParam, LPARAM lParam)
    Message:                The message type
    wParam:                 Word parameter passed to function
    lParam:                 Long parameter passed to function
The callback function parameters are equivalent to the second,
third, and fourth parameters that are delivered to a Microsoft ®
Windows message handler function (Win 3.1).
Status Messages: none
Peer Messages: none
OpenChannel        Requests a sub-channel connection from the peer
                   application. The result of the action is given to
                   the application by invoking the Channel Manager. The
                   application specifies an ID for this transaction.
                   This ID is returned to the Channel Manager when the
                   request is complete, along with the Channel Handle
                   (if the request was accepted by the peer). All
                   OpenChannel requests are for establishing channels
                   for sending data. The receive channels are opened
                   as the result of accepting a peer's OpenChannel
                   request.
TSTATUS OpenChannel         (HCONN hConn, LPCHAN _INFO lpChanInfo,
                            DWORD TransID)
hConn:          Handle for the Connection.
lpChanInfo:     Pointer to a channel information structure. Filled
                by application. The structure contains:
                    o   A channel ID number (application-defined).
                    o   Priority of this channel relative to other
                        channels on this connection. Higher numbers
                        represent higher priority.
                    o   Timeout value for the channel
                    o   Reliability of the channel.
```

|  |  |
|---|---|
|  | o Length of the channel specific field. |
|  | o Channel specific information. |
|  | This structure is delivered to the Channel Manager on the peer side along with the CHAN_REQUESTED notification. |
| TransID: | A user defined identifier that is returned with response messages to identify the channel request. |

Return values:
| | |
|---|---|
| SUCESSFUL | Channel request was sent. |
| HANDLE_INVALID | The Connection handle was invalid. |
| BANDWIDTH_NA | Bandwidth is not available. |
| NO_SESSION | BeginSession has not been called. |
| NO_CHAN_MGR | RegisterChanMgr has not been called. |
| CHAN_ID_INVALID | The channel number is not in the valid range |
| CHAN_INUSE | The channel number is already is use. |

Status Messages:
| | |
|---|---|
| CHAN_ACCEPTED: | The peer process has accepted request. |
| CHAN_REJECTED: | The Peer process has rejected request. |
| CHAN_TIMEOUT: | No answer from peer |

Peer Messages:
CHAN_REQUESTED

| | |
|---|---|
| AcceptChannel | A peer application can issue AcceptChannel in response to a CHAN_REQUESTED (OpenChannel) message that has been received. The result of the AcceptChannel call is a one-way communication sub-channel for receiving data. |

TSTATUS AcceptChannel (HCHAN hChan, DWORD TransID)
| | |
|---|---|
| hChan: | Handle to the Channel (that was received as part of the CHAN_REQUESTED callback/message) |
| TransID: | The identifier that was received as part of the CHAN_REQUESTED notification. |

Return values:
| | |
|---|---|
| SUCESSFUL | Channel request was sent. |
| CHAN_INVALID | The Channel handle was invalid |

Status Messages: none
Peer Messages:
CHAN_ACCEPTED

| | |
|---|---|
| RejectChannel | Rejects an OpenChannel request (CHAN_REQUESTED message) from the peer. |

TSTATUS RejectChannel (HCHAN hChan, DWORD TransID)
| | |
|---|---|
| hChan: | Handle to the Channel (that was received as part of the CHAN_REQUESTED callback/message) |
| TransID: | The identifier that was received as part of the CHAN_REQUESTED message. |

Return values:
| | |
|---|---|
| SUCESSFUL | Reject request was sent. |
| CHAN_INVALID | The Channel handle was invalid. |

Status Messages: none
Peer Messages:
CHAN_REJECTED

| | |
|---|---|
| RegisterChanHandler | Registers a callback or an application window whose message processing function will handle low level notifications generated by data channel IO activities. The channels that are opened will receive CHAN_DATA_SENT, and the accepted channels will receive CHAN_RECV_COMPLTE. |

TSTATUS RegisterChanHandler  (HCHAN hChan, WORD Flags, LPVOID CallBack)

hChan: Channel Handle.
Flags: Indicates the type of notification to be used:
| | |
|---|---|
| CALLBACK_FUNCTION | for callback interface |
| CALLBACK_WINDOW | for post message interface |
| NOCALLBACK | for polled status interface. |

CallBack: Either a pointer to a callback function, or a window handle to which messages will be posted, depending on flags.

Return values:
| | |
|---|---|
| SUCESSFUL | Channel Handler installed. |
| CHAN_INVALID | The Channel handle was invalid |

Callback routine format:
FuncName (UINT Message, WPARAM wParam, LPARAM lParam)
| | |
|---|---|
| Message: | The message type |
| wParam: | Word parameter passed to function (e.g. bytes received) |
| lParam: | Long parameter passed to function |

The callback function parameters are equivalent to the second, third, and fourth parameters that are delivered to a Microsoft ® Windows message handler function (Win 3.1).

| | |
|---|---|
| Status Messages: none | |
| Peer Messages: none | |
| CloseChannel | Closes a sub-channel that was opened by AcceptChannel or Open Channel. The handler for this channel is automatically de-registered. |
| TSTATUS CloseChannel (HCHAN hChan, DWORD TransId) | |
| hChan: | The handle to the Channel to be closed. |
| TransId | A user specified identifier that will be returned to the local Channel Manager along with the response notification (CHAN_CLOSE_RESP). |
| Return values: | |
| SUCESSFUL | Channel Close has been initiated. |
| CHAN_INVALID | Invalid channel handle. |
| Status Messages: | |
| CHAN_CLOSE_RESP | |
| Peer Messages: | |
| CHAN_CLOSED | |

Data Exchange

All the data communication is done in "message passing" fashion. This means that a send satisfies a receive on a specific channel, regardless of the length of the sent data and the receive buffer length. If the length of the sent message is greater than the length of the posted receive buffer, the data is discarded. All these calls are "asynchronous", which means that the data in the send buffer is not changed until a "data-sent" event has been sent to the application, and the contents of receive buffer are not valid until a "received-complete" event has been detected for that channel.

| | |
|---|---|
| SendData | Sends data to peer. If there are no receive buffers posted on the peer machine, the data will be lost. |
| TSTATUS SendData | (HCHAN hChan, LPSTR Buffer, WORD Buflen, DWORD TransID) |
| hChan: | Handle to channel opened via OpenChannel. |
| Buffer: | A pointer to the buffer to be sent. |
| Buflen: | The length of the buffer in bytes. |
| TransID: | This is a user defined transaction ID which will be passed to the local channel handler along with the status message to identify the transaction. |
| Return values: | |
| SUCESSFUL | Data queued for transmission. |
| CHAN_INVALID | Invalid channel handle. |
| CHAN_TRANFULL | Channel transaction table full. |
| Status Messages: | |
| CHAN_DATA_SENT | Tells the application that the data has been extracted from the buffer and it is available for reuse. |
| CHAN_DATA_LOST | This message will be delivered to the caller if the data could not be sent. |
| Peer Messages: | |
| CHAN_DATA_LOST | This message will be delivered to the peer if an adequate ReceiveData buffer is not posted. |
| CHAN_RECV_COMPLETE | Indicates that data was received. |
| ReceiveData | Data is received through this mechanism. Normally this call is issued in order to post receive buffers to the system. When the system has received data in the given buffers, the Channel Handler will receive a "CHAN_RECV_COMPLETE" notification. |
| TSTATUS ReceiveData | (HCHAN hChan, LPSTR Buffer, WORD Buflen, DWORD TransID) |
| hChan: | Handle to channel handle opened via AcceptChannel. |
| Buffer: | A pointer to the buffer to be filled in. |
| Buflen: | The length of the buffer in bytes. Max. bytes to receive. |
| TransID: | This is a user defined transaction ID which will be passed to the channel handler along with the status message to identify the transaction. This ID and the number of bytes actually received are returned as part of the CHAN_RECV_COMPLETE notification. |
| Return values: | |
| SUCESSFUL | Receive buffer was posted. |
| CHAN_INVALID | Invalid channel handle. |
| CHAN_TRANFULL | Channel transaction table full. |
| Status Messages: | |
| CHAN_RECV_COMPLETE | Indicates that data was received. |
| CHAN_DATA_LOST | This message will be delivered if the buffer is inadequate for a data message received from the peer. |

Peer Messages:
none

Communications Statistics

```
GetTIIStats     Return statistics for the TII subsystem. See
                TII_STATS structure for details.
TSTATUS FAR PASCAL _export GetChanStats    (IN BOOL bResetFlag,
                                            OUT LP_TII_STATS
                                            lpTiiStats
bResetFlag: Boolean Reset statistics if true.
lpTiiStats: Pointer to the TII_STATS structure.
Return values: none
Status Messages: none
Peer Messages: none
GetChanStats    Return statistics for the given Channel. See
                CHAN_STATS structure for details.
TSTATUS FAR PASCAL        _export GetChanStats (IN HCHAN hChan, IN
                          BOOL bResetFlag, OUT LP_CHAN_STATS
                          lpChanStats)
hChan:          Channel handle
bResetFlag:     Boolean reset statistics if true.
lpChanStats:           Pointer to the CHAN_STATS structure.
Return values:
CHAN_INVALID         The channel handle was invalid.
Status Messages: none
Peer Messages: none
GetChanInfo     This function will return various statistical
                information about a channel (e.g., priority,
                reliability).
TSTATUS GetChanInfo (HCHAN hChan, LPCHAN_INFO lpChanInfo)
hChan:          Handle to channel
lpChanInfo:     Pointer to channel info (to be returned by the
                call).
Return values:
CHAN_INVALID         Invalid channel handle.
Status Messages: none
Peer Messages: none
```

Alternative Embodiments

In a preferred embodiment of conferencing system 100, video encoding is implemented on video board 204 and video decoding is implemented on host processor 202. In an alternative preferred embodiment of the present invention, video encoding and decoding are both implemented on video board 204. In another alternative preferred embodiment of the present invention, video encoding and decoding are bother implemented on the host processor.

In a preferred embodiment of conferencing system 100, audio processing is implemented by audio task 538 on audio/comm board 206. In an alternative preferred embodiment of the present invention, audio processing is implemented by Wave driver 524 on host processor 202.

In a preferred embodiment, conferencing systems 100 communicate over an ISDN network. In alternative preferred embodiments of the present invention, alternative transport media may be used such as Switch 56, a local area network (LAN), or a wide area network (WAN).

In a preferred embodiment, two conferencing systems 100 participate in a conferencing session. In alternative preferred embodiments of the present invention, two or more conferencing systems 100 may participate in a conferencing session.

In a preferred embodiment, the local sources of analog video and audio signals are a camera and a microphone, respectively. In alternative preferred embodiments of the present invention, analog audio and/or video signals may have alternative sources such as being generated by a VCR or CD-ROM player or received from a remote source via antenna or cable.

In a preferred embodiment, conferencing system 100 compresses and decompresses video using the IRV method for purposes of video conferencing. Those skilled in the art will understand that the IRV method of video compression and decompression is not limited to video conferencing, and may be used for other applications and other systems that rely on or utilize compressed video.

In a preferred embodiment, conferencing system 100 compresses and decompresses video using the IRV method. Those skilled in the art will understand that alternative conferencing systems within the scope of the present invention may use methods other than the IRV method for compressing and decompressing video signals.

In a preferred embodiment, conferencing system 100 uses the IRV method to compress and decompress a sequence of video images. In alternative embodiments of the present invention, the IRV method may be used to compress and/or decompress a single image either in a conferencing system or in some other application.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A video subsystem for a computer conferencing system having a general-purpose host processor, comprising:
  (a) a video capture means for:
    (1) receiving local video signals;
    (2) compressing the local video signals to generate local compressed video signals; and
    (3) passing the local compressed video signals to a communications subsystem of the computer conferencing system for transmission over a communications link to a remote computer conferencing system; and
  (b) a video playback means for:
    (1) receiving remote compressed video signals from the communications subsystem, the remote compressed video signals having been transmitted by the remote computer conferencing system over the communications link; and
    (2) decompressing the remote compressed video signals to generate remote decompressed video signals for local playback, wherein the decompression of the remote compressed video signals is implemented on the general-purpose host processor, wherein the video subsystem comprises a video manager adapted for residing in the general-purpose host processor and for controlling operations of the video subsystem, for passing the local compressed video signals to the communications subsystem, and for receiving the remote compressed video signals from the communications subsystem, wherein the video manager comprises:
      (1) a library component adapted to provide a library of functions of the video applications programming interface;
      (2) a capture component adapted to control the capture of the local video signal by the video board and distribution of the local compressed video signals from the video board;
      (3) a playback component adapted to control the decompression and playback of the remote compressed video signals;
      (4) a network library component adapted to provide interfaces to send the local compressed video signals to the communications subsystem and to receive the remote compressed video signals from the communications subsystem; and
      (5) an audio-video synchronization library component adapted to provide interfaces to enable synchronization of the local and remote video signals with local and remote audio signals in the computer conferencing system.

2. The video subsystem of claim 1, further comprising:
  a video microcode adapted for residing in a video board of the computer conferencing system and for compressing the local video signals;
  a video capture driver adapted for residing in the general-purpose host processor and for controlling operations of the video board; and
  a video applications programming interface adapted for residing in the general-purpose host processor and for providing an interface between an application and the video subsystem.

3. The video subsystem of claim 2, wherein the video board comprises:
  a video capture module for capturing the local video signals;
  a memory device for storing the local captured video signals; and
  a pixel processor for executing the video microcode and for compressing the local captured video signals.

4. A computer conferencing system, comprising:
  (a) a general-purpose host processor;
  (b) a video board; and
  (c) a video subsystem adapted for residing partially in the general-purpose host processor and partially in the video board, wherein the video subsystem comprises:
    (1) a video capture means for:
      (i) receiving local video signals;
      (ii) compressing the local video signals to generate local compressed video signals; and
      (iii) passing the local compressed video signals to a communications subsystem of the computer conferencing system for transmission over a communications link to a remote computer conferencing system; and
    (2) a video playback means for:
      (i) receiving remote compressed video signals from the communications subsystem, the remote compressed video signals having been transmitted by the remote computer conferencing system over the communications link; and
      (ii) decompressing the remote compressed video signals to generate remote decompressed video signals for local playback, wherein the decompression of the remote compressed video signals is implemented on the general-purpose host processor, wherein the video subsystem comprises a video manager adapted for residing in the general-purpose host processor and for controlling operations of the video subsystem, for passing the local compressed video signals to the communications subsystem, and for receiving the remote compressed video signals from the communications subsystem, wherein the video manager comprises:
        (1) a library component adapted to provide a library of functions of the video applications programming interface;
        (2) a capture component adapted to control the capture of the local video signal by the video board and distribution of the local compressed video signals from the video board;
        (3) a playback component adapted to control the decompression and playback of the remote compressed video signals;
        (4) a network library component adapted to provide interfaces to send the local compressed video signals to the communications subsystem and to receive the remote compressed video signals from the communications subsystem; and
        (5) an audio-video synchronization library component adapted to provide interfaces to enable synchronization of the local and remote video signals with local and remote audio signals in the computer conferencing system.

5. The system of claim 4, wherein the video subsystem further comprises:

a video microcode adapted for residing in the video board and for compressing the local video signals;

a video capture driver adapted for residing in the general-purpose host processor and for controlling operations of the video board; and a video applications programming interface adapted for residing in the general-purpose host processor and for providing an interface between an application and the video subsystem.

6. The system of claim 5, wherein the video board comprises:

a video capture module for capturing the local video signals;

a memory device for storing the local captured video signals; and a pixel processor for executing the video microcode and for compressing the local captured video signals.

* * * * *